(12) United States Patent
Toye et al.

(10) Patent No.: US 10,791,680 B2
(45) Date of Patent: Oct. 6, 2020

(54) NETTING, CROP COVER, AND GROUND COVER MATERIALS

(71) Applicant: Nine IP Limited, Auckland (NZ)

(72) Inventors: Jonathan Dallas Toye, Auckland (NZ); Suzanne Elizabeth Foy, Auckland (NZ)

(73) Assignee: NINE IP LIMITED, Rosedale (NZ)

( * ) Notice: Subject to any disclaimer, the term of this patent is extended or adjusted under 35 U.S.C. 154(b) by 397 days.

(21) Appl. No.: 14/427,952

(22) PCT Filed: Sep. 12, 2013

(86) PCT No.: PCT/IB2013/058488
§ 371 (c)(1),
(2) Date: Mar. 12, 2015

(87) PCT Pub. No.: WO2014/041499
PCT Pub. Date: Mar. 20, 2014

(65) Prior Publication Data
US 2015/0223411 A1 Aug. 13, 2015

Related U.S. Application Data

(60) Provisional application No. 61/700,203, filed on Sep. 12, 2012.

(30) Foreign Application Priority Data

Aug. 8, 2013 (NZ) .......................... 614071
Aug. 8, 2013 (NZ) .......................... 614074
Aug. 8, 2013 (NZ) .......................... 614075

(51) Int. Cl.
*A01G 13/02* (2006.01)
*A01G 13/10* (2006.01)
(Continued)

(52) U.S. Cl.
CPC ..... *A01G 13/0275* (2013.01); *A01G 13/0268* (2013.01); *A01G 13/10* (2013.01);
(Continued)

(58) Field of Classification Search
CPC .......... Y10T 442/259; Y10T 442/2598; Y10T 442/2607; Y10T 442/10; Y10T 442/183;
(Continued)

(56) References Cited

U.S. PATENT DOCUMENTS 3,043,709 A 7/1962 Amborski
3,315,408 A 4/1967 Fisher
(Continued)

FOREIGN PATENT DOCUMENTS

AU 2004201984 A1 6/2004
AU 2012202670 A1 5/2012
(Continued)

OTHER PUBLICATIONS

Cover Factor definition, Textile Glossary, Celanese Acetate, copyright 2001.*
(Continued)

*Primary Examiner* — Jennifer A Steele
(74) *Attorney, Agent, or Firm* — Seed IP Law Group LLP

(57) ABSTRACT

The invention relates to crop netting materials, crop cover materials, and ground cover materials for agricultural applications, which is knitted, woven or non-woven, from a synthetic monofilament, multifilament yarn, or tape or combination thereof, formed from a resin comprising at least one pigment such that the monofilament, multifilament yarn, or tape, transmit solar radiation in the visible wavelength range of about 420 to 720 nm at a level similar to the level that the materials transmit solar radiation in the infra-red wavelength ranges of about 700 to about 1000 nm and 1500 to about
(Continued)

1600 nm. The materials also absorb solar radiation in the UV wavelength range of about 300 to about 380 nm.

22 Claims, 47 Drawing Sheets

(51) Int. Cl.
  *D01F 1/10* (2006.01)
  *D03D 1/00* (2006.01)
(52) U.S. Cl.
  CPC ............. *D01F 1/106* (2013.01); *D03D 1/007* (2013.01); *D10B 2401/22* (2013.01); *Y10T 442/10* (2015.04); *Y10T 442/183* (2015.04); *Y10T 442/184* (2015.04); *Y10T 442/3033* (2015.04); *Y10T 442/3976* (2015.04); *Y10T 442/40* (2015.04); *Y10T 442/696* (2015.04)
(58) Field of Classification Search
  CPC ............. Y10T 442/184; Y10T 442/102; Y10T 442/3041; A01G 13/0268; A01G 13/0206; A01G 13/02; A01G 13/043; A01G 9/1438; A01G 9/22; A01G 7/045; C09K 17/52; Y02P 60/146
  See application file for complete search history.

(56) References Cited

U.S. PATENT DOCUMENTS

| | | | |
|---|---|---|---|
| 3,911,620 A | 10/1975 | Glatti | |
| 4,074,482 A * | 2/1978 | Klahr | E04B 1/76 359/886 |
| 4,529,269 A | 7/1985 | Mutzhas | |
| 4,764,913 A | 8/1988 | Sasaki et al. | |
| 4,799,963 A | 1/1989 | Basil et al. | |
| 4,895,904 A | 1/1990 | Allingham | |
| 5,022,181 A | 6/1991 | Longstaff | |
| 5,078,462 A | 1/1992 | Gravisse | |
| 5,138,792 A | 8/1992 | Allingham | |
| 5,164,250 A | 11/1992 | Paz Rodriguez | |
| 5,771,630 A | 6/1998 | Harasawa et al. | |
| 5,953,857 A | 9/1999 | Aiga et al. | |
| 6,080,688 A | 6/2000 | Henningsson et al. | |
| 6,180,224 B1 | 1/2001 | Shouji et al. | |
| 6,441,059 B1 | 8/2002 | Kieser et al. | |
| 6,521,038 B2 | 2/2003 | Yanagimoto et al. | |
| 6,647,662 B2 * | 11/2003 | Toye | A01G 7/045 47/9 |
| 6,810,224 B2 | 10/2004 | Ahn | |
| 7,455,899 B2 | 11/2008 | Gross et al. | |
| 8,505,237 B2 | 8/2013 | Vitale et al. | |
| 9,204,598 B2 | 12/2015 | Velate et al. | |
| 9,284,666 B2 | 3/2016 | Swennen et al. | |
| 9,414,549 B2 | 8/2016 | Toye | |
| 9,777,455 B2 | 10/2017 | Sutton et al. | |
| 2004/0074012 A1 * | 4/2004 | Heidenfelder | C11D 1/62 8/115.51 |
| 2005/0050793 A1 | 3/2005 | Johnson et al. | |
| 2005/0204616 A1 | 9/2005 | Hinsperger | |
| 2006/0134389 A1 | 6/2006 | Weiser | |
| 2006/0167138 A1 * | 7/2006 | Ishii | C09C 1/043 523/200 |
| 2008/0031832 A1 | 2/2008 | Wakefield et al. | |
| 2008/0120901 A1 | 5/2008 | Hinsperger | |
| 2008/0268190 A1 | 10/2008 | Shi et al. | |
| 2010/0064578 A1 | 3/2010 | Karl et al. | |
| 2013/0139437 A1 | 6/2013 | Maxik et al. | |
| 2015/0064415 A1 | 3/2015 | Verlinde et al. | |
| 2015/0208590 A1 | 7/2015 | Wu | |
| 2016/0174472 A1 | 6/2016 | Toye et al. | |
| 2016/0174473 A1 | 6/2016 | Toye et al. | |
| 2016/0174474 A1 | 6/2016 | Toye et al. | |
| 2016/0348333 A1 | 12/2016 | Sutton et al. | |

FOREIGN PATENT DOCUMENTS

| | | |
|---|---|---|
| CA | 2 421 687 A1 | 3/2002 |
| CA | 2 415 074 A1 | 6/2004 |
| DE | 23 38 189 A1 | 2/1975 |
| DE | 39 17 508 A1 | 3/1990 |
| DE | 10 2013 010 702 B3 | 11/2014 |
| EP | 1 217 044 B1 | 9/2006 |
| FR | 2 071 064 A5 | 9/1971 |
| FR | 2 363 975 A1 | 4/1978 |
| GB | 2 240 745 A | 8/1991 |
| JP | 9-262030 A | 10/1997 |
| NZ | 328780 A | 9/1987 |
| NZ | 299783 A | 11/1996 |
| NZ | 517454 A | 9/2003 |
| NZ | 578427 A | 2/2012 |
| WO | 92/01733 A1 | 2/1992 |
| WO | 9821935 A2 | 5/1998 |
| WO | 2009/115574 A1 | 9/2009 |
| WO | 2009/136141 A1 | 11/2009 |
| WO | 2010/026227 A1 | 3/2010 |
| WO | 2010/044270 A1 | 4/2010 |
| WO | 2010120201 A2 | 10/2010 |
| WO | 2011/008109 A1 | 1/2011 |
| WO | 2011/101657 A1 | 8/2011 |
| WO | 2011/101658 A1 | 8/2011 |
| WO | 2011/101659 A1 | 8/2011 |
| WO | 2011/121339 A1 | 10/2011 |
| WO | 2011/149028 A1 | 12/2011 |
| WO | 2013/162385 A1 | 10/2013 |

OTHER PUBLICATIONS

"Heat blocking effect of TITANIX JR-1000 in dark gray colored film", TAYCA Corporation, accessed Sep. 12, 2012, 1 page.
"Heat blocking effect of TITANIX JR-1000 in deep blue colored film", TAYCA Corporation, accessed Sep. 12, 2012, 1 page.
"Heat blocking effect of TITANIX JR-1000 in moss green colored film", TAYCA Corporation, accessed Sep. 12, 2012, 1 page.
"Heat blocking effect of TITANIX JR-1000 in two-coat film", TAYCA Corporation, accessed Sep. 12, 2012, 2 pages.
"Product Introduction—Titanium Dioxide", TAYCA Corporation, accessed Sep. 12, 2012, 4 pages.
"Infrared reflection demonstration", Huntsman Altiris product brochure, Mar. 2012, 4 pages.
"Infrared reflection for exterior coatings", Huntsman Altiris product brochure, May 2012, 16 pages.
"Altiris® 550 Pigment Product Data Sheet," Huntsman Altiris product brochure, May 2012, 2 pages.
"Altiris® 800 Pigment Product Data Sheet," Huntsman Altiris product brochure, May 2012, 2 pages.

* cited by examiner

NETTING, CROP COVER, AND GROUND COVER MATERIALS

PRIORITY CLAIM

This invention claims priority from PCT Application No. PCT/IB2013/058488 filed Sep. 12, 2013, which claims priority to New Zealand Application Serial Nos. 614071, 614074 and 614075 filed Aug. 8, 2013 and U.S. Provisional Patent Application No. 61/700,203 filed Sep. 12, 2012, which are hereby incorporated by reference.

FIELD OF INVENTION

The invention relates to netting materials, particularly but not exclusively to netting materials for use as bird netting, insect netting, shadecloth netting, windbreak netting, or hail protection netting for example or in other agricultural applications, and also to crop cover materials and ground cover materials.

BACKGROUND

Bird netting, insect netting, shadecloth netting, windbreak netting, or hail protection netting may be placed near plants to protect for example annual plants, perennial plants, fruit trees, or grape vines, from birds, insects, excessive sun, wind, or hail. Typically the netting is supported over the plant(s) and/or as a vertical and/or angled wall or walls near the plant(s), by for example cables or wires between posts positioned along the rows of plants in a garden, field crop, orchard or vineyard, or is draped over the plant(s) or is laid on the ground.

A crop cover material such as film, or a woven material optionally coated with a film layer on one or both sides is placed above the plant crop to protected it from birds, insects, rain, hail, wind and excessive sun. The addition of materials to the cover may occur to add in its properties, such as sun protection by increasing the level of shade.

Woven or film ground cover materials are used in agriculture for a number of purposes including weed suppression and/or soil warmth retention and/or moisture retention and/or for light reflecting and/or for soil cooling.

Typically where a material is used primarily as a reflective ground cover for light enhancement, the material is rolled out in lengths onto the ground, and secured in place, beneath or between rows of trees, vines, or plants, to increase the amount of light to which the plants and in particular fruit are exposed by reflection of light from the material towards the fruit above. The material may also aid soil warmth retention and moisture retention. The material may also be used for reducing or control soil temperature to an optimum range for plant growth.

It is an object of the present invention to provide improved netting, crop cover, and ground cover materials; and/or to at least provide the public with a useful choice.

SUMMARY OF INVENTION

In broad terms in one aspect the invention comprises a crop netting material which is knitted, woven, or non-woven, from a synthetic monofilament, multifilament yarn, or tape or combination thereof, formed from a resin comprising at least one pigment such that the monofilament, multifilament yarn, or tape:

across a UV wavelength range about 300 to about 380 nm:
absorbs at least about 55% solar radiation on average, and
transmits less than about 30% solar radiation on average;
across a visible wavelength range about 420 to about 700 nm:
transmits at least about 10% solar radiation on average, and
reflects at least about 10% of solar radiation on average;
across an infrared wavelength range about 700 to about 1000 nm: transmits between about 15% and about 80% of solar radiation on average;
across an infrared wavelength range of 1500 to 1600 nm: transmits at least about 15% to about 90% solar radiation on average; and
across an infrared wavelength range about 700 to about 1000 nm;
transmits not more than about 9 percentage points on average more than, and
transmits not less than about 9 percentage points on average less than,
the solar radiation transmission across said visible wavelength range about 420 to about 700 nm; and
across an infrared wavelength range about 1500 to about 1600 nm:
transmits not more than about 9 percentage points on average more than, and
transmits not less than about 9 percentage points on average less than,
the solar radiation transmission across said infrared wavelength range about 700 to about 1000 nm.

Netting of the invention may be suitable for use in relation to plants which in the environment in which they are growing, without the netting of the invention, may suffer overheating (and reduced photosynthesis plus excessive plant respiration) and fruit sunburn. Netting of the invention also or alternatively may be suitable for use in providing an improved or controlled growing and/or fruit development environment.

The netting across a UV wavelength range about 300 to about 380 nm absorbs at least about 55% solar radiation on average. This may reduce fruit sunburn.

The netting across this UV wavelength range transmits less than about 30% solar radiation on average. This reduction in UV this assists in reducing sunburn effects on fruit. It also reduces the UV stress effects on the plant itself and aids in supporting lower temperatures.

In some embodiments, the crop netting material across a UV wavelength range about 300 to about 380 nm:
absorbs at least about 60% solar radiation on average, and
transmits less than about 30% solar radiation on average.

The netting across a visible wavelength range about 420 to about 700 nm transmits at least about 10% solar radiation on average. Visible light is required for plant photosynthesis.

In some embodiments, the crop netting material across a visible wavelength range about 420 to about 700 nm: transmits at least about 20% solar radiation on average.

The netting across the infrared wavelength ranges about 700 to about 1000 nm transmits between about 15% to about 80% of solar radiation on average; and 1500 to about 1600 nm transmits between about 15% and about 90% of solar radiation on average. And the netting in the range of about 700 to about 1000 transmits not more than about 9% on average, and transmits not less than about 9% on average, of transmission across said visible wavelength range about 420 to about 700 nm. And the netting in the range of about across an infrared wavelength range of about 1500 to about 1600 nm transmits not more than about 9% on average, and transmits not less than about 9% on average, of transmits not less than about 9% on average, of transmission across said infrared wavelength range about 700 to about 1000 nm. The netting therefore may reduce heating beneath the netting relative to certain prior art netting.

In at least some embodiments the netting material transmits at least about 15%, or at least about 20%, or about 25%, or at least about 30%, or at least about 35% of solar radiation on average across said infrared wavelength range about 700 to about 1000 nm.

In at least some embodiments the netting material transmits between about 15% and about 85%, or between about 20% and about 80%, or between about 20% and about 70%, or between 15% and about 45% or between about 10 and about 45%, or between about 10% and about 40% or between about 35% and about 80% or between about 40% and about 75% of solar radiation on average across the infrared wavelength range about 700 to about 1000 nm.

In at least some embodiments the netting material transmits not more than about 90%, or not more than about 85%, or not more than about 80%, or not more than about 75% or not more than about 70% or not more than about 65% or not more than about 60% or not more than about 55% or not more than about 50% or not more than about 485% of solar radiation on average across said infrared wavelength range about 1500 to about 1600 nm.

In at least some embodiments the netting material transmits between about 15% and about 90%, or between about 15% and about 85%, or between about 20% and about 80%, or between 20% and about 70% or between 20% and about 75% or between about 20% to about 90% or between about 30% to about 85% or between about 35% to about 80% or between about 40% to about 75% or between about 10% to about 60% or between about 10% to 55% or between about 15% to about 50% or between about 15% to 45% of solar radiation on average across said infrared wavelength range about 1500 to about 1600 nm.

In at least some embodiments the netting material reflects substantially all of said solar radiation from about 700 to about 1000 nm and/or from about 1500 nm to about 1600 nm it does not transmit, across said infrared wavelength ranges.

In at least some embodiments the netting material across said infrared wavelength range about 700 to about 1000 nm:
  transmits not more than about 9% or not more than about 8% on average or not more than about 7% and
  transmits not less than about 9% or not more than about 8% on average or not more than about 7%,
  of transmission across said visible wavelength range about 420 to about 700 nm.

In at least some embodiments the netting material across said infrared wavelength range about 1500 to about 1600 nm:
  transmits not more than about 9% or not more than about 8% on average or not more than about 7% and
  transmits not less than about 9% or not more than about 8% on average or not more than about 7%,
  of transmission across said infrared wavelength range about 700 to about 1000 nm.

In at least some embodiments the netting material absorbs at least about 55%, or at least about 60%, or at least about 65%, or at least about 70%, or at least about 75%, or at least about 80%, or at least about 85%, or at least about 90%, or at least about 95%, on average of solar radiation on average across said UV wavelength range about 280 to about 380 nm.

In at least some embodiments the netting material transmits at least about 10%, or at least about 15%, or at least about 20%, or at least about 25%, or at least about 30%, or at least about 35%, or at least about 40%, or at least about 45%, or at least about 50%, of solar radiation on average across said visible wavelength range about 420 to about 700 nm.

In at least some embodiments the netting material reflects at least about 20%, or at least about 25%, or at least about 30%, or at least about 35%, or at least about 40%, or at least about 45%, or at least about 50%, of solar radiation on average across said visible wavelength range about 420 to about 700 nm.

In another aspect the invention comprises a crop cover material which is knitted, woven, or non-woven, from a synthetic monofilament, multifilament yarn, or tape or combination thereof, formed from a resin comprising at least one pigment such that the monofilament, multifilament yarn, or tape:
  across a UV wavelength range about 300 to about 380 nm:
    absorbs at least about 55% solar radiation on average, and
    transmits less than about 30% solar radiation on average;
  across a visible wavelength range about 420 to about 700 nm:
    transmits at least about 20% solar radiation on average, and
    reflects at least about 10% solar radiation on average;
  across an infrared wavelength range about 700 to about 1000 nm: transmits between about 20% and about 90% of solar radiation on average;
  across an infrared wavelength range of 1500 to 1600 nm: transmits at least about 20% to about 90% solar radiation on average; and
  across an infrared wavelength range about 700 to about 1000 nm:
    transmits not more than about 9 percentage points on average more than, and
    transmits not less than about 9 percentage points on average less than,
  the solar radiation transmission across said visible wavelength range about 420 to about 700 nm; and
  across an infrared wavelength range about 1500 to about 1600 nm:
    transmits not more than about 9 percentage points on average more than, and
    transmits not less than about 9 percentage points on average less than,
  the solar radiation transmission across said infrared wavelength range about 700 to about 1000 nm.

In some embodiments, the crop cover material across a UV wavelength range about 300 to about 380 nm:
  absorbs at least about 60% solar radiation on average, and
  transmits less than about 30% solar radiation on average.

In some embodiments, the crop cover material across a UV wavelength range about 300 to about 380 nm absorbs at least about 60%, at least about 65%, at least about 70%, or at least about 75% solar radiation on average.

In some embodiments, the crop cover material across a UV wavelength range about 300 to about 380 nm transmits less than about 30%, less than about 25%, less than about 20%, or less than about 15% solar radiation on average.

In some embodiments, the crop cover material across a visible wavelength range about 420 to about 700 nm transmits at least about 30%, at least about 35%, at least about 40%, or at least about 50% solar radiation on average.

In at least some embodiments the crop cover material reflects at least about 20%, or at least about 25%, or at least about 30%, or at least about 35%, or at least about 40%, or at least about 45%, or at least about 50%, of solar radiation on average across said visible wavelength range about 420 to about 700 nm.

In some embodiments, the crop cover material across an infrared wavelength range about 700 to about 1000 nm transmits between about 30% and about 85%, between about 35% and about 85%, between about 40% and about 85%, between about 30% and about 80%, between about 30% and about 75%, between about 35% and about 80%, between about 40% and about 75%, or between about 45% and about 70% of solar radiation on average.

In some embodiments, the crop cover material across an infrared wavelength range of 1500 to 1600 nm transmits at least about 30% to about 85%, at least about 35% to about 80%, at least about 40% to about 75%, at least about 35% to about 85%, at least about 40% to about 85%, at least about 45% to about 85%, at least about 30% to about 80%, at least about 30% to about 75%, or at least about 30% to about 70% solar radiation on average.

In some embodiments, the crop cover material across an infrared wavelength range about 700 to about 1000 nm:
 transmits not more than about 8% on average or not more than about 7% on average, and
 transmits not less than about 8% on average or not more than about 7% on average,
 of transmission across said visible wavelength range about 420 to about 700 nm.

In some embodiments, the crop cover material across an infrared wavelength range about 1500 to about 1600 nm:
 transmits not more than about 8% on average or not more than about 7% on average, and
 transmits not less than about 8% on average or not more than about 7% on average,
 of transmission across said infrared wavelength range about 700 to about 1000 nm.

In some embodiments the crop cover material includes a plastic coating on the surface of at least one on one side of the cover material. In some embodiments the crop cover material includes a plastic coating on the surface of both sides of the cover material. In some embodiments the plastic coating comprises at least one pigment. In some embodiments the pigment is an inorganic pigment. In some embodiments, the pigment is a white pigment in accordance with any of the embodiments described herein. In certain exemplary embodiments, the pigment comprises non-conventional titanium dioxide in accordance with any of the embodiments described herein.

In another aspect the invention comprises a ground cover material which is woven, or non-woven, from a synthetic monofilament, multifilament yarn, or tape or combination thereof, formed from a resin comprising at least one pigment such that the monofilament, multifilament yarn, or tape:
 across a UV wavelength range about 300 to about 380 nm:
  absorbs at least about 55% solar radiation on average, and
  transmits less than about 20% solar radiation on average;
 across a visible wavelength range about 420 to about 700 nm:
  transmits less than about 40% solar radiation on average, and
  reflects at least about 10% of solar radiation on average;
 across an infrared wavelength range about 700 to about 1000 nm: transmits between about 10% and about 50% of solar radiation on average;
 across an infrared wavelength range of 1500 to 1600 nm: transmits at least about 10% to about 60% solar radiation on average; and
 across an infrared wavelength range about 700 to about 1000 nm:
  transmits not more than about 9 percentage points on average more than, and
  transmits not less than about 9 percentage points on average less than,
 the solar radiation transmission across said visible wavelength range about 420 to about 700 nm; and
 across an infrared wavelength range about 1500 to about 1600 nm:
  transmits not more than about 9 percentage points on average more than, and
  transmits not less than about 9 percentage points on average less than,
 the solar radiation transmission across said infrared wavelength range about 700 to about 1000 nm.

In some embodiments the ground cover across a UV wavelength range about 300 to about 380 nm:
 absorbs at least about 60% solar radiation on average, and
 transmits less than about 20% solar radiation on average.

In some embodiments the ground cover across a UV wavelength range about 300 to about 380 nm absorbs at least about 65%, at least about 70%, or at least about 75% solar radiation on average.

In some embodiments the ground cover across a UV wavelength range about 300 to about 380 nm transmits less than about 25%, less than about 30%, or less than about 35% solar radiation on average.

In some embodiments the ground cover across a visible wavelength range about 420 to about 700 nm transmits less than about 35%, less than about 40%, less than about 45%, or less than about 50% solar radiation on average.

In at least some embodiments the ground cover material reflects at least about 20%, or at least about 25%, or at least about 30%, or at least about 35%, or at least about 40%, or at least about 45%, or at least about 50%, of solar radiation on average across said visible wavelength range about 420 to about 700 nm.

In some embodiments the ground cover across an infrared wavelength range about 700 to about 1000 nm transmits between about 15% and about 45%, 10% and about 45%, 10% and about 40%, between about 20% and about 45%, between about 25% and about 45%, between about 30% and about 45%, between about 15% and about 40%, between about 15% and about 35%, or between about 15% and about 30% of solar radiation on average.

In some embodiments the ground cover across an infrared wavelength range of 1500 to 1600 nm: transmits at least about 10% to about 55%, at least about 15% to about 50%, at least about 15% to about 45%, at least about 15% to about 55%, at least about 20% to about 55%, at least about 25% to about 55%, at least about 10% to about 50%, at least about 10% to about 45%, or at least about 10% to about 40% solar radiation on average.

In some embodiments the ground cover across an infrared wavelength range about 700 to about 1000 nm:
 transmits not more than about 8% on average or not less than about 7% on average, and
 transmits not less than about 8% on average or not less than about 7% on average, of transmission across said visible wavelength range about 420 to about 700 nm.

In some embodiments the ground cover across an infrared wavelength range about 1500 to about 1600 nm:
  transmits not more than about 8% on average or not less than about 7% on average, and
  transmits not less than about 8% on average or not less than about 7% on average,
  of transmission across said infrared wavelength range about 700 to about 1000 nm.

The netting and crop cover material across the UV wavelength range indicated transmits less than about 30% solar radiation on average. This reduction in UV assists in reducing sunburn effects on fruit. It also reduces the UV stress effects on the plant itself and aids in lower support lower temperatures.

The ground cover material in the UV wavelength range indicated transmits less than about 20% solar radiation on average. This reduction in the UV assists in reducing the damage effects high UV transmission has in the plastic polymers plus reduce any soil warming effects it may have.

In some embodiments, the monofilament, yarn, or tape has a total solar absorption of greater than about 55%, about 60%, about 65%, about 70%, or about 75% or about 80% or about 85%.

In some embodiments, the monofilament, yarn, or tape has a total solar reflectance of greater than about 45%, about 40%, about 35%, about 30%, or about 25% or about 20% or about 15%.

Typically the netting is supported over the plant(s) and/or as a vertical and/or angled wall or walls near the plant(s), or on the ground itself, by for example cables or wires between posts positioned along the rows of plants in a garden, fieldcrop, orchard or vineyard, or is draped over the plant(s), as bird netting, insect netting (for repelling for example mosquitoes, or as for example bee exclusion netting), shade-cloth netting, windbreak netting, or hail protection. Netting may be placed near plants to protect for example annual plants, perennial plants, fruit trees, or grape vines, vegetable plants, from birds, insects, excessive sun, wind, or hail. The netting has some reflective due to the white pigment(s) referred to above, visible light incident on the netting i.e. on the monofilament, yarn, or tapes thereof, is reflected. A portion of incident light hits the netting such that it is reflected away but some light although undergoing a change in direction due to reflection from the netting nonetheless enters the plants but is diffused and hence more favourable for more even light distribution of the plant, and hits the plants and particularly fruit or vegetables below or adjacent the netting canopy and creates an environment that is favourable for plant growth and/or fruit or vegetable development, and an environment suited to beneficial organisms (insects, bacteria and fungi etc) and less favoured by some non beneficial organisms of the plant or fruits or vegetables. Light not hitting the netting passes directly through the netting air space to the plants and fruit. Light hitting the sides of the net yarn will be reflected in part to the space above the net and in part to the plants below the net which will contribute to the light diffusion properties of the net.

As described above, the netting material of the present invention has increased reflectivity in the infrared wavelength range in proportion to the visible or photosynthetic active solar radiation. In nets placed over plants to give some heat reduction typical involves also reduction in visible light as well. In some cases the amount of the visible light reduction is excessive just to obtain a certain amount of heat reduction. The advantage of the heat reduction comes at a cost of reduced photosynthetic active light. Hence is a net that reduces more heat with less reduction of photosynthetic active light then this is an advantage. Accordingly, heating of the surface of the netting material and heat transfer through the netting material is reduced. This can be advantageous, for example, where it is desirable to provide lower temperature environments for the growth of certain plants under canopies of the netting material or for soil covered by the netting material or with ground covers material of the present invention. The reflection of the heat is preferable to heat absorption in the case of heat absorbing pigments such as carbon black or others as it places the heat away from the plant zone, as absorbing material gives the unfavourable opportunity for the heat to be transferred to the plant environment by conduction or convention.

Also as described above, the netting material has increased transmittance of light in the visible wavelength region, due to reduced scattering. In some cases with direct unfiltered light the parts of the plant in the top part of the tree received visible light such that the leaves are light saturated and the parts of the plant in the lower part are not working optimal due to insufficient visible light. The creation or the increasing the amount of diffuse light enables the light to be used more efficiently by the plant. Hence by providing a plant with a net that gives heat reduction but also increased diffuse light then this gives an advantage over a net that gives the same heat reduction but with less diffused visible light. Accordingly, increased amounts of light in the visible wavelength region can pass through, for example, canopies of the netting material to plants and fruit beneath. This may assist in growth of the plants and the growth and/or ripening of fruit.

The transmission, absorbance, and reflection properties of the netting, crop cover, and ground cover materials of the invention may achieved by the inclusion of at least one pigment in the resin from which monofilament, multifilament yarn, or tape from which the netting, crop cover, or ground material are formed. The pigment or combination of pigments selected will depend on the end use of the material. As described herein the at least one pigment may be a single pigment or a combination of two or more pigments that together provide the desired transmission, absorbance, and reflection properties.

In some embodiments the at least one pigment comprises at least one white pigment. In some embodiments said pigment comprises at least one inorganic pigment. In some embodiments said pigment comprises a white zirconium, strontium, barium, magnesium, zinc, calcium, titanium, or potassium pigment or a combination thereof.

In some embodiments said pigment comprises zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, potassium tintanate, barium titanate, magnesium titanate, strontium titanate, neodymium titanate, tin oxide, titanium dioxide, titanium oxide, zinc oxide, zinc sulphide, zinc sulphate, dipotassium titanium trioxide, potassium oxide, potassium titanate, magnesium carbonate, aluminium oxide, aluminium hydroxide, or a combination thereof.

In some exemplary embodiments, said pigment comprises a zirconium dioxide, barium sulphate, calcium carbonate, and titanium dioxide. In some exemplary embodiments, said pigment comprises titanium dioxide, calcium carbonate, or a combination thereof. In some exemplary embodiments, said pigment is titanium dioxide. In some exemplary embodiments, said pigment is calcium carbonate.

In one embodiment, the resin comprises a titanium pigment. In one embodiment, the titanium pigment is white.

In some embodiments, the at least one pigment comprises a particulate material. In certain embodiments, the pigment comprises a particulate material having a large average particle size.

In one embodiment, the average particle size is greater than or equal to 0.4 µm. In certain embodiments, the average particle size is greater than or equal to 0.5 µm. In other embodiments, the average particle size is greater than or equal to 0.7 µm, greater than or equal to about 1.0 µm, greater than or equal to about 1.5 µm, or greater than or equal to about 1.8 µm.

In some embodiments, the average particle size is from about 0.5 µm to about 2.0 In certain embodiments, the average particle size is from about 0.7 µm to about 1.8 µm from about 0.7 to about 1.4 µm from about 0.6 µm to about 1.7 µm from about 1.0 µm to about 1.6 µm from about 1.0 µm to about 1.5 µm or from about 1.2 µm to about 1.4 In other embodiments, the average particle size is from about 0.55 µm and about 0.95 µm from about 0.6 µm to about 0.9 µm and from about 0.7 µm to about 0.8 µm.

In some embodiments, the average particle size is about 1.1 µm±0.3 In other embodiments, the average particle size is about 1 µm.

In some embodiments, the particulate material has a substantially rutile crystal form.

In some embodiments, the at least one pigment comprises non-conventional titanium dioxide. As described herein, non-conventional titanium dioxide is distinct from conventional titanium dioxide. Non-conventional titanium dioxide transmits comparatively less infrared light and more visible light than conventional titanium dioxide. In addition, non-conventional titanium dioxide also absorbs UV light in useful amounts.

In some embodiments, the particulate material comprises titanium dioxide in substantially rutile crystal form. In some embodiments, the particulate material comprises greater than 70% by weight of titanium dioxide in rutile crystal form, based on the total weight of the particulate material. In other embodiments, the particulate material comprises greater than 80% by weight, greater than 90% by weight, greater than 95% by weight, or greater than 99.5% by weight of titanium dioxide in rutile crystal form, based on the total weight of the particulate material.

In certain embodiments, the particulate material is titanium dioxide in substantially rutile crystal form. In one embodiment, the titanium dioxide comprises doped titanium dioxide in substantially rutile crystal form.

In some embodiments, said pigment comprises titanium dioxide having an average particle size of at least 0.5 µm or at least 0.7 In some embodiments said pigment comprises a titanium dioxide having an average particle size from about 0.7 µm to about 1.8 µm.

In certain embodiments said titanium dioxide comprises titanium dioxide in the rutile crystal form. In certain embodiments said titanium dioxide is substantially in the rutile crystal form. That is, the majority of said titanium dioxide in the rutile crystal form. In some embodiments, greater than greater than 80% by weight, greater than 90% by weight, greater than 95% by weight, or greater than 99.5% by weight of the titanium dioxide is in the rutile crystal form.

In certain embodiments, the titanium dioxide comprises doped titanium dioxide. In some embodiments, the doped titanium dioxide comprises nickel antimony titanate or chromium antimony titanate.

In certain embodiments, said titanium dioxide comprises coated titanium dioxide. In certain embodiments, said titanium dioxide is coated with a coating comprising silica, alumina, or a combination thereof.

In one embodiment, the pigment is selected from Altiris® 550 or Altiris® 800, which are commercially available from Huntsman Corporation.

In another embodiment, the pigment is JR-1000, which is commercially available from Tayca Corporation.

Numerous other non-conventional titanium dioxide pigments with high infrared reflectivity relative to the visible light spectrum, compared to conventional titanium dioxide, are commercially available.

In some embodiments, the pigment comprises conventional pigmentary titanium dioxide. Conventional titanium dioxide may be useful in the materials of the present invention in combination with other pigments described herein, for example, microvoiding pigments.

The netting, crop cover, and ground cover materials of the present invention has useful UV absorbance. Accordingly, in some embodiments, said pigment comprises at least one UV absorbing substance. In some embodiments, said UV absorbing substance is an inorganic pigment or an organic pigment.

In some embodiments, the organic UV absorbing pigment is selected from the group consisting organic UV absorbing pigment is chosen from the group consisting of benzotriazole, cyanoacrylates, phenylacrylate, oxanilides, benzophenones, hydroxyphenyltriazines, hyrdoxyphenylbenzotriazole, tri and octyl methoxycinnamate, aminobenzoic acid, aminobenzoate, oxybenzone, and combinations thereof.

In some embodiments, the inorganic UV absorbing pigment is selected from the group consisting of barium titanate, magnesium titanate, strontium titanate, neodymium titanate, tin oxide, titanium oxide, titanium dioxide, silica, alumina, zinc oxide, zinc sulphide, zinc sulphate, zirconium silicate, magnesium oxide, and combinations thereof.

In certain exemplary embodiments, the inorganic UV absorbing pigment is titanium dioxide or zinc oxide. In certain embodiments, the inorganic pigment is non conventional titanium dioxide as defined in any of the embodiments described herein. In certain embodiments, the inorganic pigment is conventional pigmentary titanium dioxide. In certain embodiments, the inorganic pigment is zinc oxide. In certain embodiments, the zinc oxide is nano zinc oxide.

In some embodiments, the netting, crop cover, or ground cover material comprises microvoids in the material. Microvoids can provide useful reflectance properties. In some embodiments microvoids have been formed by stretching said synthetic monofilament, yarn, or tape from which the netting material is formed or stretching a film material from which said tape has been cut.

In certain embodiments, the at least one pigment comprises a particulate material that forms microvoids when monofilament, yarn, or tape from which the netting material is formed or a film material from which tape is cut is stretched. In some embodiments, the microvoid forming particulate material is a white pigment. In some embodiments, the microvoid forming white pigment comprises barium sulphate, calcium carbonate, magnesium zirconate, calcium zirconate, strontium zirconate, barium zirconate, zirconium silicate, or a combination thereof.

In certain embodiments, the microvoiding white pigment is barium sulphate and/or calcium carbonate. In some embodiments, the barium sulphate and/or calcium carbonate are in the form of particles of size in the range 0.05 to 10 microns, 0.1 to 7 microns, 0.25 to 5 microns, or 0.5 to 3 microns.

The combination of a microvoiding pigment and a UV absorbing substances is useful in providing the materials of the present invention.

In some embodiments, the material comprises microvoids and is formed from a resin, wherein the at least one pigment comprises a microvoiding pigment and a UV absorbing substance as defined in any of the embodiments described herein.

In some embodiments the material comprises microvoids and is formed from a resin, wherein the at least one pigment comprises a microvoiding pigment and a white pigment as defined in any of the embodiments described herein.

In some embodiments the material comprises microvoids and is formed from a resin, wherein the at least one pigment comprises a microvoiding pigment, a white pigment as defined in any of the embodiments described herein, and UV absorbing substance as defined in any of the embodiments described herein.

The amount the at least one pigment present in the materials depends on the nature of the pigment(s) used. Some pigments may need to be used in higher amounts than others to achieve the desired transmission, absorption, and reflectance levels. In some embodiments the material is formed from a resin comprising at least 1%, at least 2%, at least 3%, at least 5%, at least 10%, or at least 15% by weight of said pigment.

In some embodiments the netting material of the invention has a cover factor (as herein defined) of less than 95%, less than 90%, less than 80%, or less than 70%.

In some embodiments the netting, crop cover, or ground cover material is of denier 50 to 2000, 100 to 1000, 300 to 800, or 400 to 600.

In some embodiments the netting material comprises air space apertures through the material of widest dimension about 20 mm or 30 mm. In some embodiments the material comprises air space apertures in the range 10-30 mm.

In some embodiments the monofilament, yarn, or tape of the netting, crop cover, or ground cover material is formed from polypropylene.

In some embodiments, the netting or crop cover material is constructed to have a higher density in stronger parallel side margins of the material.

In some embodiments the netting or crop cover material is a bird netting, an insect netting, a shade cloth netting, a windbreak netting, or a hail protection netting.

In broad terms in another aspect the invention comprises a reflective netting material knitted, woven or non-woven from a synthetic monofilament, yarn, or tape or a combination thereof formed from a resin comprising at least one white, translucent, or colourless titanium pigment, which resin has been formed by mixing a masterbatch consisting essentially of 0.5 to 90% by weight of a white, translucent or colourless titanium pigment, and a first polymer, with a second polymer such that the resin (masterbatch) comprising the white, translucent, or colourless titanium pigment comprises between about 4 to 50% by weight of the total mixture. In some embodiments, the titanium pigment is white.

In some embodiments the material may incorporate a compound or compounds added to cause or increase the extent to which the material reflects and/or absorption of radiation from the earth (terrestrial (long wave or infrared) radiation). Thus when the material is placed over or adjunct to plants it will assist in retaining heat beneath the material, which may be desirable for some plants or applications.

In some further embodiments the material may incorporate a compound or compounds added to cause or increase the extent to which the material allows transmission and/or absorption of radiation from the earth (terrestrial (long wave or infrared) radiation). Thus when the material is placed over or adjacent to plants it will assist in releasing the heat beneath the material, which may be desirable for some plants or applications.

In yet another embodiment the material may incorporate a compound or compounds added to cause or increase the extent to which the material reflects and/or absorbs solar radiation. Thus when the material is placed over or adjunct to plants it will assist in cooling beneath the material, which may be desirable for some plants or applications. In some applications, there is a need for the material to allow visible light transmission in the form of diffused light.

In broad terms in another aspect the invention comprises a method of treating a plant or fruit or vegetables thereon which comprises providing over and/or adjacent the plant as bird netting, insect netting, shadecloth netting, windbreak netting, or hail protection netting a reflective netting material of any form or embodiment above.

In some embodiments, the resin comprises one or more additional pigments or colourants.

The materials, the netting, the crop cover, the ground cover may also contain additional pigments or materials to aid on the total system. The addition of pigments such as micro void generating pigments is of interest due to the ability to generate high reflectivity though the production of micro voids, which are very small air voids in the plastic/polymer material that give two materials with different light refractive indexes, in this case air and polymer. The combination of the micro void generating pigments along with UV absorbing pigments, gives useful combination. Possible micro void generating pigments include magnesium zirconate, calcium zirconate, strontium zirconate, calcium carbonate, barium zirconate and zirconium silicate.

Possible UV absorbing pigments include but are not limited to titanium dioxide, zinc oxide, zinc oxide nano particle size, altiris form of titanium dioxide barium titanate, magnesium titanate, strontium titanate, neodymium titanate, tin oxide, titanium oxide, cerium dioxide, zinc sulphide, zinc sulphate, zirconium silicate and magnesium oxide.

In broad terms in another aspect the invention comprises a method of treating a plant or fruit or vegetables thereon which comprises providing over and/or adjacent the plant as bird netting, insect netting, shadecloth netting, windbreak netting, or hail protection netting a reflective netting material as defined above.

In broad terms in another aspect the invention comprises a method of making a reflective netting material knitted, woven or non-woven from a synthetic monofilament, yarn, or tape or a combination thereof formed from a resin comprising at least one pigment such that the monofilament, yarn, or tape reflects at least 10% solar radiation on average across the wavelength range about 700-2500 nm, the method comprising: (i) providing a resin comprising the at least one pigment; (ii) forming a synthetic monofilament, yarn, or tape or a combination thereof from the resin; and (iii) forming a knitted, woven or non-woven netting material from the synthetic monofilament, yarn, or tape or a combination thereof.

By "netting" is meant:

in the case of knitted material, material having a cover factor (as herein defined) of up to 98% but typically less than 95%, 90%, 80%, 70%, 60%, 50%, 40%, 30%, 20%, 10%, 5%, or 3%;

in the case of woven material, material having a cover factor (as herein defined) less than 85% or 80% but typically less than 70%, 60%, 50%, 40%, 30%, 20%, 10%, 5%, or 3%; and in the case of non-woven material, material having a cover factor (as herein defined) of up to 98% but typically less than 95%, 90%, 80%, 70%, 60%, 50%, 40%, 30%, 20%, 10%, 5%, or 3%.

By "cover factor" is meant the percentage of the overall area of the netting material which comprises knitted, woven, or non-woven monofilament, yarn, or tape or a combination, forming the netting itself, judged from perpendicular to the plane of the netting when laid out flat, as opposed to air space in between the netting. Thus if a netting has a cover factor of 30% then the air space through the netting would be 70% of the total area of the netting.

By "reflective" in general is meant that the material is reflective of at least 20% on average of visible light or of energy across any particular wavelength range of interest, more preferably at least 30% or 40% or 50% or 60% or 70% or 80% or 90%, on at least one side of the netting material. At some wavelengths within the particular wavelength range of interest the material may be less reflective, so long as the average of the reflectance of the material at all wavelengths across the wavelength range of interest is at least the minimum specified.

"Non woven netting" includes extruded netting, comprising crossed strands heat welded or chemically bonded together.

As used herein the term "and/or" means "and" or "or", or both.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

BRIEF DESCRIPTION OF THE DRAWINGS

The invention is further described by way of example with reference to the accompanying drawings in which.

DETAILED DESCRIPTION OF EMBODIMENTS

Figure 1A:
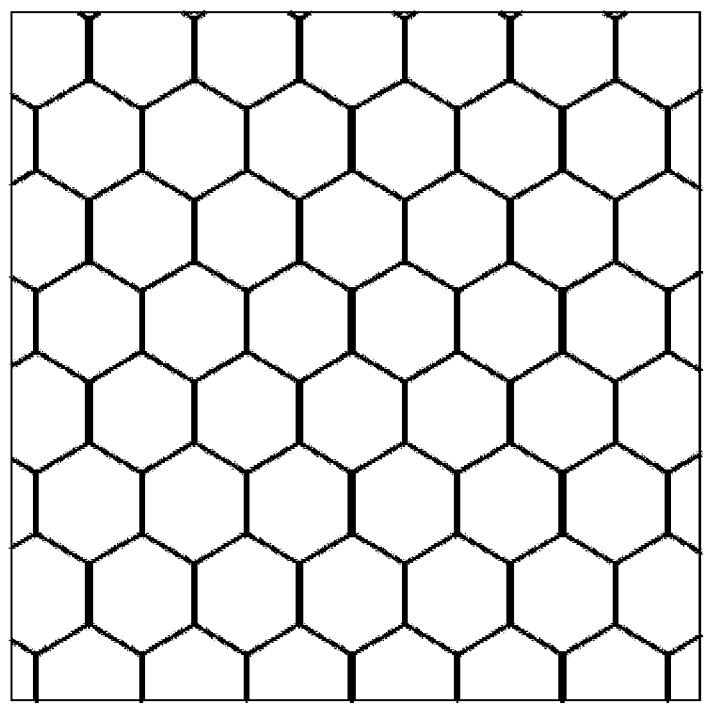
FIGS. 1a and 1b shows a section of one form of knitted hexagonal monofilament netting, having a cover factor of approximately 10-15%

Netting, crop cover, or ground cover material of the invention may be knitted, woven or non-woven from a synthetic monofilament, yarn (multifilament and non-multifilament), or tape or a combination thereof, formed from a resin comprising sufficient of at least one pigment the desired light transmission, reflection, and absorption properties described herein.

In one embodiment the monofilament, yarn, or tape is formed from a resin comprising at least one pigment, which resin has been formed by mixing a masterbatch consisting essentially of 10 or 20 to 90% by weight of the pigment(s) and a first polymer, with a second polymer. The first polymer may be a mixture of polymers as may the second polymer. The masterbatch may be in the form of thermoplastic granules. The pigment(s) may be added to the first polymer or mix of polymers when heated to be liquid or flowable and is vigorously mixed to distribute the pigment evenly, and the first polymer comprising the mixed pigment(s) is then formed into solid granules on cooling. The first polymer or polymers acts to bind the pigment(s) into granules enabling solid granulation of the mixture, the masterbatch; for ease of handling in a subsequent monofilament, yarn, fibre, or tape manufacturing process. The masterbatch is then mixed with a second polymer and may be mixed in a letdown range of 4 or 5 to 50% of the masterbatch to the second polymer or polymers, to form the mixture from which the monofilament, yarn, or tape is then manufactured. Monofilament may be extruded; synthetic yarn may be formed by known methods including extrusion of individual fibres which are then twisted to form a yarn. Tape may be extruded directly or the resin may be extruded into sheet form which may then be cut to tapes suitable for knitting or weaving into netting. Nonwoven netting may be formed by random binding at numerous irregular crossing points, of thermoplastic monofilament, yarn, or tape, by application of heat and pressure.

The first polymer and the second polymer may be the same or different and may be any suitable polyolefin such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA) and ethylene methyl acrylate (EMA) are useful for imparting elasticity and other properties. Polyesters and polystyrene, styrene-butdienie (SB), acrylonitrile-butadienie-styrene (ABS), styrene-acrylonitrile (SAN), polyethylene terephthalate (PET), polymethylmethacrylate (PMMA) and polycarbonate are useful as dye carriers and also for influencing radiation (reflecting, absorbing and transmission) properties and also other properties on the materials. Starch and other plant polymers are useful to increase biodegradability. Alternatively the material may comprise in part or whole of paper, wood or cellulose fibre, starch based polymers, casein, latex or in any combination of the above and/or with petroleum derived plastic polymers. In addition to the pigment the polymer or polymer blend may incorporate other agents such as a UV stabiliser or combination of stabilisers and processing aid or aids.

The at least one pigment in the resin from which the netting or ground cover material is formed provides the material with improved transmittance of visible light relative to the amount of infrared light transmitted by the material, and increased absorption of UV light.

In some embodiments, the at least one pigment is a single pigment that provides improved transmittance of visible light relative to the amount of infrared light transmitted by the material, and increased absorption of UV light. In some embodiments, the at least one pigment comprises two or more individual pigments that provide the desired transmission and absorption properties.

In one embodiment, the at least one pigment comprises a particulate material. The particulate material may be white, coloured or colourless. In some exemplary embodiments, the particulate material comprises at least one white pigment. In some embodiments, the particulate material is a microvoiding pigment, as described herein.

In some embodiments the at least one pigment comprises at least one white pigment. In some embodiments, the at least one white pigment comprises an inorganic white pigment.

In certain embodiments the at least one white pigment comprises a white zirconium, strontium, barium, magnesium, zinc, calcium, titanium, or potassium pigment or a combination thereof. In some embodiments, the white pigment comprises zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, potassium tintanate, barium titanate, magnesium titanate, strontium titanate, neodymium titanate, tin oxide, titanium dioxide, titanium oxide, zinc oxide, zinc sulphide, zinc sulphate, dipotassium titanium trioxide, potassium oxide, potassium titanate, magnesium carbonate, aluminium oxide, aluminium hydroxide, or a combination thereof.

In some embodiments, the at least one white pigment comprises zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, potassium oxide, potassium titanate or a combination thereof.

In certain embodiments, the white pigment comprises a white zirconium, strontium, barium, magnesium or calcium pigment, or a combination thereof.

In certain embodiments, the white pigment comprises zirconium dioxide, magnesium zirconate, calcium zirconate, strontium zirconate, barium zirconate, zirconium silicate, calcium carbonate, barium sulphate, magnesium oxide, strontium carbonate, barium carbonate, dipotassium titanium trioxide, and potassium titanate, magnesium carbonate, aluminium oxide, aluminium hydroxide, or a combination thereof.

In some embodiments, the white pigment is selected from the group consisting of zirconium dioxide, barium sulphate, calcium carbonate, and titanium dioxide.

In some embodiments, the white pigment is selected from the group consisting of zirconium dioxide, barium sulphate, calcium carbonate.

In some embodiments, the white pigment is selected from the group consisting of barium sulphate, calcium carbonate, and titanium dioxide.

In some embodiments, the white pigment is selected from the group consisting of barium sulphate and calcium carbonate. In some embodiments the barium sulphate or calcium carbonate is provided in an amount of 12% to 30% by weight. In some embodiments said barium sulphate or calcium carbonate is in the form of particles of size 0.5-3 microns.

In some embodiments, the white pigment is selected from the group consisting of calcium carbonate and titanium dioxide.

In some embodiments, the white pigment comprises a titanium pigment, a calcium pigment, or a combination thereof.

In one exemplary embodiment, the white pigment is titanium dioxide. In some embodiments, the titanium dioxide is present in an amount of 0.1% to about 4% by weight of the material. In some embodiments, the titanium dioxide is present in an amount of 1% to about 4% by weight of the material. In some embodiments, the titanium dioxide is conventional titanium dioxide. In some embodiments, the titanium dioxide is non-conventional titanium dioxide, as described herein.

In some embodiments, the white pigment is calcium carbonate.

In some embodiments, the at least one white pigment comprises a UV absorbing pigment or a UV reflecting pigment. In some embodiments, the at least one pigment comprises a UV reflecting white pigment and UV absorbing pigment; or a UV absorbing white pigment.

In some embodiments, the at least one white pigment comprises a microvoiding pigment as described herein. In some embodiments, the microvoiding pigment is a UV reflecting white pigment. In some embodiments, the at least one pigment comprises a microvoiding UV reflecting white pigment and a UV absorbing pigment.

As described herein, the UV absorbing pigment reduced the amount of UV light reflected within the material, which may cause photodegradation, and reduced the amount of UV light transmitted by the material. Reduced transmission of UV light in netting and crop cover materials can also reduce sunburn on, for example, fruit and vegetables beneath the canopy of the netting or crop cover, and other UV related stress on plants.

The at least one white pigment may comprise one or more white pigments in the form of particles. In some embodiments, the at least one white pigment is a particulate material.

In some embodiments, the at least one pigment comprises titanium dioxide substantially in the rutile crystal form. Titanium dioxide in rutile crystal form is capable of scattering near-infrared light while also providing low scattering and low absorbance of visible light. Such properties may be obtained when the titanium dioxide has an average particle size as defined above.

Titanium dioxide substantially in the rutile crystal form and having a large average particle size, as defined herein, is distinct from conventional pigmentary titanium dioxide and may be referred to herein as non-conventional titanium dioxide.

Titanium dioxide in the rutile form having an average particle size as defined above reflects significantly more near-infrared light and less visible light than conventional titanium dioxide pigment. The reflection in the visible spectrum as a percent of incoming radiation is more similar to the infrared spectrum, while conventional titanium dioxide reflects more visible light in proportion to the infrared spectrum. Such non-conventional titanium dioxide is commercially available, for example, from Huntsman Corporation under the trade name Altiris® 550 and Altiris® 800 and from Tayca Corporation under the trade name JR-1000.

WO 2011/101657 A1, WO 2011/101658 A1, and WO 2011/101659 A1, each of which is incorporated herein by reference, describe titanium dioxide in the rutile crystal form having a large average particle size, relative to conventional pigmentary titanium dioxide.

As described therein, crystal size is distinct from particle size. Crystal size relates to the size of the fundamental crystals which make up the particulate material. Crystals may aggregate to form larger particles. For example, conventional titanium dioxide in the rutile crystal form has a crystal size of about 0.17 µm-0.29 µm and a particle size of about 0.25 µm-0.40 µm while conventional titanium dioxide in the anatase crystal form has a crystal size of about 0.10

μm-0.25 μm and a particle size of about 0.20 μm-0.40 μm. Particle size is affected by factors such as the crystal size and milling technique used during production.

In some embodiments, the particle size of the titanium dioxide is greater than the crystal size. In other embodiments, the particle size of the titanium dioxide is about equal to the crystal size. In one embodiment, the average particle size is about equal to the average crystal size. In another embodiment, the ratio of the average particle size to the average crystal size ratio is less than 1.4.

The crystal size and particle size of the titanium dioxide may be determined by methods well known to those skilled in the art. For example, the crystal size may be determined by transmission electron microscopy on a sample and analysis of the resulting image.

The particulate material comprises titanium dioxide substantially in the rutile crystal form because of its high refractive index. In some embodiments, greater than 90% by weight of the titanium dioxide, greater than 95% by weight of the titanium dioxide, or greater than 99% by weight of the titanium dioxide, is in the rutile crystal form. In some embodiments, the particulate material may further comprise titanium dioxide in the anatase crystal form.

The titanium dioxide may by prepared using natural ores such as ilmenite and mineral rutile, enriched ores such as titanium slag and beneficiated ilmenite, or both as the starting raw material. The titanium dioxide may be prepared by modifying known processes for the preparation of titanium dioxide. Examples of known processes include but are not limited to the sulfate, chloride, fluoride, hydrothermal, aerosol and leaching processes. To provide the desired titanium dioxide, each of these processes is modified by: (a) treating at a higher temperature, for example, 900° C. or higher; (b) treating for a longer period of time, for example, 5 hours or more; (c) increasing or reducing typical levels of growth moderators present during the process; and/or (d) reducing the typical level of rutile seeds. In some embodiments, the titanium dioxide is commercially available.

In some embodiments, the titanium dioxide comprises doped titanium dioxide. As used herein, "doped titanium dioxide" refers to titanium dioxide that includes one or more dopants which have been incorporated during preparation of the titanium dioxide. The dopants may be incorporated by known processes. Examples of dopants include, but are not limited to, calcium, magnesium, sodium, vanadium, chromium, manganese, iron, nickel, aluminum, antimony, phosphorus, niobium or cesium. In some embodiments, the dopant is incorporated in an amount of no more than 30% by weight, no more than 15% by weight, or no more than 5% by weight, based on the total weight of the titanium dioxide. In some embodiments, the dopant is incorporated in an amount of from 0.1 to 30% by weight, or 0.5 to 15% by weight, or 1 to 5% by weight, relative to the total weight of the titanium dioxide. Typically, the doped titanium dioxide issubstantially in the rutile crystal form because of its high refractive index. In some embodiments, the particulate material may further comprise doped titanium dioxide in an anatase crystal form.

In one embodiment, the doped titanium dioxide is nickel antimony titanate or chromium antimony titanate. In another embodiment, the doped titanium oxide is chromium antimony titanate.

In certain embodiments, the dopant is incorporated by adding a salt of the dopant to the pulp during preparation of the titanium dioxide. In some embodiments, the dopant is manganese, aluminium or potassium. In certain embodiments, manganese sulphate is added at a concentration of <0.2% by weight (wt/wt). For example, manganese sulphate may be added at a concentration of from 0.01 to 0.2% by weight (wt/wt). In other embodiments, $Al_2O_3$ and $K_2O$ are added to the pulp. For example, from 0.01 to 0.5% by weight of $Al_2O_3$ (wt/wt) and 0.01 to 0.5% by weight of $K_2O$ (wt/wt) may be added to the pulp. In a particular embodiment, 0.05%> by weight of $Al_2O_3$ (wt/wt) and 0.2%> by weight of $K_2O$ (wt/wt) are added to the pulp. In another particular embodiment, 0.2%> by weight $K_2O$ (wt/wt) and 0.2%> by weight $Al_2O_3$ (wt/wt) are added to the pulp.

In some embodiments, the particulate material comprises coated titanium dioxide.

In some embodiments, the coated titanium dioxide provides UV light protection without also increasing UV light activated photocatalytic effects, which are generally observed with conventional titanium dioxide. Such coated titanium dioxide can provide netting material with improved durability/longevity to UV light exposure. In some embodiments, the coated titanium dioxide also has low visible scattering.

In some embodiments, the coated titanium dioxide comprises coated doped titanium dioxide. In certain embodiments, the titanium dioxide is doped with a dopant that can act as recombination centres for holes and electrons. Those skilled in the art will appreciate that increased recombination provides decreased UV stimulated photocatalytic activity. In one embodiment, the dopant is chromium, manganese, and/or vanadium.

The coated titanium dioxide is prepared by depositing an effects coating material onto the particles surface. With such coating, the titanium dioxide exhibits increased UV light protective capability as compared to conventional pigmentary crystal size titanium dioxide. It also exhibits reduced photocatalytic activity and improved dispersibilty.

The titanium dioxide may be milled, since the optical performance depends on reducing the average particle size so that it tends towards the crystal size. The titanium dioxide may be wet milled (e.g. sand or bead milled) and may be subsequently separated from the aqueous medium by coating the particles with, for example, aluminium oxyhydroxide. The titanium dioxide must be dispersed prior to milling A crude alumina coating renders the titanium dioxide flocculent at neutral pH, facilitating filtration and washing prior to drying.

The coatings may be used to impart, for example, dispersibilty, photocatalytic inertness, or photostability.

Coating materials suitable for use include those commonly used to coat an inorganic oxide or hydrous oxide onto the surface of particles. Typical inorganic oxides and hydrous oxides include oxides and/or hydrous oxides of silicon, aluminum, titanium, zirconium, magnesium, zinc, cerium, phosphorus, or tin, for example, $Al_2O_3$, $SiO_2$, $ZrO_2$, $CeO_2$, $P_2O_5$, sodium silicate, potassium silicate, sodium aluminate, aluminum chloride, aluminum sulphate, and mixtures thereof. The amount of coating coated onto the surface of the titanium dioxide or doped titanium dioxide may range from about 0.1% by weight to about 20% by weight of the inorganic oxide and/or hydrous oxide relative to the total weight of the titanium dioxide or doped titanium dioxide.

Coating materials suitable for use also include, silica, dense amorphous silica, zirconia, aluminium phosphate, titania, tin, antimony, manganese and cerium. In some embodiments, the coating is white or colourless.

Particles of the titanium dioxide may be coated with any suitable amount of coating material. In some embodiments, the particles are coated with the coating material at a level of up to about 7% by weight. In certain embodiments, the level is from about 0.1% to about 7% by weight or from about 0.2% to about 7% by weight, relative to the total weight of titanium dioxide.

In some embodiments, the particles comprise a dense silica coating, an alumina coating, a zirconia coating or a combination thereof. In some embodiments, the particles comprise a coating of from 1-3% alumina and/or 2-4% silica.

In some embodiments, two or more coating materials may be used to coat the particles. The coatings may be applied simultaneously to produce a single layer or successively to produce two or more layers, wherein each layer may have a different composition. In one embodiment, the particles are coated with silica, such as dense silica, to produce a first layer, and also with zirconia to produce a second layer.

Coated titanium dioxide may be prepared by treating titanium dioxide with a coating material, as known in the art. For example, the titanium dioxide may be dispersed in water along with the coating material, and the pH of the solution adjusted to precipitate the desired hydrated oxide to form a coating on the surface of the particulate material. After coating, the coated material may be washed and dried before being ground, for example, in a fluid energy mill or micronizer, to separate agglomerates formed during coating. At this milling stage, an organic surface treatment, may also be applied.

The titanium dioxide particles may be milled prior to coating. In some embodiments, the particles may be dry milled, for example with a Raymond mill, or they may be wet milled, for example with a fine media mill or sandmill, or both. Generally, to wet mill, the particles are dispersed in water and ground into sub micrometer sized particles to form an aqueous slurry.

In another embodiment, the particles may be dry milled using a Raymond mill and then wet milled in a fine media mill containing Ottawa sand. During wet milling, the particles may be slurried to 350 grams/litre and milled for 30 minutes. After wet milling, the sand may be separated from the slurry, such as by settling or any other suitable means to form the aqueous slurry.

Particles may be coated by adding a suitable coating material to the aqueous slurry prior to or during a pH adjustment to effect precipitation. For example, the effect coating material may be added to the aqueous slurry first, followed by pH adjustment; alternatively, the pH of the aqueous slurry may be adjusted while the effect coating material is being added to the aqueous slurry.

Suitable coating materials include, but are not limited to, salts such as zirconium sulphate, phosphoric acid, and sodium silicate. In the case of zirconium sulphate, zirconyl oxy hydroxide may be precipitated onto the surface of the particles to coat the particles; in the case of sodium silicate, silica may be precipitated onto the surface of the particles to coat the particles.

In one exemplary embodiment, the aqueous slurry comprising particles of titanium dioxide is introduced into a tank for stirring. The temperature of the aqueous slurry may then be adjusted to 75° C. and its pH adjusted to 10.5. The coating material may then be introduced into the stirred tank in an amount sufficient to produce the desired coating. For example, to produce a 1% by weight dense silica coating, 1% silica (% wt/wt on titanium dioxide) is added to the stirred tank over 30 minutes and mixed for 30 minutes. Similarly, to produce a 3% by weight dense silica coating, 3% silica (% wt/wt on titanium dioxide) is added. In one embodiment, the coating material used to provide a silica coating is sodium silicate.

To precipitate a dense silica coating onto the particles, the pH may be adjusted by adding sulphuric acid to the stirred tank. In a particular embodiment, sulphuric acid is added over 60 minutes to bring the pH to 8.8 and then over 35 minutes to further adjust the pH to 1.3.

The particles of titanium dioxide or doped titanium dioxide coated with dense silica may then be coated with an alumina coating to, for example, assist onward processing such as filtration. In one embodiment, the particles are further coated with 0.6% by weight alumina by adding caustic sodium aluminate to the stirred tank over 25 minutes to bring the pH to 10.25, at which point the contents of the tank are mixed for 20 minutes. Sulphuric acid can then be added to the tank to adjust the pH to 6.5.

After coating, the coated titanium dioxide or doped titanium dioxide may then be washed and dried before grinding in, for example, a micronizer or fluid energy mill Generally, this grinding step separates particles that have aggregated during the coating and/or drying procedures.

During this grinding step the coated material may be treated with a surface treatment. Surface treatments include, for example, organic surface treatments such as treatment with polyols, amines, and silicone derivatives. In one embodiment, the organic surface treatment comprises treatment with trimethylolpropane, pentaerythritol, triethanolamine, n-octyl phosphonic acid, trimethylolethane, or a combination thereof. Organic surface treatments may improve the dispersibilty of the coated titanium dioxide.

In one embodiment, the coated titanium dioxide particles are treated to selectively remove particular size fractions. In one embodiment, particles greater than or equal to 5 μm in diameter are removed. In another embodiment, particles greater than or equal to 3 μm in diameter are removed. Any suitable method for removal may be used. In some embodiments, selective removal may be performed by centrifugation.

The titanium dioxide may be dispersed within suitable vehicle for incorporation into the resin. In certain embodiments, non-conventional titanium dioxide is incorporated into the netting material in an amount from about 0.5% to about 4.0% by weight of the material. In certain embodiments non-conventional titanium dioxide is incorporated into the netting material in an amount from about 1% to about 4.0% by weight of the material. In certain embodiments non-conventional titanium dioxide is incorporated into the netting material in an amount of 0.2%, 0.25%, 0.5%, 1.0%, 1.5%, 2%, 2.5%, 3.0%, 3.5%, 4.0%, 4.5%, 5%, or 6%.

In some embodiments, the at least one pigment consists essentially of non-conventional titanium dioxide. In certain embodiments, the at least one pigment is non-conventional titanium dioxide.

As shown, in the Figures such non-conventional titanium dioxide advantageously has the desired absorbance, reflectance, and transmittance profile.

In one embodiment, the at least one pigment comprises conventional titanium dioxide. Such titanium dioxide is readily commercially available.

Conventional pigmentary titanium dioxide is typically used in the netting material in combination with at least one additional pigment. Accordingly, in certain embodiments, the at least one pigment comprises conventional titanium dioxide and at least one additional pigment.

In certain embodiments, the additional pigment comprises a particulate material that forms microvoids on stretching the monofilament, yarn, multifilament yarn, or tape from which the netting material is formed or a film material from which tape is cut. In some embodiments, the microvoiding pigment is barium sulphate and/or calcium carbonate.

In some embodiments, the netting material comprises microvoids in the material. In some embodiments, the microvoids have been formed by stretching monofilament, yarn, or tape from which the netting material is formed or a film material from which tape is cut.

In some embodiments, the at least one pigment comprises a particulate material that forms microvoids when monofilament, yarn, or tape from which the netting material is formed or a film material from which tape is cut is stretched. Such particulate materials may be referred to herein as microvoiding pigments. Stretching monofilament, yarn, or tape from which the netting material is formed which comprises microvoiding pigments causes the pigment to at least partially debond or separate from the polymer(s) of the resin from which the monofilament, yarn or tape of the netting material is formed. In some embodiments, the microvoids are formed by stretching mono-axially or bi-axially. For many applications mono-orientation is preferred with tapes being stretched to a length of at least 5 times greater or more.

The microvoids create areas in which the difference in refractive index between the air and the polymer(s) results in light scattering. The presence of microvoids in the material contribute to the reflectance and transmittance properties of the material. In some embodiments, stretching monofilament, yarn, or tape from which the netting material is formed or a film material from which tape is cut, to create microvoids increases the opacity of the monofilament, yarn, tape or film material.

In some embodiments, the microvoiding pigment is at least partially debonded or separated from the polymer(s) of the resin to create the microvoids is an inorganic pigment.

In some embodiments, the microvoiding pigment is a is a white pigment. In some embodiments, the white microvoiding pigment is an inorganic pigment. In some embodiments, the white inorganic pigment is a metal salt or oxide. In some embodiments the white inorganic pigment that create micro voids is barium sulphate, calcium carbonate, magnesium zirconate, calcium zirconate, strontium zirconate, barium zirconate, zirconium silicate, or a combination thereof.

In exemplary embodiments, the white pigment that creates microvoids is zirconium dioxide, barium sulphate and/or calcium carbonate. In exemplary embodiments, the white pigment that creates microvoids is barium sulphate and/or calcium carbonate. In one embodiment, the microvoiding pigment is calcium carbonate.

The stretching or orienting the polymer/pigment mixture also assists the development of thermic properties of the material.

In some embodiments, the microvoiding pigment is barium sulphate or calcium carbonate, as a mineral obtained from mining or as a precipitate from manufacturing. In one embodiment, the pigment is processed to a fine micron size in the range 0.05 to 10 microns. In some embodiments, the size is in the range 0.5-3 microns or 0.7-1.0 micron. Other useful white pigments for use as microvoiding pigments are described above.

In some embodiments, the material comprises microvoids that have been formed by stretching monofilament, yarn, or tape from or a film material from which the tape is cut, formed from a resin comprising at least one microvoiding pigment. In some embodiments, the resin further comprises a UV absorbing pigment. In some embodiments, the UV absorbing pigment is an inorganic pigment. In some embodiments, the UV absorbing pigment is titanium dioxide or zinc oxide.

In some embodiments, the at least one pigment comprises at least one UV absorbing pigment. In some embodiments, the UV absorbing pigment is an organic UV absorbing pigment or an inorganic UV absorbing pigment.

In some embodiments the at least one pigment comprises an organic UV absorbing pigment. In some embodiments the organic UV absorbing pigment is chosen from the group consisting of benzotriazole, cyanoacrylates, phenylacrylate, oxanilides, benzophenones, hydroxyphenyltriazines, hyrdoxyphenylbenzotriazole, tri and octyl methoxycinnamate, aminobenzoic acid, aminobenzoate and oxybenzone.

In some embodiments the organic UV absorbing pigment is added at a rate of 0.01% to 5% by weight.

In some embodiments the at least one pigment comprises an inorganic UV absorbing pigment. In some embodiments, the UV absorbing pigment is a white pigment or colourless pigment. In some embodiments the inorganic UV absorbing pigment is clear or substantially clear. In some embodiments the inorganic clear or substantially clear UV absorbing pigment is chosen from the group consisting of nano zinc oxide and cerium dioxide.

In some embodiments the inorganic clear UV absorbing pigment is added at a rate of 0.1% to 5% by weight.

In some embodiments the at least one pigment comprises an inorganic white UV absorbing pigment. In some embodiments the inorganic white UV absorbing pigment is chosen from the group consisting of barium titanate, magnesium titanate, strontium titanate, neodymium titanate, tin oxide, titanium oxide, titanium dioxide, silica, alumina, zinc oxide, zinc sulphide, zinc sulphate, zirconium silicate and magnesium oxide. In some embodiments, the inorganic white UV absorbing pigment is titanium dioxide.

In some embodiments the inorganic white UV absorbing pigment is added at a rate of 0.1% to 5% by weight.

The at least one UV absorbing pigment is present in the monofilament, multifilament yarn, or tape in an amount such that the material has the desired absorbance profile. The UV absorbing pigment decreases the reflectance in the 280-400 nm or 300-380 nm range by increasing UV absorbance. Increasing the absorbance in the UV range improves the life of the polymer by protecting the polymer from UV light, and reduces plants exposure to excessive amounts of UV light, which may cause sunburn. The UV absorbing pigment absorbs UV light before free radicals can be produced by interaction of the UV light waves with the polymer.

In some embodiments, the at least one pigment comprises an UV absorbing pigment and one or more additional pigments. In one embodiment, the additional pigment is an inorganic pigment, an organic pigment, or a mixture thereof.

In some embodiments, the additional pigment is a white or colourless pigment or combination of pigments. In some embodiments, the white or colourless pigment is an inorganic pigment, an organic pigment, or a combination thereof.

In some embodiments, the additional pigment is a white or colourless inorganic pigment selected from zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, potassium oxide, conventional pigmentary titanium dioxide, and combinations thereof.

In some embodiments, the additional pigment is a white or colourless organic pigment.

In some embodiments, the additional pigment is coloured. Including a coloured pigment in the resin can provide the netting or ground cover material with a coloured tint. The pigment selected depends on the desired colour.

In some embodiments, the coloured pigment is a single coloured pigment or a mixture of two or more coloured pigments that provide the desired colour.

In some embodiments, the coloured pigment is an inorganic or organic coloured pigment. Examples of coloured organic pigments include azo, anthraquinone, phthalocyanine, perinone/perylene, indigo/thioindigo, dioxazine, quinacridone, isoindolinone, isoindoline, diketopyrrolopyrrole, azomethine and azomethine-azo pigments.

In some embodiments, the additional pigment(s) decreases the amount of infrared light transmitted and/or increases the amount of visible light transmitted.

In embodiments where the at least one pigment comprises two or more individual pigments, the individual pigments may be combined by any suitable method known in the art. In one embodiment, the pigments are combined by mixing. In some embodiments, the pigments are combined before addition to the polymer(s) of the resin. In some embodiments, the pigments are combined by adding one or more of the individual pigments to the polymer(s) of the resin separately to the other pigment(s), and in any order.

As referred to previously in some embodiments the material may also incorporate a compound or compounds added to increase the extent to which the material reflects and/or absorbs radiation.

As referred to previously in some embodiments the material may also incorporate a compound or compounds added to increase the extent to which the material transmits and/or absorbs radiation.

As referred to previously in some embodiments the material may also incorporate a compound or compounds added to increase the extent to which the material reflects and/or absorbs solar radiation.

In some embodiments the material is of denier 50 to 2000 or 100 to 1000 and most typically 300 to 800 or 400 to 600.

The material may be constructed to have a higher knitted or woven or non-woven density in parallel side margins of the material, so that these side margins of the material are stronger.

FIGS. 1 to 13 show by way of example sections of netting material.

Figure 1B:
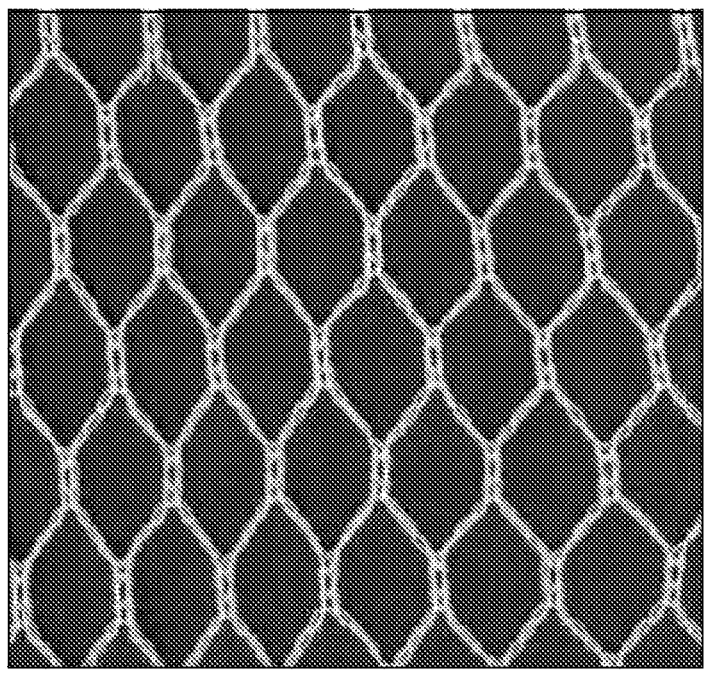

FIGS. 1a and 1b shows a section of one form of knitted hexagonal monofilament netting, having a cover factor of approximately 10-15%.

Figure 2A:
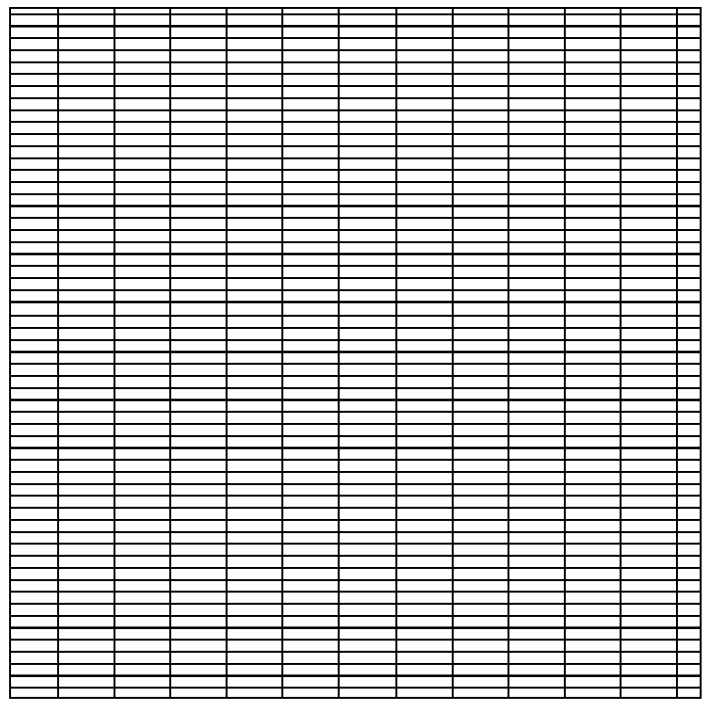
FIGS. 2a and 2b shows a section of one form leno woven based monofilament netting, having a cover factor of approximately 20-25%.
Figure 2B:
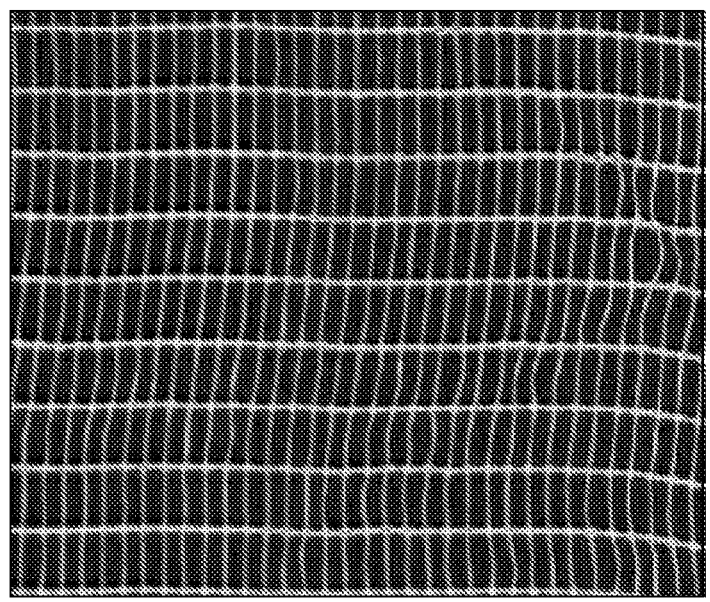

FIGS. 2a and 2b shows a section of one form leno woven based monofilament netting, having a cover factor of approximately 20-25%.

Figure 3A:
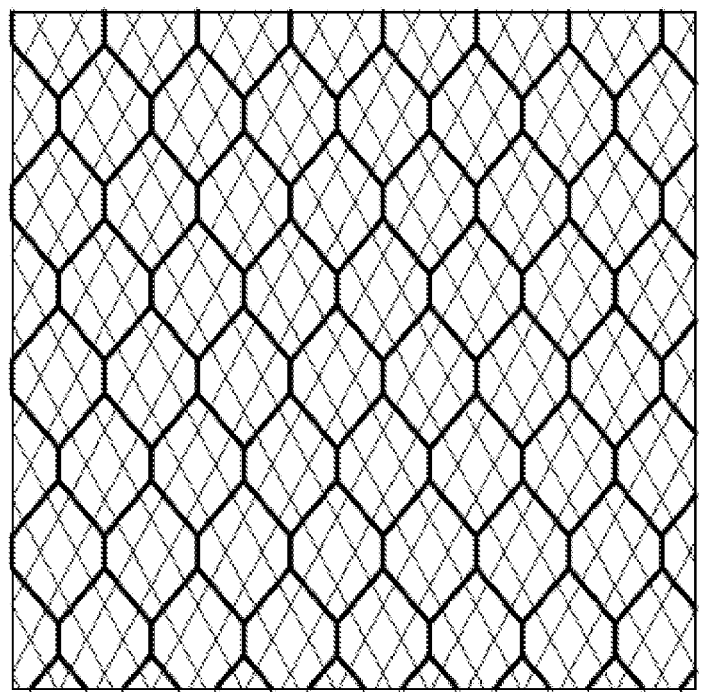
FIGS. 3a and 3b shows a section of one form of knitted diamond monofilament netting, having a cover factor of approximately 15-20%
Figure 3B:
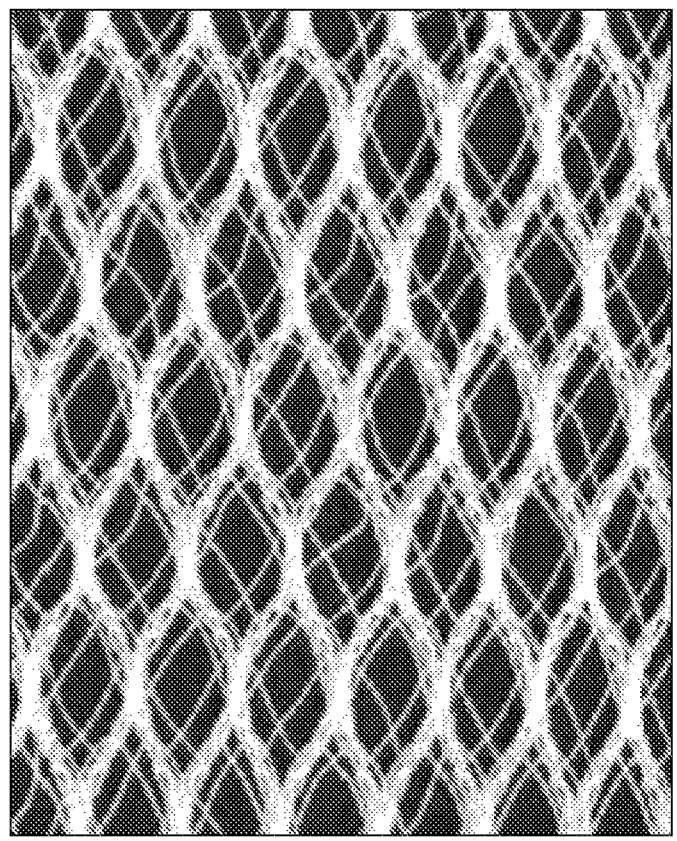

FIGS. 3a and 3b shows a section of one form of knitted diamond monofilament netting, having a cover factor of approximately 15-20%.

Figure 4A:
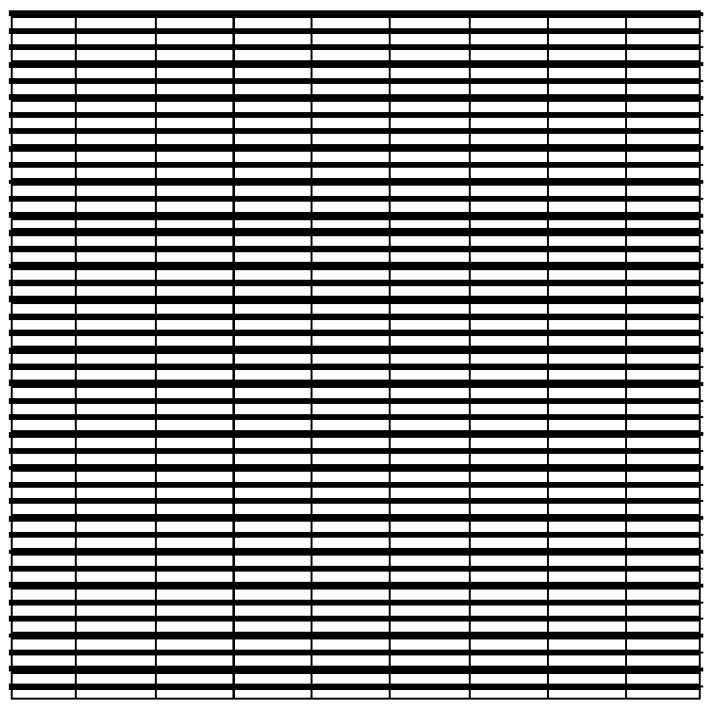
FIGS. 4a and 4b shows a section of one form leno woven based monofilament and tape netting, having a cover factor of approximately 20-25%.
Figure 4B:
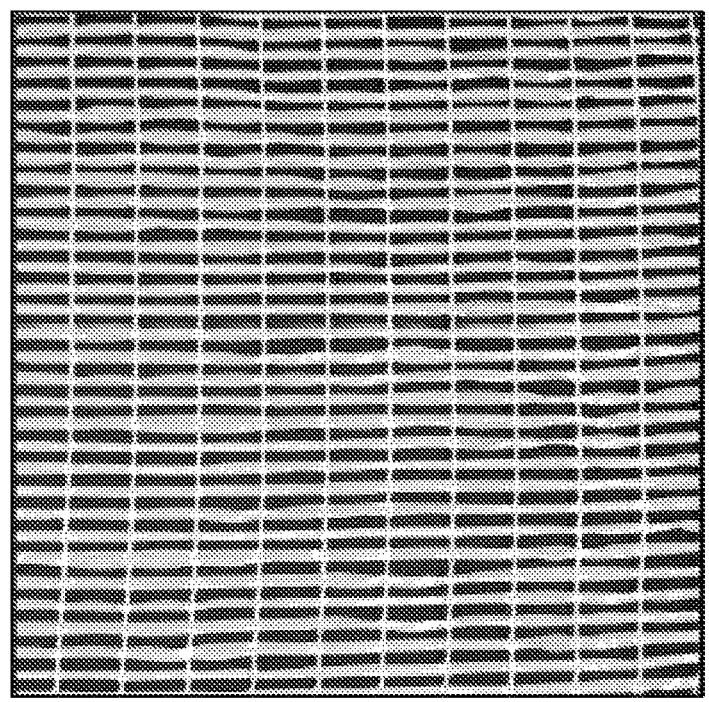

FIGS. 4a and 4b shows a section of one form leno woven based monofilament and tape netting, having a cover factor of approximately 20-25%.

Figure 5A:
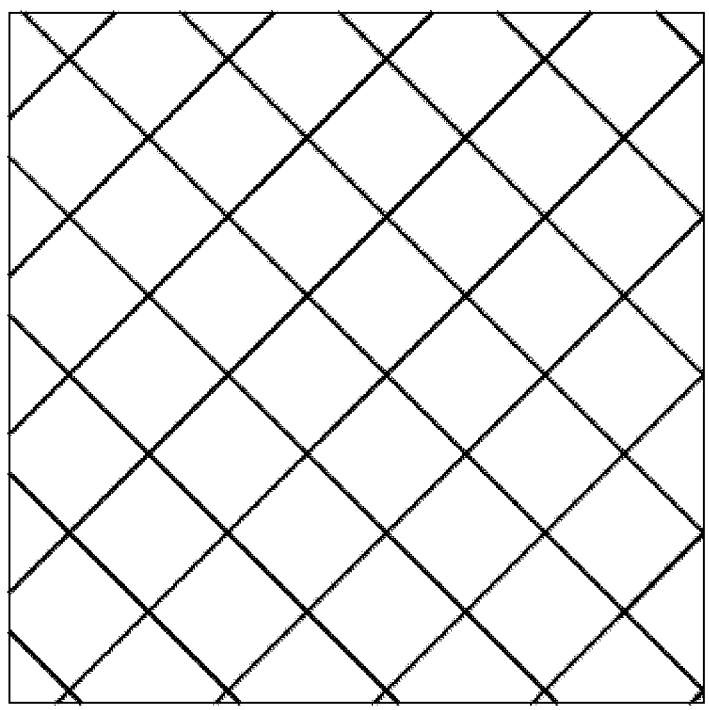
FIGS. 5a and 5b shows a section of one form knitted diamond monofilament netting, having a cover factor of approximately 5-10.
Figure 5B:
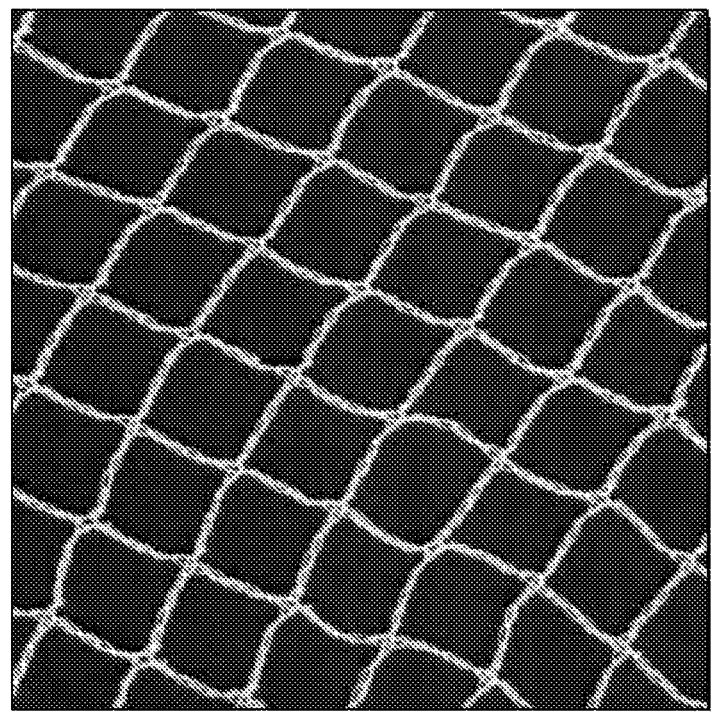

FIGS. 5a and 5b shows a section of one form knitted diamond monofilament netting, having a cover factor of approximately 5-10.

Figure 6A:
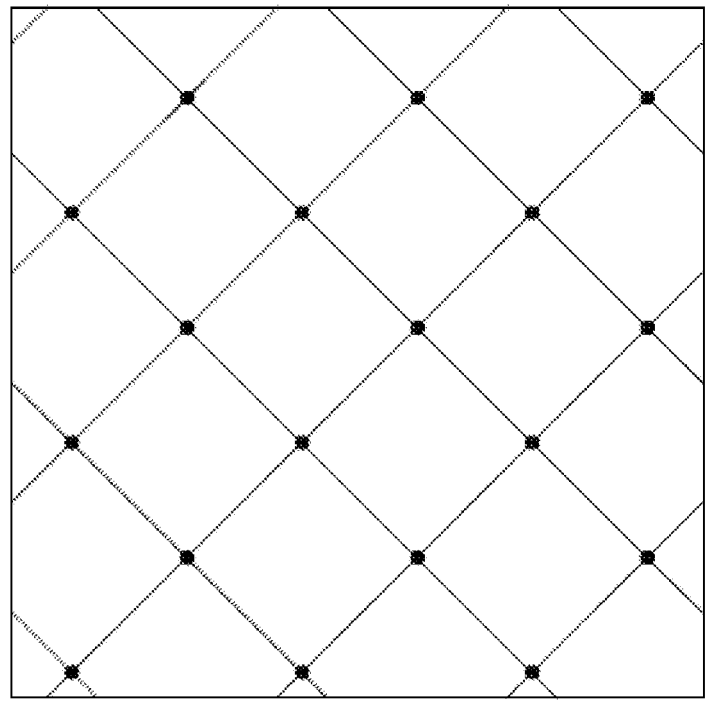
FIGS. 6a and 6b shows a section of one form extruded diamond monofilament netting, having a cover factor of approximately 3-8%.
Figure 6B:
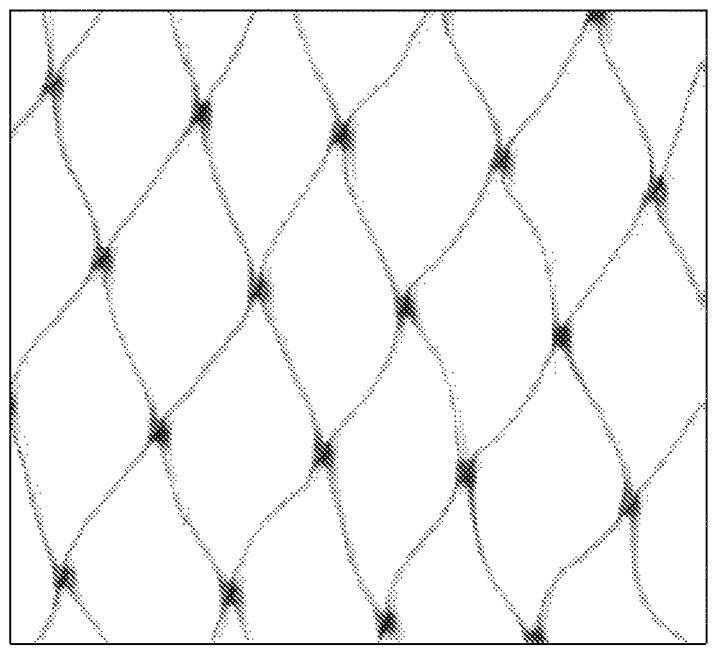

FIGS. 6a and 6b shows a section of one form extruded diamond monofilament netting, having a cover factor of approximately 3-8%.

Figure 7A:
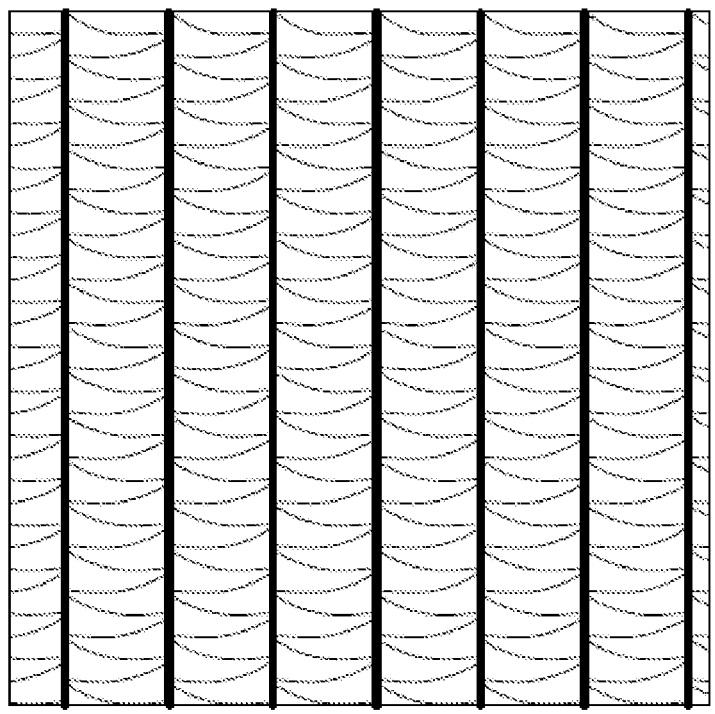
FIGS. 7a and 7b shows a section of one form pillar monofilament netting, having a cover factor of approximately 30 to 35%.
Figure 7B:
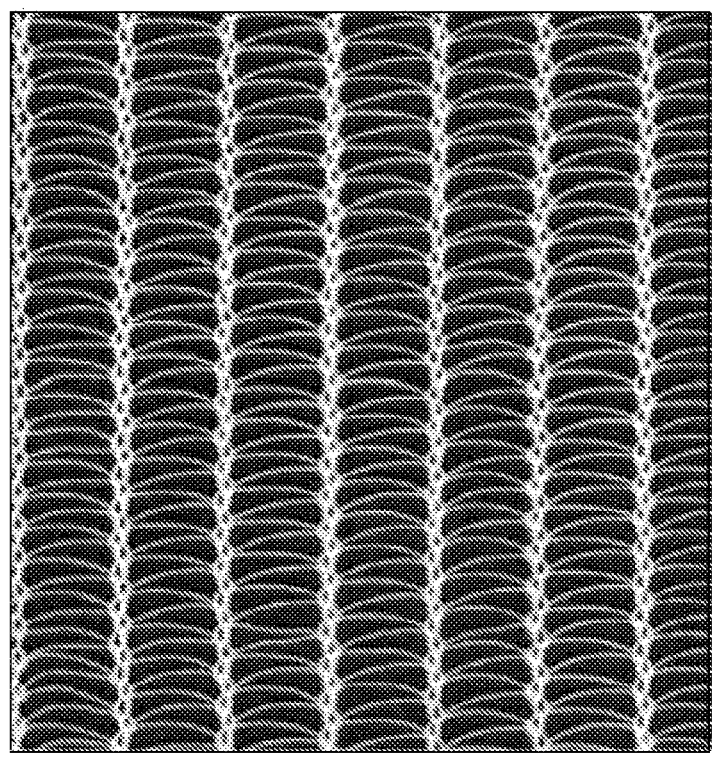

FIGS. 7a and 7b shows a section of one form pillar monofilament netting, having a cover factor of approximately 30 to 35%.

Figure 8A:
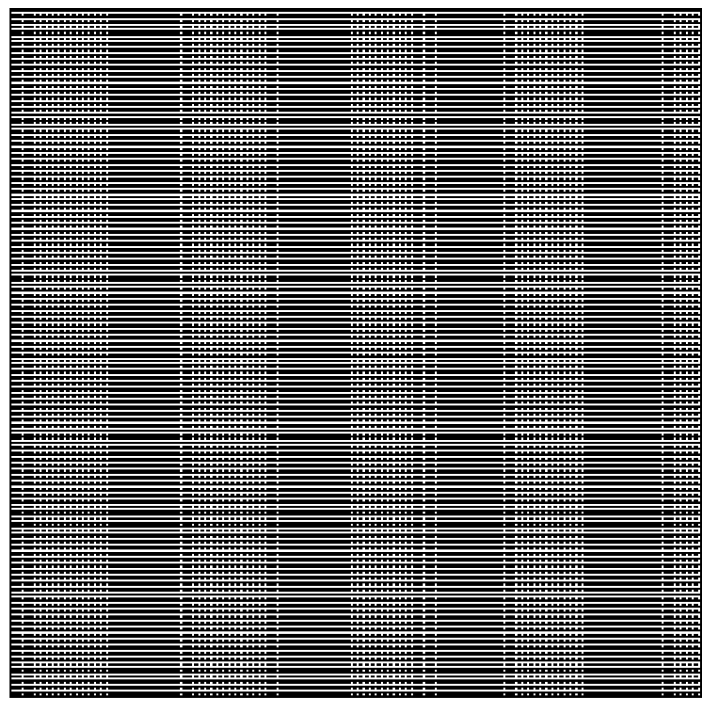
FIGS. 8a and 8b shows a section of one form non woven netting, having a cover factor of approximately 90 to 95%.
Figure 8B:
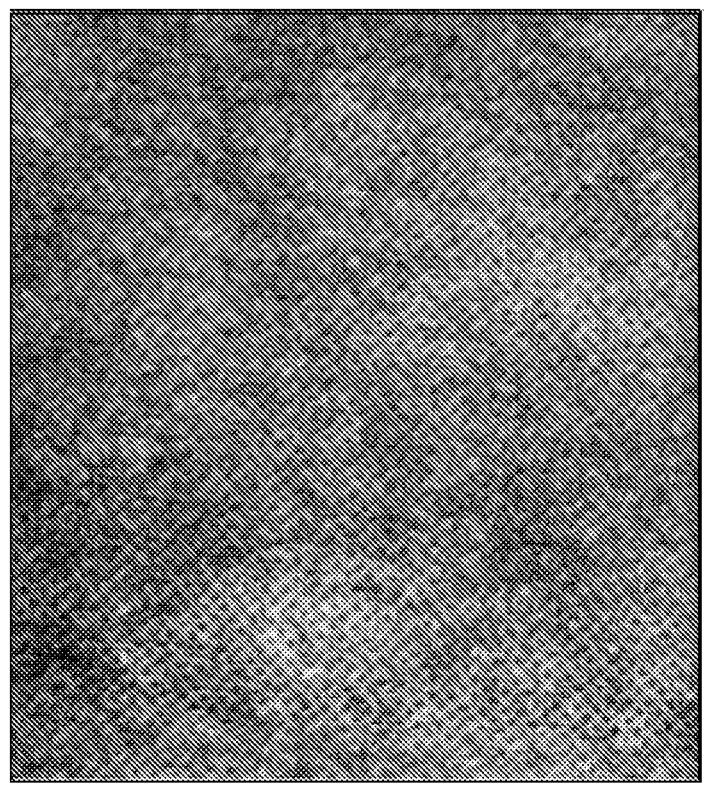

FIGS. 8a and 8b shows a section of one form non woven netting, having a cover factor of approximately 90 to 95%.

Figure 9A:
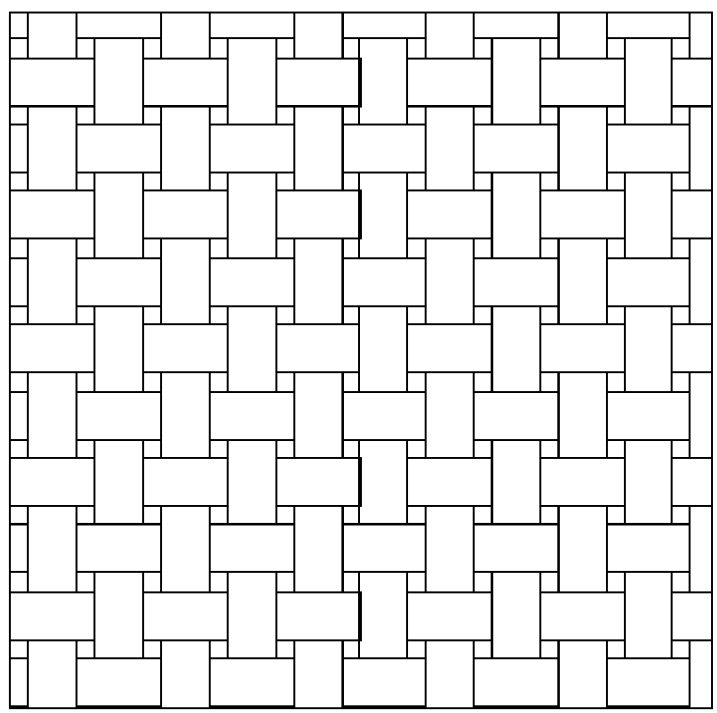
FIGS. 9a and 9b shows a section of one form woven tape netting, having a cover factor of approximately 80 to 85%.
Figure 9B:
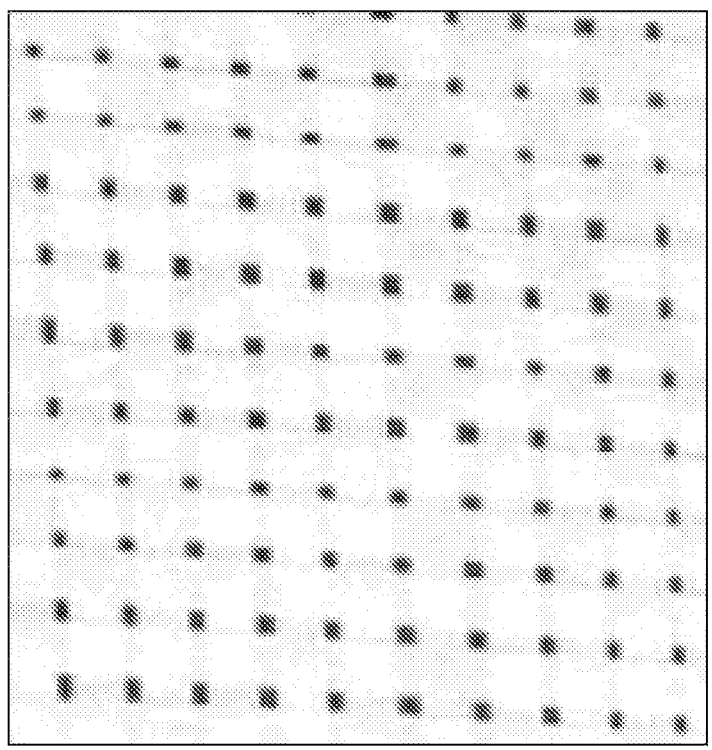

FIGS. 9a and 9b shows a section of one form woven tape netting, having a cover factor of approximately 80 to 85%.

Figure 10A:
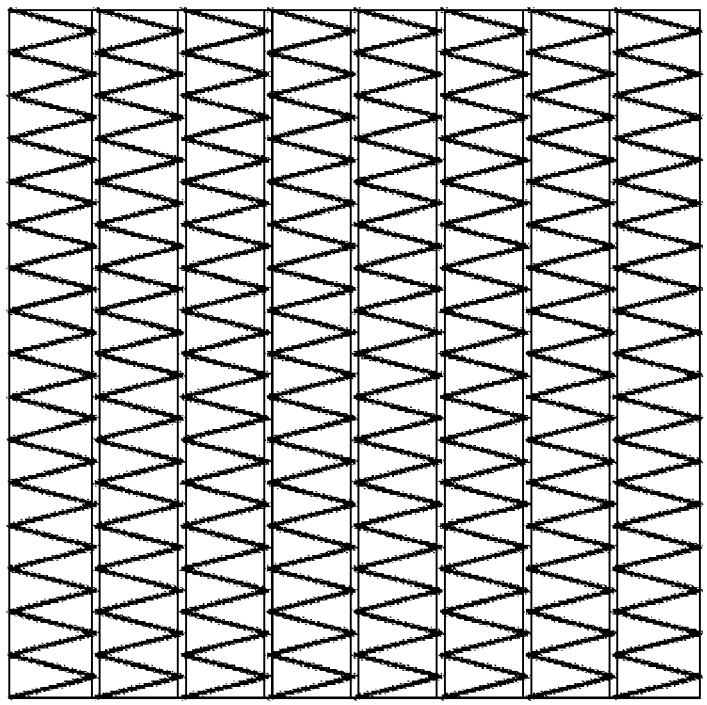
FIGS. 10a and 10b shows a section of one form pillar monofilament and tape netting, having a cover factor of approximately 35 to 40%.
Figure 10B:
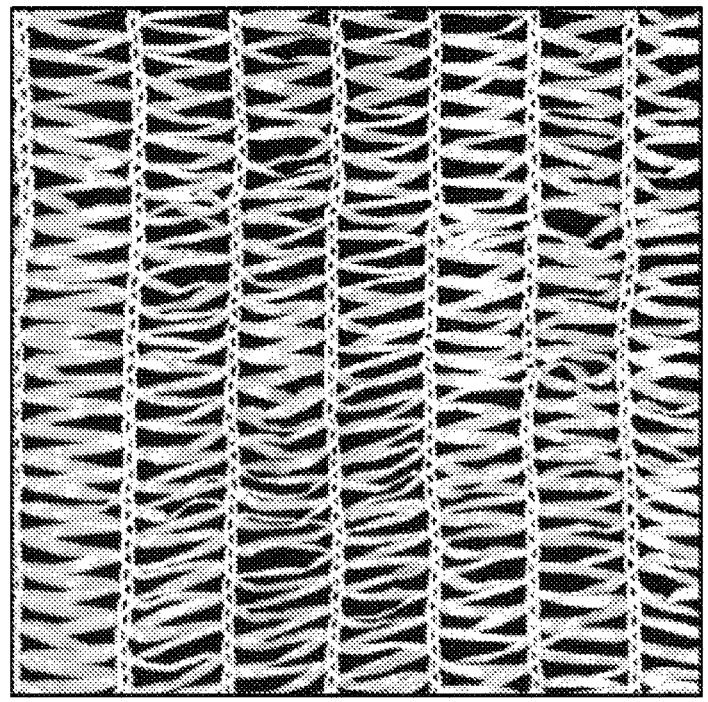

FIGS. 10a and 10b shows a section of one form pillar monofilament and tape netting, having a cover factor of approximately 35 to 40%.

Figure 11A:
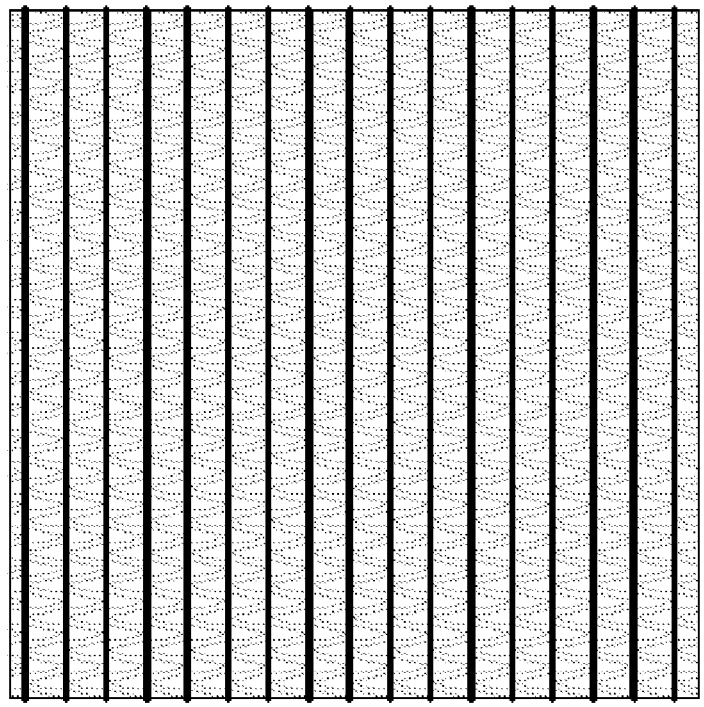
FIGS. 11a and 11b shows a section of one form pillar monofilament netting, having a cover factor of approximately 45 to 50%.
Figure 11B:
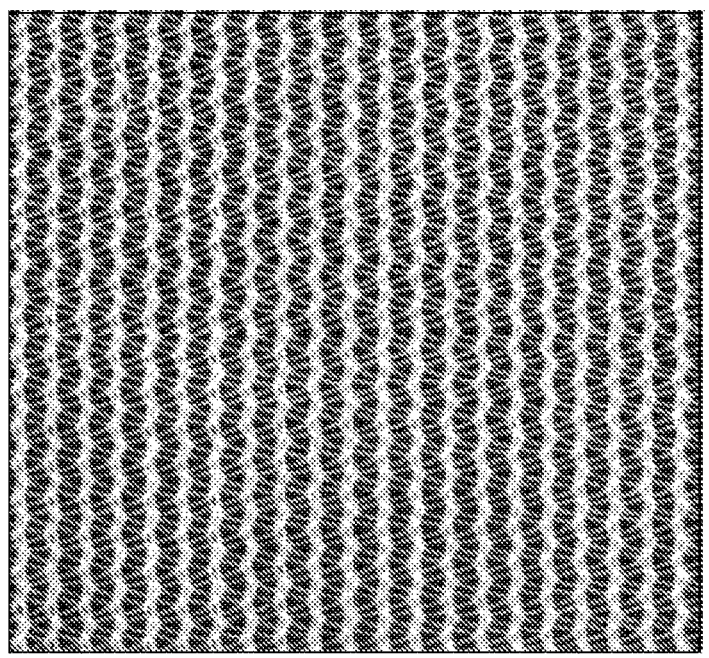

FIGS. 11a and 11b shows a section of one form pillar monofilament netting, having a cover factor of approximately 45 to 50%.

Figure 12A:
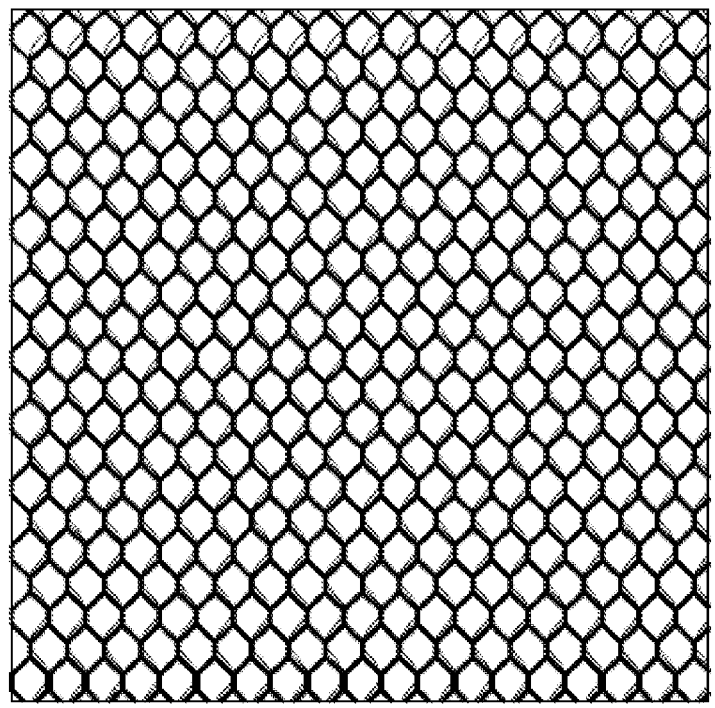
FIGS. 12a and 12b shows a section of one form knitted diamond monofilament and tape netting, having a cover factor of approximately 25-30%.
Figure 12B:
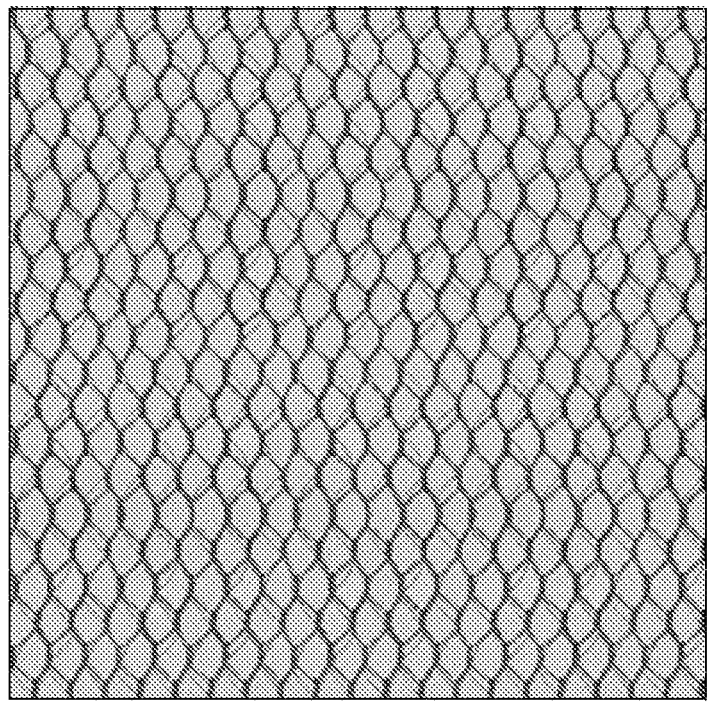

FIGS. 12a and 12b shows a section of one form knitted diamond monofilament and tape netting, having a cover factor of approximately 25-30%.

Figure 13A:
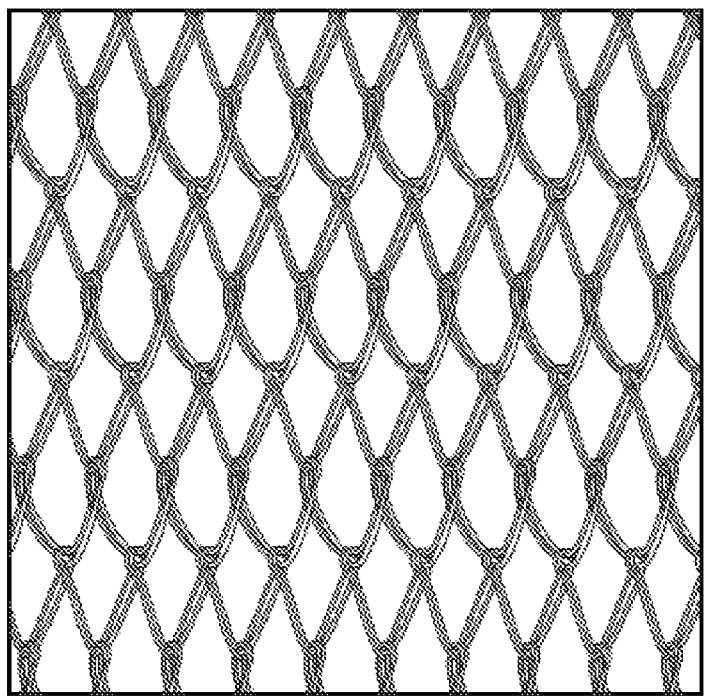
FIGS. 13a and 13b shows a section of one form knitted diamond monofilament and tape netting, having a cover factor of approximately 20-25%.
Figure 13B:
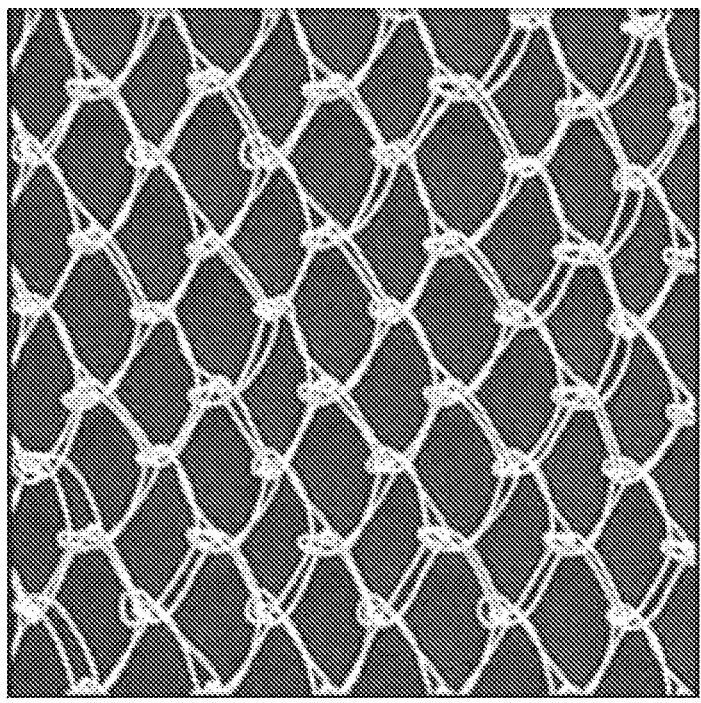
Figure 14:
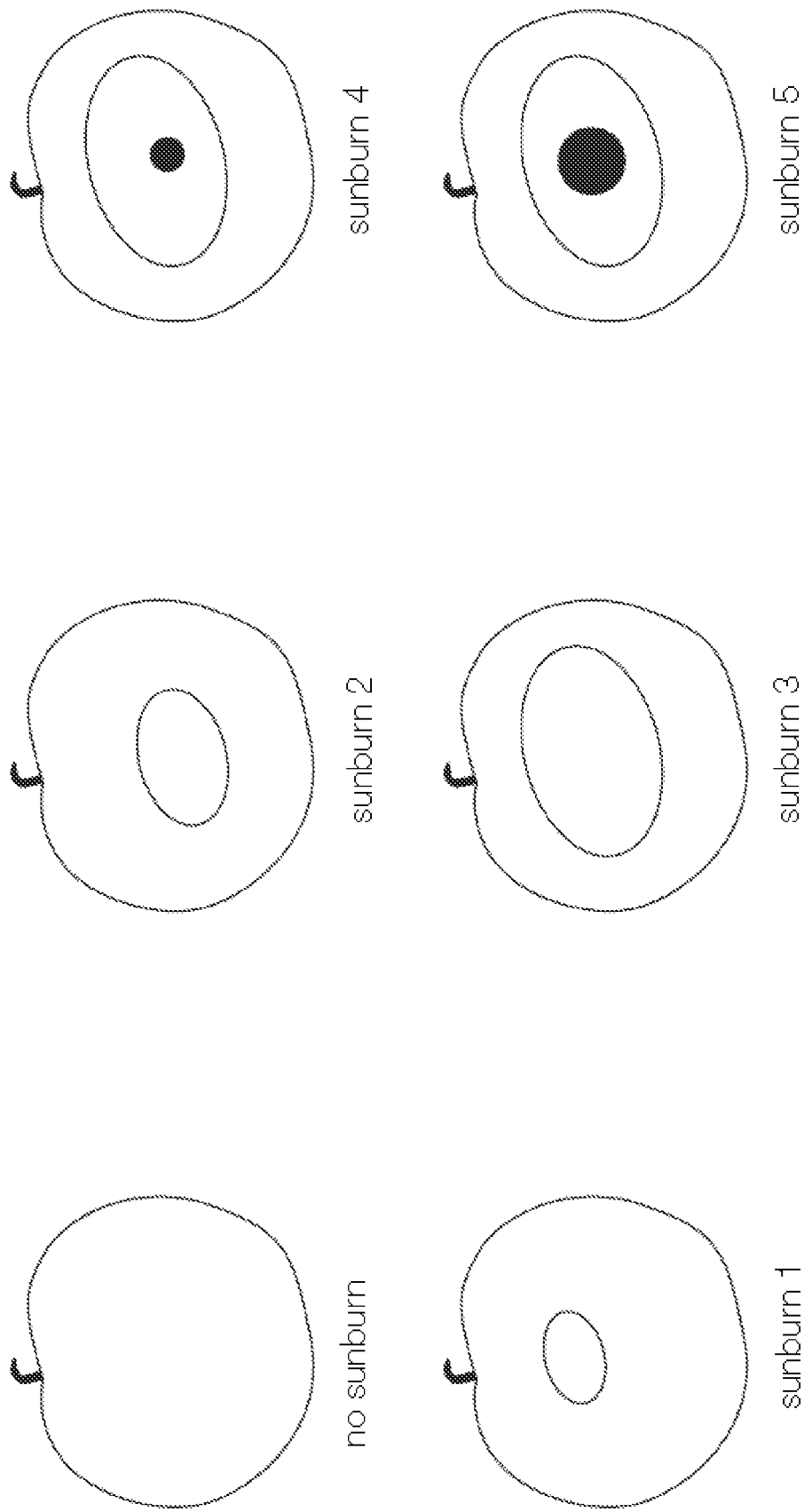
FIG. 14 shows a scale of apples with no sunburn at a progressive scale of increasing amounts of sunburn from 1 to 5. The circle area inside the apple shows the discoloured area, normally yellow in colour (in sunburn 1 to 5 examples) and then the dark inner circle in black (in example 4 and 5) is the burnt are that appears black on the fruit.
Figure 15:
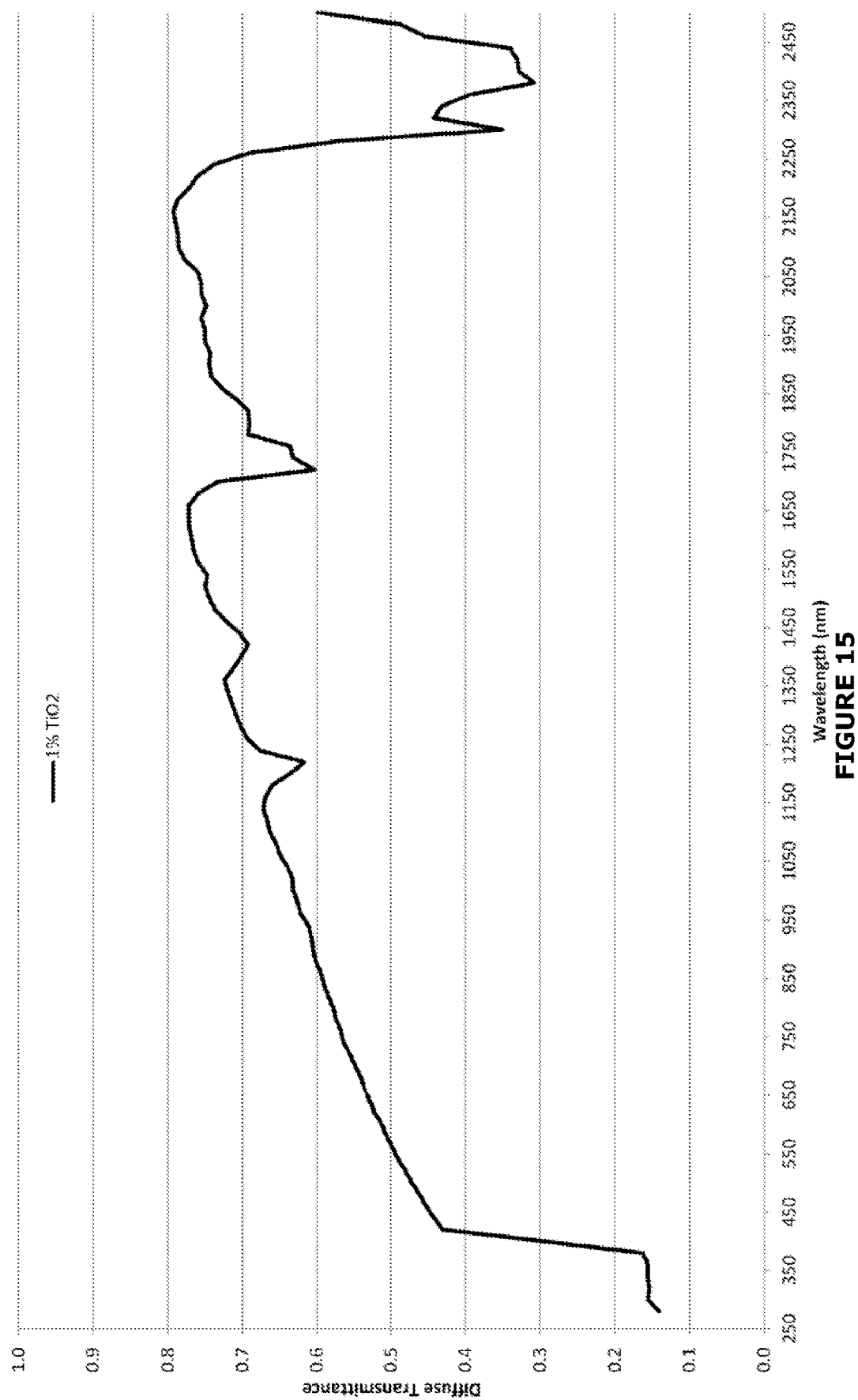
FIG. 15 shows a graph of diffuse transmittance versus radiation from 250 to 2500 nm for monofilament 1%, TiO2.
Figure 16:
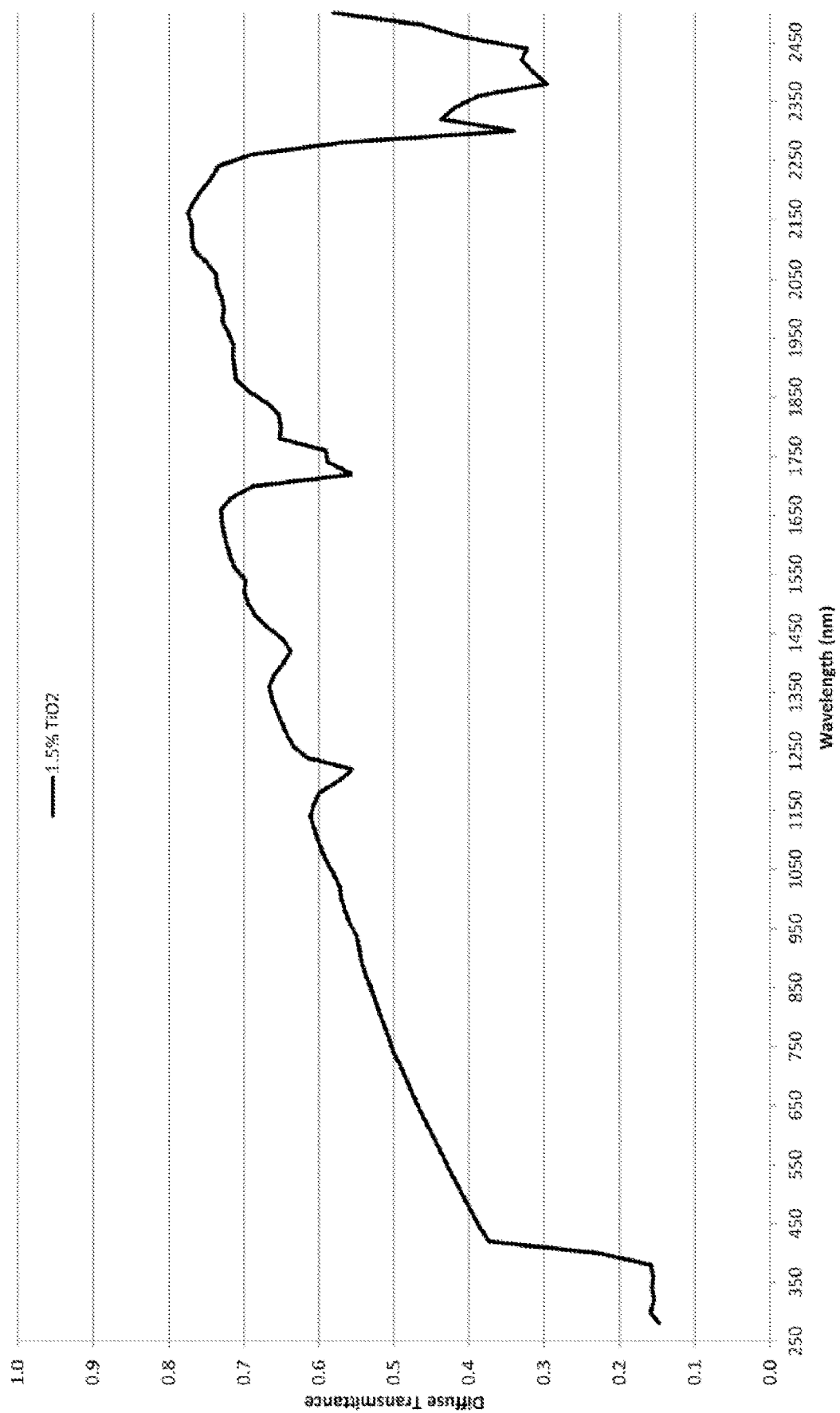
FIG. 16 shows a graph of diffuse transmittance versus radiation from 250 to 2500 nm for monofilament, 1.5% TiO2.
Figure 17:
FIG. 17 shows a graph of diffuse transmittance versus radiation from 250 to 2500 nm for monofilament, 2% TiO2.
Figure 18:
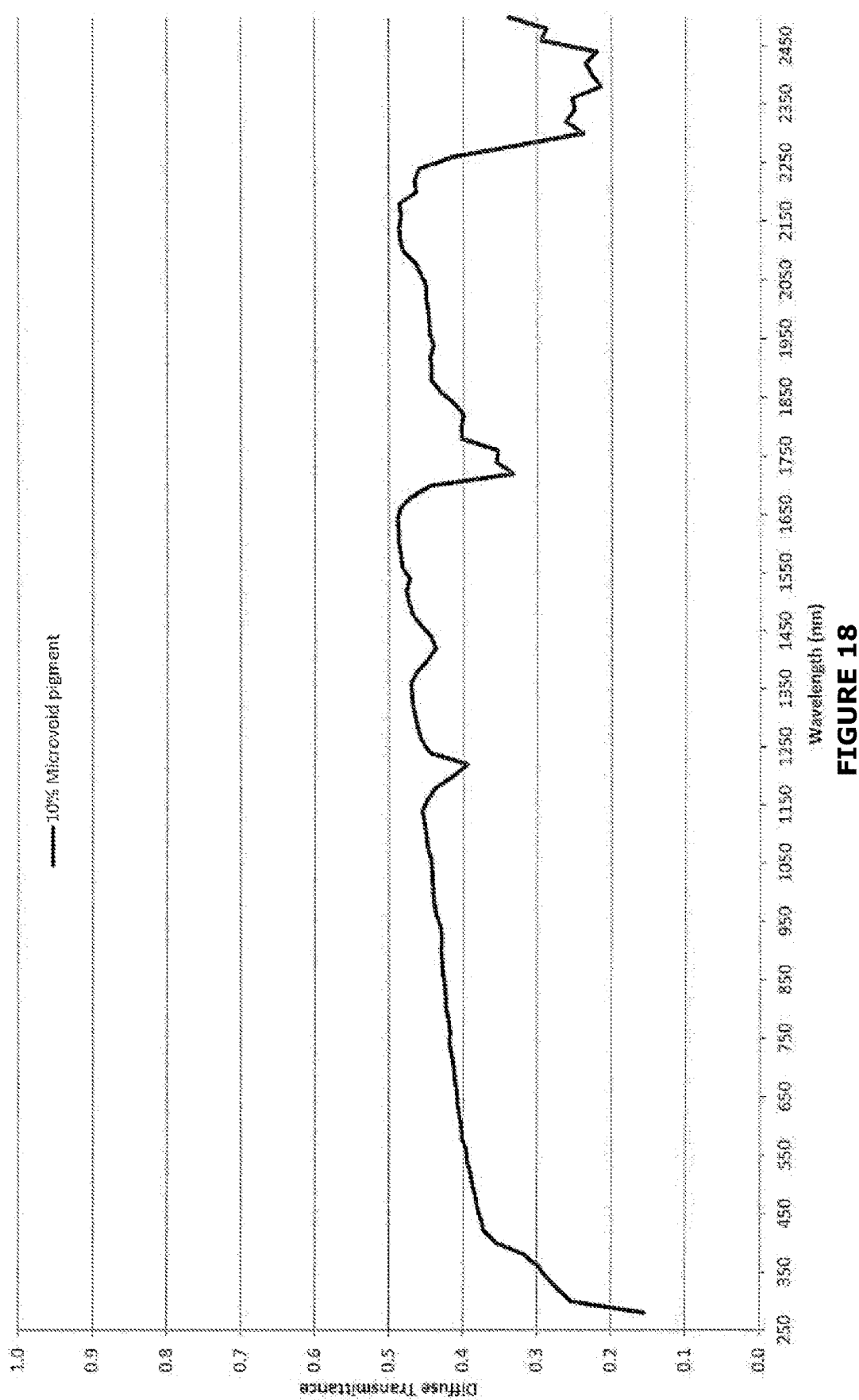
FIG. 18 shows a graph of diffuse transmittance versus radiation from 250 to 2500 nm for monofilament, 10% Microvoid pigment.
Figure 19:
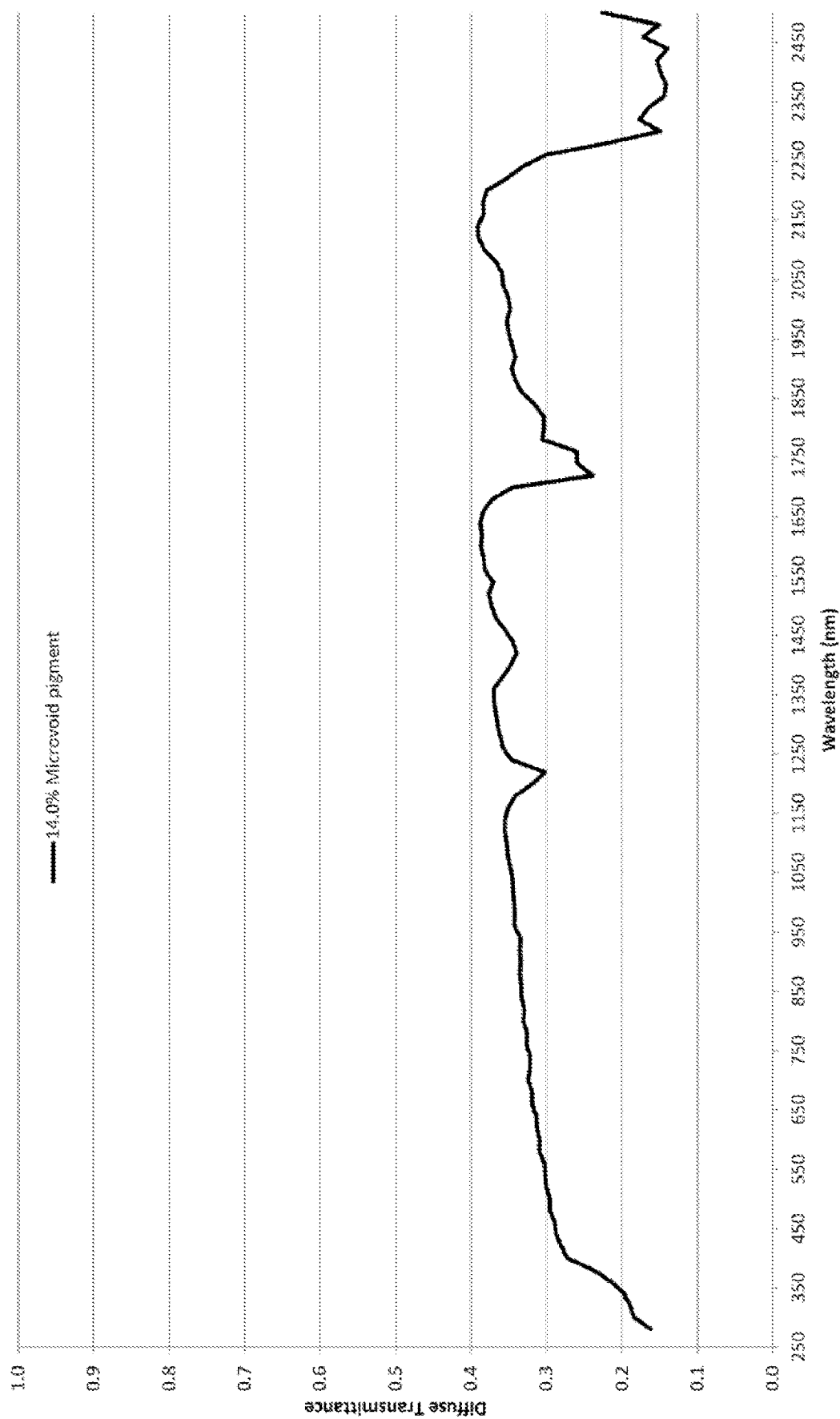
FIG. 19 shows a graph of diffuse transmittance versus radiation from 250 to 2500 nm for monofilament, 14.0% Microvoid pigment.
Figure 20:
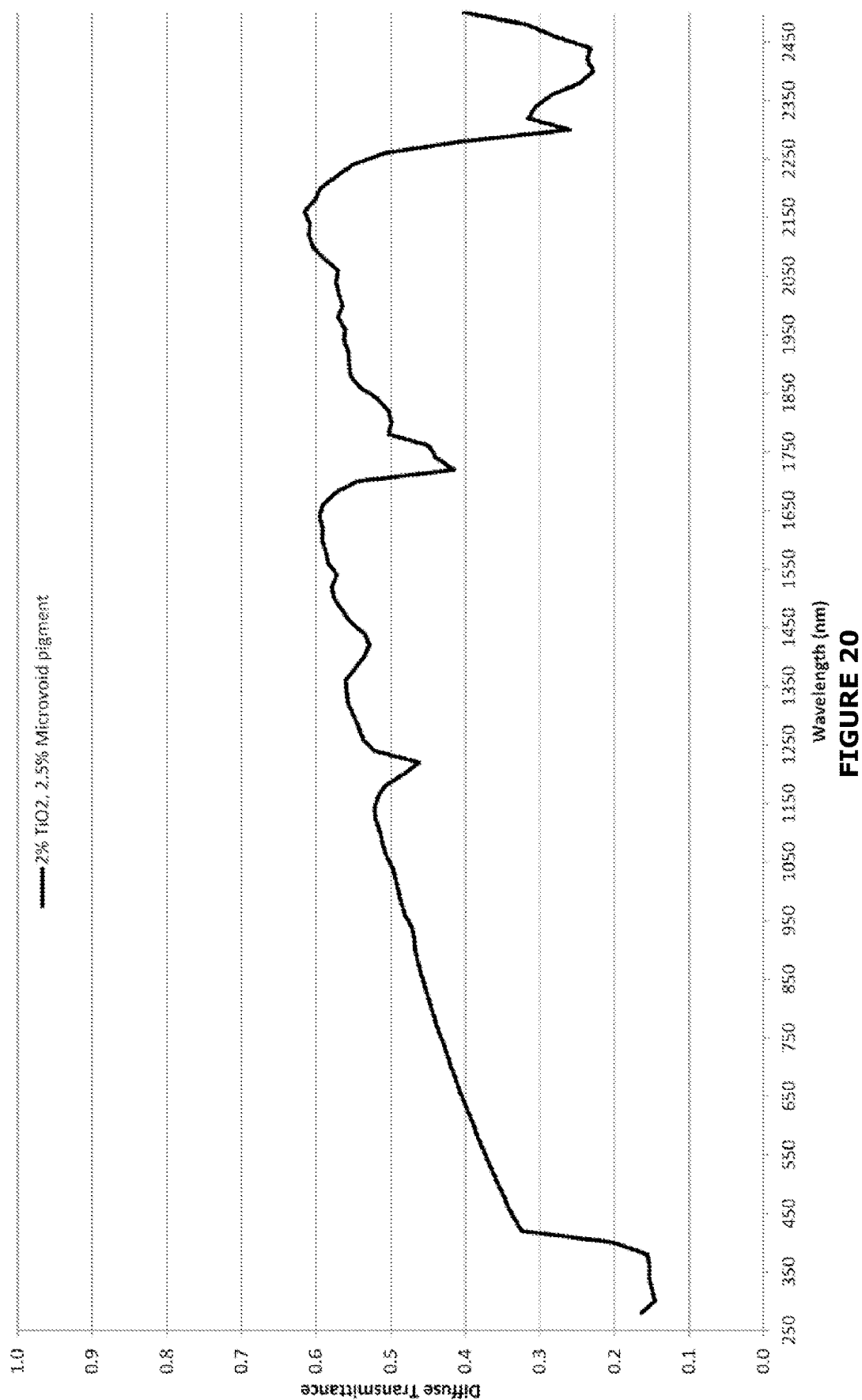
FIG. 20 shows a graph of diffuse transmittance versus radiation from 250 to 2500 nm for monofilament, 2% TiO2, 2.5% Microvoid pigment.
Figure 21:
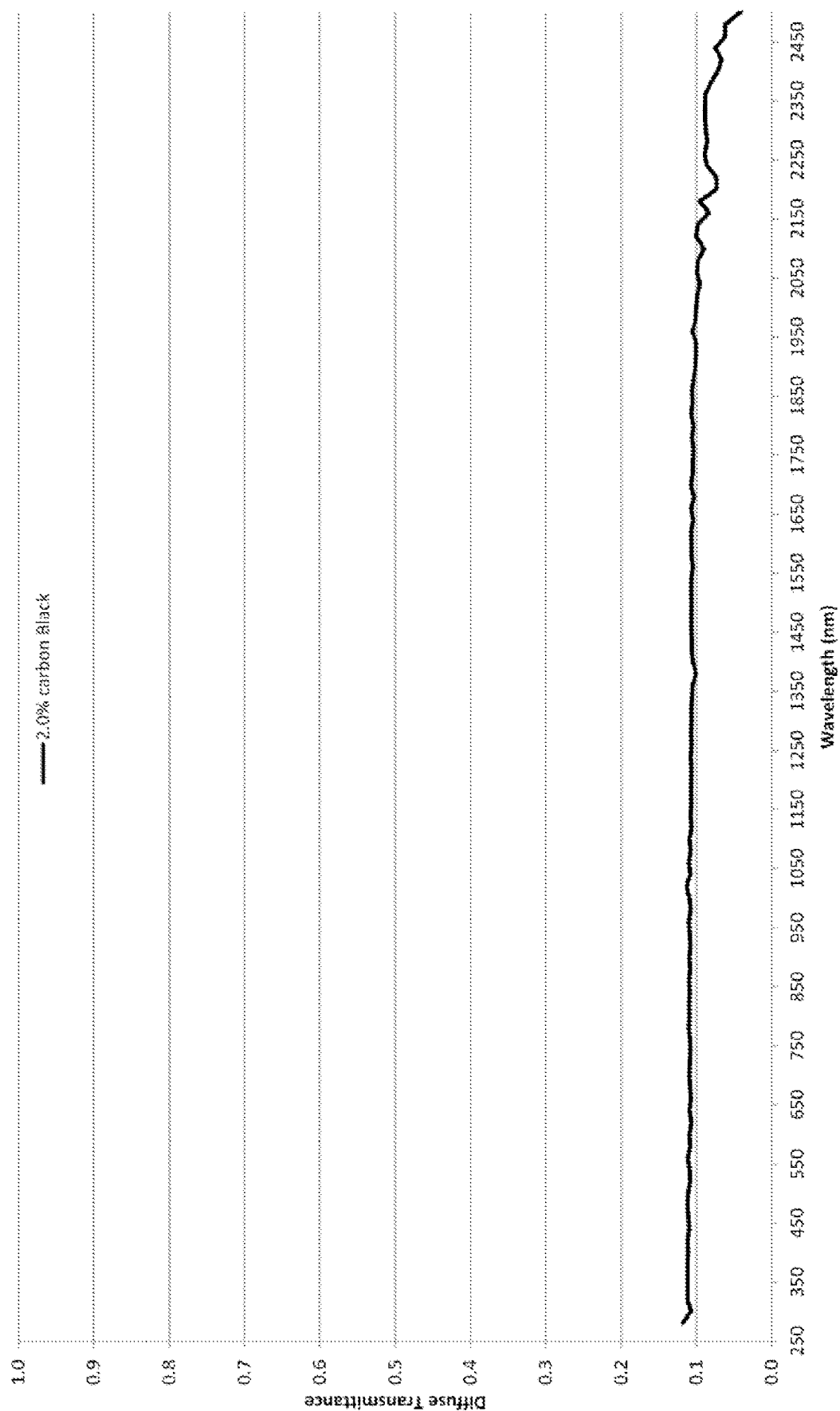
FIG. 21 shows a graph of diffuse transmittance versus radiation from 250 to 2500 nm monofilament, 2.0% carbon Black.
Figure 22:
FIG. 22 shows a graph of diffuse transmittance versus radiation from 250 to 2500 nm monofilament, 0.4% Aluminium.
Figure 23:
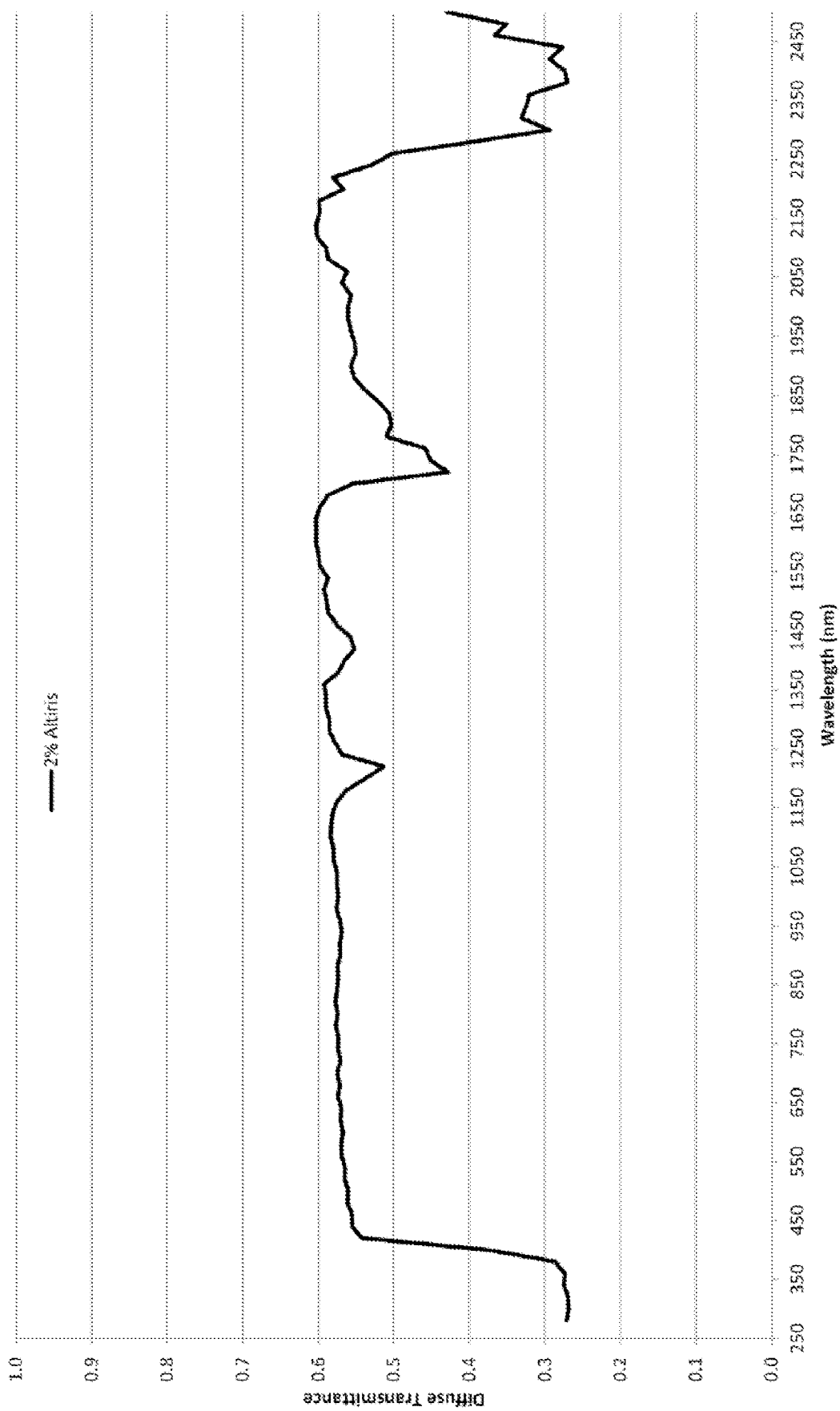
FIG. 23 shows a graph of diffuse transmittance versus radiation from 250 to 2500 nm monofilament, 2% Altiris.
Figure 24:
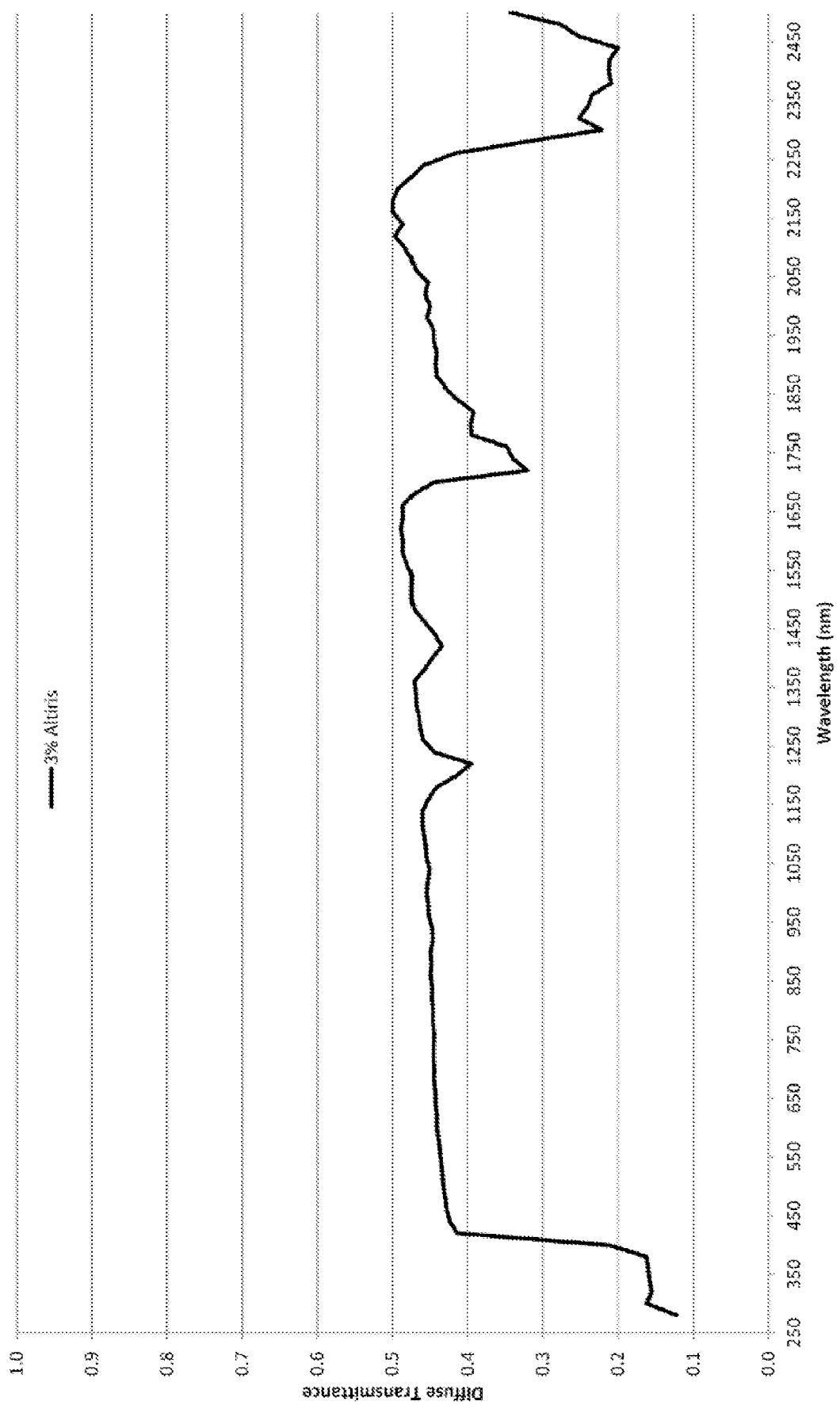
FIG. 24 shows a graph of diffuse transmittance versus radiation from 250 to 2500 nm monofilament, 3% Altiris.
Figure 25:
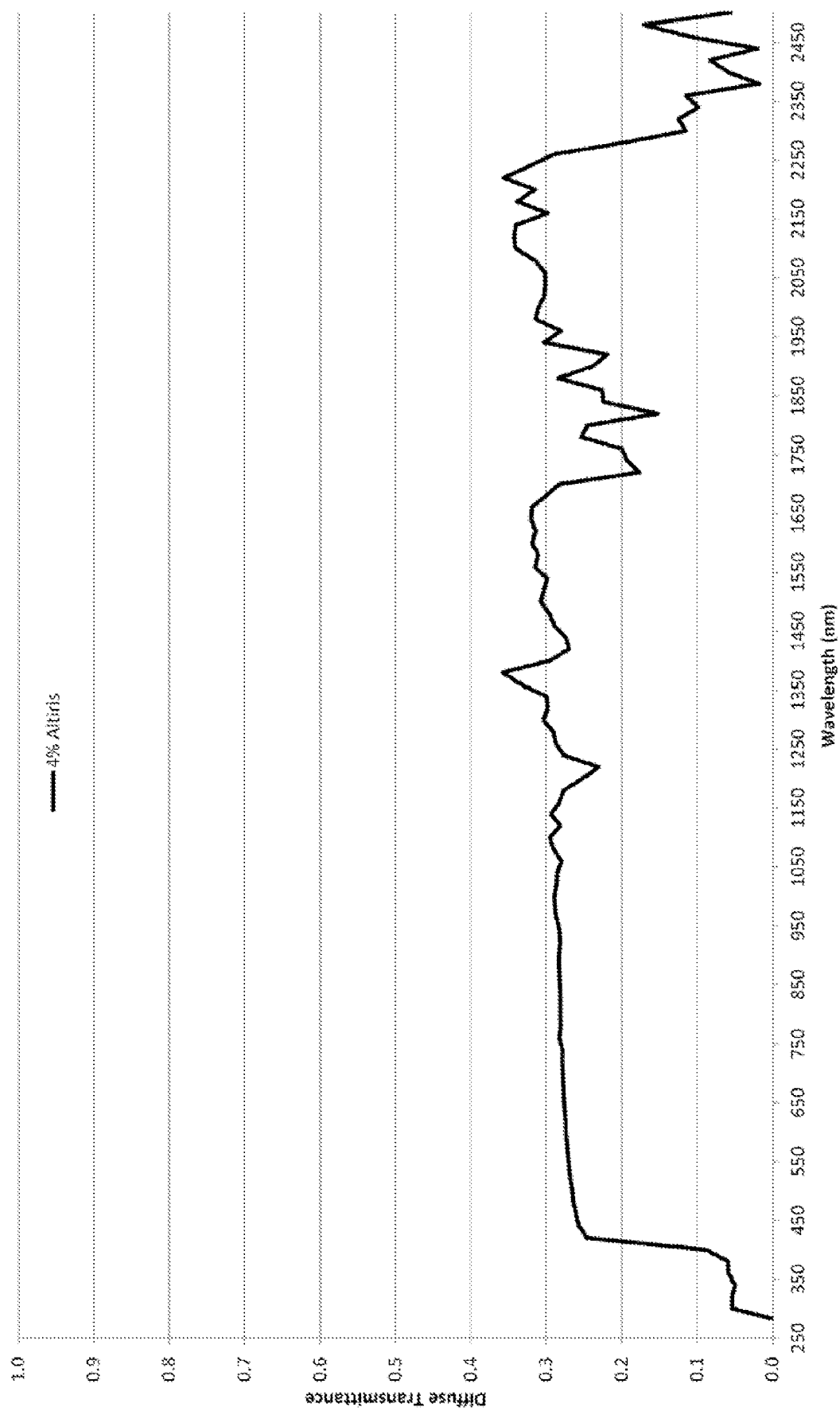
FIG. 25 shows a graph of diffuse transmittance versus radiation from 250 to 2500 nm monofilament, 4% Altiris.
Figure 26:
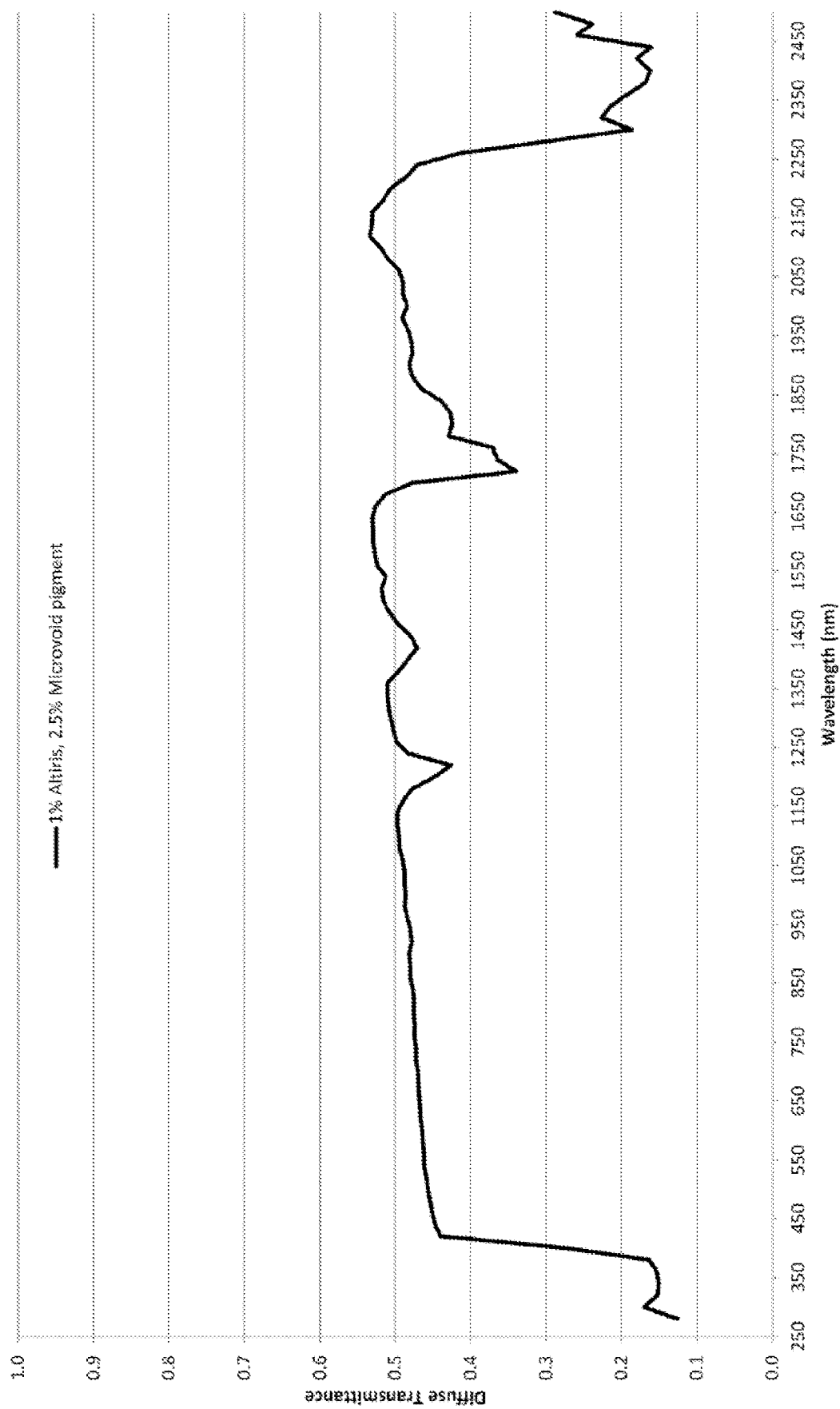
FIG. 26 shows a graph of diffuse transmittance versus radiation from 250 to 2500 nm monofilament, 1% Altiris, 2.5% Microvoid pigment.
Figure 27:
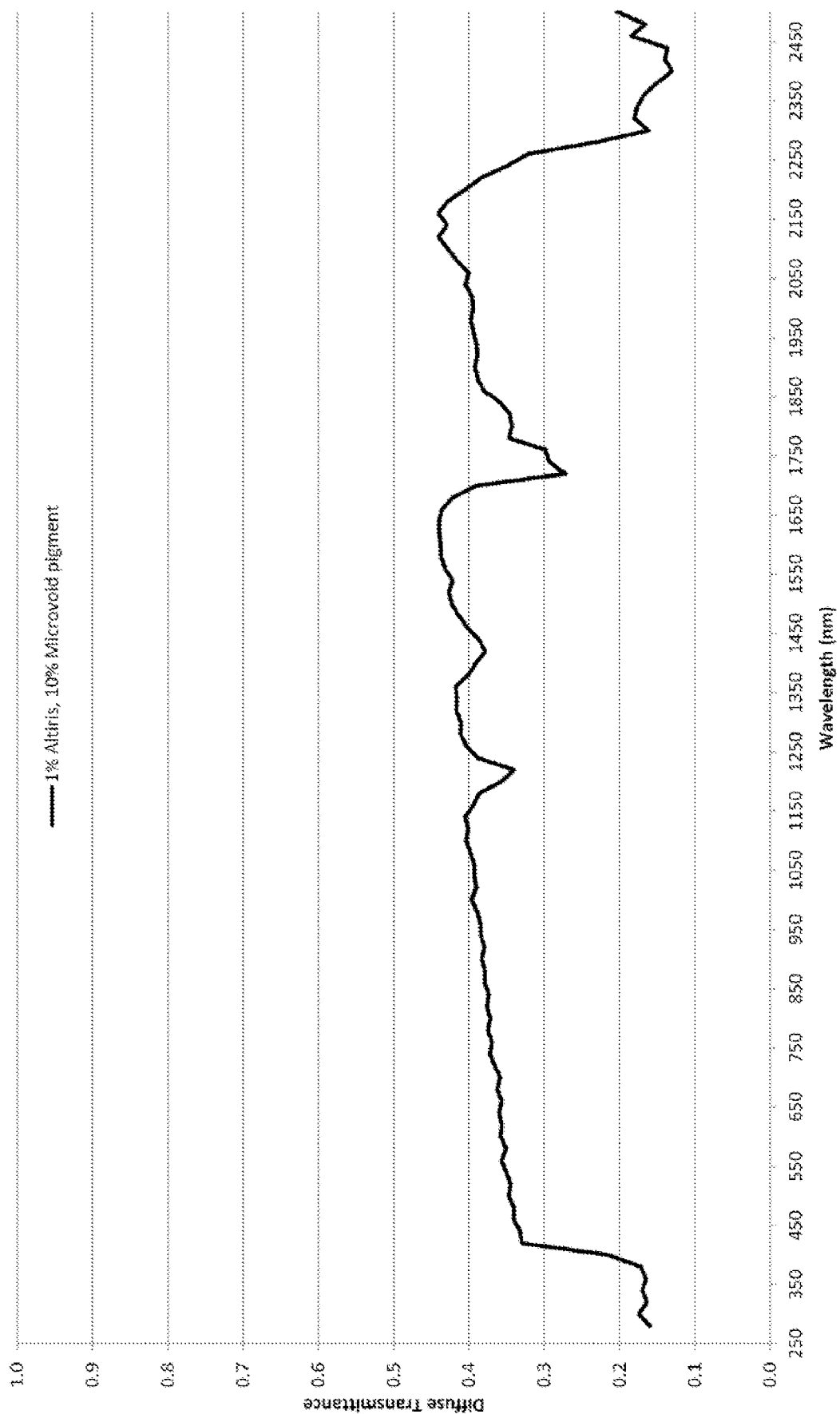
FIG. 27 shows a graph of diffuse transmittance versus radiation from 250 to 2500 nm monofilament, 1% Altiris, 10% Microvoid pigment.
Figure 28:
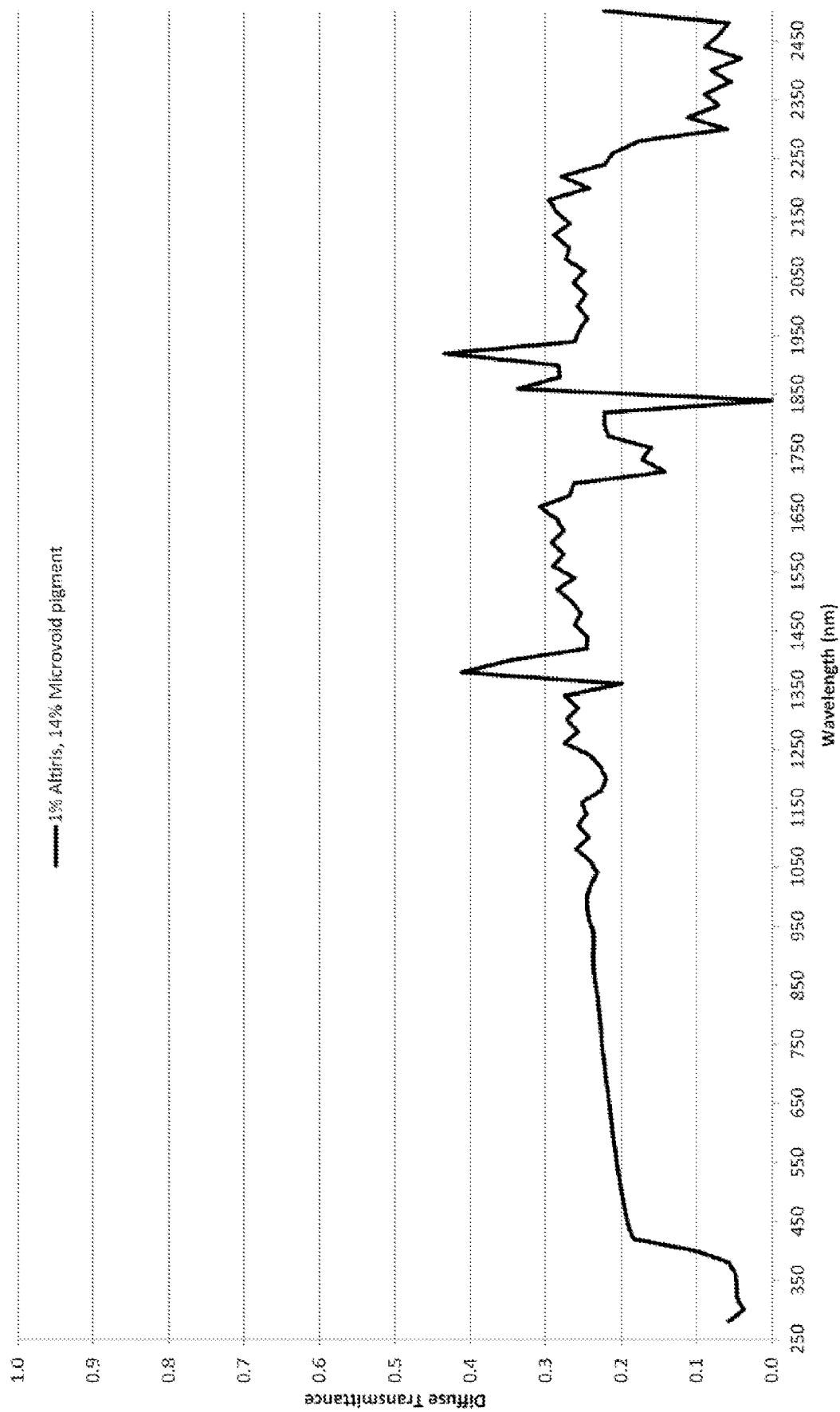
FIG. 28 shows a graph of diffuse transmittance versus radiation from 250 to 2500 nm monofilament, 1% Altiris, 14% Microvoid pigment.
Figure 29:
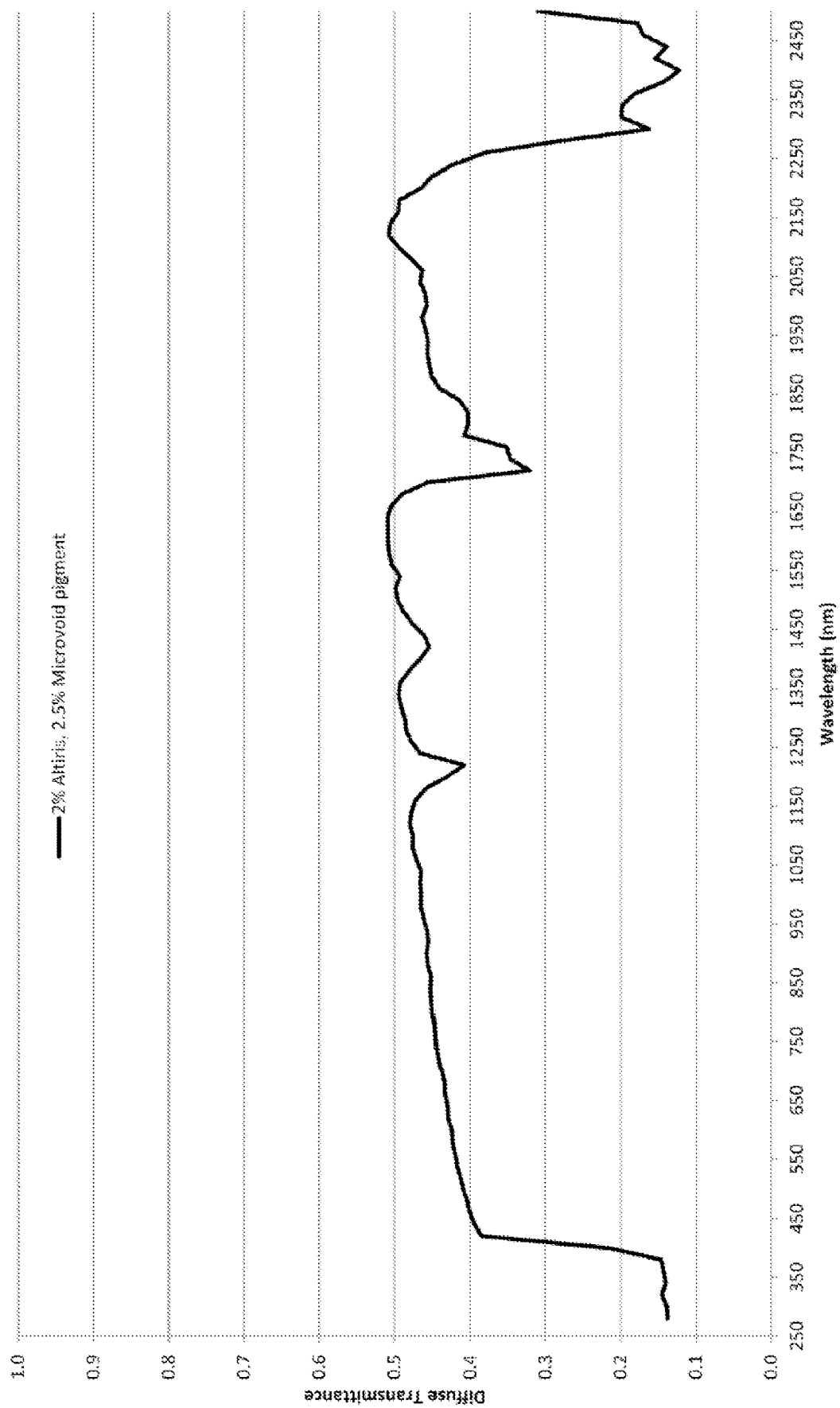
FIG. 29 shows a graph of diffuse transmittance versus radiation from 250 to 2500 nm monofilament, 2% Altiris, 2.5% Microvoid pigment.
Figure 30:
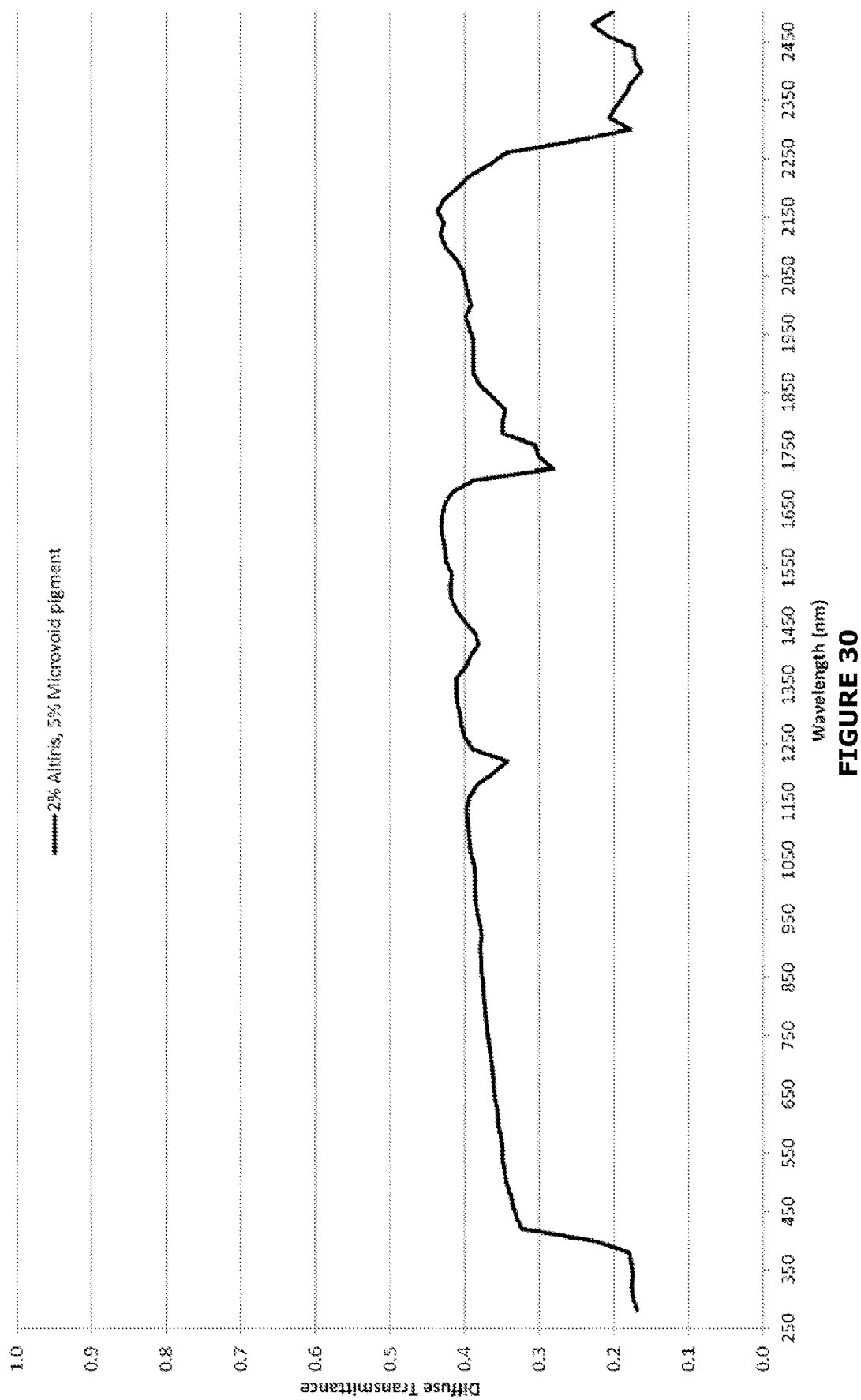
FIG. 30 shows a graph of diffuse transmittance versus radiation from 250 to 2500 nm monofilament, 2% Altiris, 5% Microvoid pigment.
Figure 31:
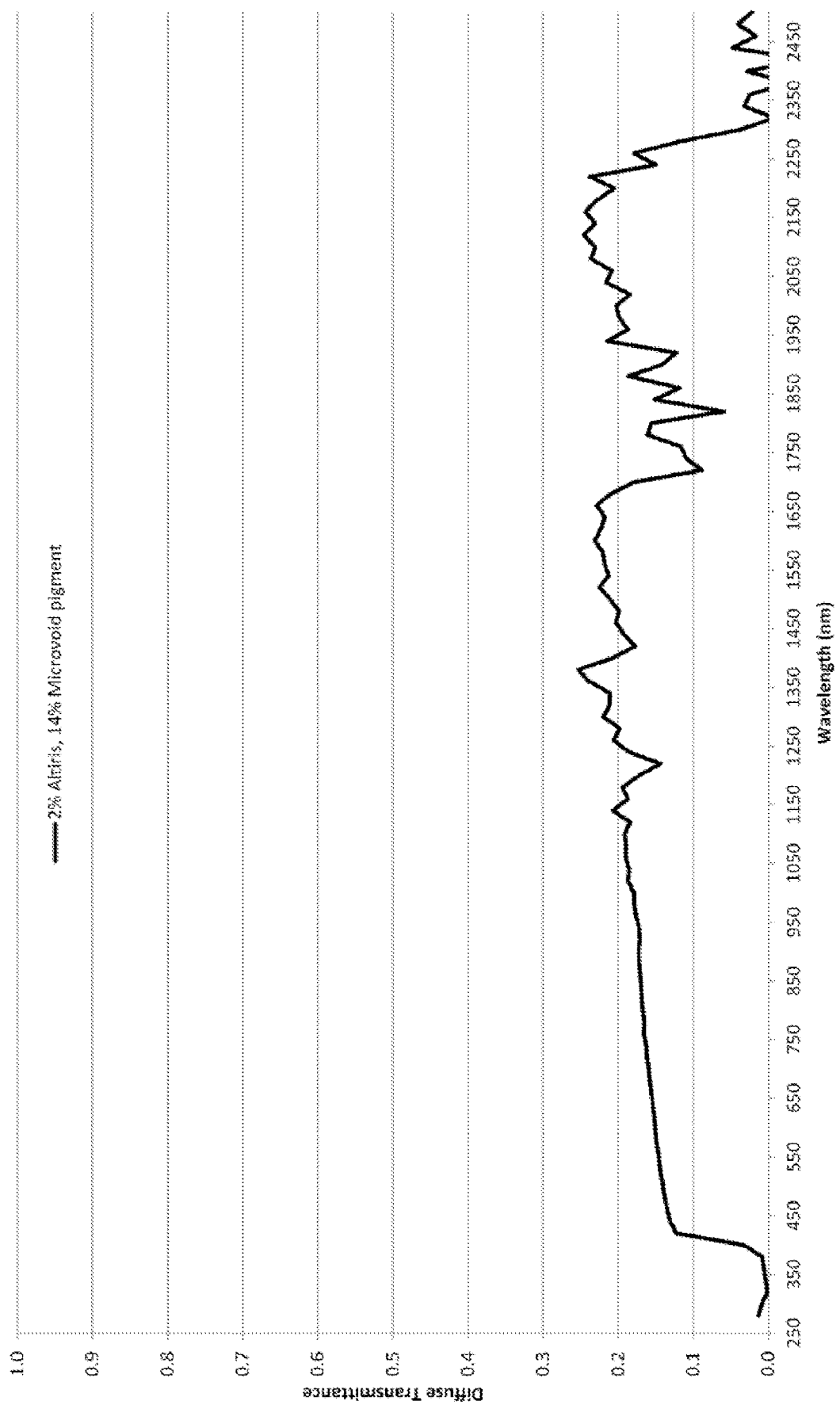
FIG. 31 shows a graph of diffuse transmittance versus radiation from 250 to 2500 nm monofilament, 2% Altiris, 14% Microvoid pigment.
Figure 32:
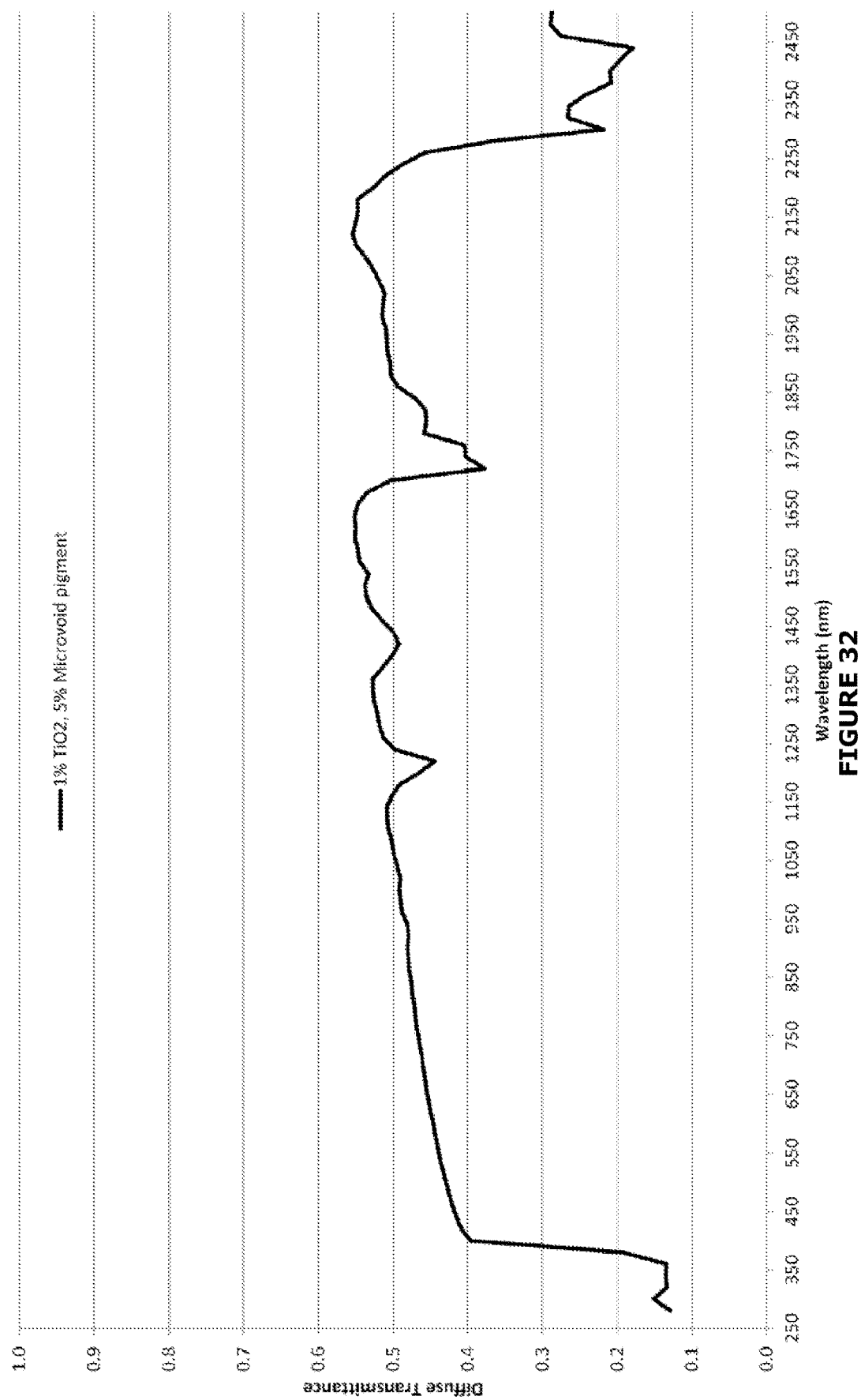
FIG. 32 shows a graph of diffuse transmittance versus radiation from 250 to 2500 nm monofilament, 1% TiO2, 5% Microvoid pigment.
Figure 33:
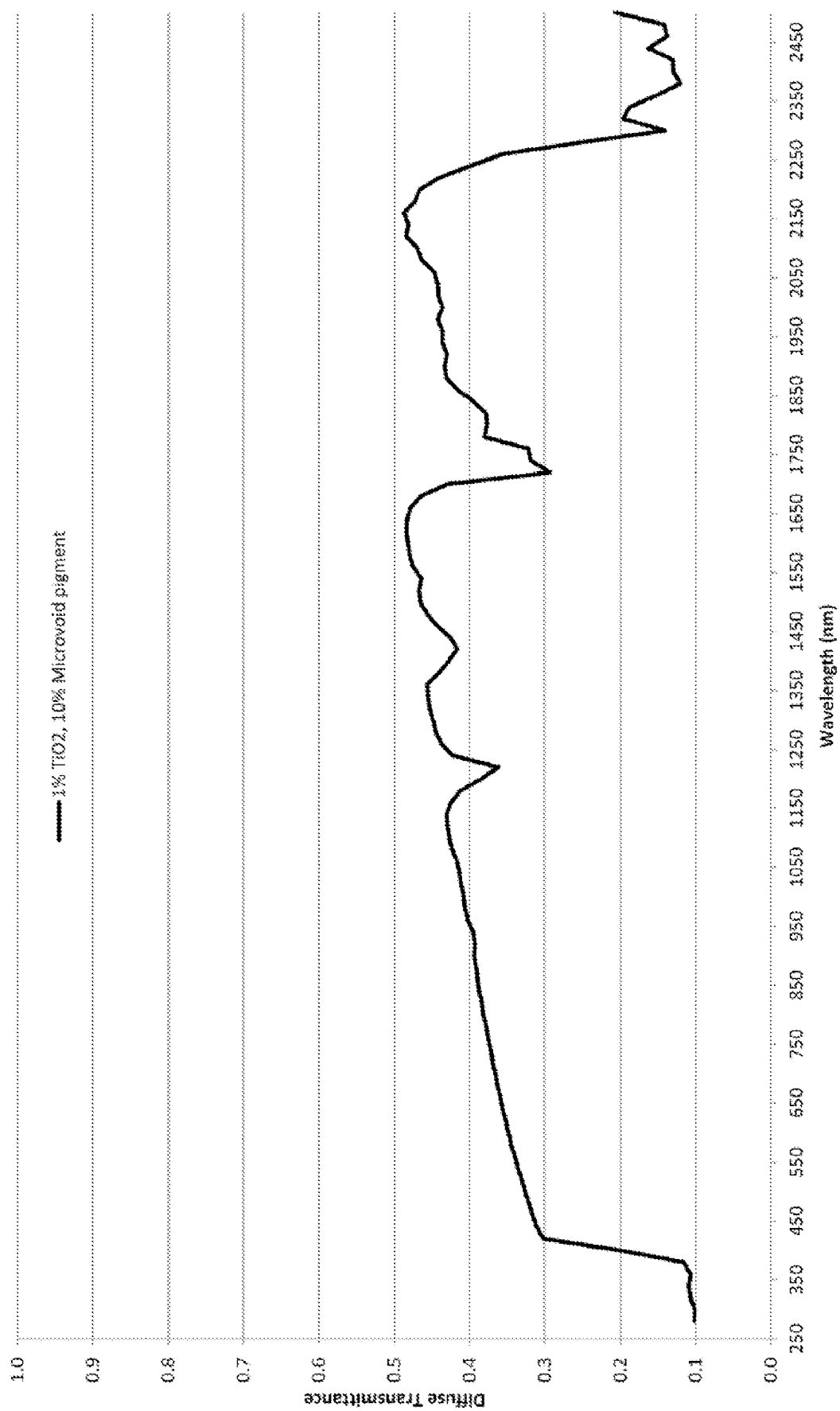
FIG. 33 shows a graph of diffuse transmittance versus radiation from 250 to 2500 nm monofilament, 1% TiO2, 10% Microvoid pigment.
Figure 34:
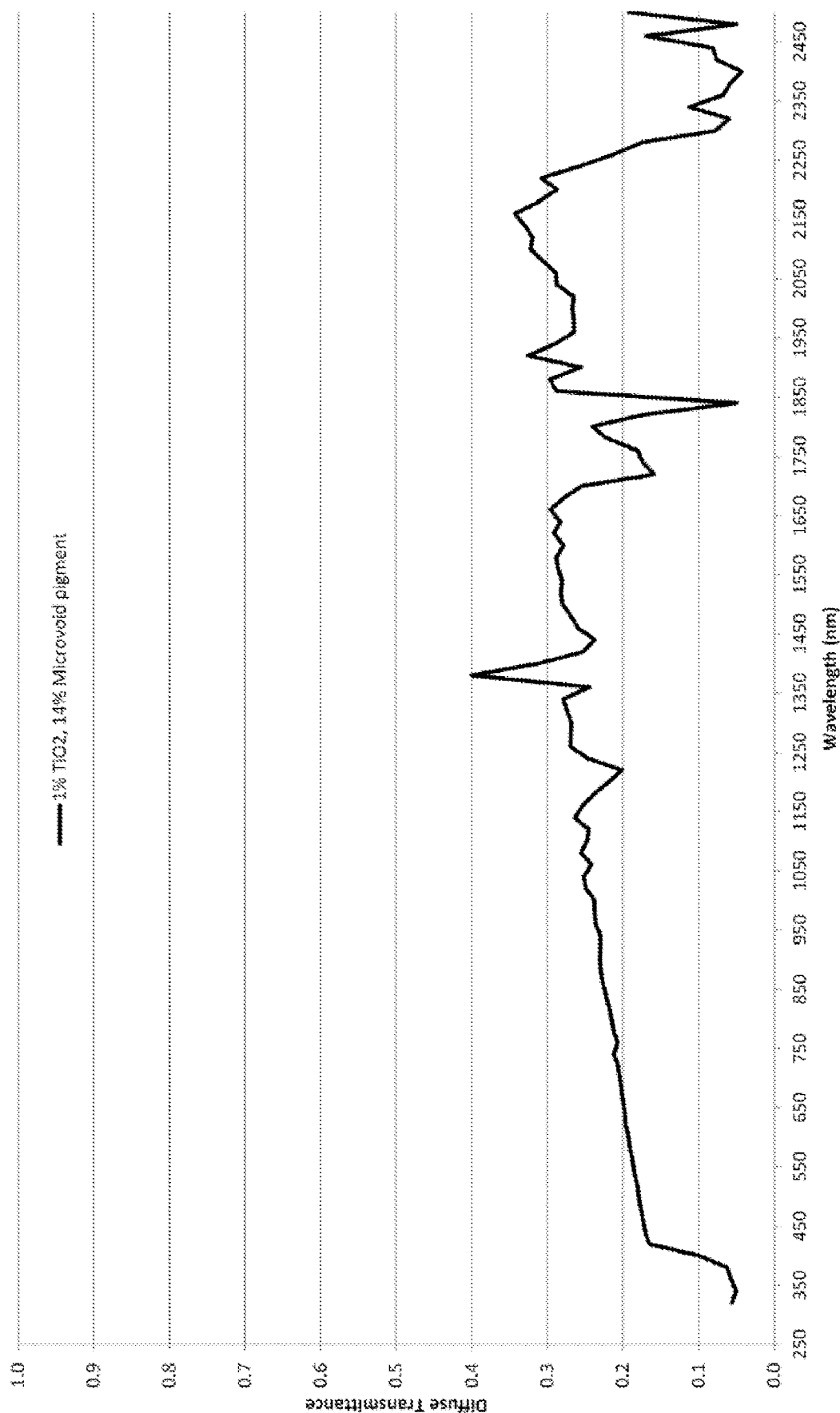
FIG. 34 shows a graph of diffuse transmittance versus radiation from 250 to 2500 nm monofilament, 1% TiO2, 14% Microvoid pigment.
Figure 35:
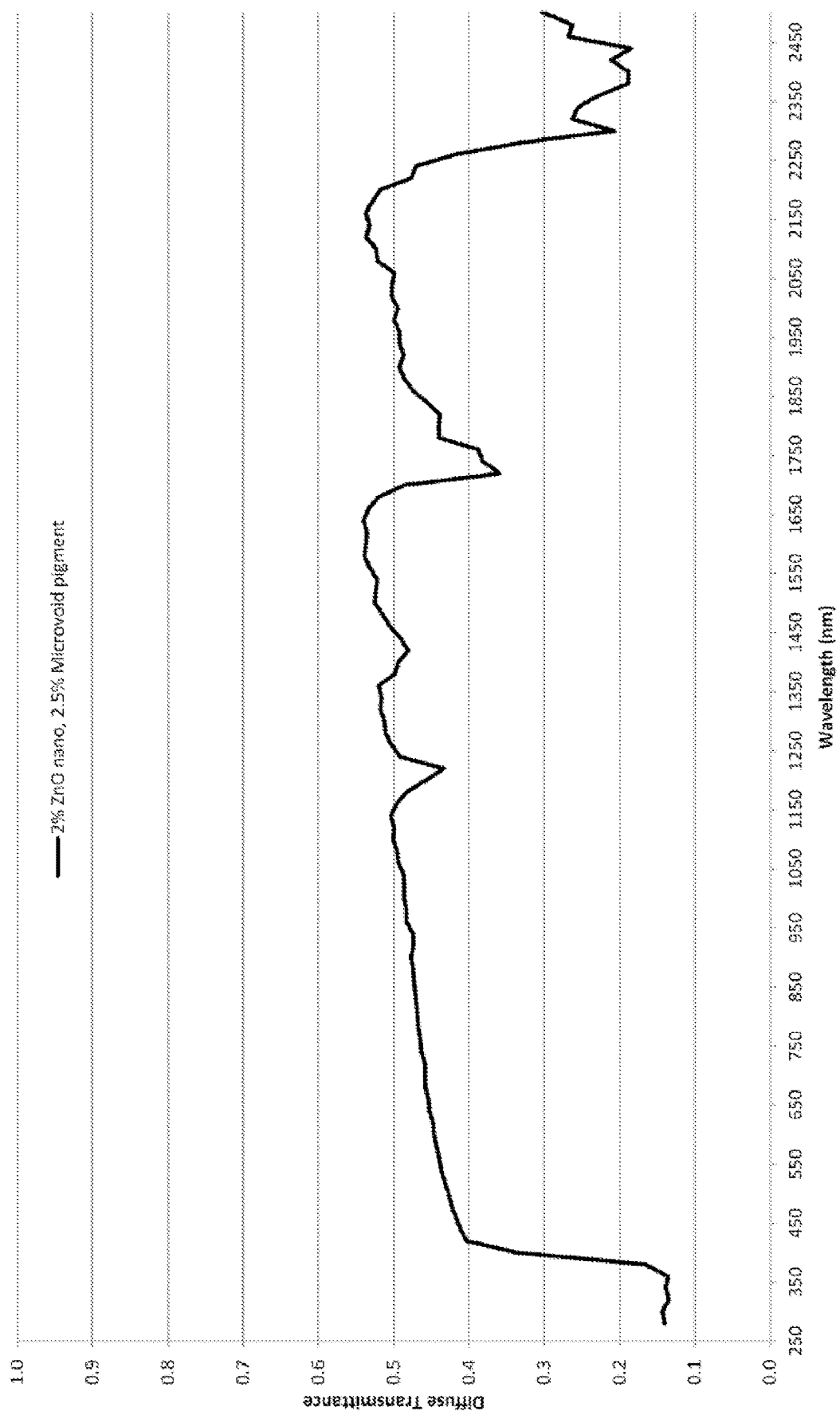
FIG. 35 shows a graph of diffuse transmittance versus radiation from 250 to 2500 nm monofilament, 2% ZnO nano, 2.5% Microvoid pigment.

FIGS. 13a and 13b shows a section of one form knitted diamond monofilament and tape netting, having a cover factor of approximately 20-25%.

Typically reflective netting of the invention has a cover factor of 50% or less. Where the netting is knitted shade cloth however, for example, it may have a higher cover factor, up to 95% but typically still less than 70%. Where the netting is woven shade cloth however, for example, it may have a higher cover factor, up to 85% but typically still less than 70%.

In some embodiments reflective netting of the invention may comprise air space apertures through the material of widest dimension about 30 mm. In other embodiments reflective netting of the invention may comprise air space apertures through the material of widest dimension about 20 mm. In some embodiments reflective netting of the invention may comprise air space apertures through the material of widest dimension in the range 10-30 mm and also in the range of 1 to 10 mm.

In some embodiments, the netting material has a form substantially as depicted in any one of the accompanying Figures.

As referred to previously the netting may be knitted or woven or formed in a non-woven construction, from monofilament, yarn, or tape or a combination. Yarn may comprise multiple synthetic fibres twisted together (multifilaments). Tape may for example be formed by extruding synthetic sheet material from the resin, and then cutting the extruded sheet material to form long tapes of typically 1 to 5 mm of width.

The yarn or tape from which the netting, crop cover, or ground cover is formed has reflectance in the near infrared wavelength range, and reflects at least 10%, or 20%, 25%, 30%, 35%, 40%, 45%, 50%, 55%, 60%, 65%, 70%, 75%, 80%, 85%, or 90% or more light within this wavelength range.

In some embodiments the material is a ground cover material, which may be a woven material woven from flat warp and weft tapes of a plastics material. The tapes may be formed by extruding a film material from a polymer resin and then cutting the film into tapes which are in turn used to weave the material, or by extruding individual tapes. Optionally a woven material may be coated on at least one side with a coating which closes any porosity in the woven material. Alternatively the ground cover material may be a film material.

Trials

Trial 1—Crop Cover Effect on Temperature

A field trial was carried out on Blackberries in Oregon, United States of America to determine the effect of crop cover material according to the invention on temperature under the cover over time.

Rain cover fabric was installed over a hoop structure that measured 14 foot at the apex. The Rain cover fabric was approximately 12 feet in height where it crossed the row of blackberry bushes which were pruned to approximately 6 foot at the start of the trial. Data was collected from the east row of the coverage. Distance of the Rain cover fabric above the bushes started at 6 feet above the bushes and moved higher to the apex of the hoop which is between the two covered rows.

The Rain cover fabric panel covering the blackberries was comprised of 4 individual 40' panels sewn together for an overall length of 160'.

The temperature sensor was a TempRecord Multi-Trip MK III combination sensor/data logger unit. The loggers were placed directly over the east row of the two rows covered by the Rain cover fabric panels. Loggers were placed at 78 inches above ground level.

The Rain cover fabric material was woven non-pigmented polymer material plus stabilisers, with a plastic coating on the top and on the bottom, as follows:
Top coating: LDPE 25 gsm
Woven polymer: HDPE 105 gsm
Bottom coating: LDPE 25 gsm.
Rain cover fabric 1 had 0% Altiris 800® added to the coating
Rain cover fabric 2 had 1% Altiris 800® added to the coating
Rain cover fabric 3 had 2% Altiris 800® added to the coating
Rain cover fabric 4 had 3% Altiris 800® added to the coating.

Tables 1 and 2 below show the percentage of time at certain temperatures under the Rain cover fabric 1, Rain cover fabric 2, Rain cover fabric 3, and Rain cover fabric 4.

As can be seen from the data below, the addition of Altiris to the coating of the Rain cover fabric material provides a reduction in the period of time that high temperatures of over 30° C. were reached.

TABLE 1

9 to 22 Aug. 2013 - Oregon
PERCENTAGE OF TIME AT TEMPERATURE

| Temp (° C.) | Rain cover fabric 1 | Rain cover fabric 2 | Rain cover fabric 3 | Rain cover fabric 4 |
|---|---|---|---|---|
| Average | 21.0 | 20.7 | 20.6 | 20.5 |
| Over 35 | 0% | 0% | 0% | 0% |
| Over 30 | 18% | 14% | 11% | 11% |
| Over 25 | 17% | 19% | 20% | 20% |
| Over 20 | 14% | 16% | 16% | 16% |
| Over 15 | 26% | 26% | 27% | 26% |
| Over 10 | 24% | 23% | 24% | 24% |
| Over 5 | 2% | 2% | 2% | 2% |
| 5 or under | 0% | 0% | 0% | 0% |

TABLE 2

24 Aug. To 5 Sep. 2013 - Oregon
PERCENTAGE OF TIME AT TEMPERATURE

| Temp (° C.) | Rain cover fabric 1 | Rain cover fabric 2 | Rain cover fabric 3 | Rain cover fabric 4 |
|---|---|---|---|---|
| Average | 20.4 | 20.1 | 20.0 | 19.9 |
| Over 35 | 0% | 0% | 0% | 0% |
| Over 30 | 9% | 6% | 6% | 5% |
| Over 25 | 17% | 19% | 19% | 19% |
| Over 20 | 16% | 17% | 18% | 18% |
| Over 15 | 38% | 37% | 38% | 37% |
| Over 10 | 19% | 20% | 20% | 21% |
| Over 5 | 0% | 0% | 0% | 0% |
| 5 or under | 0% | 0% | 0% | 0% |

Trial 2—Crop Cover Material Effect on Sunburn

A field trial was carried out on Blackberries in Albany, Oreg., United States of America to determine the effect of crop cover material of the invention on sunburn.

The rows were 10 feet wide with two rows covered by each Rain cover fabric panel. The rows were running from North to South.

A Rain cover fabric was installed over a hoop structure that measures 14 foot at the apex. The Rain cover fabric was approximately 12 feet in height where it crossed the row of blackberry bushes which were pruned to approximately 6 foot at the start of the trial. Data was collected from the east row of the coverage. Distance of the Rain cover fabric above the bushes started at 6 feet above the bushes and moved higher to the apex of the hoop which is between the two covered rows.

The Rain cover fabric panel covering the blackberries was comprised of 4 individual 40' panels sewn together for an overall length of 160'.

The control material, Rain cover fabric 1, was woven non-pigmented polymer material plus stabilisers, with a plastic coating on the top and on the bottom, as follows:
Top coating: LDPE 25 gsm
Woven polymer: HDPE 105 gsm
Bottom coating: LDPE 25 gsm.
Four different variations of trial material were used:
Rain cover fabric 4—3% Altiris 800® added to the coating
Rain cover fabric 3—2% Altiris 800® added to the coating
Rain cover fabric 2—1% Altiris 800® added to the coating
Rain cover fabric 1—0% Altiris 800® added to the coating.
Open was with no cover.

As shown in Table 3 below, the effect of using 1% Altiris was a reduction in sunburn from 34.8% with no cover to 1.1% sunburn with the addition of 1% Altiris.

Harvest dates were 7 Aug. 2013, 15 Aug. 2013 and 23 Aug. 2013.

TABLE 3

Results of sunburn reduction trial in Oregon, USA

| Rain cover fabric | Total fruit no. | Total fruit with sunburn | % burn |
|---|---|---|---|
| Rain cover fabric 4 | 295 | 0 | 0.0% |
| Rain cover fabric 3 | 541 | 2 | 0.4% |
| Rain cover fabric 2 | 547 | 6 | 1.1% |
| Rain cover fabric 1 | 642 | 41 | 6.4% |
| OPEN | 414 | 144 | 34.8% |

Trial 3—Netting Material Effect on Temperature

A field trial was carried out on apples, Fuji variety, in Vantage, Wash., United States of America to determine the effect of netting material of the invention on temperature under the netting material over time.

The rows were running from East to West. The rows were 14 feet spacing in a V-trellis system. The total row length was approximately 1100 feet. Three rows were covered.

The net was suspended above the trees on a post and wire structure. The net height was 15 feet above the ground.

The netting was applied on 5 Aug. 2013.

The solar radiation was measured with a Watchdog LightScout Silicon Pyranometer with a range between 300 to 1100 nanometers. The UV radiation was measured with a Watchdog LightScout UV Light sensor, measuring between 250 to 400 nanometers. The Par Light was measured with a Watchdog External Temperature Sensor, at 400-700 nm.

The data was logged with a WatchDog 1000 Series Model 1400 Micro Station. The sensors were placed on a T-bar at 10' above ground level.

Two nets were trialled:
Net 1—2% conventional titanium dioxide, with 35% coverage
Net 2—8% micro voiding pigments and 1% Altiris 800®, with 35% coverage.

The control area had no cover.

As shown in Table 4 below, Net 2 had a greater reduction in heat in temperatures over 100° F. of 66%, compared to 34% for Net 1. Net 2 also had a greater reduction in heat in temperatures between 80° F.-100° F. of 9%, compared to 3% for Net 1.

TABLE 4

Net Trial - Fuji Apples
Results of Trial in Washington State, USA, 3 and 4 Sep. 2013

|  | Average Temperature (°F.) | Hours above 100 F. per day | Hours above 80 F. per day | Percentage reduction in heat - temperatures over 100° F. | Percentage reduction in heat 80-100° F. |
|---|---|---|---|---|---|
| No net cover | 81.5 | 3.4 | 10.5 |  |  |
| Net 1 | 80.8 | 2.3 | 10.2 | 34% | 3% |
| Net 2 | 78.1 | 1.2 | 9.6 | 66% | 9% |

Trial 4—Netting Material Effect on Temperature

A field trial was carried out on Blackberries in Oregon, United States of America to determine the effect of netting material of the invention on temperature under the netting material over time.

The data was collected over a period of 13 days, from 24 Aug. until 5 Sep. 2013.

The net was installed over a hoop structure that measured 14 foot at the apex. The net was approximately 12 feet in height where it crossed the row of blackberry bushes which were pruned to approximately 6 foot at the start of the trial. Data was collected from the east row of the coverage. Distance of the net above the bushes started at 6 feet above the bushes and moved higher to the apex of the hoop which was between the two covered rows.

The temperature sensor was a TempRecord Multi-Trip MK III combination sensor/data logger unit. The loggers were placed directly over the east row of the two rows covered by the net. Loggers were placed at 78 inches above ground level.

Two nets were trialled:
Net 1—2% conventional titanium dioxide
Net 2—10% micro voiding pigments and 1% conventional titanium dioxide.

The nets were placed over steel hoops to form the tunnel house.

The control area had no cover.

As shown in Table 5 below, high temperatures of over 30° C. were reached only 3% of the time with Net 2, compared to 6% of time with Net 1. In addition, the mean temperature with Net 2 was 0.2 degrees lower, compared to Net 1.

TABLE 5

Net trial - Blackberries
Percentage of time at temperature
Trial period: 24 Aug. to 5 Sep. 2013 (13 days)

| Temp (° C.) | No cover | Net 1 | Net 2 |
|---|---|---|---|
| Average | 20.0 | 19.6 | 19.4 |
| Over 35 | 1% | 0% | 0% |
| Over 30 | 8% | 6% | 3% |
| Over 25 | 16% | 16% | 18% |
| Over 20 | 16% | 18% | 20% |
| Over 15 | 34% | 38% | 38% |
| Over 10 | 24% | 23% | 22% |
| Over 5 | 1% | 0% | 0% |
| 5 or under | 0% | 0% | 0% |

Trial 5—Netting Material Effect on Solar Radiation

A field trial carried out on apples, Fuji variety, in Vantage, Wash., United States of America to determine the effect of netting material of the invention on solar radiation.

The rows were running from East to West. The rows were 14 feet spacing in a V-trellis system. The total row length was approximately 1100 feet. Three rows were covered. The net was suspended above the trees on a post and wire structure. The net height was 15 feet above the ground.

The netting was applied on 5 Aug. 2013. The trials were conducted on 3 to 4 Sep. 2013.

The solar radiation was measured with a Watchdog LightScout Silicon Pyranometer with a range between 300 to 1100 nanometers. The UV radiation was measured with a Watchdog LightScout UV Light sensor, measuring between 250 to 400 nanometers. The Par Light was measured with a Watchdog External Temperature Sensor 400-700 nanometers.

The data was logged with a WatchDog 1000 Series Model 1400 Micro Station. The sensors were placed on a T-bar at 10' above ground level.

Two nets were trialled:
Net 1—2% conventional titanium dioxide with 35% coverage
Net 2—8% micro voiding pigments and 1% Altiris 800® with 35% coverage.

Table 6 below shows that:
Net 2 had an increased reduction in UV light of 29%, compared to 26% reduction for Net 1
Net 2 had an increased reduction in Solar Radiation of 22%, compared to 17% reduction for Net 1
Net 2 had an increased reduction in Infrared Radiation of 17%, compared to 9% reduction for Net 1.

TABLE 6

Net Trial - Fuji Apples, Washington State, USA
3 and 4 Sep. 2013

|  | UV Light 280 to 400 nm | PAR 400-700 | Solar Radiation (wat/m2) 300 to 1100 nm | Infrared Radiation (wat/m2) 700 to 1100 nm |
|---|---|---|---|---|
| Incoming Solar radiation | 1,981 | 35,254 | 76,812 | 39,577 |

TABLE 6-continued

Net Trial - Fuji Apples, Washington State, USA
3 and 4 Sep. 2013

|  | UV Light 280 to 400 nm | PAR 400-700 | Solar Radiation (wat/m2) 300 to 1100 nm | Infrared Radiation (wat/m2) 700 to 1100 nm |
|---|---|---|---|---|
| Net 1 - wat/m2 | 1,467 | 26,253 | 64,123 | 36,133 |
| Net 2 - wat/m2 | 1,411 | 25,436 | 59,622 | 32,755 |
| Net 1 - reduction % | 26% | 25% | 17% | 9% |
| Net 2 - reduction % | 29% | 28% | 22% | 17% |

Net 3—12% micro voiding pigment and 0.5% Altiris 800®, with 35% coverage.

Table 7 below shows that:

The reduction in the period of time high temperatures of over 100° F. were reached, with the addition of Altiris to the netting The reduction in the percentage of time that high temperatures of over 100° F. were reached, with the addition of Altiris to the net The higher percentage of reduction in infrared radiation, from 9% in the Titanium Dixoide net to 17% in the netting with Altiris added.

TABLE 7

Net Trial - Fuji Apples
Results of Heat Reflecting Netting Trial in Washington State,
USA - 3 and 4 September 2013

|  | Average Temperature (*F.) | Hours above 100 F. per day | Hours above 80 F. per day | Percentage reduction in Infrared radiation (wat/m2) | Percentage reduction in heat temperatures over 100° F. | Percentage reduction in heat 80-100° F. |
|---|---|---|---|---|---|---|
| Incoming solar radiation | 81.5 | 3.4 | 10.5 |  |  |  |
| Net 1 | 80.8 | 2.3 | 10.2 | 9% | 34% | 3% |
| Net 2 | 78.1 | 1.2 | 9.6 | 17% | 66% | 9% |
| Net 3 | 78.6 | 0.2 | 9.4 | 17% | 95% | 10% |

TABLE 6-continued

Net Trial - Fuji Apples, Washington State, USA
3 and 4 Sep. 2013

|  | UV Light 280 to 400 nm | PAR 400-700 | Solar Radiation (wat/m2) 300 to 1100 nm | Infrared Radiation (wat/m2) 700 to 1100 nm |
|---|---|---|---|---|

Trial 6—Netting Material Effect on Solar Radiation

A field trial was carried out on apples, Fuji variety, in Vantage, Wash., United States of America to determine the effect of netting materials of the invention on solar radiation.

The rows were running from East to West. The rows were 14 feet spacing in a V-trellis system. The total row length was approximately 1100 feet. Three rows were covered. The net was suspended above the trees on a post and wire structure. The net height was 15 feet above the ground.

The netting was applied on 5 Aug. 2013. The trial period was 3 and 4 Sep. 2013.

The solar radiation was measured with a Watchdog Light-Scout Silicon Pyranometer with a range between 300 to 1100 nanometers. The UV radiation was measured with a Watchdog LightScout UV Light sensor, measuring between 250 to 400 nanometers. The Par Light was measured with a Watchdog External Temperature Sensor, measuring between 400 to 700 nanometers.

The data was logged with a WatchDog 1000 Series Model 1400 Micro Station. The sensors were placed on a T-bar at 10' above ground level.

Three nets were trialled:
Net 1—conventional titanium dioxide and 2% Altiris 800®, with 35% coverage
Net 2—8% micro voiding pigment and 1% Altiris 800®, with 35% coverage Trial 7—Netting Material Effect on Solar Radiation A field trial was carried out on apples, Fuji variety, in Vantage, Wash., United States of America to determine the effect of netting material of the invention on solar radiation.

The rows were running from East to West. The rows were 14 feet spacing in a V-trellis system. The total row length was approximately 1100 feet. Three rows were covered. The net was suspended above the trees on a post and wire structure. The net height was 15 feet above the ground.

The netting was applied on 5 Aug. 2013. The trial period was 18 to 26 Aug. 2013.

The solar radiation was measured with a Watchdog Light-Scout Silicon Pyranometer with a range between 300 to 1100 nanometers. The UV radiation was measured with a Watchdog LightScout UV Light sensor, measuring between 250 to 400 nanometers. The Par Light was measured with a Watchdog External Temperature Sensor, measuring between 400 to 700 nanometers.

The data was logged with a WatchDog 1000 Series Model 1400 Micro Station. The sensors were placed on a T-bar at 10' above ground level.

Four nets were trialled:
Net 1—35% coverage and 2% conventional titanium dioxide
Net 4—30% coverage and 2% Altiris 800®
Net 5—40% coverage and 2% Altiris 800®
Net 2—35% coverage with 8% micro voiding pigment and 1% Altiris 800®

Table 8 shows that:
Net 4 had a greater reduction in solar radiation of 19%, compared to 17% with Net 1, and a greater reduction in infrared radiation of 17% compared to 11% with Net 1
Net 5 had a greater reduction in solar radiation of 26% compared to 17% with Net 1, and a greater reduction in infrared radiation of 23% compared to 11% with Net 1

Net 2 had a greater reduction in solar radiation of 24% compared to 17% with Net 1, and a greater reduction in infrared radiation of 22% compared to 11% with Net 1.

TABLE 8

Net Trial - Fuji Apples
Results of Heat Reflecting Netting Trial in
Washington State, USA, 18-26 Aug. 2013

|  | UV Light wat/m2 280 to 400 nm | PAR wat/m2 | Solar Radiation wat/m2 400 to 1100 nm | Infrared Radiation wat/m2 700 to 1100 nm |
|---|---|---|---|---|
| Incoming Solar radiation | 8,962 | 148,826 | 336,342 | 178,824 |
| Net 1 - wat/m2 | 6,679 | 113,601 | 278,662 | 158,383 |
| Net 4 - wat/m2 | 7,099 | 117,761 | 272,928 | 148,068 |
| Net 5 - wat/m2 | 5,799 | 103,515 | 247,841 | 138,547 |
| Net 2 - watt/m2 | 6,899 | 2,937,647 | 254,807 | 139,055 |
| Net 1 - reduction in solar and infrared radiation (%) | 23% | 24% | 17% | 11% |
| Net 4 - reduction in solar and infrared radiation (%) | 18% | 21% | 19% | 17% |
| Net 5 - reduction in solar and infrared radiation (%) | 34% | 30% | 26% | 23% |
| Net 2 - reduction in solar and infrared radiation (%) | 21% | 27% | 24% | 22% |

Trial 8—Netting Material Effect on Sunburn

A field trial was carried out on apples, Granny Smith variety, in Wenatchee, Wash., United States of America.

The netting was applied on 5 May 2013. The crop was picked on 9 Sep. 2013. 200 apples were counted.

Two nets were trialled:
Net 1—14% micro voiding pigments and 1% conventional titanium dioxide, with 25% coverage
Net 2—2% conventional titanium dioxide, with 35% coverage.

As shown in the table below, Net 1 and Net 2 provide the same level of sunburn protection, even though Net 1 had a lower coverage.

The netting was applied on 5 Aug. 2013. The trials were conducted on 6 to 9 Sep. 2013 (4 days).

The solar radiation was measured with a Watchdog LightScout Silicon Pyranometer with a range between 300 to 1100 nanometers. The UV radiation was measured with a Watchdog LightScout UV Light sensor, measuring between 250 to 400 nanometers. The Par Light was measured with a Watchdog External Temperature Sensor 400-700 nanometers.

The data was logged with a WatchDog 1000 Series Model 1400 Micro Station. The sensors were placed on a T-bar at 10' above ground level.

Two net were trialled:
Net 1—2% conventional titanium dioxide with 35% coverage
Net 2—12% micro voiding pigments and 1% Altiris 800® with 35% coverage.

Table 10 below shows that:
Net 2 had an increased reduction in UV light of 34, compared to 26% reduction for Net 1
Net 2 had an increased reduction in Solar Radiation of 25%, compared to 17% reduction for Net 1
Net 2 had an increased reduction in Infrared Radiation of 19%, compared to 10% reduction for Net 1.

TABLE 10

Net Trial - Fuji Apples, Washington State, USA
6-9 Sep. 2013 (4 Days)

|  | UV Light (wat/m2) 280 to 400 nm | PAR (wat/m2) 400-700 | Solar Radiation (wat/m2) 400 to 1100 nm | Infrared Radiation (wat/m2) 700 to 1100 nm |
|---|---|---|---|---|
| Incoming Solar radiation | 3,029 | 50,962 | 111,394 | 57,404 |
| Net 1 - wat/m2 | 2,241 | 37,950 | 92,040 | 51,850 |
| Net 2 - wat/m2 | 2,002 | 35,647 | 83,950 | 46,302 |
| Net 1 - reduction % | 26% | 26% | 17% | 10% |
| Net 2 - reduction % | 34% | 30% | 25% | 19% |

TABLE

COMPARATIVE HEAT REFLECTING MATERIAL TRIAL
Results of Sunburn reduction trial

|  | Fruit No. picked | Percentage not burnt | Sunburn 1 | Percentage Sunburn 1 | Sunburn 2 | Percentage Sunburn 2 | Sunburn 3 | Percentage Sunburn 3 | Sunburn 4 | Percentage Sunburn 4 | Sunburn 5 | Percentage Sunburn 5 | Sunburn 6 | Percentage Sunburn 6 |
|---|---|---|---|---|---|---|---|---|---|---|---|---|---|---|
| No net | 199 | 32% | 36 | 18% | 44 | 22% | 45 | 23% | 7 | 4% | 3 | 2% | 0 | 0% |
| Net 1 | 200 | 40% | 71 | 36% | 43 | 22% | 7 | 4% | 0 | 0% | 0 | 0% | 0 | 0% |
| No net | 200 | 24% | 45 | 23% | 48 | 24% | 31 | 16% | 14 | 7% | 6 | 3% | 8 | 4% |
| Net 2 | 200 | 39% | 69 | 35% | 41 | 21% | 13 | 7% | 0 | 0% | 0 | 0% | 0 | 0% |

Trial 9—Netting Material Effect on Solar Radiation

A field trial was carried out on apples, Fuji variety, in Vantage, Wash., United States of America.

The rows were running from East to West.

The rows were 14 feet spacing in a V-trellis system. The total row length was approximately 1100 feet. Three rows were covered. The net was suspended above the trees on a post and wire structure. The net height was 15 feet above the ground.

Trial 10—Netting Material Effect on Temperature

A field trial was carried out on apples, Fuji variety, in Vantage, Wash., United States of America.

The rows were running from East to West. The rows were 14 feet spacing in a V-trellis system. The total row length was approximately 1100 feet. Three rows were covered. The net was suspended above the trees on a post and wire structure. The net height was 15 feet above the ground.

The netting was applied on 5 Aug. 2013.

The solar radiation was measured with a WatchDog LightScout Silicon Pyranometer with a range between 300 to 1100 nanometers. The UV radiation was measured with a Watchdog LightScout UV Light sensor, measuring between 250 to 400 nanometers. The Par Light was measured with a Watchdog External Temperature Sensor, at 400-700 nm.

The data was logged with a WatchDog 1000 Series Model 1400 Micro Station. The sensors were placed on a T-bar at 10' above ground level.

Two nets were trialled:
Net 1—2% conventional titanium dioxide with 35% coverage
Net 2—12% micro voiding pigments and 1% Altiris 800® with 35% coverage.

As shown below in Table 11, Net 2 reduced the percentage of time per day that high temperatures of over 35° C. were reached to 2%, compared to 5% with Net 1.

TABLE

Net Trial - Fuji Apples
Heat Reflecting Netting Trial, 6-9 Sep. 2014 (4 days)
PERCENTAGE OF TIME AT TEMPERATURE

| Temp (° C.) | No Net | Net 1 | Net 2 |
|---|---|---|---|
| Average | 20.56 | 20.38 | 19.64 |
| Over 35 | 7% | 5% | 2% |
| 30-35 | 9% | 10% | 11% |
| 25-30 | 6% | 6% | 7% |
| 20-25 | 20% | 22% | 19% |
| 15-20 | 32% | 32% | 34% |
| 10-15 | 26% | 26% | 28% |
| 5-10 | 0% | 0% | 0% |
| 5 or under | 0% | 0% | 0% | age of fruit with no sunburn from 64% with no cover to 86% with the addition of 2% Altiris.

TABLE 12

COMPARATIVE HEAT REFLECTING MATERIAL TRIAL
Results of Sunburn reduction trial 13 Aug. and 6 Sep. 2013

| | Fruit No. picked | Total Not Burnt | Percentage not burnt |
|---|---|---|---|
| No net | 175 | 112 | 64% |
| Net 1 | 212 | 143 | 67% |
| Net 2 | 177 | 137 | 78% |
| Net 3 | 215 | 174 | 81% |
| Net 4 | 233 | 200 | 86% |

TABLE 13

COMPARATIVE HEAT REFLECTING MATERIAL TRIAL
Results of Sunburn reduction trial 13 August and 6 September 2013

| | Sunburn 1 | Percentage Sunburn 1 | Sunburn 2 | Percentage Sunburn 2 | Sunburn 3 | Percentage Sunburn 3 | Sunburn 4 | Percentage Sunburn 4 | Sunburn 5 | Percentage Sunburn 5 |
|---|---|---|---|---|---|---|---|---|---|---|
| No net | 50 | 29% | 11 | 6% | 2 | 1% | 0 | 0% | 0 | 0% |
| Net 1 | 63 | 30% | 3 | 1% | 1 | 0% | 1 | 0% | 1 | 0% |
| Net 2 | 39 | 22% | 1 | 1% | 0 | 0% | 0 | 0% | 0 | 0% |
| Net 3 | 34 | 16% | 3 | 1% | 0 | 0% | 2 | 1% | 2 | 1% |
| Net 4 | 28 | 12% | 3 | 1% | 1 | 0% | 1 | 0% | 0 | 0% |

Trial 11—Netting Material Effect on Sunburn

A field trial was carried out on apples, Fuji variety, in Vantage, Wash., United States of America.

The rows were running from East to West. The rows were 14 feet spacing in a V-trellis system. The total row length was approximately 1100 feet. Three rows were covered. The net was suspended above the trees on a post and wire structure. The net height was 15 feet above the ground.

The netting was applied on 5 Aug. 2013. The crop was scored for sunburn on 11 Sep. 2013.

Four nets were trialled:
Net 1—2% conventional titanium dioxide, with 35% coverage
Net 2—12% micro voiding pigments and 1% Altiris 800®, with 35% coverage
Net 3—8% micro voiding pigments and 0.5% Altiris 800®, with 40% coverage
Net 4—2% Altiris 800® with 25% coverage.

As shown in the Tables 12 and 13 below, the effect of using 2% Altiris was a significant reduction in the percent- Trial 12—Netting Material Effect on Sunburn A field trial was carried out on established on apples, Fuji variety, in Vantage, Wash., United States of America.

The rows were running from East to West. The rows were 14 feet spacing in a V-trellis system.

The total row length was approximately 1100 feet. Three rows were covered. The net was suspended above the trees on a post and wire structure. The net height was 15 feet above the ground.

The netting was applied on 5 Aug. 2013. The crop was scored for sunburn on 11 Sep. 2013.

Three nets were trialled:
Net 1—8% micro voiding pigments and 1% Altiris 800® with 25% coverage
Net 2—8% micro voiding pigments and 1% Altiris 800® with 30% coverage
Net 3—8% micro voiding pigments and 1% Altiris 800® with 40% coverage.

As shown in Tables 14 and 15, the percentage of sunburn decreased as the netting coverage was increased.

TABLE 14

COMPARATIVE HEAT REFLECTING MATERIAL TRIAL
Results of Sunburn reduction trial 13 Aug. and 6 Sep. 2013

|  | Fruit No. picked | Fruit not burnt | Percentage not burnt |
|---|---|---|---|
| No net | 175 | 112 | 64% |
| Net 1 | 155 | 108 | 70% |
| Net 2 | 198 | 143 | 72% |
| Net 2 | 177 | 137 | 78% |

TABLE 15

COMPARATIVE HEAT REFLECTING MATERIAL TRIAL
Results of Sunburn reduction trial 13 August and 6 September 2013

|  | Sunburn 1 | Percentage Sunburn 1 | Sunburn 2 | Percentage Sunburn 2 | Sunburn 3 | Percentage Sunburn 3 | Sunburn 4 | Percentage Sunburn 4 | Sunburn 5 | Percentage Sunburn 5 |
|---|---|---|---|---|---|---|---|---|---|---|
| No net | 50 | 29% | 11 | 6% | 2 | 1% | 0 | 0% | 0 | 0% |
| Net 1 | 33 | 21% | 9 | 6% | 2 | 1% | 2 | 1% | 1 | 0% |
| Net 2 | 44 | 22% | 8 | 4% | 1 | 1% | 0 | 0% | 1 | 1% |
| Net 2 | 39 | 22% | 1 | 1% | 0 | 0% | 0 | 0% | 0 | 0% |

Diffuse Transmittance

The diffuse transmittance of a series of the monofilament or tape or yarn that make up netting, crop cover or ground cover materials were measured by spectrophotometry to determine the effect of netting or crop cover or ground cover materials of the invention compared to conventional netting crop cover, or ground cover materials.

The monofilament or tape material was a prepared by (i) mixing the pigments into a masterbatch (ii) mixing the masterbatch with polymer (iii) extruding the mixture into a water bath for cooling, and (iv) then drawing though air or a water bath to orientate the mixture. A sample of the resulting is used for measuring the properties.

Conventional netting materials were prepared using conventional pigmentary titanium dioxide or micro void generating pigment in the amount specified below. Netting materials of the invention were prepared using Altiris 800®, a combination of Altiris 800® and micro void generating pigment, or a combination of micro void generating pigment and zinc oxide or a combination of micro void generating pigment and conventional titanium dioxide in the amount specified below.

The spectrophotometer was based on a GSA/McPherson 2051 1 metre focal length monochromator fitted with a prism predisperser and also stray light filters. The light source is a current regulated tungsten halogen lamp. The bandwidth is adjustable up to 3 nm. The monochromatic beam from the monochromator is focused onto the sample or into the integrating sphere using off-axis parabolic mirrors. The integrating spheres are coated with pressed halon powder (PTFE powder). Halon powder is also used as the white reflectance reference material. The detector is usually a silicon photodiode connected to an electrometer amplifier and digital volt meter. The whole system is controlled using software written in LabVIEW. The detectors used can be photomultiplier tubes, silicon diodes or lead sulphide detectors.

The integrating sphere has an internal diameter of 120 mm and is coated with pressed halon powder. The sample is mounted on one port and the incident light port is at an angle of 90° around the sphere. The sphere rotates by 90° in the horizontal plane to allow the focused incident light to enter the sphere through the incident light port or the incident light to be transmitted through the sample and enter the sphere. The detector is mounted at the top of the sphere.

Diffuse transmittance over the 280-2,500 nm wavelength range was measured for monofilament or tape or yarn. The graphs are for 100% coverage.

Graphs of the diffuse transmittance are shown in FIGS. 15-47.

FIGS. 15-22 show diffuse transmittance graphs for prior art netting material.

FIGS. 23-35 show diffuse transmittance graphs for netting material of the invention.

Figure 36:
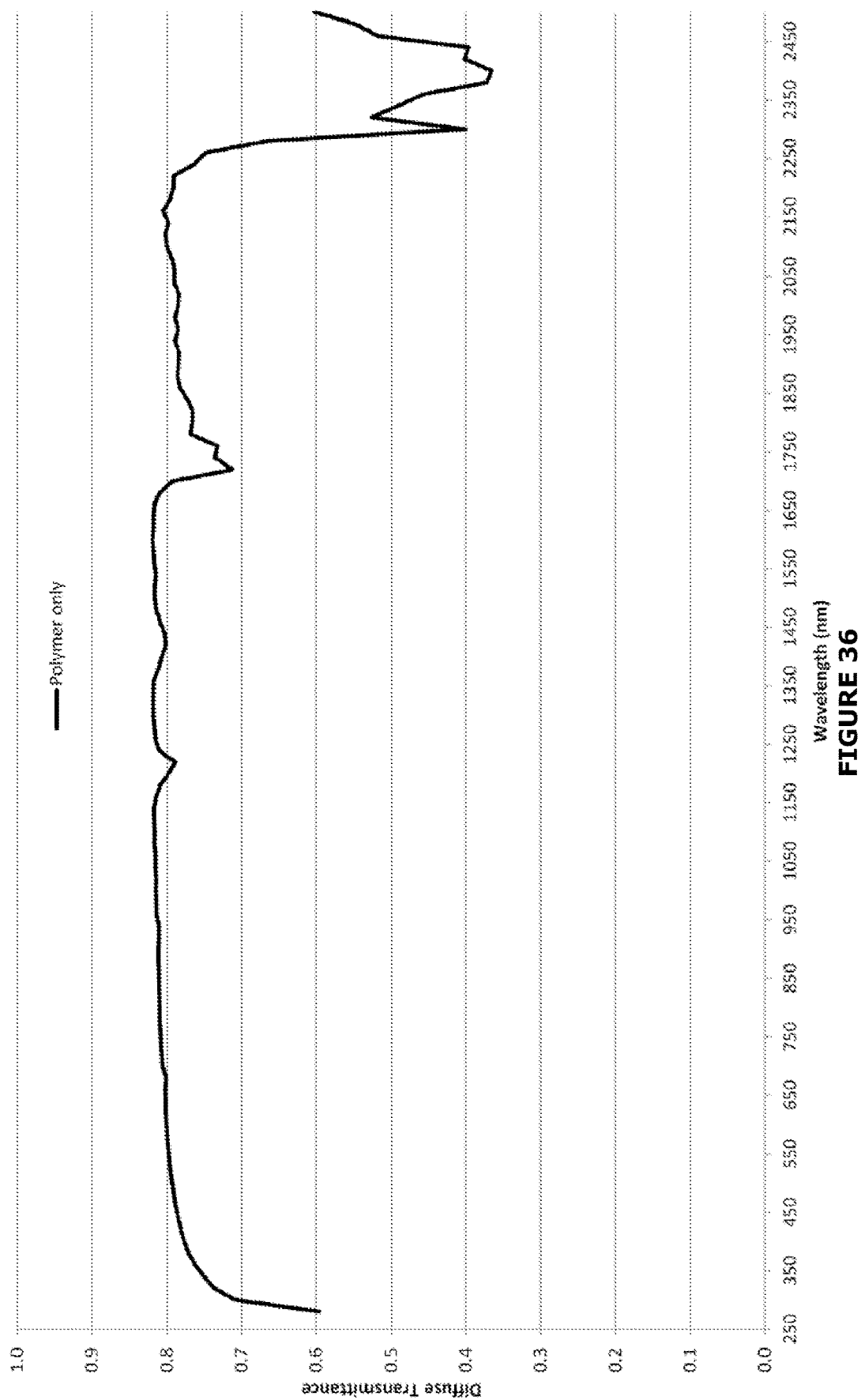
FIG. 36 shows a graph of diffuse transmittance versus radiation from 250 to 2500 nm film extruded onto woven fabric, Polymer only.
Figure 37:
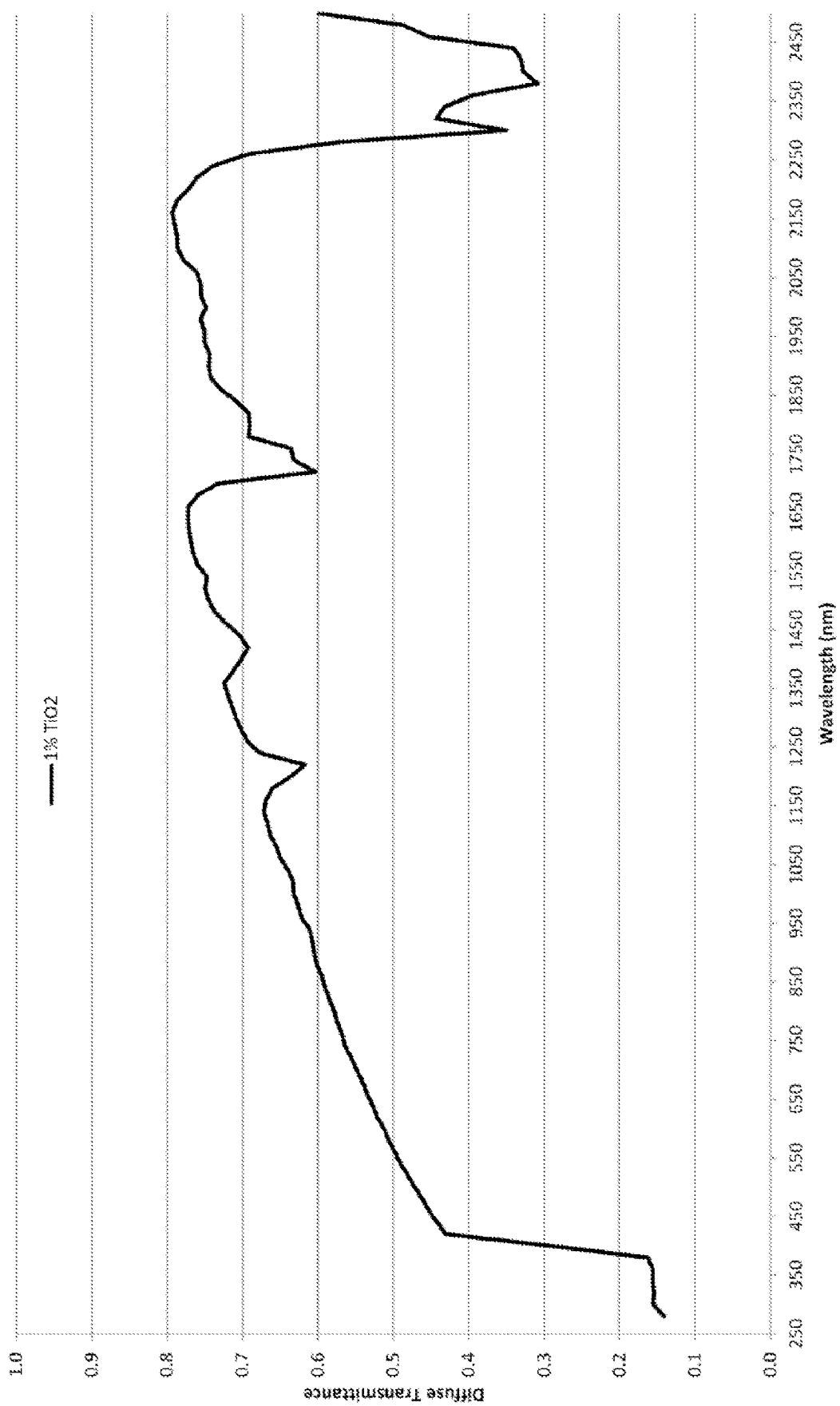
FIG. 37 shows a graph of diffuse transmittance versus radiation from 250 to 2500 nm monofilament, 1% TiO2.
Figure 38:
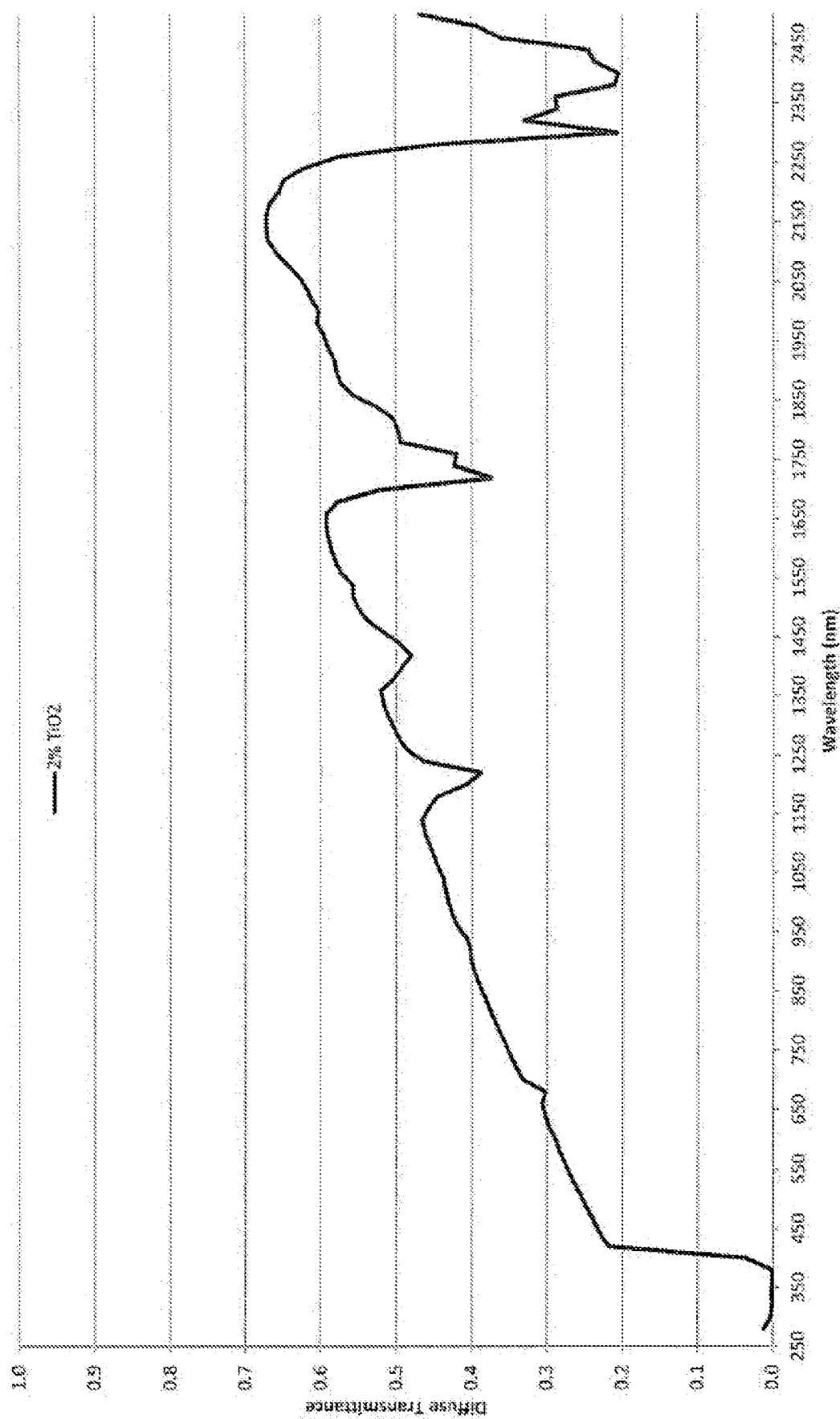
FIG. 38 shows a graph of diffuse transmittance versus radiation from 250 to 2500 nm film, 2% TiO2.

FIGS. 36-38 show diffuse transmittance graphs for prior art crop cover material.

Figure 39:
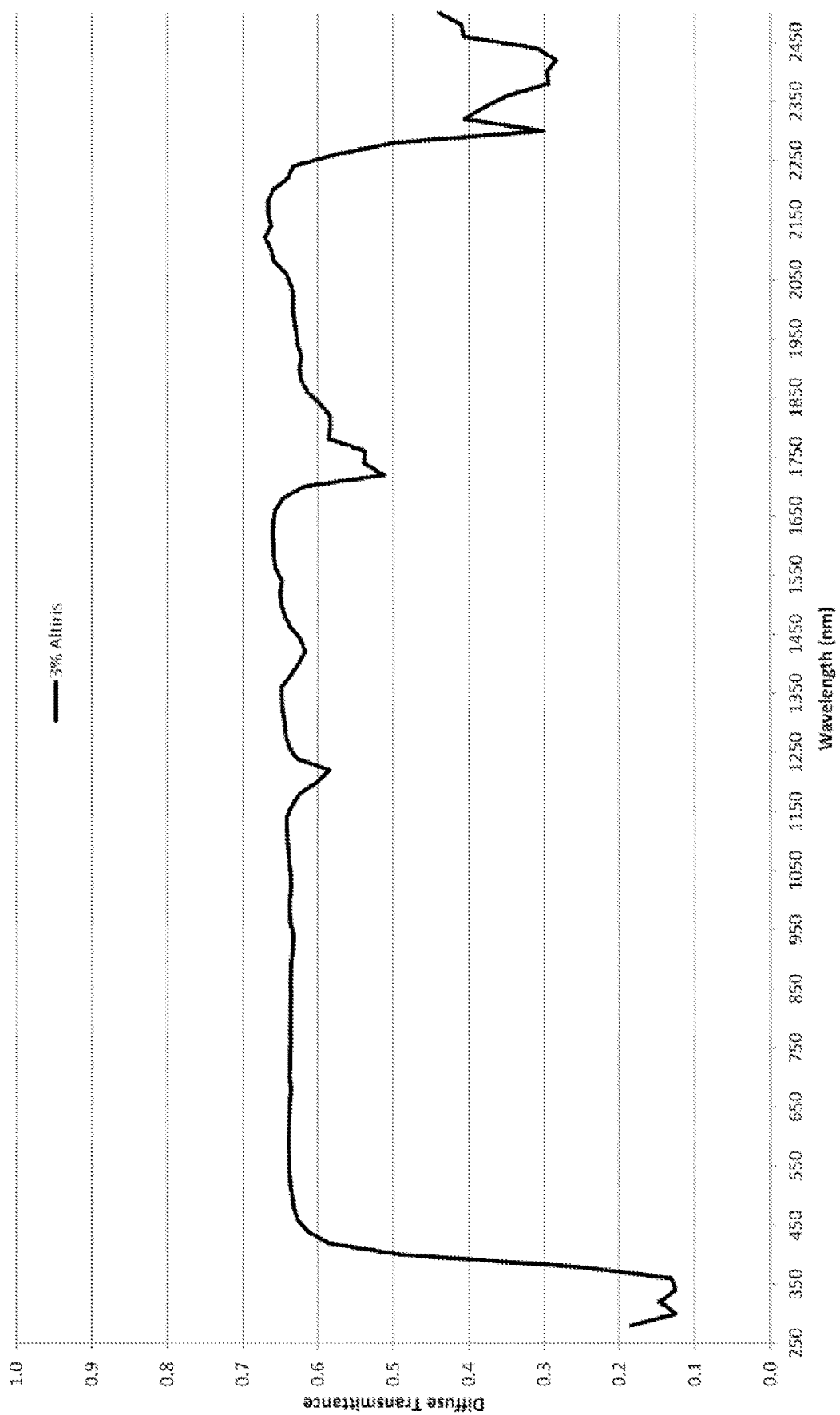
FIG. 39 shows a graph of diffuse transmittance versus radiation from 250 to 2500 nm film extruded onto woven fabric, 3% Altiris.
Figure 40:
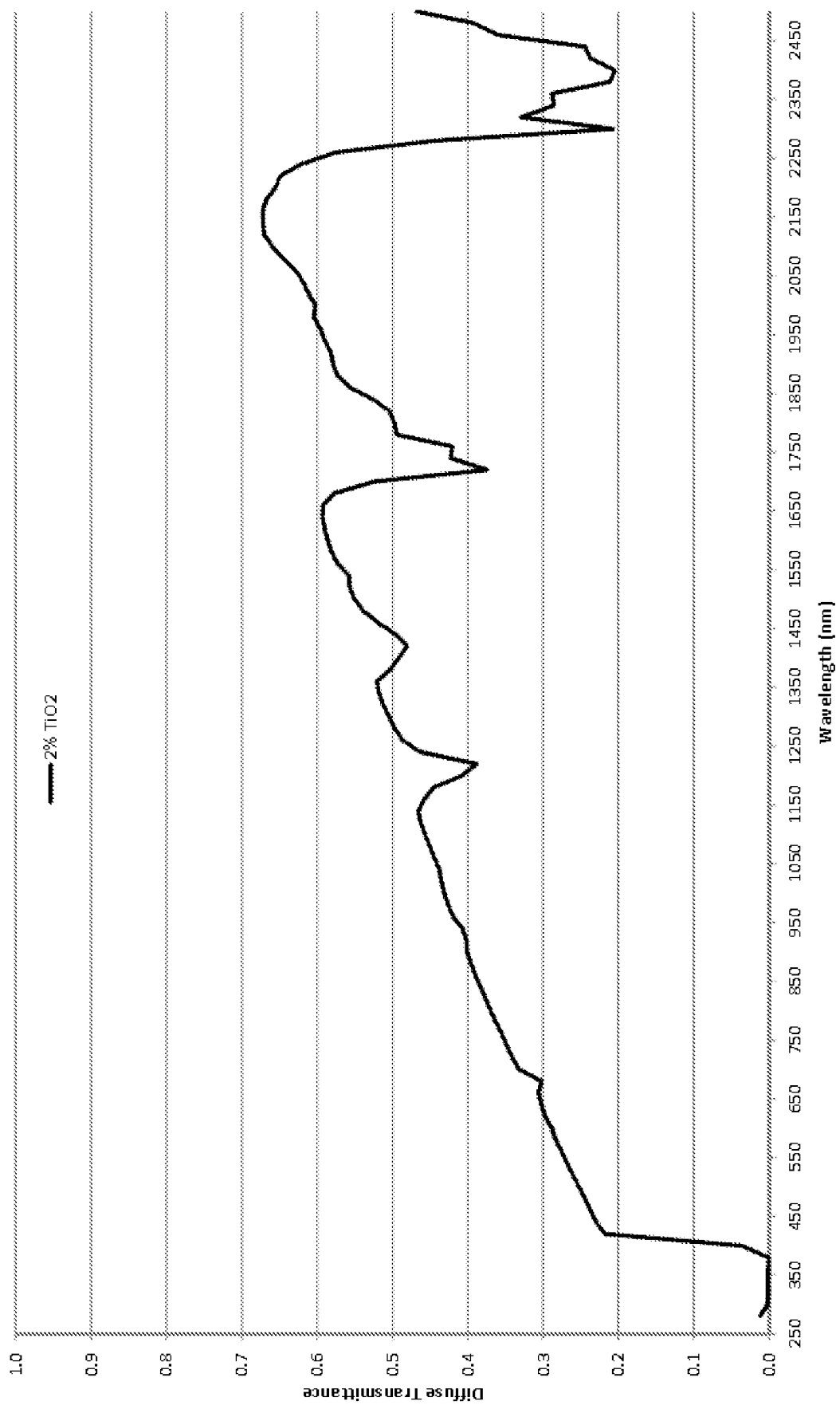
FIG. 40 shows a graph of diffuse transmittance versus radiation from 250 to 2500 nm tape, 2% TiO2.
Figure 41:
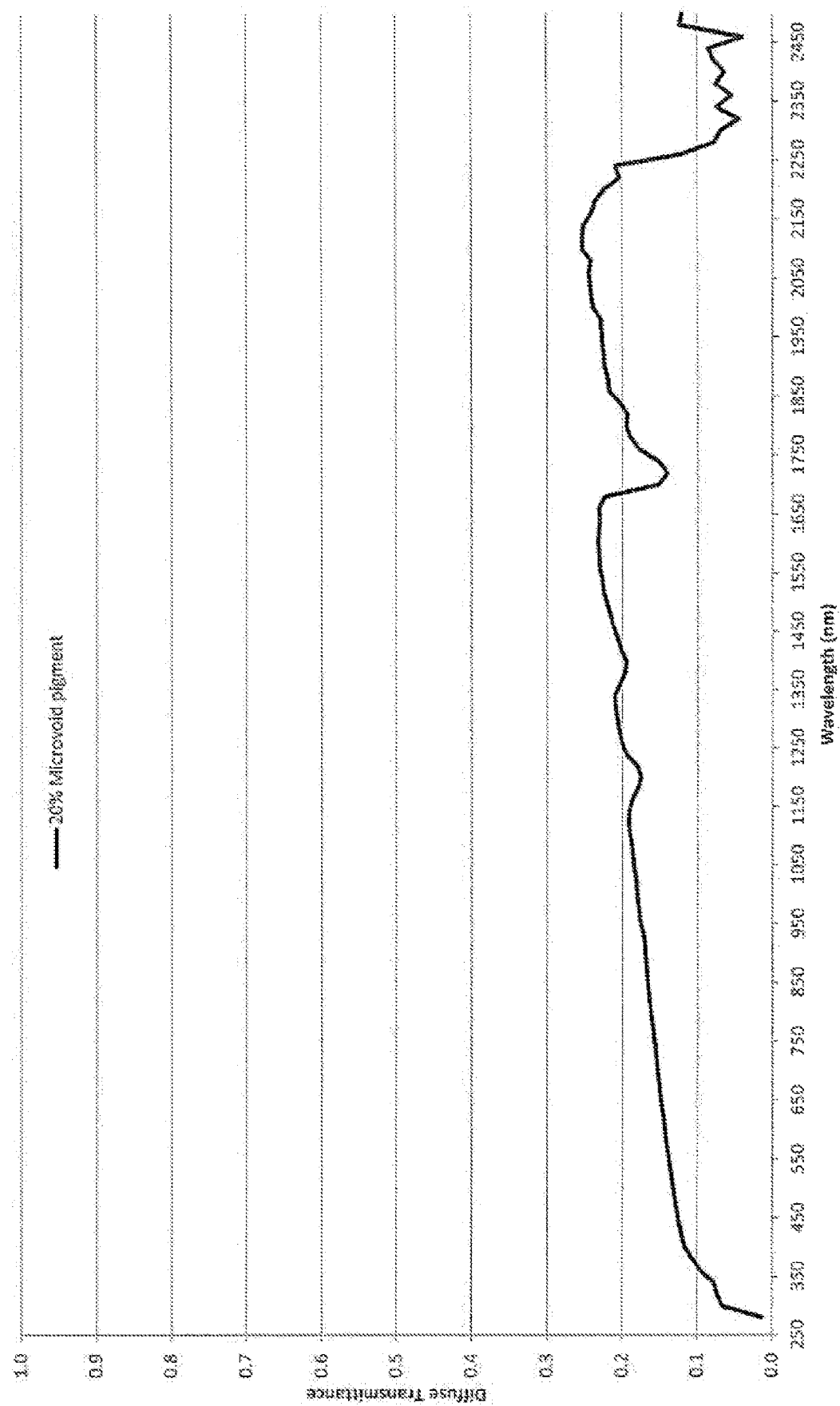
FIG. 41 shows a graph of diffuse transmittance versus radiation from 250 to 2500 nm tape, 20% Microvoid pigment.
Figure 42:
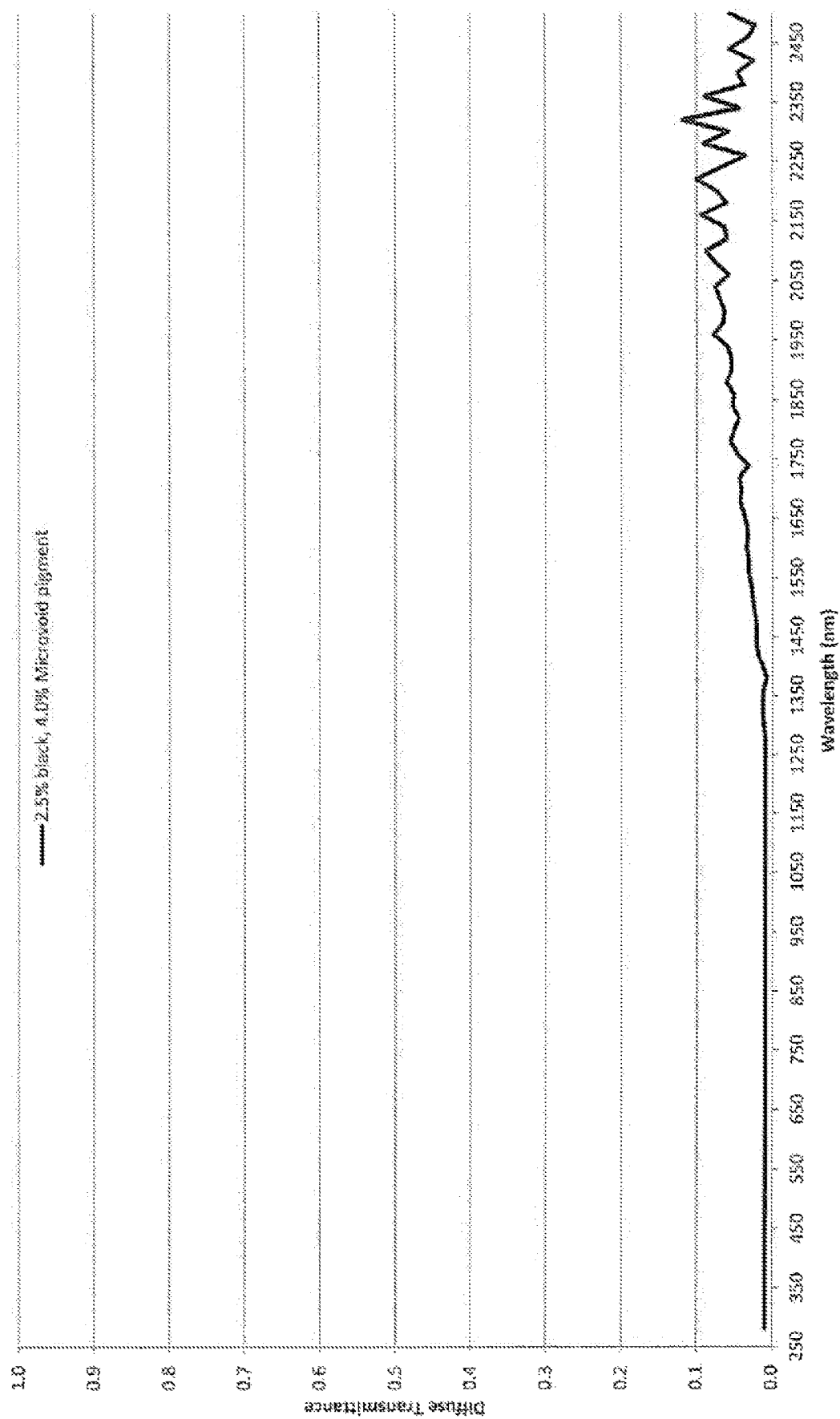
FIG. 42 shows a graph of diffuse transmittance versus radiation from 250 to 2500 nm tape, 2.5% black, 4.0% Microvoid pigment.
Figure 43:
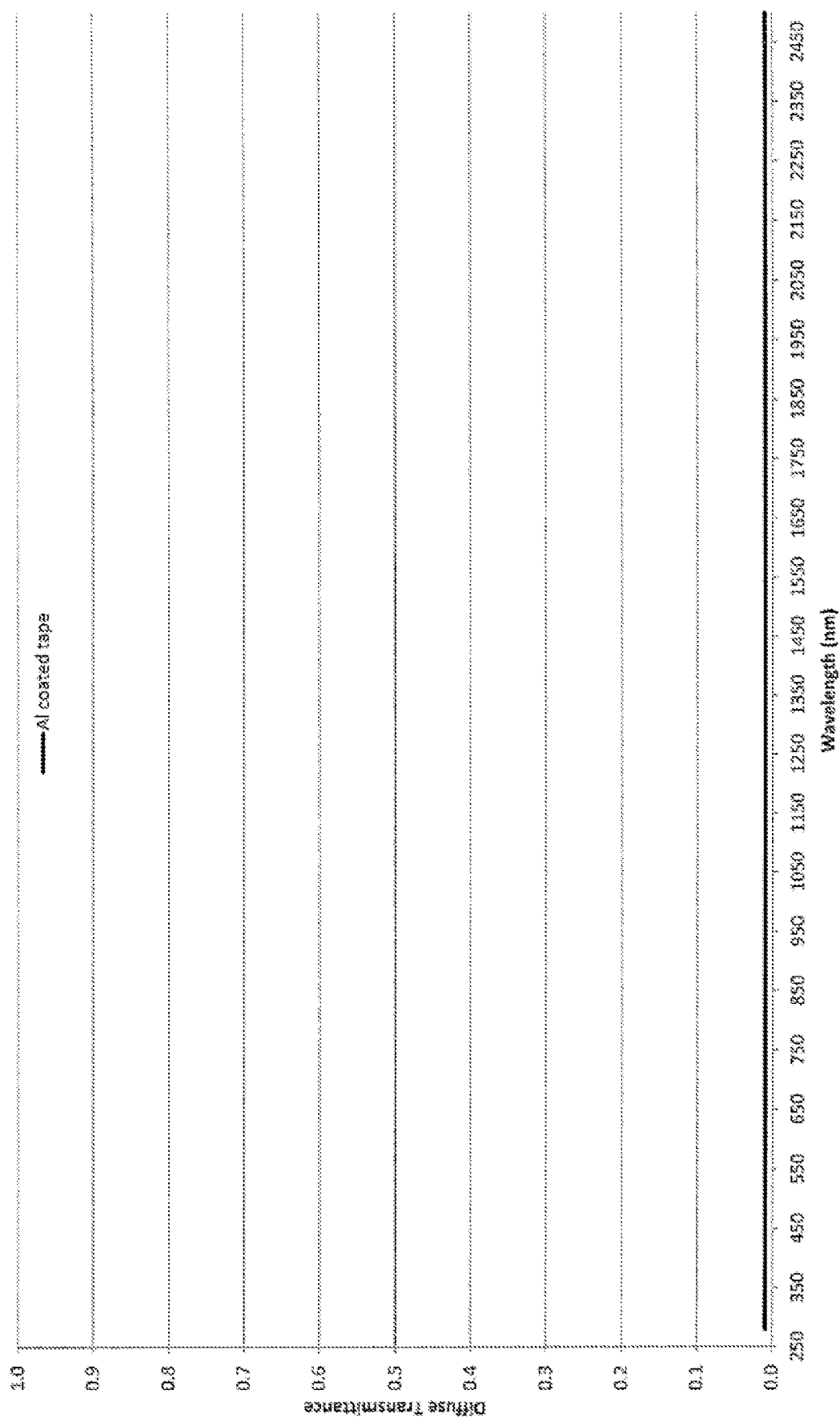
FIG. 43 shows a graph of diffuse transmittance versus radiation from 250 to 2500 nm tape, Al coated tape.
Figure 44:
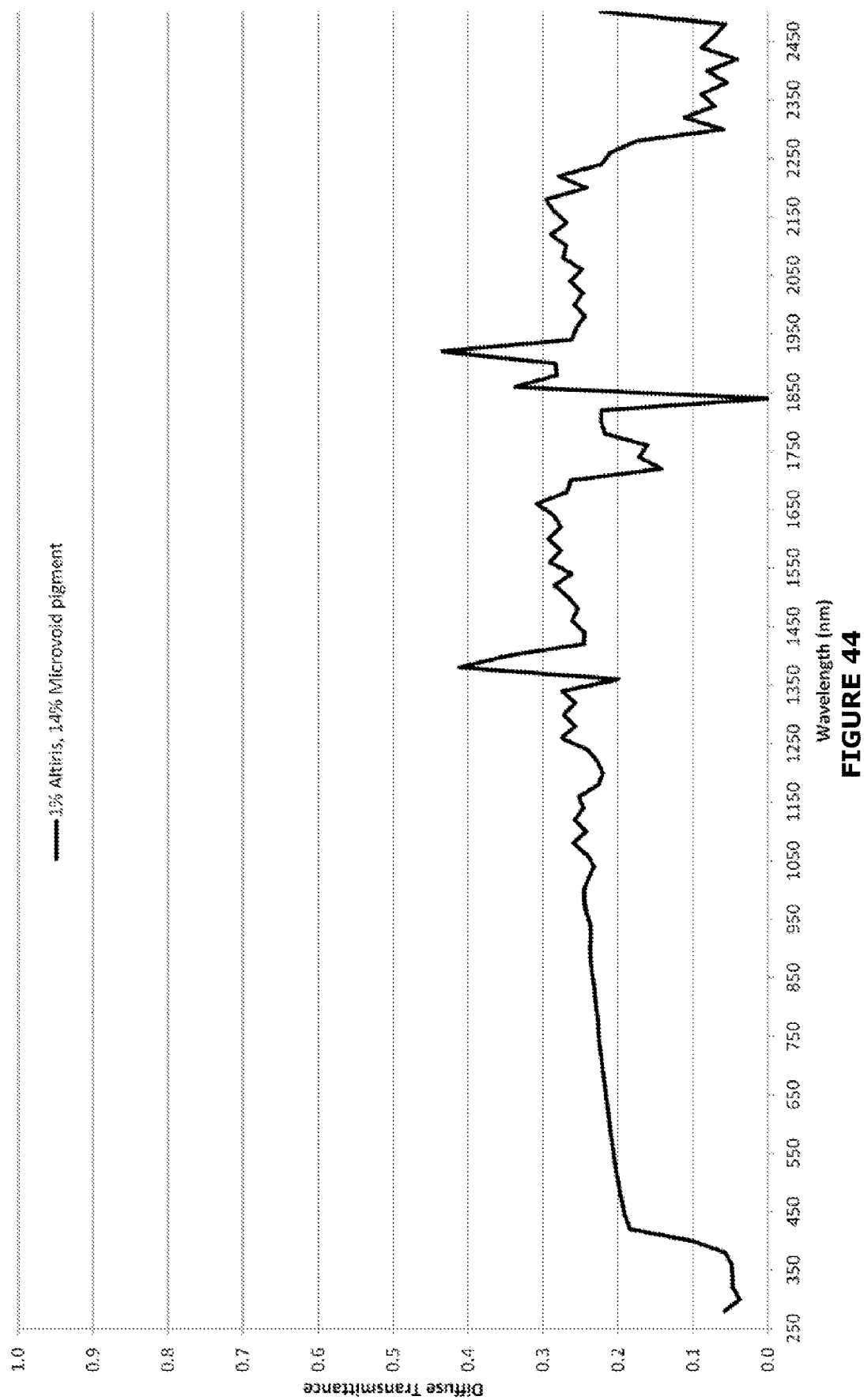
FIG. 44 shows a graph of diffuse transmittance versus radiation from 250 to 2500 nm monofilament, 1% Altiris, 14% Microvoid pigment.
Figure 45:
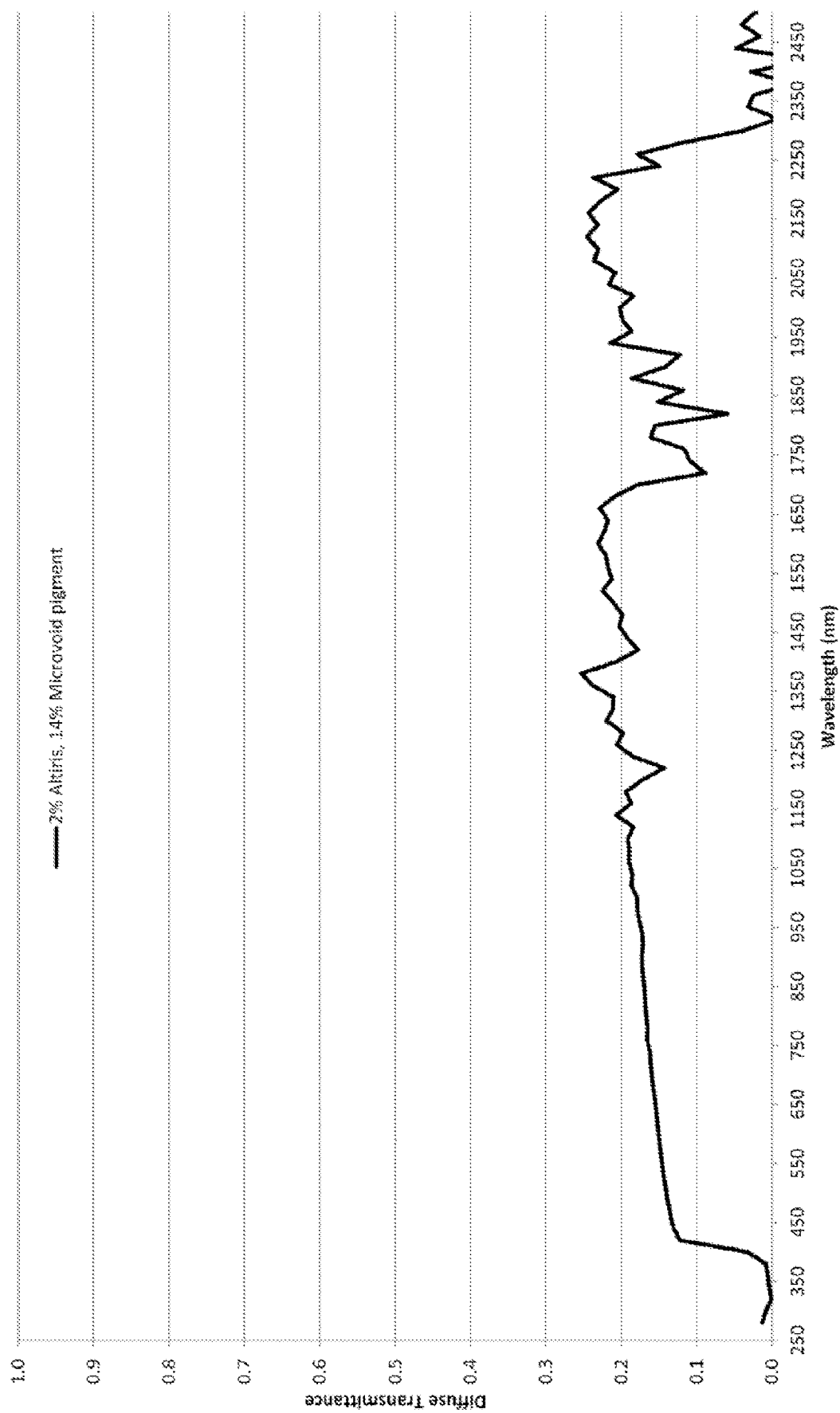
FIG. 45 shows a graph of diffuse transmittance versus radiation from 250 to 2500 nm monofilament, 2% Altiris, 14% Microvoid pigment.
Figure 46:
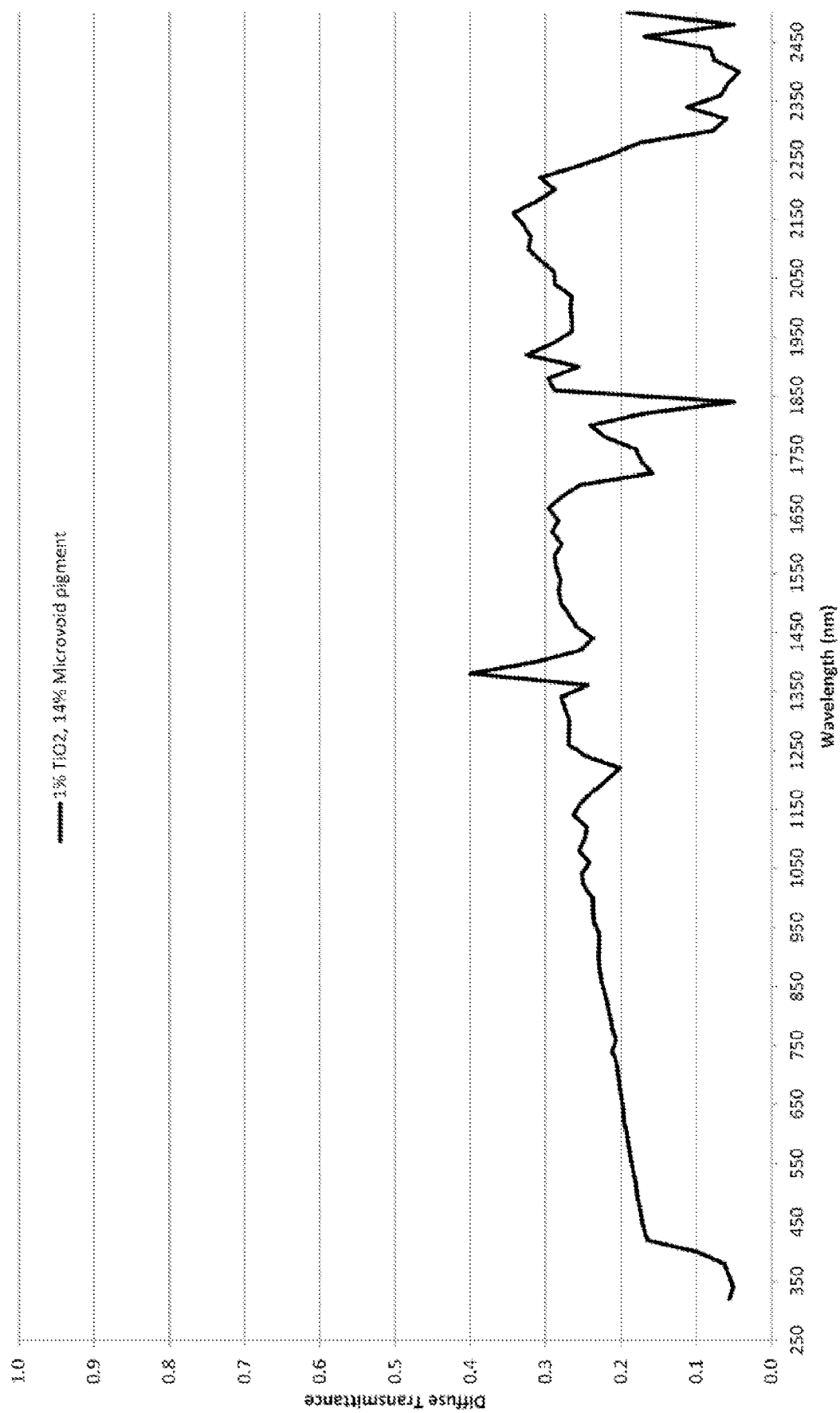
FIG. 46 shows a graph of diffuse transmittance versus radiation from 250 to 2500 nm monofilament, 1% TiO2, 14% Microvoid pigment.
Figure 47:
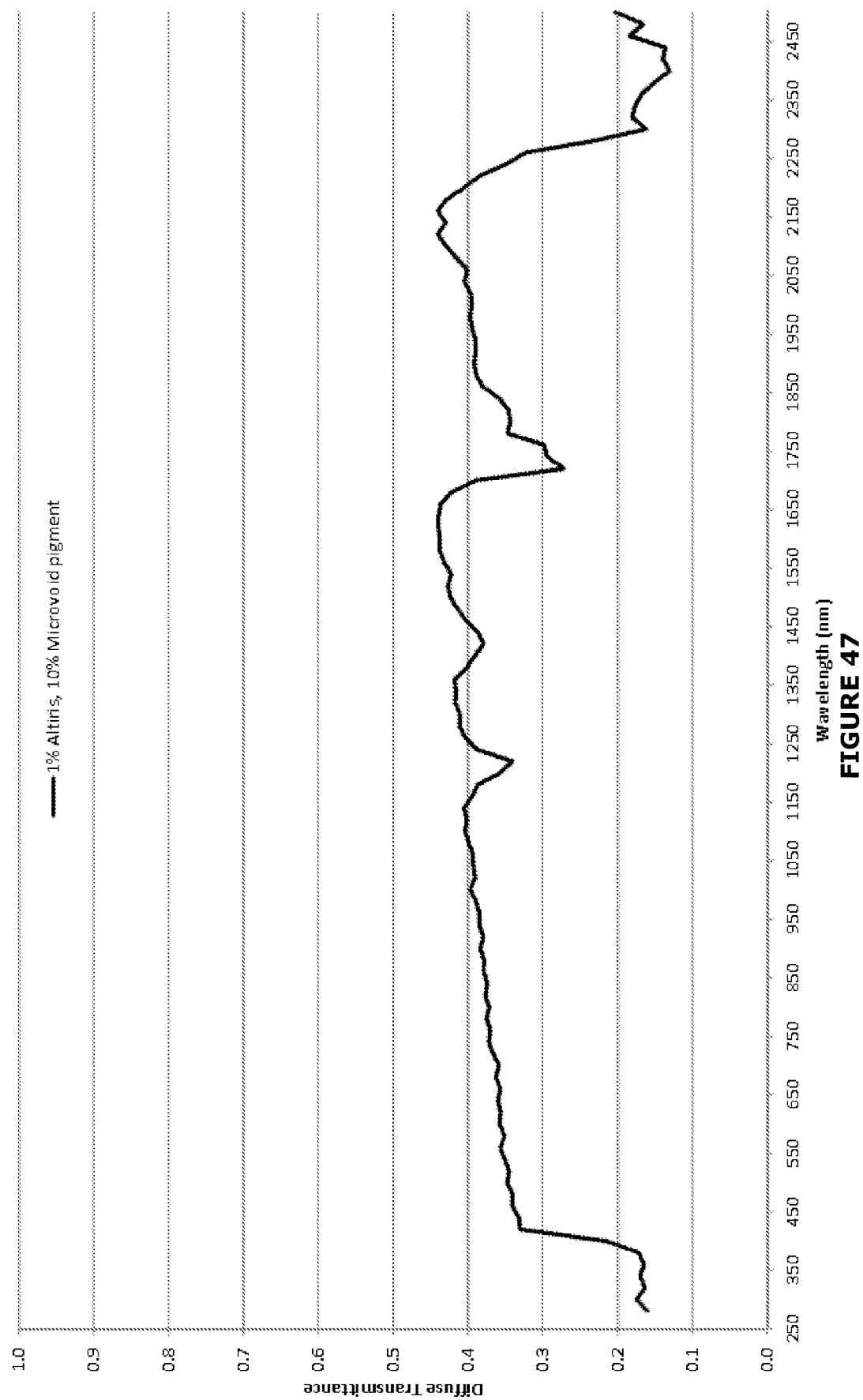
FIG. 47 shows a graph of diffuse transmittance versus radiation from 250 to 2500 nm tape, 2% TiO2, 15% Microvoid pigment.

FIG. 39 shows diffuse transmittance graphs for crop cover material of the invention.

FIGS. 40-43 show diffuse transmittance graphs for prior art ground cover material.

FIGS. 44-47 show diffuse transmittance graphs for prior art ground cover material of the invention.

Data from which the graphs in FIGS. 15-47 were created are shown below in FIGS. 48-80, each of which contains a table showing the transmittance for each wavelength, a table showing transmittance average for each wavelength range, and a table showing transmittance difference each wavelength range.

The graphs show that netting, crop cover, and ground cover materials of the invention have advantageous UV, visible and heat transmission profiles.

Conventional titanium dioxide is currently used in the netting industry has limitations in that it blocks some of the light that plants use in the 400-700 nm range, and transmits heat rather than absorbing or reflecting it.

The graphs show that non-conventional titanium dioxide, as described herein, such as Altiris 800® transmits less heat and more visible light, which is used by plants for photosynthesis, than conventional titanium dioxide. The graphs also show that Altiris 800® has relatively low UV transmission.

The graphs show that the combination of Altiris 800® and a microvoiding pigment and also the combination of a microvoiding pigment and a UV absorbing pigment, such as zinc oxide or conventional titanium dioxide have similar transmission properties.

The graphs demonstrate that use of a microvoiding pigment in combination with Altiris 800® allows the use of lower amounts Altiris 800®, while providing transmission profiles comparable to those obtained when Altiris 800® is used alone in comparatively higher amounts. This is useful as microvoiding pigments can be comparatively less expensive.

Several of the graphs are compared below.

2% Standard Titanium Dioxide Vs 10% Micro Void Pigment

In the UV region standard TiO2 transmits less UV light than the micro void pigments. Adding organic UV absorbers will reduce this transmittance in the UV region.

In the infrared region the micro void pigment transmits less heat than standard titanium dioxide.

The micro void pigments transmittance is more similar to Altiris than standard TiO2 from 400 nm to 2500 nm, but not exactly the same. The micro void pigment is allowing more light for plants though from 400 to 700 nm and reflecting more heat than TiO2.

2% Standard Titanium Dioxide Vs 2.5% Micro Void Pigment

The micro void pigments is a lower % than in the comparison above, therefore the transmittance is proportionally higher.

2% Standard Titanium Dioxide Vs 1% Altiris+5% Micro Void Pigments

In the UV region the combination of 1% Altiris and 5% micro void pigments has similar transmittance to 3% Altiris. Adding organic UV absorbers will reduce this transmittance in the UV region.

In the infrared and visible region the Altiris/micro void pigments combination has flattened the transmittance over the 400 nm to 1660 nm range, compared to TiO2, so that it is similar to 3% Altiris.

The Altiris/micro void pigments combination allows more light for plants through from 400 to 700 nm and reflects more heat than TiO2.

This combination of micro void pigments and Altiris reduces the costs of the formula.

10% Micro Void Pigments Vs 3% Altiris

Over the 1150 nm to 2500 nm wavelength range 10% micro void pigments has similar transmittance to 3% Altiris. But Altriris is allowing more plant light and reducing more heat.

In the UV range the Altiris has significantly less transmittance than the micro void pigments so it would need less organic UV absorbers to reduce this compared to the micro void pigments.

2.5% Micro Void Pigments Vs 3% Altiris

Over the 280-2280 nm wavelength range 2.5% micro void pigments has greater transmittance than the 3% Altiris.

At around 420-500 nm the 2.4% micro void pigments and 3% Altiris have similar transmittance.

In the UV range the Altiris has significantly less transmittance than the micro void pigments. So it would need less organic UV absorbers to reduce this compared to the micro void pigments.

2.5% Micro Void Pigments Vs 10% Micro Void Pigments

In the UV region the 10% micro void pigments is blocking more UV light than the 2.5% micro void pigments. The transmittance has increased for 2.5% micro void pigments compared to 10% micro void pigments.

The micro void pigment generally has slightly increasing transmittance with increasing wavelength from 300 nm to 1660 nm.

2.5% Micro void pigments allows more light through for plants, but also allows more heat and UV through than 10% micro void pigments. 10% Micro void pigments has higher heat reflectance than 2.5% micro void pigments.

Diffuse Transmittance Data
Prior Art Netting Material

FIG. 48
FIG. 48: Diffuse transmittance table, diffuse transmittance versus radiation from 250 to 2500 nm for monofilament 1%, TiO2

Transmittance for each wavelength

| wavelength (nm) | Mono 1% TiO2 |
|---|---|
| 280 | 0.1403 |
| 300 | 0.1553 |
| 320 | 0.1540 |
| 340 | 0.1557 |
| 360 | 0.1554 |
| 380 | 0.1629 |
| 400 | 0.2955 |
| 420 | 0.4304 |
| 440 | 0.4419 |
| 460 | 0.4527 |
| 480 | 0.4616 |
| 500 | 0.4716 |
| 520 | 0.4803 |
| 540 | 0.4899 |
| 560 | 0.4975 |
| 580 | 0.5058 |
| 600 | 0.5126 |
| 620 | 0.5220 |
| 640 | 0.5281 |
| 660 | 0.5357 |
| 680 | 0.5412 |
| 700 | 0.5490 |
| 720 | 0.5557 |
| 740 | 0.5642 |
| 760 | 0.5681 |
| 780 | 0.5745 |
| 800 | 0.5786 |
| 820 | 0.5848 |
| 840 | 0.5910 |
| 860 | 0.5952 |
| 880 | 0.6020 |
| 900 | 0.6051 |
| 920 | 0.6078 |
| 940 | 0.6110 |
| 960 | 0.6220 |
| 980 | 0.6262 |
| 1000 | 0.6322 |
| 1020 | 0.6325 |
| 1040 | 0.6398 |
| 1060 | 0.6494 |
| 1080 | 0.6549 |
| 1100 | 0.6632 |
| 1120 | 0.6669 |
| 1140 | 0.6719 |
| 1160 | 0.6689 |
| 1180 | 0.6601 |
| 1200 | 0.6365 |
| 1220 | 0.6171 |
| 1240 | 0.6765 |
| 1260 | 0.6934 |
| 1280 | 0.7018 |
| 1300 | 0.7086 |
| 1320 | 0.7141 |
| 1340 | 0.7195 |
| 1360 | 0.7239 |
| 1380 | 0.7124 |
| 1400 | 0.7019 |
| 1420 | 0.6927 |
| 1440 | 0.7034 |
| 1460 | 0.7208 |
| 1480 | 0.7362 |
| 1500 | 0.7446 |
| 1520 | 0.7498 |
| 1540 | 0.7471 |
| 1560 | 0.7591 |
| 1580 | 0.7651 |
| 1600 | 0.7684 |
| 1620 | 0.7710 |
| 1640 | 0.7720 |
| 1660 | 0.7717 |
| 1680 | 0.7588 |
| 1700 | 0.7328 |

FIG. 48
FIG. 48: Diffuse transmittance table, diffuse transmittance versus radiation from 250 to 2500 nm for monofilament 1%, TiO2

| | |
|---|---|
| 1720 | 0.6035 |
| 1740 | 0.6319 |
| 1760 | 0.6363 |
| 1780 | 0.6921 |
| 1800 | 0.6904 |
| 1820 | 0.6923 |
| 1840 | 0.7082 |
| 1860 | 0.7279 |
| 1880 | 0.7418 |
| 1900 | 0.7449 |
| 1920 | 0.7433 |
| 1940 | 0.7503 |
| 1960 | 0.7503 |
| 1980 | 0.7557 |
| 2000 | 0.7485 |
| 2020 | 0.7550 |
| 2040 | 0.7553 |
| 2060 | 0.7603 |
| 2080 | 0.7775 |
| 2100 | 0.7859 |
| 2120 | 0.7867 |
| 2140 | 0.7897 |
| 2160 | 0.7928 |
| 2180 | 0.7868 |
| 2200 | 0.7716 |
| 2220 | 0.7602 |
| 2240 | 0.7382 |
| 2260 | 0.6907 |
| 2280 | 0.5714 |
| 2300 | 0.3504 |
| 2320 | 0.4424 |
| 2340 | 0.4320 |
| 2360 | 0.3938 |
| 2380 | 0.3078 |
| 2400 | 0.3284 |
| 2420 | 0.3304 |
| 2440 | 0.3403 |
| 2460 | 0.4542 |
| 2480 | 0.4867 |
| 2500 | 0.5986 |

Transmittance average for each wavelength range

| | 1% TiO2 |
|---|---|
| Average: 300-380 | 16% |
| Average 420-700 | 49% |
| Average 700-1000 | 59% |
| Average 1500-1600 | 76% |

Transmittance difference for each wavelength range

| | |
|---|---|
| (700-1000) vs (420-700) | 10% |
| (1500-1600) vs (700-1000) | 16% |

FIG. 49
FIG. 49: Diffuse transmittance table, diffuse transmittance versus radiation from 250 to 2500 nm for monofilament, 1.5% TiO2

Transmittance for each wavelength

| wavelength (nm) | Mono 1.5% TiO2 |
|---|---|
| 280 | 0.1476 |
| 300 | 0.1591 |
| 320 | 0.1540 |
| 340 | 0.1568 |
| 360 | 0.1551 |
| 380 | 0.1587 |
| 400 | 0.2297 |
| 420 | 0.3729 |
| 440 | 0.3838 |
| 460 | 0.3923 |
| 480 | 0.4004 |
| 500 | 0.4090 |
| 520 | 0.4170 |
| 540 | 0.4253 |
| 560 | 0.4330 |
| 580 | 0.4405 |
| 600 | 0.4487 |
| 620 | 0.4569 |
| 640 | 0.4644 |
| 660 | 0.4713 |
| 680 | 0.4785 |
| 700 | 0.4852 |
| 720 | 0.4921 |
| 740 | 0.5004 |
| 760 | 0.5054 |
| 780 | 0.5108 |
| 800 | 0.5168 |
| 820 | 0.5223 |
| 840 | 0.5276 |
| 860 | 0.5331 |
| 880 | 0.5390 |
| 900 | 0.5431 |
| 920 | 0.5458 |
| 940 | 0.5496 |
| 960 | 0.5597 |
| 980 | 0.5657 |
| 1000 | 0.5703 |
| 1020 | 0.5725 |
| 1040 | 0.5799 |
| 1060 | 0.5886 |
| 1080 | 0.5960 |
| 1100 | 0.6016 |
| 1120 | 0.6071 |
| 1140 | 0.6115 |
| 1160 | 0.6074 |
| 1180 | 0.5999 |
| 1200 | 0.5744 |
| 1220 | 0.5555 |
| 1240 | 0.6170 |
| 1260 | 0.6346 |
| 1280 | 0.6434 |
| 1300 | 0.6502 |
| 1320 | 0.6568 |
| 1340 | 0.6630 |
| 1360 | 0.6663 |
| 1380 | 0.6594 |
| 1400 | 0.6477 |
| 1420 | 0.6378 |
| 1440 | 0.6487 |
| 1460 | 0.6678 |
| 1480 | 0.6844 |
| 1500 | 0.6942 |
| 1520 | 0.6993 |
| 1540 | 0.6977 |
| 1560 | 0.7122 |
| 1580 | 0.7181 |
| 1600 | 0.7228 |
| 1620 | 0.7267 |
| 1640 | 0.7296 |
| 1660 | 0.7306 |
| 1680 | 0.7171 |
| 1700 | 0.6877 |
| 1720 | 0.5565 |
| 1740 | 0.5888 |
| 1760 | 0.5911 |
| 1780 | 0.6520 |
| 1800 | 0.6508 |
| 1820 | 0.6535 |
| 1840 | 0.6686 |
| 1860 | 0.6932 |
| 1880 | 0.7107 |
| 1900 | 0.7127 |
| 1920 | 0.7149 |

FIG. 49: Diffuse transmittance table, diffuse transmittance versus radiation from 250 to 2500 nm for monofilament, 1.5% TiO2

| | |
|---|---|
| 1940 | 0.7143 |
| 1960 | 0.7209 |
| 1980 | 0.7292 |
| 2000 | 0.7267 |
| 2020 | 0.7299 |
| 2040 | 0.7360 |
| 2060 | 0.7372 |
| 2080 | 0.7502 |
| 2100 | 0.7670 |
| 2120 | 0.7696 |
| 2140 | 0.7694 |
| 2160 | 0.7746 |
| 2180 | 0.7667 |
| 2200 | 0.7559 |
| 2220 | 0.7433 |
| 2240 | 0.7342 |
| 2260 | 0.6902 |
| 2280 | 0.5689 |
| 2300 | 0.3402 |
| 2320 | 0.4362 |
| 2340 | 0.4181 |
| 2360 | 0.3858 |
| 2380 | 0.2963 |
| 2400 | 0.3153 |
| 2420 | 0.3296 |
| 2440 | 0.3228 |
| 2460 | 0.4090 |
| 2480 | 0.4634 |
| 2500 | 0.5808 |

Transmittance average for each wavelength range

| | 1.5% TiO2 |
|---|---|
| Average: 300-380 | 16% |
| Average 420-700 | 43% |
| Average 700-1000 | 53% |
| Average 1500-1600 | 71% |

Transmittance difference for each wavelength range

| | |
|---|---|
| (700-1000) vs (420-700) | 10% |
| (1500-1600) vs (700-1000) | 18% |

FIG. 50: Diffuse transmittance table, diffuse transmittance versus radiation from 250 to 2500 nm for monofilament, 2% TiO2

Transmittance for each wavelength

| wavelength (nm) | Mono 2% TiO2 |
|---|---|
| 280 | 0.0173 |
| 300 | 0.0432 |
| 320 | 0.0577 |
| 340 | 0.0656 |
| 360 | 0.0718 |
| 380 | 0.0761 |
| 400 | 0.1281 |
| 420 | 0.2552 |
| 440 | 0.2662 |
| 460 | 0.2751 |
| 480 | 0.2833 |
| 500 | 0.2916 |
| 520 | 0.3001 |
| 540 | 0.3078 |
| 560 | 0.3167 |
| 580 | 0.3248 |
| 600 | 0.3330 |
| 620 | 0.3384 |
| 640 | 0.3492 |
| 660 | 0.3567 |
| 680 | 0.3643 |
| 700 | 0.3716 |
| 720 | 0.3790 |
| 740 | 0.3826 |
| 760 | 0.3978 |
| 780 | 0.4019 |
| 800 | 0.4080 |
| 820 | 0.4127 |
| 840 | 0.4178 |
| 860 | 0.4227 |
| 880 | 0.4281 |
| 900 | 0.4335 |
| 920 | 0.4366 |
| 940 | 0.4432 |
| 960 | 0.4523 |
| 980 | 0.4598 |
| 1000 | 0.4662 |
| 1020 | 0.4679 |
| 1040 | 0.4714 |
| 1060 | 0.4808 |
| 1080 | 0.4858 |
| 1100 | 0.4928 |
| 1120 | 0.4924 |
| 1140 | 0.5036 |
| 1160 | 0.4992 |
| 1180 | 0.4902 |
| 1200 | 0.4689 |
| 1220 | 0.4481 |
| 1240 | 0.5100 |
| 1260 | 0.5271 |
| 1280 | 0.5358 |
| 1300 | 0.5418 |
| 1320 | 0.5496 |
| 1340 | 0.5540 |
| 1360 | 0.5320 |
| 1380 | 0.6157 |
| 1400 | 0.5703 |
| 1420 | 0.5349 |
| 1440 | 0.5340 |
| 1460 | 0.5614 |
| 1480 | 0.5739 |
| 1500 | 0.5848 |
| 1520 | 0.5895 |
| 1540 | 0.5884 |
| 1560 | 0.6028 |
| 1580 | 0.6101 |
| 1600 | 0.6116 |
| 1620 | 0.6206 |
| 1640 | 0.6225 |
| 1660 | 0.6229 |
| 1680 | 0.6116 |
| 1700 | 0.5842 |
| 1720 | 0.4463 |
| 1740 | 0.4743 |
| 1760 | 0.4847 |
| 1780 | 0.5502 |
| 1800 | 0.5527 |
| 1820 | 0.5234 |
| 1840 | 0.4709 |
| 1860 | 0.6184 |
| 1880 | 0.6267 |
| 1900 | 0.6199 |
| 1920 | 0.6493 |
| 1940 | 0.6202 |
| 1960 | 0.6171 |
| 1980 | 0.6400 |
| 2000 | 0.6256 |
| 2020 | 0.6341 |
| 2040 | 0.6516 |
| 2060 | 0.6305 |
| 2080 | 0.6551 |
| 2100 | 0.6614 |
| 2120 | 0.6816 |

FIG. 50: Diffuse transmittance table, diffuse transmittance versus radiation from 250 to 2500 nm for monofilament, 2% TiO2

| | |
|---|---|
| 2140 | 0.6885 |
| 2160 | 0.6885 |
| 2180 | 0.6707 |
| 2200 | 0.6676 |
| 2220 | 0.6744 |
| 2240 | 0.6231 |
| 2260 | 0.6158 |
| 2280 | 0.4615 |
| 2300 | 0.2119 |
| 2320 | 0.3322 |
| 2340 | 0.2990 |
| 2360 | 0.2688 |
| 2380 | 0.2135 |
| 2400 | 0.2322 |
| 2420 | 0.2696 |
| 2440 | 0.2611 |
| 2460 | 0.3499 |
| 2480 | 0.3737 |
| 2500 | 0.6091 |

Transmittance average for each wavelength range

| | 2% TiO2 |
|---|---|
| Average: 300-380 | 6% |
| Average 420-700 | 32% |
| Average 700-1000 | 42% |
| Average 1500-1600 | 60% |

Transmittance difference for each wavelength range

| | |
|---|---|
| (700-1000) vs (420-700) | 10% |
| (1500-1600) vs (700-1000) | 18% |

FIG. 51: Diffuse transmittance table, diffuse transmittance versus radiation from 250 to 2500 nm for monofilament, 10% Microvoid pigment Transmittance for each wavelength

| wavelength (nm) | Mono 10% Microvoid pigment |
|---|---|
| 280 | 0.1556 |
| 300 | 0.2535 |
| 320 | 0.2702 |
| 340 | 0.2852 |
| 360 | 0.2973 |
| 380 | 0.3160 |
| 400 | 0.3548 |
| 420 | 0.3717 |
| 440 | 0.3757 |
| 460 | 0.3811 |
| 480 | 0.3834 |
| 500 | 0.3878 |
| 520 | 0.3901 |
| 540 | 0.3948 |
| 560 | 0.3959 |
| 580 | 0.4018 |
| 600 | 0.4027 |
| 620 | 0.4052 |
| 640 | 0.4078 |
| 660 | 0.4085 |
| 680 | 0.4118 |
| 700 | 0.4127 |
| 720 | 0.4154 |
| 740 | 0.4186 |
| 760 | 0.4175 |
| 780 | 0.4199 |
| 800 | 0.4229 |
| 820 | 0.4236 |
| 840 | 0.4248 |
| 860 | 0.4274 |
| 880 | 0.4282 |
| 900 | 0.4300 |
| 920 | 0.4286 |
| 940 | 0.4306 |
| 960 | 0.4362 |
| 980 | 0.4393 |
| 1000 | 0.4403 |
| 1020 | 0.4412 |
| 1040 | 0.4420 |
| 1060 | 0.4440 |
| 1080 | 0.4483 |
| 1100 | 0.4495 |
| 1120 | 0.4521 |
| 1140 | 0.4552 |
| 1160 | 0.4477 |
| 1180 | 0.4372 |
| 1200 | 0.4143 |
| 1220 | 0.3949 |
| 1240 | 0.4445 |
| 1260 | 0.4554 |
| 1280 | 0.4607 |
| 1300 | 0.4640 |
| 1320 | 0.4676 |
| 1340 | 0.4691 |
| 1360 | 0.4701 |
| 1380 | 0.4623 |
| 1400 | 0.4480 |
| 1420 | 0.4373 |
| 1440 | 0.4434 |
| 1460 | 0.4568 |
| 1480 | 0.4686 |
| 1500 | 0.4733 |
| 1520 | 0.4768 |
| 1540 | 0.4717 |
| 1560 | 0.4821 |
| 1580 | 0.4836 |
| 1600 | 0.4869 |
| 1620 | 0.4868 |
| 1640 | 0.4883 |
| 1660 | 0.4853 |
| 1680 | 0.4708 |
| 1700 | 0.4440 |
| 1720 | 0.3328 |
| 1740 | 0.3549 |
| 1760 | 0.3538 |
| 1780 | 0.4020 |
| 1800 | 0.4025 |
| 1820 | 0.3996 |
| 1840 | 0.4127 |
| 1860 | 0.4311 |
| 1880 | 0.4434 |
| 1900 | 0.4430 |
| 1920 | 0.4442 |
| 1940 | 0.4398 |
| 1960 | 0.4452 |
| 1980 | 0.4455 |
| 2000 | 0.4472 |
| 2020 | 0.4500 |
| 2040 | 0.4496 |
| 2060 | 0.4567 |
| 2080 | 0.4645 |
| 2100 | 0.4806 |
| 2120 | 0.4851 |
| 2140 | 0.4862 |
| 2160 | 0.4833 |
| 2180 | 0.4860 |
| 2200 | 0.4632 |
| 2220 | 0.4652 |
| 2240 | 0.4591 |
| 2260 | 0.4148 |
| 2280 | 0.3248 |
| 2300 | 0.2379 |
| 2320 | 0.2608 |

FIG. 51
FIG. 51: Diffuse transmittance table, diffuse transmittance versus radiation from 250 to 2500 nm for monofilament, 10% Microvoid pigment

| | |
|---|---|
| 2340 | 0.2491 |
| 2360 | 0.2519 |
| 2380 | 0.2145 |
| 2400 | 0.2262 |
| 2420 | 0.2347 |
| 2440 | 0.2201 |
| 2460 | 0.2942 |
| 2480 | 0.2873 |
| 2500 | 0.3387 |

Transmittance average for each wavelength range

| | 10% Microvoid pigment |
|---|---|
| Average: 300-380 | 28% |
| Average 420-700 | 40% |
| Average 700-1000 | 43% |
| Average 1500-1600 | 48% |

Transmittance difference for each wavelength range

| | |
|---|---|
| (700-1000) vs (420-700) | 3% |
| (1500-1600) vs (700-1000) | 5% |

FIG. 52
FIG. 52: Diffuse transmittance table, diffuse transmittance versus radiation from 250 to 2500 nm for monofilament, 14.0% Microvoid pigment Transmittance for each wavelength

| wavelength (nm) | Mono 14.0% Microvoid pigment |
|---|---|
| 280 | 0.1618 |
| 300 | 0.1842 |
| 320 | 0.1895 |
| 340 | 0.1975 |
| 360 | 0.2145 |
| 380 | 0.2375 |
| 400 | 0.2721 |
| 420 | 0.2800 |
| 440 | 0.2868 |
| 460 | 0.2889 |
| 480 | 0.2950 |
| 500 | 0.2950 |
| 520 | 0.3002 |
| 540 | 0.3010 |
| 560 | 0.3024 |
| 580 | 0.3089 |
| 600 | 0.3088 |
| 620 | 0.3128 |
| 640 | 0.3133 |
| 660 | 0.3187 |
| 680 | 0.3190 |
| 700 | 0.3241 |
| 720 | 0.3217 |
| 740 | 0.3213 |
| 760 | 0.3263 |
| 780 | 0.3260 |
| 800 | 0.3304 |
| 820 | 0.3292 |
| 840 | 0.3330 |
| 860 | 0.3334 |
| 880 | 0.3351 |
| 900 | 0.3340 |
| 920 | 0.3350 |
| 940 | 0.3342 |
| 960 | 0.3425 |
| 980 | 0.3422 |
| 1000 | 0.3426 |
| 1020 | 0.3442 |
| 1040 | 0.3449 |
| 1060 | 0.3480 |
| 1080 | 0.3512 |
| 1100 | 0.3524 |
| 1120 | 0.3554 |
| 1140 | 0.3550 |
| 1160 | 0.3502 |
| 1180 | 0.3409 |
| 1200 | 0.3180 |
| 1220 | 0.3020 |
| 1240 | 0.3455 |
| 1260 | 0.3574 |
| 1280 | 0.3614 |
| 1300 | 0.3648 |
| 1320 | 0.3672 |
| 1340 | 0.3696 |
| 1360 | 0.3700 |
| 1380 | 0.3576 |
| 1400 | 0.3472 |
| 1420 | 0.3396 |
| 1440 | 0.3447 |
| 1460 | 0.3553 |
| 1480 | 0.3675 |
| 1500 | 0.3724 |
| 1520 | 0.3766 |
| 1540 | 0.3703 |
| 1560 | 0.3815 |
| 1580 | 0.3832 |
| 1600 | 0.3867 |
| 1620 | 0.3854 |
| 1640 | 0.3876 |
| 1660 | 0.3836 |
| 1680 | 0.3719 |
| 1700 | 0.3447 |
| 1720 | 0.2383 |
| 1740 | 0.2597 |
| 1760 | 0.2603 |
| 1780 | 0.3052 |
| 1800 | 0.3031 |
| 1820 | 0.3037 |
| 1840 | 0.3164 |
| 1860 | 0.3328 |
| 1880 | 0.3412 |
| 1900 | 0.3458 |
| 1920 | 0.3411 |
| 1940 | 0.3459 |
| 1960 | 0.3495 |
| 1980 | 0.3525 |
| 2000 | 0.3481 |
| 2020 | 0.3502 |
| 2040 | 0.3572 |
| 2060 | 0.3584 |
| 2080 | 0.3668 |
| 2100 | 0.3819 |
| 2120 | 0.3902 |
| 2140 | 0.3911 |
| 2160 | 0.3832 |
| 2180 | 0.3842 |
| 2200 | 0.3790 |
| 2220 | 0.3529 |
| 2240 | 0.3321 |
| 2260 | 0.3012 |
| 2280 | 0.2210 |
| 2300 | 0.1494 |
| 2320 | 0.1769 |
| 2340 | 0.1651 |
| 2360 | 0.1440 |
| 2380 | 0.1416 |
| 2400 | 0.1494 |
| 2420 | 0.1537 |
| 2440 | 0.1399 |
| 2460 | 0.1724 |

FIG. 52
FIG. 52: Diffuse transmittance table, diffuse transmittance versus radiation from 250 to 2500 nm for monofilament, 14.0% Microvoid pigment

| | |
|---|---|
| 2480 | 0.1507 |
| 2500 | 0.2265 |

Transmittance average for each wavelength range

| | 14.0% Microvoid pigment |
|---|---|
| Average: 300-380 | 20% |
| Average 420-700 | 30% |
| Average 700-1000 | 33% |
| Average 1500-1600 | 38% |

Transmittance difference for each wavelength range

| | |
|---|---|
| (700-1000) vs (420-700) | 3% |
| (1500-1600) vs (700-1000) | 5% |

FIG. 53
FIG. 53: Diffuse transmittance table, diffuse transmittance versus radiation from 250 to 2500 nm for monofilament, 2% TiO2, 2.5% Microvoid pigment Transmittance for each wavelength

| wavelength (nm) | Mono 2% TiO2, 2.5% Microvoid pigment |
|---|---|
| 280 | 0.1643 |
| 300 | 0.1456 |
| 320 | 0.1498 |
| 340 | 0.1535 |
| 360 | 0.1531 |
| 380 | 0.1563 |
| 400 | 0.2006 |
| 420 | 0.3242 |
| 440 | 0.3335 |
| 460 | 0.3419 |
| 480 | 0.3483 |
| 500 | 0.3559 |
| 520 | 0.3625 |
| 540 | 0.3697 |
| 560 | 0.3761 |
| 580 | 0.3831 |
| 600 | 0.3885 |
| 620 | 0.3950 |
| 640 | 0.4015 |
| 660 | 0.4080 |
| 680 | 0.4131 |
| 700 | 0.4194 |
| 720 | 0.4241 |
| 740 | 0.4291 |
| 760 | 0.4357 |
| 780 | 0.4407 |
| 800 | 0.4455 |
| 820 | 0.4499 |
| 840 | 0.4549 |
| 860 | 0.4594 |
| 880 | 0.4636 |
| 900 | 0.4671 |
| 920 | 0.4687 |
| 940 | 0.4719 |
| 960 | 0.4813 |
| 980 | 0.4861 |
| 1000 | 0.4901 |
| 1020 | 0.4932 |
| 1040 | 0.4978 |
| 1060 | 0.5058 |
| 1080 | 0.5108 |
| 1100 | 0.5141 |
| 1120 | 0.5198 |
| 1140 | 0.5216 |
| 1160 | 0.5179 |
| 1180 | 0.5077 |
| 1200 | 0.4823 |
| 1220 | 0.4620 |
| 1240 | 0.5220 |
| 1260 | 0.5367 |
| 1280 | 0.5424 |
| 1300 | 0.5493 |
| 1320 | 0.5564 |
| 1340 | 0.5589 |
| 1360 | 0.5598 |
| 1380 | 0.5470 |
| 1400 | 0.5354 |
| 1420 | 0.5288 |
| 1440 | 0.5346 |
| 1460 | 0.5537 |
| 1480 | 0.5648 |
| 1500 | 0.5755 |
| 1520 | 0.5785 |
| 1540 | 0.5719 |
| 1560 | 0.5833 |
| 1580 | 0.5866 |
| 1600 | 0.5914 |
| 1620 | 0.5910 |
| 1640 | 0.5951 |
| 1660 | 0.5906 |
| 1680 | 0.5745 |
| 1700 | 0.5453 |
| 1720 | 0.4154 |
| 1740 | 0.4398 |
| 1760 | 0.4486 |
| 1780 | 0.5026 |
| 1800 | 0.4989 |
| 1820 | 0.5031 |
| 1840 | 0.5169 |
| 1860 | 0.5404 |
| 1880 | 0.5534 |
| 1900 | 0.5553 |
| 1920 | 0.5562 |
| 1940 | 0.5619 |
| 1960 | 0.5606 |
| 1980 | 0.5701 |
| 2000 | 0.5643 |
| 2020 | 0.5689 |
| 2040 | 0.5731 |
| 2060 | 0.5704 |
| 2080 | 0.5891 |
| 2100 | 0.6037 |
| 2120 | 0.6094 |
| 2140 | 0.6080 |
| 2160 | 0.6155 |
| 2180 | 0.6013 |
| 2200 | 0.5939 |
| 2220 | 0.5724 |
| 2240 | 0.5509 |
| 2260 | 0.5086 |
| 2280 | 0.4060 |
| 2300 | 0.2595 |
| 2320 | 0.3152 |
| 2340 | 0.3053 |
| 2360 | 0.2840 |
| 2380 | 0.2463 |
| 2400 | 0.2285 |
| 2420 | 0.2363 |
| 2440 | 0.2322 |
| 2460 | 0.2797 |
| 2480 | 0.3172 |
| 2500 | 0.4017 |

Transmittance average for each wavelength range

FIG. 53
FIG. 53: Diffuse transmittance table, diffuse transmittance versus radiation from 250 to 2500 nm for monofilament, 2% TiO2, 2.5% Microvoid pigment

|  | 2% TiO2, 2.5% Microvoid pigment |
|---|---|
| Average: 300-380 | 15% |
| Average 420-700 | 37% |
| Average 700-1000 | 46% |
| Average 1500-1600 | 58% |

Transmittance difference for each wavelength range

| (700-1000) vs (420-700) | 8% |
|---|---|
| (1500-1600) vs (700-1000) | 13% |

FIG. 54
FIG. 54: Diffuse transmittance table, diffuse transmittance versus radiation from 250 to 2500 nm monofilament, 2.0% carbon Black Transmittance for each wavelength

| wavelength (nm) | Mono 2% carbon Black |
|---|---|
| 280 | 0.1184 |
| 300 | 0.1076 |
| 320 | 0.1115 |
| 340 | 0.1116 |
| 360 | 0.1116 |
| 380 | 0.1116 |
| 400 | 0.1106 |
| 420 | 0.1113 |
| 440 | 0.1097 |
| 460 | 0.1103 |
| 480 | 0.1116 |
| 500 | 0.1108 |
| 520 | 0.1088 |
| 540 | 0.1092 |
| 560 | 0.1109 |
| 580 | 0.1087 |
| 600 | 0.1095 |
| 620 | 0.1072 |
| 640 | 0.1094 |
| 660 | 0.1080 |
| 680 | 0.1088 |
| 700 | 0.1096 |
| 720 | 0.1091 |
| 740 | 0.1085 |
| 760 | 0.1088 |
| 780 | 0.1100 |
| 800 | 0.1093 |
| 820 | 0.1099 |
| 840 | 0.1092 |
| 860 | 0.1097 |
| 880 | 0.1087 |
| 900 | 0.1094 |
| 920 | 0.1086 |
| 940 | 0.1090 |
| 960 | 0.1100 |
| 980 | 0.1082 |
| 1000 | 0.1096 |
| 1020 | 0.1130 |
| 1040 | 0.1086 |
| 1060 | 0.1101 |
| 1080 | 0.1081 |
| 1100 | 0.1094 |
| 1120 | 0.1068 |
| 1140 | 0.1082 |
| 1160 | 0.1071 |
| 1180 | 0.1074 |
| 1200 | 0.1072 |
| 1220 | 0.1067 |
| 1240 | 0.1080 |
| 1260 | 0.1062 |
| 1280 | 0.1075 |
| 1300 | 0.1064 |
| 1320 | 0.1065 |
| 1340 | 0.1057 |
| 1360 | 0.1050 |
| 1380 | 0.1009 |
| 1400 | 0.1045 |
| 1420 | 0.1058 |
| 1440 | 0.1061 |
| 1460 | 0.1066 |
| 1480 | 0.1065 |
| 1500 | 0.1062 |
| 1520 | 0.1070 |
| 1540 | 0.1066 |
| 1560 | 0.1048 |
| 1580 | 0.1063 |
| 1600 | 0.1061 |
| 1620 | 0.1070 |
| 1640 | 0.1045 |
| 1660 | 0.1065 |
| 1680 | 0.1035 |
| 1700 | 0.1072 |
| 1720 | 0.1046 |
| 1740 | 0.1047 |
| 1760 | 0.1041 |
| 1780 | 0.1057 |
| 1800 | 0.1041 |
| 1820 | 0.1067 |
| 1840 | 0.1049 |
| 1860 | 0.1056 |
| 1880 | 0.1039 |
| 1900 | 0.1017 |
| 1920 | 0.1007 |
| 1940 | 0.1004 |
| 1960 | 0.1053 |
| 1980 | 0.1011 |
| 2000 | 0.1001 |
| 2020 | 0.0990 |
| 2040 | 0.0950 |
| 2060 | 0.0993 |
| 2080 | 0.0976 |
| 2100 | 0.0898 |
| 2120 | 0.1002 |
| 2140 | 0.0984 |
| 2160 | 0.0834 |
| 2180 | 0.0953 |
| 2200 | 0.0735 |
| 2220 | 0.0733 |
| 2240 | 0.0855 |
| 2260 | 0.0895 |
| 2280 | 0.0852 |
| 2300 | 0.0873 |
| 2320 | 0.0888 |
| 2340 | 0.0888 |
| 2360 | 0.0885 |
| 2380 | 0.0812 |
| 2400 | 0.0722 |
| 2420 | 0.0665 |
| 2440 | 0.0749 |
| 2460 | 0.0615 |
| 2480 | 0.0616 |
| 2500 | 0.0406 |

Transmittance average for each wavelength range

|  | 2% carbon Black |
|---|---|
| Average: 300-380 | 11% |
| Average 420-700 | 11% |
| Average 700-1000 | 11% |
| Average 1500-1600 | 11% |

FIG. 54
FIG. 54: Diffuse transmittance table, diffuse transmittance versus radiation from 250 to 2500 nm monofilament, 2.0% carbon Black Transmittance difference for each wavelength range

| | |
|---|---|
| (700-1000) vs (420-700) | 0% |
| (1500-1600) vs (700-1000) | 0% |

FIG. 55
FIG. 55: Diffuse transmittance table, diffuse transmittance versus radiation from 250 to 2500 nm monofilament, 0.4% Aluminium Transmittance for each wavelength

| wavelength (nm) | Mono 0.4% Aluminium |
|---|---|
| 280 | 0.0916 |
| 300 | 0.1347 |
| 320 | 0.1403 |
| 340 | 0.1429 |
| 360 | 0.1486 |
| 380 | 0.1532 |
| 400 | 0.1578 |
| 420 | 0.1573 |
| 440 | 0.1562 |
| 460 | 0.1553 |
| 480 | 0.1540 |
| 500 | 0.1528 |
| 520 | 0.1521 |
| 540 | 0.1503 |
| 560 | 0.1496 |
| 580 | 0.1488 |
| 600 | 0.1480 |
| 620 | 0.1455 |
| 640 | 0.1451 |
| 660 | 0.1444 |
| 680 | 0.1431 |
| 700 | 0.1419 |
| 720 | 0.1407 |
| 740 | 0.1373 |
| 760 | 0.1392 |
| 780 | 0.1357 |
| 800 | 0.1340 |
| 820 | 0.1323 |
| 840 | 0.1320 |
| 860 | 0.1321 |
| 880 | 0.1334 |
| 900 | 0.1353 |
| 920 | 0.1373 |
| 940 | 0.1399 |
| 960 | 0.1408 |
| 980 | 0.1436 |
| 1000 | 0.1452 |
| 1020 | 0.1530 |
| 1040 | 0.1477 |
| 1060 | 0.1564 |
| 1080 | 0.1541 |
| 1100 | 0.1563 |
| 1120 | 0.1491 |
| 1140 | 0.1718 |
| 1160 | 0.1523 |
| 1180 | 0.1543 |
| 1200 | 0.1450 |
| 1220 | 0.1525 |
| 1240 | 0.1530 |
| 1260 | 0.1675 |
| 1280 | 0.1496 |
| 1300 | 0.1658 |
| 1320 | 0.1527 |
| 1340 | 0.1564 |
| 1360 | 0.1998 |
| 1380 | 0.1960 |
| 1400 | 0.1648 |
| 1420 | 0.1599 |
| 1440 | 0.1569 |
| 1460 | 0.1698 |
| 1480 | 0.1589 |
| 1500 | 0.1659 |
| 1520 | 0.1560 |
| 1540 | 0.1647 |
| 1560 | 0.1717 |
| 1580 | 0.1652 |
| 1600 | 0.1664 |
| 1620 | 0.1584 |
| 1640 | 0.1703 |
| 1660 | 0.1667 |
| 1680 | 0.1722 |
| 1700 | 0.1759 |
| 1720 | 0.1520 |
| 1740 | 0.1532 |
| 1760 | 0.1531 |
| 1780 | 0.1673 |
| 1800 | 0.1481 |
| 1820 | 0.0960 |
| 1840 | 0.1772 |
| 1860 | 0.1004 |
| 1880 | 0.1681 |
| 1900 | 0.1149 |
| 1920 | 0.0903 |
| 1940 | 0.1898 |
| 1960 | 0.1556 |
| 1980 | 0.1617 |
| 2000 | 0.1671 |
| 2020 | 0.1589 |
| 2040 | 0.1861 |
| 2060 | 0.1640 |
| 2080 | 0.1591 |
| 2100 | 0.1954 |
| 2120 | 0.1814 |
| 2140 | 0.1449 |
| 2160 | 0.1804 |
| 2180 | 0.1908 |
| 2200 | 0.1905 |
| 2220 | 0.1630 |
| 2240 | 0.2434 |
| 2260 | 0.1377 |
| 2280 | 0.0906 |
| 2300 | 0.1675 |
| 2320 | 0.1532 |
| 2340 | 0.0821 |
| 2360 | 0.1023 |
| 2380 | 0.1330 |
| 2400 | 0.1885 |
| 2420 | 0.0795 |
| 2440 | 0.1093 |
| 2460 | 0.0127 |
| 2480 | 0.2727 |
| 2500 | 0.1630 |

Transmittance average for each wavelength range

| | 0.4% Aluminium |
|---|---|
| Average: 300-380 | 14% |
| Average 420-700 | 15% |
| Average 700-1000 | 14% |
| Average 1500-1600 | 16% |

Transmittance difference for each wavelength range

| | |
|---|---|
| (700-1000) vs (420-700) | −1% |
| (1500-1600) vs (700-1000) | 3% |

Netting Material of the Invention

FIG. 56
FIG. 56: Diffuse transmittance table, diffuse transmittance versus radiation from 250 to 2500 nm monofilament, 2% Altiris

| Transmittance for each wavelength | |
|---|---|
| wavelength (nm) | Mono 2% Altiris |
| 280 | 0.2714 |
| 300 | 0.2684 |
| 320 | 0.2696 |
| 340 | 0.2747 |
| 360 | 0.2734 |
| 380 | 0.2866 |
| 400 | 0.3752 |
| 420 | 0.5433 |
| 440 | 0.5550 |
| 460 | 0.5558 |
| 480 | 0.5616 |
| 500 | 0.5607 |
| 520 | 0.5651 |
| 540 | 0.5647 |
| 560 | 0.5691 |
| 580 | 0.5697 |
| 600 | 0.5674 |
| 620 | 0.5709 |
| 640 | 0.5699 |
| 660 | 0.5738 |
| 680 | 0.5716 |
| 700 | 0.5748 |
| 720 | 0.5711 |
| 740 | 0.5738 |
| 760 | 0.5735 |
| 780 | 0.5771 |
| 800 | 0.5747 |
| 820 | 0.5776 |
| 840 | 0.5756 |
| 860 | 0.5735 |
| 880 | 0.5746 |
| 900 | 0.5714 |
| 920 | 0.5722 |
| 940 | 0.5689 |
| 960 | 0.5717 |
| 980 | 0.5763 |
| 1000 | 0.5737 |
| 1020 | 0.5755 |
| 1040 | 0.5754 |
| 1060 | 0.5793 |
| 1080 | 0.5798 |
| 1100 | 0.5838 |
| 1120 | 0.5831 |
| 1140 | 0.5811 |
| 1160 | 0.5758 |
| 1180 | 0.5625 |
| 1200 | 0.5375 |
| 1220 | 0.5130 |
| 1240 | 0.5683 |
| 1260 | 0.5780 |
| 1280 | 0.5854 |
| 1300 | 0.5852 |
| 1320 | 0.5903 |
| 1340 | 0.5903 |
| 1360 | 0.5922 |
| 1380 | 0.5738 |
| 1400 | 0.5655 |
| 1420 | 0.5524 |
| 1440 | 0.5582 |
| 1460 | 0.5751 |
| 1480 | 0.5865 |
| 1500 | 0.5893 |
| 1520 | 0.5927 |
| 1540 | 0.5871 |
| 1560 | 0.5982 |
| 1580 | 0.5998 |
| 1600 | 0.6031 |
| 1620 | 0.6028 |
| 1640 | 0.6033 |
| 1660 | 0.5978 |
| 1680 | 0.5872 |
| 1700 | 0.5556 |
| 1720 | 0.4279 |
| 1740 | 0.4514 |
| 1760 | 0.4577 |
| 1780 | 0.5095 |
| 1800 | 0.5031 |
| 1820 | 0.5060 |
| 1840 | 0.5214 |
| 1860 | 0.5399 |
| 1880 | 0.5526 |
| 1900 | 0.5573 |
| 1920 | 0.5508 |
| 1940 | 0.5521 |
| 1960 | 0.5575 |
| 1980 | 0.5604 |
| 2000 | 0.5603 |
| 2020 | 0.5573 |
| 2040 | 0.5688 |
| 2060 | 0.5624 |
| 2080 | 0.5865 |
| 2100 | 0.5897 |
| 2120 | 0.6018 |
| 2140 | 0.6027 |
| 2160 | 0.5979 |
| 2180 | 0.5988 |
| 2200 | 0.5671 |
| 2220 | 0.5807 |
| 2240 | 0.5308 |
| 2260 | 0.5015 |
| 2280 | 0.3938 |
| 2300 | 0.2940 |
| 2320 | 0.3309 |
| 2340 | 0.3246 |
| 2360 | 0.3204 |
| 2380 | 0.2705 |
| 2400 | 0.2733 |
| 2420 | 0.2938 |
| 2440 | 0.2766 |
| 2460 | 0.3660 |
| 2480 | 0.3511 |
| 2500 | 0.4295 |

| Transmittance average for each wavelength range | |
|---|---|
| | 2% Altiris |
| Average: 300-380 | 27% |
| Average 420-700 | 56% |
| Average 700-1000 | 57% |
| Average 1500-1600 | 60% |

| Transmittance difference for each wavelength range | |
|---|---|
| (700-1000) vs (420-700) | 1% |
| (1500-1600) vs (700-1000) | 2% |

FIG. 57
FIG. 57: Diffuse transmittance table, diffuse transmittance versus radiation from 250 to 2500 nm monofilament, 3% Altiris

| Transmittance for each wavelength | |
|---|---|
| wavelength (nm) | Mono 3% Altiris |
| 280 | 0.1226 |
| 300 | 0.1617 |
| 320 | 0.1552 |
| 340 | 0.1578 |
| 360 | 0.1598 |
| 380 | 0.1619 |
| 400 | 0.2113 |
| 420 | 0.4140 |

FIG. 57
FIG. 57: Diffuse transmittance table, diffuse transmittance versus radiation from 250 to 2500 nm monofilament, 3% Altiris

| | |
|---|---|
| 440 | 0.4238 |
| 460 | 0.4282 |
| 480 | 0.4299 |
| 500 | 0.4330 |
| 520 | 0.4341 |
| 540 | 0.4353 |
| 560 | 0.4376 |
| 580 | 0.4389 |
| 600 | 0.4409 |
| 620 | 0.4411 |
| 640 | 0.4432 |
| 660 | 0.4431 |
| 680 | 0.4451 |
| 700 | 0.4447 |
| 720 | 0.4458 |
| 740 | 0.4454 |
| 760 | 0.4448 |
| 780 | 0.4468 |
| 800 | 0.4463 |
| 820 | 0.4479 |
| 840 | 0.4475 |
| 860 | 0.4495 |
| 880 | 0.4487 |
| 900 | 0.4496 |
| 920 | 0.4466 |
| 940 | 0.4475 |
| 960 | 0.4522 |
| 980 | 0.4531 |
| 1000 | 0.4544 |
| 1020 | 0.4534 |
| 1040 | 0.4514 |
| 1060 | 0.4549 |
| 1080 | 0.4564 |
| 1100 | 0.4587 |
| 1120 | 0.4602 |
| 1140 | 0.4600 |
| 1160 | 0.4527 |
| 1180 | 0.4417 |
| 1200 | 0.4150 |
| 1220 | 0.3954 |
| 1240 | 0.4452 |
| 1260 | 0.4591 |
| 1280 | 0.4634 |
| 1300 | 0.4649 |
| 1320 | 0.4684 |
| 1340 | 0.4694 |
| 1360 | 0.4717 |
| 1380 | 0.4581 |
| 1400 | 0.4472 |
| 1420 | 0.4347 |
| 1440 | 0.4437 |
| 1460 | 0.4563 |
| 1480 | 0.4703 |
| 1500 | 0.4747 |
| 1520 | 0.4748 |
| 1540 | 0.4742 |
| 1560 | 0.4810 |
| 1580 | 0.4861 |
| 1600 | 0.4860 |
| 1620 | 0.4886 |
| 1640 | 0.4859 |
| 1660 | 0.4862 |
| 1680 | 0.4717 |
| 1700 | 0.4444 |
| 1720 | 0.3203 |
| 1740 | 0.3401 |
| 1760 | 0.3479 |
| 1780 | 0.3954 |
| 1800 | 0.3961 |
| 1820 | 0.3924 |
| 1840 | 0.4139 |
| 1860 | 0.4296 |
| 1880 | 0.4410 |
| 1900 | 0.4433 |
| 1920 | 0.4412 |
| 1940 | 0.4453 |
| 1960 | 0.4458 |
| 1980 | 0.4544 |
| 2000 | 0.4509 |
| 2020 | 0.4568 |
| 2040 | 0.4529 |
| 2060 | 0.4687 |
| 2080 | 0.4747 |
| 2100 | 0.4840 |
| 2120 | 0.4966 |
| 2140 | 0.4859 |
| 2160 | 0.4994 |
| 2180 | 0.4992 |
| 2200 | 0.4923 |
| 2220 | 0.4747 |
| 2240 | 0.4585 |
| 2260 | 0.4168 |
| 2280 | 0.3203 |
| 2300 | 0.2216 |
| 2320 | 0.2516 |
| 2340 | 0.2399 |
| 2360 | 0.2343 |
| 2380 | 0.2088 |
| 2400 | 0.2116 |
| 2420 | 0.2108 |
| 2440 | 0.1999 |
| 2460 | 0.2529 |
| 2480 | 0.2760 |
| 2500 | 0.3430 |

Transmittance average for each wavelength range

| | 3% Altiris |
|---|---|
| Average: 300-380 | 16% |
| Average 420-700 | 44% |
| Average 700-1000 | 45% |
| Average 1500-1600 | 48% |

Transmittance difference for each wavelength range

| | |
|---|---|
| (700-1000) vs (420-700) | 1% |
| (1500-1600) vs (700-1000) | 3% |

FIG. 58
FIG. 58: Diffuse transmittance table, diffuse transmittance versus radiation from 250 to 2500 nm monofilament, 4% Altiris Transmittance for each wavelength

| wavelength (nm) | Mono 4% Altiris |
|---|---|
| 280 | −0.0076 |
| 300 | 0.0530 |
| 320 | 0.0530 |
| 340 | 0.0499 |
| 360 | 0.0577 |
| 380 | 0.0586 |
| 400 | 0.0879 |
| 420 | 0.2453 |
| 440 | 0.2561 |
| 460 | 0.2603 |
| 480 | 0.2629 |
| 500 | 0.2653 |
| 520 | 0.2675 |
| 540 | 0.2691 |
| 560 | 0.2708 |
| 580 | 0.2721 |
| 600 | 0.2734 |
| 620 | 0.2737 |
| 640 | 0.2752 |

FIG. 58: Diffuse transmittance table, diffuse transmittance versus radiation from 250 to 2500 nm monofilament, 4% Altiris

| wavelength | transmittance |
|---|---|
| 660 | 0.2762 |
| 680 | 0.2769 |
| 700 | 0.2777 |
| 720 | 0.2786 |
| 740 | 0.2781 |
| 760 | 0.2821 |
| 780 | 0.2803 |
| 800 | 0.2806 |
| 820 | 0.2808 |
| 840 | 0.2811 |
| 860 | 0.2817 |
| 880 | 0.2825 |
| 900 | 0.2826 |
| 920 | 0.2812 |
| 940 | 0.2818 |
| 960 | 0.2854 |
| 980 | 0.2880 |
| 1000 | 0.2889 |
| 1020 | 0.2859 |
| 1040 | 0.2852 |
| 1060 | 0.2790 |
| 1080 | 0.2899 |
| 1100 | 0.2948 |
| 1120 | 0.2814 |
| 1140 | 0.2931 |
| 1160 | 0.2822 |
| 1180 | 0.2770 |
| 1200 | 0.2521 |
| 1220 | 0.2307 |
| 1240 | 0.2766 |
| 1260 | 0.2869 |
| 1280 | 0.2906 |
| 1300 | 0.3033 |
| 1320 | 0.2976 |
| 1340 | 0.2996 |
| 1360 | 0.3334 |
| 1380 | 0.3569 |
| 1400 | 0.2944 |
| 1420 | 0.2692 |
| 1440 | 0.2738 |
| 1460 | 0.2889 |
| 1480 | 0.2956 |
| 1500 | 0.3071 |
| 1520 | 0.3026 |
| 1540 | 0.2983 |
| 1560 | 0.3146 |
| 1580 | 0.3101 |
| 1600 | 0.3183 |
| 1620 | 0.3136 |
| 1640 | 0.3197 |
| 1660 | 0.3190 |
| 1680 | 0.3006 |
| 1700 | 0.2818 |
| 1720 | 0.1769 |
| 1740 | 0.1932 |
| 1760 | 0.1998 |
| 1780 | 0.2527 |
| 1800 | 0.2452 |
| 1820 | 0.1522 |
| 1840 | 0.2243 |
| 1860 | 0.2263 |
| 1880 | 0.2842 |
| 1900 | 0.2391 |
| 1920 | 0.2194 |
| 1940 | 0.3028 |
| 1960 | 0.2798 |
| 1980 | 0.3143 |
| 2000 | 0.3095 |
| 2020 | 0.3020 |
| 2040 | 0.3010 |
| 2060 | 0.3014 |
| 2080 | 0.3150 |
| 2100 | 0.3405 |
| 2120 | 0.3423 |
| 2140 | 0.3395 |
| 2160 | 0.2978 |
| 2180 | 0.3384 |
| 2200 | 0.3146 |
| 2220 | 0.3560 |
| 2240 | 0.3216 |
| 2260 | 0.2896 |
| 2280 | 0.1966 |
| 2300 | 0.1150 |
| 2320 | 0.1247 |
| 2340 | 0.0981 |
| 2360 | 0.1146 |
| 2380 | 0.0177 |
| 2400 | 0.0589 |
| 2420 | 0.0829 |
| 2440 | 0.0199 |
| 2460 | 0.1100 |
| 2480 | 0.1713 |
| 2500 | 0.0560 |

Transmittance average for each wavelength range

|  | 4% Altiris |
|---|---|
| Average: 300-380 | 5% |
| Average 420-700 | 27% |
| Average 700-1000 | 28% |
| Average 1500-1600 | 31% |

Transmittance difference for each wavelength range

| | |
|---|---|
| (700-1000) vs (420-700) | 1% |
| (1500-1600) vs (700-1000) | 3% |

FIG. 59: Diffuse transmittance table, diffuse transmittance versus radiation from 250 to 2500 nm monofilament, 1% Altiris, 2.5% Microvoid pigment Transmittance for each wavelength

| wavelength (nm) | Mono 1% Altiris, 2.5% Microvoid pigment |
|---|---|
| 280 | 0.1258 |
| 300 | 0.1696 |
| 320 | 0.1518 |
| 340 | 0.1504 |
| 360 | 0.1532 |
| 380 | 0.1631 |
| 400 | 0.2736 |
| 420 | 0.4392 |
| 440 | 0.4471 |
| 460 | 0.4505 |
| 480 | 0.4537 |
| 500 | 0.4569 |
| 520 | 0.4581 |
| 540 | 0.4614 |
| 560 | 0.4620 |
| 580 | 0.4632 |
| 600 | 0.4638 |
| 620 | 0.4660 |
| 640 | 0.4670 |
| 660 | 0.4681 |
| 680 | 0.4687 |
| 700 | 0.4697 |
| 720 | 0.4718 |
| 740 | 0.4720 |
| 760 | 0.4739 |
| 780 | 0.4737 |
| 800 | 0.4754 |
| 820 | 0.4751 |

FIG. 59
FIG. 59: Diffuse transmittance table, diffuse transmittance versus radiation from 250 to 2500 nm monofilament, 1% Altiris, 2.5% Microvoid pigment

| | |
|---|---|
| 840 | 0.4765 |
| 860 | 0.4792 |
| 880 | 0.4796 |
| 900 | 0.4816 |
| 920 | 0.4775 |
| 940 | 0.4794 |
| 960 | 0.4835 |
| 980 | 0.4868 |
| 1000 | 0.4858 |
| 1020 | 0.4873 |
| 1040 | 0.4872 |
| 1060 | 0.4900 |
| 1080 | 0.4940 |
| 1100 | 0.4946 |
| 1120 | 0.4970 |
| 1140 | 0.4966 |
| 1160 | 0.4895 |
| 1180 | 0.4770 |
| 1200 | 0.4478 |
| 1220 | 0.4259 |
| 1240 | 0.4825 |
| 1260 | 0.4979 |
| 1280 | 0.5020 |
| 1300 | 0.5056 |
| 1320 | 0.5084 |
| 1340 | 0.5103 |
| 1360 | 0.5104 |
| 1380 | 0.4953 |
| 1400 | 0.4828 |
| 1420 | 0.4708 |
| 1440 | 0.4791 |
| 1460 | 0.4950 |
| 1480 | 0.5079 |
| 1500 | 0.5158 |
| 1520 | 0.5184 |
| 1540 | 0.5123 |
| 1560 | 0.5242 |
| 1580 | 0.5272 |
| 1600 | 0.5296 |
| 1620 | 0.5297 |
| 1640 | 0.5303 |
| 1660 | 0.5265 |
| 1680 | 0.5129 |
| 1700 | 0.4774 |
| 1720 | 0.3396 |
| 1740 | 0.3647 |
| 1760 | 0.3707 |
| 1780 | 0.4293 |
| 1800 | 0.4240 |
| 1820 | 0.4266 |
| 1840 | 0.4400 |
| 1860 | 0.4650 |
| 1880 | 0.4769 |
| 1900 | 0.4810 |
| 1920 | 0.4766 |
| 1940 | 0.4779 |
| 1960 | 0.4828 |
| 1980 | 0.4903 |
| 2000 | 0.4836 |
| 2020 | 0.4895 |
| 2040 | 0.4894 |
| 2060 | 0.4940 |
| 2080 | 0.5087 |
| 2100 | 0.5200 |
| 2120 | 0.5339 |
| 2140 | 0.5308 |
| 2160 | 0.5305 |
| 2180 | 0.5162 |
| 2200 | 0.5059 |
| 2220 | 0.4848 |
| 2240 | 0.4706 |
| 2260 | 0.4139 |
| 2280 | 0.2981 |
| 2300 | 0.1859 |
| 2320 | 0.2269 |
| 2340 | 0.2143 |
| 2360 | 0.1911 |
| 2380 | 0.1677 |
| 2400 | 0.1613 |
| 2420 | 0.1793 |
| 2440 | 0.1609 |
| 2460 | 0.2592 |
| 2480 | 0.2390 |
| 2500 | 0.2890 |

Transmittance average for each wavelength range

| | 1% Altiris, 2.5% Microvoid pigment |
|---|---|
| Average: 300-380 | 16% |
| Average 420-700 | 46% |
| Average 700-1000 | 48% |
| Average 1500-1600 | 52% |

Transmittance difference for each wavelength range

| | |
|---|---|
| (700-1000) vs (420-700) | 2% |
| (1500-1600) vs (700-1000) | 4% |

FIG. 60
FIG. 60: Diffuse transmittance table, diffuse transmittance versus radiation from 250 to 2500 nm monofilament, 1% Altiris, 10% Microvoid pigment Transmittance for each wavelength

| wavelength (nm) | Mono 1% Altiris, 10% Microvoid pigment |
|---|---|
| 280 | 0.1599 |
| 300 | 0.1747 |
| 320 | 0.1637 |
| 340 | 0.1700 |
| 360 | 0.1651 |
| 380 | 0.1721 |
| 400 | 0.2150 |
| 420 | 0.3299 |
| 440 | 0.3319 |
| 460 | 0.3406 |
| 480 | 0.3402 |
| 500 | 0.3473 |
| 520 | 0.3447 |
| 540 | 0.3505 |
| 560 | 0.3566 |
| 580 | 0.3509 |
| 600 | 0.3575 |
| 620 | 0.3564 |
| 640 | 0.3595 |
| 660 | 0.3565 |
| 680 | 0.3627 |
| 700 | 0.3584 |
| 720 | 0.3662 |
| 740 | 0.3722 |
| 760 | 0.3699 |
| 780 | 0.3747 |
| 800 | 0.3715 |
| 820 | 0.3765 |
| 840 | 0.3738 |
| 860 | 0.3789 |
| 880 | 0.3785 |
| 900 | 0.3833 |
| 920 | 0.3794 |
| 940 | 0.3844 |
| 960 | 0.3849 |

FIG. 60
FIG. 60: Diffuse transmittance table, diffuse transmittance versus radiation from 250 to 2500 nm monofilament, 1% Altiris, 10% Microvoid pigment

| wavelength | transmittance |
|---|---|
| 980 | 0.3893 |
| 1000 | 0.3967 |
| 1020 | 0.3904 |
| 1040 | 0.3928 |
| 1060 | 0.3930 |
| 1080 | 0.3983 |
| 1100 | 0.4039 |
| 1120 | 0.4011 |
| 1140 | 0.4052 |
| 1160 | 0.3944 |
| 1180 | 0.3866 |
| 1200 | 0.3569 |
| 1220 | 0.3401 |
| 1240 | 0.3881 |
| 1260 | 0.4032 |
| 1280 | 0.4111 |
| 1300 | 0.4106 |
| 1320 | 0.4168 |
| 1340 | 0.4162 |
| 1360 | 0.4178 |
| 1380 | 0.4008 |
| 1400 | 0.3907 |
| 1420 | 0.3787 |
| 1440 | 0.3871 |
| 1460 | 0.4019 |
| 1480 | 0.4137 |
| 1500 | 0.4234 |
| 1520 | 0.4265 |
| 1540 | 0.4223 |
| 1560 | 0.4319 |
| 1580 | 0.4375 |
| 1600 | 0.4379 |
| 1620 | 0.4394 |
| 1640 | 0.4396 |
| 1660 | 0.4364 |
| 1680 | 0.4221 |
| 1700 | 0.3903 |
| 1720 | 0.2720 |
| 1740 | 0.2938 |
| 1760 | 0.2982 |
| 1780 | 0.3469 |
| 1800 | 0.3429 |
| 1820 | 0.3456 |
| 1840 | 0.3578 |
| 1860 | 0.3801 |
| 1880 | 0.3888 |
| 1900 | 0.3918 |
| 1920 | 0.3894 |
| 1940 | 0.3902 |
| 1960 | 0.3942 |
| 1980 | 0.3971 |
| 2000 | 0.3947 |
| 2020 | 0.3960 |
| 2040 | 0.4049 |
| 2060 | 0.4004 |
| 2080 | 0.4153 |
| 2100 | 0.4286 |
| 2120 | 0.4404 |
| 2140 | 0.4297 |
| 2160 | 0.4403 |
| 2180 | 0.4288 |
| 2200 | 0.4050 |
| 2220 | 0.3841 |
| 2240 | 0.3493 |
| 2260 | 0.3223 |
| 2280 | 0.2324 |
| 2300 | 0.1618 |
| 2320 | 0.1806 |
| 2340 | 0.1767 |
| 2360 | 0.1678 |
| 2380 | 0.1511 |
| 2400 | 0.1303 |
| 2420 | 0.1395 |
| 2440 | 0.1366 |
| 2460 | 0.1843 |
| 2480 | 0.1661 |
| 2500 | 0.2038 |

Transmittance average for each wavelength range

|  | 1% Altiris, 10% Microvoid pigment |
|---|---|
| Average: 300-380 | 17% |
| Average 420-700 | 35% |
| Average 700-1000 | 38% |
| Average 1500-1600 | 43% |

Transmittance difference for each wavelength range

| (700-1000) vs (420-700) | 3% |
|---|---|
| (1500-1600) vs (700-1000) | 5% |

FIG. 61
FIG. 61: Diffuse transmittance table, diffuse transmittance versus radiation from 250 to 2500 nm monofilament, 1% Altiris, 14% Microvoid pigment Transmittance for each wavelength

| wavelength (nm) | Mono 1% Altiris, 14% Microvoid pigment |
|---|---|
| 280 | 0.0574 |
| 300 | 0.0376 |
| 320 | 0.0466 |
| 340 | 0.0471 |
| 360 | 0.0484 |
| 380 | 0.0572 |
| 400 | 0.1003 |
| 420 | 0.1837 |
| 440 | 0.1902 |
| 460 | 0.1940 |
| 480 | 0.1969 |
| 500 | 0.1999 |
| 520 | 0.2026 |
| 540 | 0.2049 |
| 560 | 0.2073 |
| 580 | 0.2096 |
| 600 | 0.2113 |
| 620 | 0.2136 |
| 640 | 0.2152 |
| 660 | 0.2172 |
| 680 | 0.2193 |
| 700 | 0.2213 |
| 720 | 0.2232 |
| 740 | 0.2254 |
| 760 | 0.2267 |
| 780 | 0.2274 |
| 800 | 0.2291 |
| 820 | 0.2311 |
| 840 | 0.2329 |
| 860 | 0.2352 |
| 880 | 0.2368 |
| 900 | 0.2378 |
| 920 | 0.2364 |
| 940 | 0.2372 |
| 960 | 0.2420 |
| 980 | 0.2445 |
| 1000 | 0.2448 |
| 1020 | 0.2399 |
| 1040 | 0.2324 |
| 1060 | 0.2412 |
| 1080 | 0.2595 |
| 1100 | 0.2428 |

FIG. 61
FIG. 61: Diffuse transmittance table, diffuse transmittance versus radiation from 250 to 2500 nm monofilament, 1% Altiris, 14% Microvoid pigment

| wavelength | transmittance |
|---|---|
| 1120 | 0.2569 |
| 1140 | 0.2462 |
| 1160 | 0.2515 |
| 1180 | 0.2264 |
| 1200 | 0.2202 |
| 1220 | 0.2282 |
| 1240 | 0.2410 |
| 1260 | 0.2752 |
| 1280 | 0.2568 |
| 1300 | 0.2719 |
| 1320 | 0.2568 |
| 1340 | 0.2747 |
| 1360 | 0.2000 |
| 1380 | 0.4113 |
| 1400 | 0.3465 |
| 1420 | 0.2459 |
| 1440 | 0.2443 |
| 1460 | 0.2612 |
| 1480 | 0.2532 |
| 1500 | 0.2662 |
| 1520 | 0.2845 |
| 1540 | 0.2618 |
| 1560 | 0.2903 |
| 1580 | 0.2763 |
| 1600 | 0.2926 |
| 1620 | 0.2759 |
| 1640 | 0.2856 |
| 1660 | 0.3079 |
| 1680 | 0.2679 |
| 1700 | 0.2623 |
| 1720 | 0.1421 |
| 1740 | 0.1724 |
| 1760 | 0.1609 |
| 1780 | 0.2174 |
| 1800 | 0.2228 |
| 1820 | 0.2224 |
| 1840 | −0.0007 |
| 1860 | 0.3368 |
| 1880 | 0.2810 |
| 1900 | 0.2830 |
| 1920 | 0.4342 |
| 1940 | 0.2613 |
| 1960 | 0.2552 |
| 1980 | 0.2445 |
| 2000 | 0.2577 |
| 2020 | 0.2468 |
| 2040 | 0.2632 |
| 2060 | 0.2478 |
| 2080 | 0.2727 |
| 2100 | 0.2687 |
| 2120 | 0.2889 |
| 2140 | 0.2680 |
| 2160 | 0.2855 |
| 2180 | 0.2955 |
| 2200 | 0.2420 |
| 2220 | 0.2792 |
| 2240 | 0.2221 |
| 2260 | 0.2106 |
| 2280 | 0.1754 |
| 2300 | 0.0589 |
| 2320 | 0.1118 |
| 2340 | 0.0707 |
| 2360 | 0.0892 |
| 2380 | 0.0546 |
| 2400 | 0.0808 |
| 2420 | 0.0413 |
| 2440 | 0.0889 |
| 2460 | 0.0707 |
| 2480 | 0.0572 |
| 2500 | 0.2232 |

Transmittance average for each wavelength range

| | 1% Altiris, 14% Microvoid pigment |
|---|---|
| Average: 300-380 | 5% |
| Average 420-700 | 21% |
| Average 700-1000 | 23% |
| Average 1500-1600 | 28% |

Transmittance difference for each wavelength range

| | |
|---|---|
| (700-1000) vs (420-700) | 3% |
| (1500-1600) vs (700-1000) | 5% |

FIG. 62
FIG. 62: Diffuse transmittance table, diffuse transmittance versus radiation from 250 to 2500 nm monofilament, 2% Altiris, 2.5% Microvoid pigment Transmittance for each wavelength

| wavelength (nm) | Mono 2% Altiris, 2.5% Microvoid pigment |
|---|---|
| 280 | 0.1377 |
| 300 | 0.1386 |
| 320 | 0.1448 |
| 340 | 0.1402 |
| 360 | 0.1425 |
| 380 | 0.1463 |
| 400 | 0.2157 |
| 420 | 0.3849 |
| 440 | 0.3944 |
| 460 | 0.4004 |
| 480 | 0.4039 |
| 500 | 0.4093 |
| 520 | 0.4131 |
| 540 | 0.4174 |
| 560 | 0.4201 |
| 580 | 0.4235 |
| 600 | 0.4245 |
| 620 | 0.4293 |
| 640 | 0.4300 |
| 660 | 0.4333 |
| 680 | 0.4336 |
| 700 | 0.4379 |
| 720 | 0.4424 |
| 740 | 0.4445 |
| 760 | 0.4456 |
| 780 | 0.4474 |
| 800 | 0.4501 |
| 820 | 0.4512 |
| 840 | 0.4523 |
| 860 | 0.4512 |
| 880 | 0.4554 |
| 900 | 0.4575 |
| 920 | 0.4549 |
| 940 | 0.4569 |
| 960 | 0.4616 |
| 980 | 0.4648 |
| 1000 | 0.4645 |
| 1020 | 0.4658 |
| 1040 | 0.4647 |
| 1060 | 0.4709 |
| 1080 | 0.4758 |
| 1100 | 0.4753 |
| 1120 | 0.4796 |
| 1140 | 0.4774 |
| 1160 | 0.4722 |
| 1180 | 0.4587 |
| 1200 | 0.4315 |
| 1220 | 0.4073 |
| 1240 | 0.4657 |

FIG. 62
FIG. 62: Diffuse transmittance table, diffuse transmittance versus radiation from 250 to 2500 nm monofilament, 2% Altiris, 2.5% Microvoid pigment

| | |
|---|---|
| 1260 | 0.4775 |
| 1280 | 0.4848 |
| 1300 | 0.4863 |
| 1320 | 0.4914 |
| 1340 | 0.4940 |
| 1360 | 0.4923 |
| 1380 | 0.4805 |
| 1400 | 0.4655 |
| 1420 | 0.4540 |
| 1440 | 0.4604 |
| 1460 | 0.4763 |
| 1480 | 0.4879 |
| 1500 | 0.4957 |
| 1520 | 0.4985 |
| 1540 | 0.4922 |
| 1560 | 0.5039 |
| 1580 | 0.5070 |
| 1600 | 0.5083 |
| 1620 | 0.5088 |
| 1640 | 0.5092 |
| 1660 | 0.5043 |
| 1680 | 0.4899 |
| 1700 | 0.4558 |
| 1720 | 0.3211 |
| 1740 | 0.3466 |
| 1760 | 0.3517 |
| 1780 | 0.4080 |
| 1800 | 0.4024 |
| 1820 | 0.4030 |
| 1840 | 0.4151 |
| 1860 | 0.4409 |
| 1880 | 0.4504 |
| 1900 | 0.4537 |
| 1920 | 0.4561 |
| 1940 | 0.4554 |
| 1960 | 0.4583 |
| 1980 | 0.4635 |
| 2000 | 0.4570 |
| 2020 | 0.4587 |
| 2040 | 0.4657 |
| 2060 | 0.4628 |
| 2080 | 0.4775 |
| 2100 | 0.4951 |
| 2120 | 0.5070 |
| 2140 | 0.5056 |
| 2160 | 0.4947 |
| 2180 | 0.4933 |
| 2200 | 0.4646 |
| 2220 | 0.4502 |
| 2240 | 0.4236 |
| 2260 | 0.3793 |
| 2280 | 0.2779 |
| 2300 | 0.1621 |
| 2320 | 0.1994 |
| 2340 | 0.1981 |
| 2360 | 0.1819 |
| 2380 | 0.1426 |
| 2400 | 0.1221 |
| 2420 | 0.1537 |
| 2440 | 0.1387 |
| 2460 | 0.1703 |
| 2480 | 0.1776 |
| 2500 | 0.3100 |

Transmittance average for each wavelength range

| | 2% Altiris, 2.5% Microvoid pigment |
|---|---|
| Average: 300-380 | 14% |
| Average 420-700 | 42% |
| Average 700-1000 | 45% |
| Average 1500-1600 | 50% |

Transmittance difference for each wavelength range

| | |
|---|---|
| (700-1000) vs (420-700) | 4% |
| (1500-1600) vs (700-1000) | 5% |

FIG. 63
FIG. 63: Diffuse transmittance table, diffuse transmittance versus radiation from 250 to 2500 nm monofilament, 2% Altiris, 5% Microvoid pigment Transmittance for each wavelength

| wavelength (nm) | Mono 2% Altiris, 5% Microvoid pigment |
|---|---|
| 280 | 0.1689 |
| 300 | 0.1744 |
| 320 | 0.1767 |
| 340 | 0.1750 |
| 360 | 0.1769 |
| 380 | 0.1799 |
| 400 | 0.2281 |
| 420 | 0.3232 |
| 440 | 0.3304 |
| 460 | 0.3353 |
| 480 | 0.3386 |
| 500 | 0.3443 |
| 520 | 0.3463 |
| 540 | 0.3490 |
| 560 | 0.3496 |
| 580 | 0.3516 |
| 600 | 0.3550 |
| 620 | 0.3558 |
| 640 | 0.3591 |
| 660 | 0.3606 |
| 680 | 0.3618 |
| 700 | 0.3637 |
| 720 | 0.3655 |
| 740 | 0.3675 |
| 760 | 0.3699 |
| 780 | 0.3715 |
| 800 | 0.3726 |
| 820 | 0.3744 |
| 840 | 0.3754 |
| 860 | 0.3775 |
| 880 | 0.3777 |
| 900 | 0.3793 |
| 920 | 0.3770 |
| 940 | 0.3787 |
| 960 | 0.3833 |
| 980 | 0.3856 |
| 1000 | 0.3861 |
| 1020 | 0.3863 |
| 1040 | 0.3869 |
| 1060 | 0.3915 |
| 1080 | 0.3932 |
| 1100 | 0.3948 |
| 1120 | 0.3967 |
| 1140 | 0.3973 |
| 1160 | 0.3931 |
| 1180 | 0.3826 |
| 1200 | 0.3607 |
| 1220 | 0.3427 |
| 1240 | 0.3888 |
| 1260 | 0.3996 |
| 1280 | 0.4043 |
| 1300 | 0.4063 |
| 1320 | 0.4098 |
| 1340 | 0.4110 |
| 1360 | 0.4111 |
| 1380 | 0.3992 |

FIG. 63
FIG. 63: Diffuse transmittance table, diffuse transmittance versus radiation from 250 to 2500 nm monofilament, 2% Altiris, 5% Microvoid pigment

| | |
|---|---|
| 1400 | 0.3916 |
| 1420 | 0.3817 |
| 1440 | 0.3868 |
| 1460 | 0.4014 |
| 1480 | 0.4119 |
| 1500 | 0.4186 |
| 1520 | 0.4190 |
| 1540 | 0.4173 |
| 1560 | 0.4248 |
| 1580 | 0.4264 |
| 1600 | 0.4291 |
| 1620 | 0.4310 |
| 1640 | 0.4302 |
| 1660 | 0.4266 |
| 1680 | 0.4162 |
| 1700 | 0.3884 |
| 1720 | 0.2812 |
| 1740 | 0.3002 |
| 1760 | 0.3055 |
| 1780 | 0.3490 |
| 1800 | 0.3489 |
| 1820 | 0.3457 |
| 1840 | 0.3602 |
| 1860 | 0.3780 |
| 1880 | 0.3878 |
| 1900 | 0.3888 |
| 1920 | 0.3888 |
| 1940 | 0.3891 |
| 1960 | 0.3933 |
| 1980 | 0.3990 |
| 2000 | 0.3913 |
| 2020 | 0.3959 |
| 2040 | 0.3991 |
| 2060 | 0.4031 |
| 2080 | 0.4123 |
| 2100 | 0.4263 |
| 2120 | 0.4324 |
| 2140 | 0.4281 |
| 2160 | 0.4365 |
| 2180 | 0.4281 |
| 2200 | 0.4090 |
| 2220 | 0.3941 |
| 2240 | 0.3659 |
| 2260 | 0.3443 |
| 2280 | 0.2527 |
| 2300 | 0.1783 |
| 2320 | 0.2065 |
| 2340 | 0.1970 |
| 2360 | 0.1850 |
| 2380 | 0.1770 |
| 2400 | 0.1628 |
| 2420 | 0.1726 |
| 2440 | 0.1726 |
| 2460 | 0.2093 |
| 2480 | 0.2297 |
| 2500 | 0.2018 |

Transmittance average for each wavelength range

| | 2% Altiris, 5% Microvoid pigment |
|---|---|
| Average: 300-380 | 18% |
| Average 420-700 | 35% |
| Average 700-1000 | 38% |
| Average 1500-1600 | 42% |

Transmittance difference for each wavelength range

| | |
|---|---|
| (700-1000) vs (420-700) | 3% |
| (1500-1600) vs (700-1000) | 5% |

FIG. 64
FIG. 64: Diffuse transmittance table, diffuse transmittance versus radiation from 250 to 2500 nm monofilament, 2% Altiris, 14% Microvoid pigment Transmittance for each wavelength

| wavelength (nm) | Mono 2% Altiris, 14% Microvoid pigment |
|---|---|
| 280 | 0.0127 |
| 300 | 0.0081 |
| 320 | 0.0009 |
| 340 | 0.0037 |
| 360 | 0.0053 |
| 380 | 0.0085 |
| 400 | 0.0320 |
| 420 | 0.1225 |
| 440 | 0.1308 |
| 460 | 0.1347 |
| 480 | 0.1375 |
| 500 | 0.1404 |
| 520 | 0.1429 |
| 540 | 0.1450 |
| 560 | 0.1472 |
| 580 | 0.1492 |
| 600 | 0.1508 |
| 620 | 0.1521 |
| 640 | 0.1540 |
| 660 | 0.1560 |
| 680 | 0.1579 |
| 700 | 0.1598 |
| 720 | 0.1616 |
| 740 | 0.1624 |
| 760 | 0.1662 |
| 780 | 0.1655 |
| 800 | 0.1669 |
| 820 | 0.1682 |
| 840 | 0.1695 |
| 860 | 0.1710 |
| 880 | 0.1722 |
| 900 | 0.1728 |
| 920 | 0.1716 |
| 940 | 0.1721 |
| 960 | 0.1761 |
| 980 | 0.1790 |
| 1000 | 0.1795 |
| 1020 | 0.1868 |
| 1040 | 0.1853 |
| 1060 | 0.1902 |
| 1080 | 0.1897 |
| 1100 | 0.1913 |
| 1120 | 0.1843 |
| 1140 | 0.2074 |
| 1160 | 0.1873 |
| 1180 | 0.1941 |
| 1200 | 0.1724 |
| 1220 | 0.1433 |
| 1240 | 0.1853 |
| 1260 | 0.2062 |
| 1280 | 0.1979 |
| 1300 | 0.2200 |
| 1320 | 0.2115 |
| 1340 | 0.2109 |
| 1360 | 0.2391 |
| 1380 | 0.2527 |
| 1400 | 0.2066 |
| 1420 | 0.1779 |
| 1440 | 0.1920 |
| 1460 | 0.2033 |
| 1480 | 0.1988 |
| 1500 | 0.2109 |
| 1520 | 0.2252 |
| 1540 | 0.2130 |
| 1560 | 0.2180 |
| 1580 | 0.2206 |
| 1600 | 0.2312 |
| 1620 | 0.2233 |
| 1640 | 0.2178 |

FIG. 64
FIG. 64: Diffuse transmittance table, diffuse transmittance versus radiation from 250 to 2500 nm monofilament, 2% Altiris, 14% Microvoid pigment

| | |
|---|---|
| 1660 | 0.2293 |
| 1680 | 0.2097 |
| 1700 | 0.1792 |
| 1720 | 0.0887 |
| 1740 | 0.1091 |
| 1760 | 0.1164 |
| 1780 | 0.1612 |
| 1800 | 0.1555 |
| 1820 | 0.0587 |
| 1840 | 0.1516 |
| 1860 | 0.1183 |
| 1880 | 0.1865 |
| 1900 | 0.1415 |
| 1920 | 0.1225 |
| 1940 | 0.2151 |
| 1960 | 0.1865 |
| 1980 | 0.1988 |
| 2000 | 0.2026 |
| 2020 | 0.1843 |
| 2040 | 0.2164 |
| 2060 | 0.2087 |
| 2080 | 0.2360 |
| 2100 | 0.2311 |
| 2120 | 0.2452 |
| 2140 | 0.2312 |
| 2160 | 0.2432 |
| 2180 | 0.2290 |
| 2200 | 0.2052 |
| 2220 | 0.2372 |
| 2240 | 0.1495 |
| 2260 | 0.1791 |
| 2280 | 0.1171 |
| 2300 | 0.0379 |
| 2320 | −0.0083 |
| 2340 | 0.0317 |
| 2360 | 0.0249 |
| 2380 | −0.0277 |
| 2400 | 0.0280 |
| 2420 | −0.0482 |
| 2440 | 0.0478 |
| 2460 | 0.0161 |
| 2480 | 0.0405 |
| 2500 | 0.0214 |

Transmittance average for each wavelength range

| | 2% Altiris, 14% Microvoid pigment |
|---|---|
| Average: 300-380 | 1% |
| Average 420-700 | 15% |
| Average 700-1000 | 17% |
| Average 1500-1600 | 22% |

Transmittance difference for each wavelength range

| | |
|---|---|
| (700-1000) vs (420-700) | 2% |
| (1500-1600) vs (700-1000) | 5% |

FIG. 65
FIG. 65: Diffuse transmittance table, diffuse transmittance versus radiation from 250 to 2500 nm monofilament, 1% TiO2, 5% Microvoid pigment Transmittance for each wavelength

| wavelength (nm) | Mono 1% TiO2, 5% Microvoid pigment |
|---|---|
| 280 | 0.1295 |
| 300 | 0.1514 |
| 320 | 0.1334 |
| 340 | 0.1351 |
| 360 | 0.1342 |
| 380 | 0.1934 |
| 400 | 0.3964 |
| 420 | 0.4087 |
| 440 | 0.4151 |
| 460 | 0.4206 |
| 480 | 0.4253 |
| 500 | 0.4292 |
| 520 | 0.4333 |
| 540 | 0.4373 |
| 560 | 0.4404 |
| 580 | 0.4436 |
| 600 | 0.4464 |
| 620 | 0.4499 |
| 640 | 0.4530 |
| 660 | 0.4554 |
| 680 | 0.4578 |
| 700 | 0.4602 |
| 720 | 0.4623 |
| 740 | 0.4653 |
| 760 | 0.4678 |
| 780 | 0.4701 |
| 800 | 0.4717 |
| 820 | 0.4739 |
| 840 | 0.4755 |
| 860 | 0.4782 |
| 880 | 0.4795 |
| 900 | 0.4808 |
| 920 | 0.4797 |
| 940 | 0.4809 |
| 960 | 0.4877 |
| 980 | 0.4902 |
| 1000 | 0.4918 |
| 1020 | 0.4905 |
| 1040 | 0.4945 |
| 1060 | 0.4991 |
| 1080 | 0.5015 |
| 1100 | 0.5059 |
| 1120 | 0.5078 |
| 1140 | 0.5084 |
| 1160 | 0.5025 |
| 1180 | 0.4911 |
| 1200 | 0.4654 |
| 1220 | 0.4443 |
| 1240 | 0.4987 |
| 1260 | 0.5128 |
| 1280 | 0.5185 |
| 1300 | 0.5212 |
| 1320 | 0.5251 |
| 1340 | 0.5271 |
| 1360 | 0.5274 |
| 1380 | 0.5142 |
| 1400 | 0.5015 |
| 1420 | 0.4922 |
| 1440 | 0.4998 |
| 1460 | 0.5150 |
| 1480 | 0.5285 |
| 1500 | 0.5352 |
| 1520 | 0.5377 |
| 1540 | 0.5328 |
| 1560 | 0.5439 |
| 1580 | 0.5466 |
| 1600 | 0.5502 |
| 1620 | 0.5494 |
| 1640 | 0.5510 |
| 1660 | 0.5468 |
| 1680 | 0.5342 |
| 1700 | 0.5038 |
| 1720 | 0.3778 |

FIG. 65
FIG. 65: Diffuse transmittance table, diffuse transmittance versus radiation from 250 to 2500 nm monofilament, 1% TiO2, 5% Microvoid pigment

| | |
|---|---|
| 1740 | 0.4028 |
| 1760 | 0.4050 |
| 1780 | 0.4586 |
| 1800 | 0.4555 |
| 1820 | 0.4567 |
| 1840 | 0.4708 |
| 1860 | 0.4937 |
| 1880 | 0.5035 |
| 1900 | 0.5042 |
| 1920 | 0.5075 |
| 1940 | 0.5087 |
| 1960 | 0.5100 |
| 1980 | 0.5149 |
| 2000 | 0.5136 |
| 2020 | 0.5113 |
| 2040 | 0.5188 |
| 2060 | 0.5265 |
| 2080 | 0.5355 |
| 2100 | 0.5480 |
| 2120 | 0.5540 |
| 2140 | 0.5495 |
| 2160 | 0.5468 |
| 2180 | 0.5474 |
| 2200 | 0.5267 |
| 2220 | 0.5117 |
| 2240 | 0.4873 |
| 2260 | 0.4582 |
| 2280 | 0.3653 |
| 2300 | 0.2185 |
| 2320 | 0.2658 |
| 2340 | 0.2639 |
| 2360 | 0.2413 |
| 2380 | 0.2081 |
| 2400 | 0.2098 |
| 2420 | 0.1953 |
| 2440 | 0.1792 |
| 2460 | 0.2753 |
| 2480 | 0.2889 |
| 2500 | 0.2870 |

Transmittance average for each wavelength range

| | 1% TiO2, 5% Microvoid pigment |
|---|---|
| Average: 300-380 | 15% |
| Average 420-700 | 44% |
| Average 700-1000 | 48% |
| Average 1500-1600 | 54% |

Transmittance difference for each wavelength range

| | |
|---|---|
| (700-1000) vs (420-700) | 4% |
| (1500-1600) vs (700-1000) | 7% |

FIG. 66
FIG. 66: Diffuse transmittance table, diffuse transmittance versus radiation from 250 to 2500 nm monofilament, 1% TiO2, 10% Microvoid pigment Transmittance for each wavelength

| wavelength (nm) | Mono 1% TiO2, 10% Microvoid pigment |
|---|---|
| 280 | 0.1019 |
| 300 | 0.1012 |
| 320 | 0.1071 |
| 340 | 0.1091 |
| 360 | 0.1070 |
| 380 | 0.1161 |
| 400 | 0.1992 |
| 420 | 0.3024 |
| 440 | 0.3109 |
| 460 | 0.3162 |
| 480 | 0.3210 |
| 500 | 0.3263 |
| 520 | 0.3305 |
| 540 | 0.3359 |
| 560 | 0.3396 |
| 580 | 0.3451 |
| 600 | 0.3487 |
| 620 | 0.3519 |
| 640 | 0.3562 |
| 660 | 0.3594 |
| 680 | 0.3631 |
| 700 | 0.3660 |
| 720 | 0.3693 |
| 740 | 0.3719 |
| 760 | 0.3750 |
| 780 | 0.3781 |
| 800 | 0.3816 |
| 820 | 0.3839 |
| 840 | 0.3870 |
| 860 | 0.3896 |
| 880 | 0.3912 |
| 900 | 0.3937 |
| 920 | 0.3928 |
| 940 | 0.3952 |
| 960 | 0.4023 |
| 980 | 0.4060 |
| 1000 | 0.4078 |
| 1020 | 0.4113 |
| 1040 | 0.4134 |
| 1060 | 0.4170 |
| 1080 | 0.4233 |
| 1100 | 0.4269 |
| 1120 | 0.4296 |
| 1140 | 0.4305 |
| 1160 | 0.4247 |
| 1180 | 0.4125 |
| 1200 | 0.3845 |
| 1220 | 0.3616 |
| 1240 | 0.4224 |
| 1260 | 0.4376 |
| 1280 | 0.4452 |
| 1300 | 0.4485 |
| 1320 | 0.4534 |
| 1340 | 0.4551 |
| 1360 | 0.4564 |
| 1380 | 0.4405 |
| 1400 | 0.4278 |
| 1420 | 0.4167 |
| 1440 | 0.4254 |
| 1460 | 0.4432 |
| 1480 | 0.4568 |
| 1500 | 0.4656 |
| 1520 | 0.4676 |
| 1540 | 0.4639 |
| 1560 | 0.4753 |
| 1580 | 0.4798 |
| 1600 | 0.4818 |
| 1620 | 0.4840 |
| 1640 | 0.4829 |
| 1660 | 0.4791 |
| 1680 | 0.4649 |
| 1700 | 0.4299 |
| 1720 | 0.2932 |
| 1740 | 0.3187 |
| 1760 | 0.3220 |
| 1780 | 0.3805 |
| 1800 | 0.3769 |
| 1820 | 0.3780 |
| 1840 | 0.3945 |

FIG. 66
FIG. 66: Diffuse transmittance table, diffuse transmittance versus radiation from 250 to 2500 nm monofilament, 1% TiO2, 10% Microvoid pigment

| wavelength (nm) | Transmittance |
|---|---|
| 1860 | 0.4159 |
| 1880 | 0.4305 |
| 1900 | 0.4334 |
| 1920 | 0.4298 |
| 1940 | 0.4365 |
| 1960 | 0.4361 |
| 1980 | 0.4426 |
| 2000 | 0.4361 |
| 2020 | 0.4418 |
| 2040 | 0.4426 |
| 2060 | 0.4470 |
| 2080 | 0.4633 |
| 2100 | 0.4694 |
| 2120 | 0.4845 |
| 2140 | 0.4810 |
| 2160 | 0.4875 |
| 2180 | 0.4726 |
| 2200 | 0.4664 |
| 2220 | 0.4399 |
| 2240 | 0.3974 |
| 2260 | 0.3567 |
| 2280 | 0.2502 |
| 2300 | 0.1411 |
| 2320 | 0.1961 |
| 2340 | 0.1878 |
| 2360 | 0.1519 |
| 2380 | 0.1203 |
| 2400 | 0.1295 |
| 2420 | 0.1299 |
| 2440 | 0.1629 |
| 2460 | 0.1380 |
| 2480 | 0.1419 |
| 2500 | 0.2077 |

Transmittance average for each wavelength range

| | 1% TiO2, 10% Microvoid pigment |
|---|---|
| Average: 300-380 | 11% |
| Average 420-700 | 34% |
| Average 700-1000 | 39% |
| Average 1500-1600 | 47% |

Transmittance difference for each wavelength range

| | |
|---|---|
| (700-1000) vs (420-700) | 5% |
| (1500-1600) vs (700-1000) | 9% |

FIG. 67
FIG. 67: Diffuse transmittance table, diffuse transmittance versus radiation from 250 to 2500 nm monofilament, 1% TiO2, 14% Microvoid pigment Transmittance for each wavelength

| wavelength (nm) | Mono 1% TiO2, 14% Microvoid pigment |
|---|---|
| 280 | 0.1586 |
| 300 | 0.0011 |
| 320 | 0.0558 |
| 340 | 0.0504 |
| 360 | 0.0565 |
| 380 | 0.0625 |
| 400 | 0.0983 |
| 420 | 0.1650 |
| 440 | 0.1700 |
| 460 | 0.1733 |
| 480 | 0.1759 |
| 500 | 0.1790 |
| 520 | 0.1811 |
| 540 | 0.1845 |
| 560 | 0.1871 |
| 580 | 0.1901 |
| 600 | 0.1919 |
| 620 | 0.1962 |
| 640 | 0.1968 |
| 660 | 0.1994 |
| 680 | 0.2016 |
| 700 | 0.2040 |
| 720 | 0.2061 |
| 740 | 0.2116 |
| 760 | 0.2070 |
| 780 | 0.2120 |
| 800 | 0.2147 |
| 820 | 0.2181 |
| 840 | 0.2222 |
| 860 | 0.2262 |
| 880 | 0.2289 |
| 900 | 0.2300 |
| 920 | 0.2295 |
| 940 | 0.2295 |
| 960 | 0.2357 |
| 980 | 0.2373 |
| 1000 | 0.2377 |
| 1020 | 0.2487 |
| 1040 | 0.2515 |
| 1060 | 0.2415 |
| 1080 | 0.2555 |
| 1100 | 0.2474 |
| 1120 | 0.2454 |
| 1140 | 0.2635 |
| 1160 | 0.2534 |
| 1180 | 0.2372 |
| 1200 | 0.2190 |
| 1220 | 0.2012 |
| 1240 | 0.2457 |
| 1260 | 0.2693 |
| 1280 | 0.2686 |
| 1300 | 0.2680 |
| 1320 | 0.2734 |
| 1340 | 0.2790 |
| 1360 | 0.2437 |
| 1380 | 0.4001 |
| 1400 | 0.3106 |
| 1420 | 0.2521 |
| 1440 | 0.2371 |
| 1460 | 0.2591 |
| 1480 | 0.2686 |
| 1500 | 0.2797 |
| 1520 | 0.2818 |
| 1540 | 0.2802 |
| 1560 | 0.2857 |
| 1580 | 0.2876 |
| 1600 | 0.2783 |
| 1620 | 0.2911 |
| 1640 | 0.2827 |
| 1660 | 0.2960 |
| 1680 | 0.2783 |
| 1700 | 0.2541 |
| 1720 | 0.1579 |
| 1740 | 0.1734 |
| 1760 | 0.1803 |
| 1780 | 0.2204 |
| 1800 | 0.2404 |
| 1820 | 0.1731 |
| 1840 | 0.0493 |
| 1860 | 0.2879 |
| 1880 | 0.2964 |
| 1900 | 0.2550 |
| 1920 | 0.3255 |
| 1940 | 0.2896 |
| 1960 | 0.2646 |
| 1980 | 0.2649 |

FIG. 67
FIG. 67: Diffuse transmittance table, diffuse transmittance versus radiation from 250 to 2500 nm monofilament, 1% TiO2, 14% Microvoid pigment

| | |
|---|---|
| 2000 | 0.2667 |
| 2020 | 0.2648 |
| 2040 | 0.2872 |
| 2060 | 0.2884 |
| 2080 | 0.3061 |
| 2100 | 0.3223 |
| 2120 | 0.3194 |
| 2140 | 0.3294 |
| 2160 | 0.3429 |
| 2180 | 0.3121 |
| 2200 | 0.2870 |
| 2220 | 0.3077 |
| 2240 | 0.2561 |
| 2260 | 0.2121 |
| 2280 | 0.1737 |
| 2300 | 0.0774 |
| 2320 | 0.0598 |
| 2340 | 0.1124 |
| 2360 | 0.0675 |
| 2380 | 0.0579 |
| 2400 | 0.0429 |
| 2420 | 0.0757 |
| 2440 | 0.0812 |
| 2460 | 0.1693 |
| 2480 | 0.0506 |
| 2500 | 0.1911 |

Transmittance average for each wavelength range

| | 1% TiO2, 14% Microvoid pigment |
|---|---|
| Average: 300-380 | 5% |
| Average 420-700 | 19% |
| Average 700-1000 | 22% |
| Average 1500-1600 | 28% |

Transmittance difference for each wavelength range

| | |
|---|---|
| (700-1000) vs (420-700) | 4% |
| (1500-1600) vs (700-1000) | 6% |

FIG. 68
FIG. 68: Diffuse transmittance table, diffuse transmittance versus radiation from 250 to 2500 nm monofilament, 2% ZnO nano, 2.5% Microvoid pigment Transmittance for each wavelength

| wavelength (nm) | Mono 2% ZnO nano, 2.5% Microvoid pigment |
|---|---|
| 280 | 0.1399 |
| 300 | 0.1434 |
| 320 | 0.1346 |
| 340 | 0.1385 |
| 360 | 0.1362 |
| 380 | 0.1652 |
| 400 | 0.3349 |
| 420 | 0.4034 |
| 440 | 0.4113 |
| 460 | 0.4171 |
| 480 | 0.4233 |
| 500 | 0.4271 |
| 520 | 0.4325 |
| 540 | 0.4367 |
| 560 | 0.4396 |
| 580 | 0.4429 |
| 600 | 0.4465 |
| 620 | 0.4475 |
| 640 | 0.4531 |
| 660 | 0.4540 |
| 680 | 0.4581 |
| 700 | 0.4582 |
| 720 | 0.4585 |
| 740 | 0.4632 |
| 760 | 0.4645 |
| 780 | 0.4676 |
| 800 | 0.4681 |
| 820 | 0.4697 |
| 840 | 0.4716 |
| 860 | 0.4732 |
| 880 | 0.4742 |
| 900 | 0.4773 |
| 920 | 0.4740 |
| 940 | 0.4743 |
| 960 | 0.4830 |
| 980 | 0.4835 |
| 1000 | 0.4862 |
| 1020 | 0.4861 |
| 1040 | 0.4870 |
| 1060 | 0.4938 |
| 1080 | 0.4956 |
| 1100 | 0.5009 |
| 1120 | 0.4998 |
| 1140 | 0.5042 |
| 1160 | 0.4961 |
| 1180 | 0.4834 |
| 1200 | 0.4575 |
| 1220 | 0.4337 |
| 1240 | 0.4910 |
| 1260 | 0.5032 |
| 1280 | 0.5109 |
| 1300 | 0.5121 |
| 1320 | 0.5178 |
| 1340 | 0.5164 |
| 1360 | 0.5201 |
| 1380 | 0.4988 |
| 1400 | 0.4934 |
| 1420 | 0.4812 |
| 1440 | 0.4910 |
| 1460 | 0.5047 |
| 1480 | 0.5146 |
| 1500 | 0.5253 |
| 1520 | 0.5244 |
| 1540 | 0.5225 |
| 1560 | 0.5315 |
| 1580 | 0.5387 |
| 1600 | 0.5365 |
| 1620 | 0.5354 |
| 1640 | 0.5396 |
| 1660 | 0.5333 |
| 1680 | 0.5207 |
| 1700 | 0.4865 |
| 1720 | 0.3589 |
| 1740 | 0.3818 |
| 1760 | 0.3877 |
| 1780 | 0.4401 |
| 1800 | 0.4402 |
| 1820 | 0.4389 |
| 1840 | 0.4566 |
| 1860 | 0.4746 |
| 1880 | 0.4861 |
| 1900 | 0.4925 |
| 1920 | 0.4870 |
| 1940 | 0.4922 |
| 1960 | 0.4925 |
| 1980 | 0.4995 |
| 2000 | 0.4945 |
| 2020 | 0.5033 |
| 2040 | 0.5024 |
| 2060 | 0.4992 |
| 2080 | 0.5218 |

FIG. 68
FIG. 68: Diffuse transmittance table, diffuse transmittance versus radiation from 250 to 2500 nm monofilament, 2% ZnO nano, 2.5% Microvoid pigment

| | |
|---|---|
| 2100 | 0.5240 |
| 2120 | 0.5366 |
| 2140 | 0.5317 |
| 2160 | 0.5369 |
| 2180 | 0.5286 |
| 2200 | 0.5179 |
| 2220 | 0.4766 |
| 2240 | 0.4706 |
| 2260 | 0.4181 |
| 2280 | 0.3297 |
| 2300 | 0.2068 |
| 2320 | 0.2625 |
| 2340 | 0.2548 |
| 2360 | 0.2281 |
| 2380 | 0.1889 |
| 2400 | 0.1881 |
| 2420 | 0.2114 |
| 2440 | 0.1850 |
| 2460 | 0.2678 |
| 2480 | 0.2620 |
| 2500 | 0.3022 |

Transmittance average for each wavelength range

| | 2% ZnO nano, 2.5% Microvoid pigment |
|---|---|
| Average: 300-380 | 14% |
| Average 420-700 | 44% |
| Average 700-1000 | 47% |
| Average 1500-1600 | 53% |

Transmittance difference for each wavelength range

| | |
|---|---|
| (700-1000) vs (420-700) | 3% |
| (1500-1600) vs (700-1000) | 6% |

Prior Art Crop Cover Material

FIG. 69
FIG. 69: Diffuse transmittance table, diffuse transmittance versus radiation from 250 to 2500 nm film extruded onto woven fabic, Polymer only Transmittance for each wavelength - crop cover Film extruded onto woven fabric

| wavelength (nm) | Polymer only |
|---|---|
| 280 | 0.5959 |
| 300 | 0.7082 |
| 320 | 0.7367 |
| 340 | 0.7502 |
| 360 | 0.7624 |
| 380 | 0.7712 |
| 400 | 0.7770 |
| 420 | 0.7812 |
| 440 | 0.7851 |
| 460 | 0.7883 |
| 480 | 0.7910 |
| 500 | 0.7929 |
| 520 | 0.7952 |
| 540 | 0.7969 |
| 560 | 0.7985 |
| 580 | 0.7996 |
| 600 | 0.8004 |
| 620 | 0.8017 |
| 640 | 0.8018 |
| 660 | 0.8021 |
| 680 | 0.8010 |
| 700 | 0.8063 |
| 720 | 0.8071 |
| 740 | 0.8082 |
| 760 | 0.8089 |
| 780 | 0.8099 |
| 800 | 0.8101 |
| 820 | 0.8102 |
| 840 | 0.8110 |
| 860 | 0.8114 |
| 880 | 0.8120 |
| 900 | 0.8119 |
| 920 | 0.8115 |
| 940 | 0.8113 |
| 960 | 0.8138 |
| 980 | 0.8141 |
| 1000 | 0.8147 |
| 1020 | 0.8146 |
| 1040 | 0.8153 |
| 1060 | 0.8154 |
| 1080 | 0.8168 |
| 1100 | 0.8167 |
| 1120 | 0.8172 |
| 1140 | 0.8178 |
| 1160 | 0.8144 |
| 1180 | 0.8096 |
| 1200 | 0.7980 |
| 1220 | 0.7892 |
| 1240 | 0.8109 |
| 1260 | 0.8156 |
| 1280 | 0.8169 |
| 1300 | 0.8183 |
| 1320 | 0.8187 |
| 1340 | 0.8183 |
| 1360 | 0.8177 |
| 1380 | 0.8114 |
| 1400 | 0.8068 |
| 1420 | 0.8014 |
| 1440 | 0.8033 |
| 1460 | 0.8098 |
| 1480 | 0.8140 |
| 1500 | 0.8167 |
| 1520 | 0.8166 |
| 1540 | 0.8149 |
| 1560 | 0.8175 |
| 1580 | 0.8180 |
| 1600 | 0.8195 |
| 1620 | 0.8180 |
| 1640 | 0.8179 |
| 1660 | 0.8171 |
| 1680 | 0.8104 |
| 1700 | 0.7931 |
| 1720 | 0.7127 |
| 1740 | 0.7360 |
| 1760 | 0.7324 |
| 1780 | 0.7687 |
| 1800 | 0.7661 |
| 1820 | 0.7659 |
| 1840 | 0.7727 |
| 1860 | 0.7827 |
| 1880 | 0.7859 |
| 1900 | 0.7848 |
| 1920 | 0.7841 |
| 1940 | 0.7891 |
| 1960 | 0.7853 |
| 1980 | 0.7893 |
| 2000 | 0.7854 |
| 2020 | 0.7842 |
| 2040 | 0.7905 |
| 2060 | 0.7900 |
| 2080 | 0.7931 |
| 2100 | 0.7999 |
| 2120 | 0.8020 |
| 2140 | 0.7982 |
| 2160 | 0.8054 |
| 2180 | 0.7956 |
| 2200 | 0.7916 |

FIG. 69

FIG. 69: Diffuse transmittance table, diffuse transmittance versus radiation from 250 to 2500 nm film extruded onto woven fabic, Polymer only

| wavelength | Polymer only |
|---|---|
| 2220 | 0.7914 |
| 2240 | 0.7633 |
| 2260 | 0.7478 |
| 2280 | 0.6630 |
| 2300 | 0.4002 |
| 2320 | 0.5265 |
| 2340 | 0.4911 |
| 2360 | 0.4559 |
| 2380 | 0.3721 |
| 2400 | 0.3656 |
| 2420 | 0.4014 |
| 2440 | 0.3965 |
| 2460 | 0.5188 |
| 2480 | 0.5480 |
| 2500 | 0.6022 |

Transmittance average for each wavelength range

|  | Polymer only |
|---|---|
| Average: 300-380 | 75% |
| Average 420-700 | 80% |
| Average 700-1000 | 81% |
| Average 1500-1600 | 82% |

Transmittance difference for each wavelength range

| | |
|---|---|
| (700-1000) vs (420-700) | 1% |
| (1500-1600) vs (700-1000) | 1% |

FIG. 70

FIG. 70: Diffuse transmittance table, diffuse transmittance versus radiation from 250 to 2500 nm monofilament, 1% TiO2

Transmittance for each wavelength - crop cover

| wavelength (nm) | Mono 1% TiO2 |
|---|---|
| 280 | 0.1403 |
| 300 | 0.1553 |
| 320 | 0.1540 |
| 340 | 0.1557 |
| 360 | 0.1554 |
| 380 | 0.1629 |
| 400 | 0.2955 |
| 420 | 0.4304 |
| 440 | 0.4419 |
| 460 | 0.4527 |
| 480 | 0.4616 |
| 500 | 0.4716 |
| 520 | 0.4803 |
| 540 | 0.4899 |
| 560 | 0.4975 |
| 580 | 0.5058 |
| 600 | 0.5126 |
| 620 | 0.5220 |
| 640 | 0.5281 |
| 660 | 0.5357 |
| 680 | 0.5412 |
| 700 | 0.5490 |
| 720 | 0.5557 |
| 740 | 0.5642 |
| 760 | 0.5681 |
| 780 | 0.5745 |
| 800 | 0.5786 |
| 820 | 0.5848 |
| 840 | 0.5910 |
| 860 | 0.5952 |
| 880 | 0.6020 |
| 900 | 0.6051 |
| 920 | 0.6078 |
| 940 | 0.6110 |
| 960 | 0.6220 |
| 980 | 0.6262 |
| 1000 | 0.6322 |
| 1020 | 0.6325 |
| 1040 | 0.6398 |
| 1060 | 0.6494 |
| 1080 | 0.6549 |
| 1100 | 0.6632 |
| 1120 | 0.6669 |
| 1140 | 0.6719 |
| 1160 | 0.6689 |
| 1180 | 0.6601 |
| 1200 | 0.6365 |
| 1220 | 0.6171 |
| 1240 | 0.6765 |
| 1260 | 0.6934 |
| 1280 | 0.7018 |
| 1300 | 0.7086 |
| 1320 | 0.7141 |
| 1340 | 0.7195 |
| 1360 | 0.7239 |
| 1380 | 0.7124 |
| 1400 | 0.7019 |
| 1420 | 0.6927 |
| 1440 | 0.7034 |
| 1460 | 0.7208 |
| 1480 | 0.7362 |
| 1500 | 0.7446 |
| 1520 | 0.7498 |
| 1540 | 0.7471 |
| 1560 | 0.7591 |
| 1580 | 0.7651 |
| 1600 | 0.7684 |
| 1620 | 0.7710 |
| 1640 | 0.7720 |
| 1660 | 0.7717 |
| 1680 | 0.7588 |
| 1700 | 0.7328 |
| 1720 | 0.6035 |
| 1740 | 0.6319 |
| 1760 | 0.6363 |
| 1780 | 0.6921 |
| 1800 | 0.6904 |
| 1820 | 0.6923 |
| 1840 | 0.7082 |
| 1860 | 0.7279 |
| 1880 | 0.7418 |
| 1900 | 0.7449 |
| 1920 | 0.7433 |
| 1940 | 0.7503 |
| 1960 | 0.7503 |
| 1980 | 0.7557 |
| 2000 | 0.7485 |
| 2020 | 0.7550 |
| 2040 | 0.7553 |
| 2060 | 0.7603 |
| 2080 | 0.7775 |
| 2100 | 0.7859 |
| 2120 | 0.7867 |
| 2140 | 0.7897 |
| 2160 | 0.7928 |
| 2180 | 0.7868 |
| 2200 | 0.7716 |
| 2220 | 0.7602 |
| 2240 | 0.7382 |
| 2260 | 0.6907 |
| 2280 | 0.5714 |
| 2300 | 0.3504 |
| 2320 | 0.4424 |
| 2340 | 0.4320 |
| 2360 | 0.3938 |
| 2380 | 0.3078 |
| 2400 | 0.3284 |

FIG. 70
FIG. 70: Diffuse transmittance table, diffuse transmittance versus radiation from 250 to 2500 nm monofilament, 1% TiO2

| | |
|---|---|
| 2420 | 0.3304 |
| 2440 | 0.3403 |
| 2460 | 0.4542 |
| 2480 | 0.4867 |
| 2500 | 0.5986 |

Transmittance average for each wavelength range

| | 1% TiO2 |
|---|---|
| Average: 300-380 | 16% |
| Average 420-700 | 49% |
| Average 700-1000 | 59% |
| Average 1500-1600 | 76% |

Transmittance difference for each wavelength range

| | |
|---|---|
| (700-1000) vs (420-700) | 10% |
| (1500-1600) vs (700-1000) | 16% |

FIG. 71
FIG. 71: Diffuse transmittance table, diffuse transmittance versus radiation from 250 to 2500 nm film, 2% TiO2

Transmittance for each wavelength - crop cover

| wavelength (nm) | Film 2% TiO2 |
|---|---|
| 280 | 0.012 |
| 300 | 0.002 |
| 320 | 0.001 |
| 340 | 0.001 |
| 360 | 0.001 |
| 380 | 0.001 |
| 400 | 0.036 |
| 420 | 0.218 |
| 440 | 0.229 |
| 460 | 0.237 |
| 480 | 0.244 |
| 500 | 0.252 |
| 520 | 0.260 |
| 540 | 0.268 |
| 560 | 0.275 |
| 580 | 0.283 |
| 600 | 0.288 |
| 620 | 0.297 |
| 640 | 0.302 |
| 660 | 0.306 |
| 680 | 0.302 |
| 700 | 0.332 |
| 720 | 0.341 |
| 740 | 0.348 |
| 760 | 0.355 |
| 780 | 0.363 |
| 800 | 0.370 |
| 820 | 0.376 |
| 840 | 0.383 |
| 860 | 0.390 |
| 880 | 0.396 |
| 900 | 0.401 |
| 920 | 0.402 |
| 940 | 0.407 |
| 960 | 0.419 |
| 980 | 0.426 |
| 1000 | 0.431 |
| 1020 | 0.435 |
| 1040 | 0.438 |
| 1060 | 0.445 |
| 1080 | 0.451 |
| 1100 | 0.457 |
| 1120 | 0.462 |
| 1140 | 0.466 |
| 1160 | 0.457 |
| 1180 | 0.445 |
| 1200 | 0.407 |
| 1220 | 0.388 |
| 1240 | 0.464 |
| 1260 | 0.486 |
| 1280 | 0.497 |
| 1300 | 0.504 |
| 1320 | 0.512 |
| 1340 | 0.518 |
| 1360 | 0.521 |
| 1380 | 0.503 |
| 1400 | 0.492 |
| 1420 | 0.480 |
| 1440 | 0.495 |
| 1460 | 0.519 |
| 1480 | 0.539 |
| 1500 | 0.550 |
| 1520 | 0.557 |
| 1540 | 0.557 |
| 1560 | 0.573 |
| 1580 | 0.580 |
| 1600 | 0.585 |
| 1620 | 0.590 |
| 1640 | 0.593 |
| 1660 | 0.592 |
| 1680 | 0.577 |
| 1700 | 0.523 |
| 1720 | 0.374 |
| 1740 | 0.423 |
| 1760 | 0.420 |
| 1780 | 0.494 |
| 1800 | 0.497 |
| 1820 | 0.504 |
| 1840 | 0.526 |
| 1860 | 0.556 |
| 1880 | 0.573 |
| 1900 | 0.579 |
| 1920 | 0.582 |
| 1940 | 0.590 |
| 1960 | 0.595 |
| 1980 | 0.605 |
| 2000 | 0.602 |
| 2020 | 0.612 |
| 2040 | 0.619 |
| 2060 | 0.629 |
| 2080 | 0.645 |
| 2100 | 0.659 |
| 2120 | 0.670 |
| 2140 | 0.671 |
| 2160 | 0.672 |
| 2180 | 0.667 |
| 2200 | 0.655 |
| 2220 | 0.649 |
| 2240 | 0.621 |
| 2260 | 0.575 |
| 2280 | 0.444 |
| 2300 | 0.206 |
| 2320 | 0.329 |
| 2340 | 0.285 |
| 2360 | 0.288 |
| 2380 | 0.211 |
| 2400 | 0.205 |
| 2420 | 0.237 |
| 2440 | 0.244 |
| 2460 | 0.360 |
| 2480 | 0.392 |
| 2500 | 0.468 |

Transmittance average for each wavelength range

| | 2% TiO2 |
|---|---|
| Average: 300-380 | 0% |

FIG. 71

FIG. 71: Diffuse transmittance table, diffuse transmittance versus radiation from 250 to 2500 nm film, 2% TiO2

| | |
|---|---|
| Average 420-700 | 27% |
| Average 700-1000 | 38% |
| Average 1500-1600 | 57% |

Transmittance difference for each wavelength range

| | |
|---|---|
| (700-1000) vs (420-700) | 11% |
| (1500-1600) vs (700-1000) | 18% |

Crop Cover Material of the Invention

FIG. 72

FIG. 72: Diffuse transmittance table, diffuse transmittance versus radiation from 250 to 2500 nm film extruded onto woven fabic, 3% Altiris Transmittance for each wavelength - crop cover Film extruded onto woven fabric

| wavelength (nm) | 3% Altiris |
|---|---|
| 280 | 0.1840 |
| 300 | 0.1255 |
| 320 | 0.1469 |
| 340 | 0.1261 |
| 360 | 0.1316 |
| 380 | 0.2565 |
| 400 | 0.4897 |
| 420 | 0.5861 |
| 440 | 0.6138 |
| 460 | 0.6274 |
| 480 | 0.6320 |
| 500 | 0.6345 |
| 520 | 0.6364 |
| 540 | 0.6377 |
| 560 | 0.6381 |
| 580 | 0.6386 |
| 600 | 0.6386 |
| 620 | 0.6384 |
| 640 | 0.6375 |
| 660 | 0.6370 |
| 680 | 0.6354 |
| 700 | 0.6373 |
| 720 | 0.6368 |
| 740 | 0.6368 |
| 760 | 0.6362 |
| 780 | 0.6365 |
| 800 | 0.6361 |
| 820 | 0.6362 |
| 840 | 0.6359 |
| 860 | 0.6362 |
| 880 | 0.6357 |
| 900 | 0.6351 |
| 920 | 0.6328 |
| 940 | 0.6322 |
| 960 | 0.6365 |
| 980 | 0.6370 |
| 1000 | 0.6372 |
| 1020 | 0.6355 |
| 1040 | 0.6358 |
| 1060 | 0.6374 |
| 1080 | 0.6393 |
| 1100 | 0.6404 |
| 1120 | 0.6411 |
| 1140 | 0.6414 |
| 1160 | 0.6345 |
| 1180 | 0.6249 |
| 1200 | 0.6011 |
| 1220 | 0.5846 |
| 1240 | 0.6284 |
| 1260 | 0.6387 |
| 1280 | 0.6427 |
| 1300 | 0.6442 |
| 1320 | 0.6468 |
| 1340 | 0.6481 |
| 1360 | 0.6484 |
| 1380 | 0.6362 |
| 1400 | 0.6261 |
| 1420 | 0.6171 |
| 1440 | 0.6227 |
| 1460 | 0.6356 |
| 1480 | 0.6440 |
| 1500 | 0.6487 |
| 1520 | 0.6505 |
| 1540 | 0.6479 |
| 1560 | 0.6558 |
| 1580 | 0.6586 |
| 1600 | 0.6590 |
| 1620 | 0.6601 |
| 1640 | 0.6591 |
| 1660 | 0.6567 |
| 1680 | 0.6466 |
| 1700 | 0.6191 |
| 1720 | 0.5123 |
| 1740 | 0.5395 |
| 1760 | 0.5375 |
| 1780 | 0.5856 |
| 1800 | 0.5838 |
| 1820 | 0.5840 |
| 1840 | 0.5976 |
| 1860 | 0.6139 |
| 1880 | 0.6221 |
| 1900 | 0.6247 |
| 1920 | 0.6218 |
| 1940 | 0.6272 |
| 1960 | 0.6288 |
| 1980 | 0.6315 |
| 2000 | 0.6332 |
| 2020 | 0.6326 |
| 2040 | 0.6355 |
| 2060 | 0.6421 |
| 2080 | 0.6581 |
| 2100 | 0.6625 |
| 2120 | 0.6704 |
| 2140 | 0.6621 |
| 2160 | 0.6659 |
| 2180 | 0.6663 |
| 2200 | 0.6596 |
| 2220 | 0.6396 |
| 2240 | 0.6328 |
| 2260 | 0.5764 |
| 2280 | 0.4972 |
| 2300 | 0.3007 |
| 2320 | 0.4051 |
| 2340 | 0.3796 |
| 2360 | 0.3476 |
| 2380 | 0.2940 |
| 2400 | 0.2961 |
| 2420 | 0.2843 |
| 2440 | 0.3099 |
| 2460 | 0.4070 |
| 2480 | 0.4102 |
| 2500 | 0.4401 |

Transmittance average for each wavelength range

| | 3% Altiris |
|---|---|
| Average: 300-380 | 16% |
| Average 420-700 | 63% |
| Average 700-1000 | 64% |
| Average 1500-1600 | 65% |

Transmittance difference for each wavelength range

| | |
|---|---|
| (700-1000) vs (420-700) | 0% |
| (1500-1600) vs (700-1000) | 2% |

Prior Art Ground Cover Material

FIG. 73
FIG. 73: Diffuse transmittance table, diffuse transmittance versus radiation from 250 to 2500 nm tape, 2% TiO2

Transmittance for each wavelength - ground cover

| wavelength (nm) | Tape 2% TiO2 |
|---|---|
| 280 | 0.012 |
| 300 | 0.002 |
| 320 | 0.001 |
| 340 | 0.001 |
| 360 | 0.001 |
| 380 | 0.001 |
| 400 | 0.036 |
| 420 | 0.218 |
| 440 | 0.229 |
| 460 | 0.237 |
| 480 | 0.244 |
| 500 | 0.252 |
| 520 | 0.260 |
| 540 | 0.268 |
| 560 | 0.275 |
| 580 | 0.283 |
| 600 | 0.288 |
| 620 | 0.297 |
| 640 | 0.302 |
| 660 | 0.306 |
| 680 | 0.302 |
| 700 | 0.332 |
| 720 | 0.341 |
| 740 | 0.348 |
| 760 | 0.355 |
| 780 | 0.363 |
| 800 | 0.370 |
| 820 | 0.376 |
| 840 | 0.383 |
| 860 | 0.390 |
| 880 | 0.396 |
| 900 | 0.401 |
| 920 | 0.402 |
| 940 | 0.407 |
| 960 | 0.419 |
| 980 | 0.426 |
| 1000 | 0.431 |
| 1020 | 0.435 |
| 1040 | 0.438 |
| 1060 | 0.445 |
| 1080 | 0.451 |
| 1100 | 0.457 |
| 1120 | 0.462 |
| 1140 | 0.466 |
| 1160 | 0.457 |
| 1180 | 0.445 |
| 1200 | 0.407 |
| 1220 | 0.388 |
| 1240 | 0.464 |
| 1260 | 0.486 |
| 1280 | 0.497 |
| 1300 | 0.504 |
| 1320 | 0.512 |
| 1340 | 0.518 |
| 1360 | 0.521 |
| 1380 | 0.503 |
| 1400 | 0.492 |
| 1420 | 0.480 |
| 1440 | 0.495 |
| 1460 | 0.519 |
| 1480 | 0.539 |
| 1500 | 0.550 |
| 1520 | 0.557 |
| 1540 | 0.557 |
| 1560 | 0.573 |
| 1580 | 0.580 |
| 1600 | 0.585 |
| 1620 | 0.590 |
| 1640 | 0.593 |
| 1660 | 0.592 |
| 1680 | 0.577 |
| 1700 | 0.523 |
| 1720 | 0.374 |
| 1740 | 0.423 |
| 1760 | 0.420 |
| 1780 | 0.494 |
| 1800 | 0.497 |
| 1820 | 0.504 |
| 1840 | 0.526 |
| 1860 | 0.556 |
| 1880 | 0.573 |
| 1900 | 0.579 |
| 1920 | 0.582 |
| 1940 | 0.590 |
| 1960 | 0.595 |
| 1980 | 0.605 |
| 2000 | 0.602 |
| 2020 | 0.612 |
| 2040 | 0.619 |
| 2060 | 0.629 |
| 2080 | 0.645 |
| 2100 | 0.659 |
| 2120 | 0.670 |
| 2140 | 0.671 |
| 2160 | 0.672 |
| 2180 | 0.667 |
| 2200 | 0.655 |
| 2220 | 0.649 |
| 2240 | 0.621 |
| 2260 | 0.575 |
| 2280 | 0.444 |
| 2300 | 0.206 |
| 2320 | 0.329 |
| 2340 | 0.285 |
| 2360 | 0.288 |
| 2380 | 0.211 |
| 2400 | 0.205 |
| 2420 | 0.237 |
| 2440 | 0.244 |
| 2460 | 0.360 |
| 2480 | 0.392 |
| 2500 | 0.468 |

Transmittance average for each wavelength range

| | 2% TiO2 |
|---|---|
| Average: 300-380 | 0% |
| Average 420-700 | 27% |
| Average 700-1000 | 38% |
| Average 1500-1600 | 57% |

Transmittance difference for each wavelength range

| | |
|---|---|
| (700-1000) vs (420-700) | 11% |
| (1500-1600) vs (700-1000) | 18% |

FIG. 74
FIG. 74: Diffuse transmittance table, diffuse transmittance versus radiation from 250 to 2500 nm tape, 20% Microvoid pigment Transmittance for each wavelength - ground cover

| wavelength (nm) | Fabric 20% Microvoid pigment |
|---|---|
| 280 | 0.014 |
| 300 | 0.067 |
| 320 | 0.074 |
| 340 | 0.078 |
| 360 | 0.095 |
| 380 | 0.106 |
| 400 | 0.117 |

FIG. 74
FIG. 74: Diffuse transmittance table, diffuse transmittance versus radiation from 250 to 2500 nm tape, 20% Microvoid pigment

| | |
|---|---|
| 420 | 0.121 |
| 440 | 0.124 |
| 460 | 0.127 |
| 480 | 0.130 |
| 500 | 0.132 |
| 520 | 0.134 |
| 540 | 0.136 |
| 560 | 0.139 |
| 580 | 0.141 |
| 600 | 0.143 |
| 620 | 0.145 |
| 640 | 0.147 |
| 660 | 0.149 |
| 680 | 0.151 |
| 700 | 0.153 |
| 720 | 0.155 |
| 740 | 0.156 |
| 760 | 0.158 |
| 780 | 0.160 |
| 800 | 0.162 |
| 820 | 0.164 |
| 840 | 0.165 |
| 860 | 0.167 |
| 880 | 0.168 |
| 900 | 0.170 |
| 920 | 0.170 |
| 940 | 0.173 |
| 960 | 0.177 |
| 980 | 0.179 |
| 1000 | 0.181 |
| 1020 | 0.181 |
| 1040 | 0.184 |
| 1060 | 0.185 |
| 1080 | 0.187 |
| 1100 | 0.190 |
| 1120 | 0.192 |
| 1140 | 0.191 |
| 1160 | 0.188 |
| 1180 | 0.180 |
| 1200 | 0.175 |
| 1220 | 0.181 |
| 1240 | 0.195 |
| 1260 | 0.201 |
| 1280 | 0.204 |
| 1300 | 0.207 |
| 1320 | 0.209 |
| 1340 | 0.210 |
| 1360 | 0.203 |
| 1380 | 0.196 |
| 1400 | 0.195 |
| 1420 | 0.202 |
| 1440 | 0.207 |
| 1460 | 0.213 |
| 1480 | 0.216 |
| 1500 | 0.221 |
| 1520 | 0.225 |
| 1540 | 0.227 |
| 1560 | 0.230 |
| 1580 | 0.231 |
| 1600 | 0.232 |
| 1620 | 0.231 |
| 1640 | 0.230 |
| 1660 | 0.231 |
| 1680 | 0.223 |
| 1700 | 0.152 |
| 1720 | 0.140 |
| 1740 | 0.151 |
| 1760 | 0.177 |
| 1780 | 0.189 |
| 1800 | 0.195 |
| 1820 | 0.193 |
| 1840 | 0.204 |
| 1860 | 0.218 |
| 1880 | 0.219 |
| 1900 | 0.223 |
| 1920 | 0.225 |
| 1940 | 0.227 |
| 1960 | 0.227 |
| 1980 | 0.228 |
| 2000 | 0.239 |
| 2020 | 0.241 |
| 2040 | 0.243 |
| 2060 | 0.244 |
| 2080 | 0.242 |
| 2100 | 0.253 |
| 2120 | 0.253 |
| 2140 | 0.251 |
| 2160 | 0.241 |
| 2180 | 0.236 |
| 2200 | 0.224 |
| 2220 | 0.203 |
| 2240 | 0.209 |
| 2260 | 0.122 |
| 2280 | 0.078 |
| 2300 | 0.069 |
| 2320 | 0.044 |
| 2340 | 0.074 |
| 2360 | 0.054 |
| 2380 | 0.076 |
| 2400 | 0.063 |
| 2420 | 0.078 |
| 2440 | 0.085 |
| 2460 | 0.040 |
| 2480 | 0.124 |
| 2500 | 0.121 |

Transmittance average for each wavelength range

| | 20% Microvoid pigment |
|---|---|
| Average: 300-380 | 8% |
| Average 420-700 | 14% |
| Average 700-1000 | 17% |
| Average 1500-1600 | 23% |

Transmittance difference for each wavelength range

| | |
|---|---|
| (700-1000) vs (420-700) | 3% |
| (1500-1600) vs (700-1000) | 6% |

FIG. 75
FIG. 75: Diffuse transmittance table, diffuse transmittance versus radiation from 250 to 2500 nm tape, 2.5% black, 4.0% Microvoid pigment Transmittance for each wavelength - ground cover

| wavelength (nm) | Tape 2.5% black, 4% microvoid pigment |
|---|---|
| 280 | 0.0090 |
| 300 | 0.0090 |
| 320 | 0.0090 |
| 340 | 0.0090 |
| 360 | 0.0090 |
| 380 | 0.0090 |
| 400 | 0.0090 |
| 420 | 0.0090 |
| 440 | 0.0090 |
| 460 | 0.0090 |
| 480 | 0.0090 |
| 500 | 0.0090 |
| 520 | 0.0090 |
| 540 | 0.0090 |
| 560 | 0.0090 |

FIG. 75
FIG. 75: Diffuse transmittance table, diffuse transmittance versus radiation from 250 to 2500 nm tape, 2.5% black, 4.0% Microvoid pigment

| | |
|---|---|
| 580 | 0.0090 |
| 600 | 0.0090 |
| 620 | 0.0090 |
| 640 | 0.0090 |
| 660 | 0.0090 |
| 680 | 0.0090 |
| 700 | 0.0090 |
| 720 | 0.0090 |
| 740 | 0.0090 |
| 760 | 0.0090 |
| 780 | 0.0090 |
| 800 | 0.0090 |
| 820 | 0.0090 |
| 840 | 0.0090 |
| 860 | 0.0090 |
| 880 | 0.0090 |
| 900 | 0.0090 |
| 920 | 0.0090 |
| 940 | 0.0090 |
| 960 | 0.0090 |
| 980 | 0.0090 |
| 1000 | 0.0090 |
| 1020 | 0.0090 |
| 1040 | 0.0090 |
| 1060 | 0.0090 |
| 1080 | 0.0090 |
| 1100 | 0.0090 |
| 1120 | 0.0090 |
| 1140 | 0.0090 |
| 1160 | 0.0090 |
| 1180 | 0.0090 |
| 1200 | 0.0090 |
| 1220 | 0.0090 |
| 1240 | 0.0090 |
| 1260 | 0.0090 |
| 1280 | 0.0090 |
| 1300 | 0.0109 |
| 1320 | 0.0118 |
| 1340 | 0.0121 |
| 1360 | 0.0116 |
| 1380 | 0.0073 |
| 1400 | 0.0121 |
| 1420 | 0.0185 |
| 1440 | 0.0207 |
| 1460 | 0.0204 |
| 1480 | 0.0214 |
| 1500 | 0.0240 |
| 1520 | 0.0257 |
| 1540 | 0.0279 |
| 1560 | 0.0307 |
| 1580 | 0.0305 |
| 1600 | 0.0335 |
| 1620 | 0.0325 |
| 1640 | 0.0330 |
| 1660 | 0.0373 |
| 1680 | 0.0416 |
| 1700 | 0.0403 |
| 1720 | 0.0429 |
| 1740 | 0.0306 |
| 1760 | 0.0458 |
| 1780 | 0.0549 |
| 1800 | 0.0501 |
| 1820 | 0.0434 |
| 1840 | 0.0525 |
| 1860 | 0.0504 |
| 1880 | 0.0602 |
| 1900 | 0.0535 |
| 1920 | 0.0540 |
| 1940 | 0.0588 |
| 1960 | 0.0771 |
| 1980 | 0.0643 |
| 2000 | 0.0629 |
| 2020 | 0.0688 |
| 2040 | 0.0753 |
| 2060 | 0.0575 |
| 2080 | 0.0744 |
| 2100 | 0.0867 |
| 2120 | 0.0596 |
| 2140 | 0.0627 |
| 2160 | 0.0931 |
| 2180 | 0.0602 |
| 2200 | 0.0724 |
| 2220 | 0.0999 |
| 2240 | 0.0673 |
| 2260 | 0.0346 |
| 2280 | 0.0905 |
| 2300 | 0.0577 |
| 2320 | 0.1181 |
| 2340 | 0.0424 |
| 2360 | 0.0888 |
| 2380 | 0.0366 |
| 2400 | 0.0453 |
| 2420 | 0.0240 |
| 2440 | 0.0562 |
| 2460 | 0.0305 |
| 2480 | 0.0221 |
| 2500 | 0.0558 |

Transmittance average for each wavelength range

| | 2.5% black, 4% microvoid pigment |
|---|---|
| Average: 300-380 | 1% |
| Average 420-700 | 1% |
| Average 700-1000 | 1% |
| Average 1500-1600 | 3% |

Transmittance difference for each wavelength range

| | |
|---|---|
| (700-1000) vs (420-700) | 0% |
| (1500-1600) vs (700-1000) | 2% |

FIG. 76
FIG. 76: Diffuse transmittance table, diffuse transmittance versus radiation from 250 to 2500 nm tape, Al coated tape Transmittance for each wavelength - ground cover

| wavelength (nm) | Tape Al coated tape |
|---|---|
| 280 | 0.0090 |
| 300 | 0.0090 |
| 320 | 0.0090 |
| 340 | 0.0090 |
| 360 | 0.0090 |
| 380 | 0.0090 |
| 400 | 0.0090 |
| 420 | 0.0090 |
| 440 | 0.0090 |
| 460 | 0.0090 |
| 480 | 0.0090 |
| 500 | 0.0090 |
| 520 | 0.0090 |
| 540 | 0.0090 |
| 560 | 0.0090 |
| 580 | 0.0090 |
| 600 | 0.0090 |
| 620 | 0.0090 |
| 640 | 0.0090 |
| 660 | 0.0090 |
| 680 | 0.0090 |
| 700 | 0.0090 |
| 720 | 0.0090 |
| 740 | 0.0090 |

FIG. 76
FIG. 76: Diffuse transmittance table, diffuse transmittance versus radiation from 250 to 2500 nm tape, Al coated tape

| | |
|---|---|
| 760 | 0.0090 |
| 780 | 0.0090 |
| 800 | 0.0090 |
| 820 | 0.0090 |
| 840 | 0.0090 |
| 860 | 0.0090 |
| 880 | 0.0090 |
| 900 | 0.0090 |
| 920 | 0.0090 |
| 940 | 0.0090 |
| 960 | 0.0090 |
| 980 | 0.0090 |
| 1000 | 0.0090 |
| 1020 | 0.0090 |
| 1040 | 0.0090 |
| 1060 | 0.0090 |
| 1080 | 0.0090 |
| 1100 | 0.0090 |
| 1120 | 0.0090 |
| 1140 | 0.0090 |
| 1160 | 0.0090 |
| 1180 | 0.0090 |
| 1200 | 0.0090 |
| 1220 | 0.0090 |
| 1240 | 0.0090 |
| 1260 | 0.0090 |
| 1280 | 0.0090 |
| 1300 | 0.0090 |
| 1320 | 0.0090 |
| 1340 | 0.0090 |
| 1360 | 0.0090 |
| 1380 | 0.0090 |
| 1400 | 0.0090 |
| 1420 | 0.0090 |
| 1440 | 0.0090 |
| 1460 | 0.0090 |
| 1480 | 0.0090 |
| 1500 | 0.0090 |
| 1520 | 0.0090 |
| 1540 | 0.0090 |
| 1560 | 0.0090 |
| 1580 | 0.0090 |
| 1600 | 0.0090 |
| 1620 | 0.0090 |
| 1640 | 0.0090 |
| 1660 | 0.0090 |
| 1680 | 0.0090 |
| 1700 | 0.0090 |
| 1720 | 0.0090 |
| 1740 | 0.0090 |
| 1760 | 0.0090 |
| 1780 | 0.0090 |
| 1800 | 0.0090 |
| 1820 | 0.0090 |
| 1840 | 0.0090 |
| 1860 | 0.0090 |
| 1880 | 0.0090 |
| 1900 | 0.0090 |
| 1920 | 0.0090 |
| 1940 | 0.0090 |
| 1960 | 0.0090 |
| 1980 | 0.0090 |
| 2000 | 0.0090 |
| 2020 | 0.0090 |
| 2040 | 0.0090 |
| 2060 | 0.0090 |
| 2080 | 0.0090 |
| 2100 | 0.0090 |
| 2120 | 0.0090 |
| 2140 | 0.0090 |
| 2160 | 0.0090 |
| 2180 | 0.0090 |
| 2200 | 0.0090 |
| 2220 | 0.0090 |
| 2240 | 0.0090 |
| 2260 | 0.0090 |
| 2280 | 0.0090 |
| 2300 | 0.0090 |
| 2320 | 0.0090 |
| 2340 | 0.0090 |
| 2360 | 0.0090 |
| 2380 | 0.0090 |
| 2400 | 0.0090 |
| 2420 | 0.0090 |
| 2440 | 0.0090 |
| 2460 | 0.0090 |
| 2480 | 0.0090 |
| 2500 | 0.0090 |

Transmittance average for each wavelength range

| | Al coated tape |
|---|---|
| Average: 300-380 | 1% |
| Average 420-700 | 1% |
| Average 700-1000 | 1% |
| Average 1500-1600 | 1% |

Transmittance difference for each wavelength range

| | |
|---|---|
| (700-1000) vs (420-700) | 0% |
| (1500-1600) vs (700-1000) | 0% |

Ground Cover Material of the Invention

FIG. 77
FIG. 77: Diffuse transmittance table, diffuse transmittance versus radiation from 250 to 2500 nm monofilament, 1% Altiris, 14% Microvoid pigment Transmittance for each wavelength - ground cover

| wavelength (nm) | Mono 1% Altiris, 14% Microvoid pigment |
|---|---|
| 280 | 0.0574 |
| 300 | 0.0376 |
| 320 | 0.0466 |
| 340 | 0.0471 |
| 360 | 0.0484 |
| 380 | 0.0572 |
| 400 | 0.1003 |
| 420 | 0.1837 |
| 440 | 0.1902 |
| 460 | 0.1940 |
| 480 | 0.1969 |
| 500 | 0.1999 |
| 520 | 0.2026 |
| 540 | 0.2049 |
| 560 | 0.2073 |
| 580 | 0.2096 |
| 600 | 0.2113 |
| 620 | 0.2136 |
| 640 | 0.2152 |
| 660 | 0.2172 |
| 680 | 0.2193 |
| 700 | 0.2213 |
| 720 | 0.2232 |
| 740 | 0.2254 |
| 760 | 0.2267 |
| 780 | 0.2274 |
| 800 | 0.2291 |
| 820 | 0.2311 |
| 840 | 0.2329 |
| 860 | 0.2352 |

FIG. 77

FIG. 77: Diffuse transmittance table, diffuse transmittance versus radiation from 250 to 2500 nm monofilament, 1% Altiris, 14% Microvoid pigment

| | |
|---|---|
| 880 | 0.2368 |
| 900 | 0.2378 |
| 920 | 0.2364 |
| 940 | 0.2372 |
| 960 | 0.2420 |
| 980 | 0.2445 |
| 1000 | 0.2448 |
| 1020 | 0.2399 |
| 1040 | 0.2324 |
| 1060 | 0.2412 |
| 1080 | 0.2595 |
| 1100 | 0.2428 |
| 1120 | 0.2569 |
| 1140 | 0.2462 |
| 1160 | 0.2515 |
| 1180 | 0.2264 |
| 1200 | 0.2202 |
| 1220 | 0.2282 |
| 1240 | 0.2410 |
| 1260 | 0.2752 |
| 1280 | 0.2568 |
| 1300 | 0.2719 |
| 1320 | 0.2568 |
| 1340 | 0.2747 |
| 1360 | 0.2000 |
| 1380 | 0.4113 |
| 1400 | 0.3465 |
| 1420 | 0.2459 |
| 1440 | 0.2443 |
| 1460 | 0.2612 |
| 1480 | 0.2532 |
| 1500 | 0.2662 |
| 1520 | 0.2845 |
| 1540 | 0.2618 |
| 1560 | 0.2903 |
| 1580 | 0.2763 |
| 1600 | 0.2926 |
| 1620 | 0.2759 |
| 1640 | 0.2856 |
| 1660 | 0.3079 |
| 1680 | 0.2679 |
| 1700 | 0.2623 |
| 1720 | 0.1421 |
| 1740 | 0.1724 |
| 1760 | 0.1609 |
| 1780 | 0.2174 |
| 1800 | 0.2228 |
| 1820 | 0.2224 |
| 1840 | −0.0007 |
| 1860 | 0.3368 |
| 1880 | 0.2810 |
| 1900 | 0.2830 |
| 1920 | 0.4342 |
| 1940 | 0.2613 |
| 1960 | 0.2552 |
| 1980 | 0.2445 |
| 2000 | 0.2577 |
| 2020 | 0.2468 |
| 2040 | 0.2632 |
| 2060 | 0.2478 |
| 2080 | 0.2727 |
| 2100 | 0.2687 |
| 2120 | 0.2889 |
| 2140 | 0.2680 |
| 2160 | 0.2855 |
| 2180 | 0.2955 |
| 2200 | 0.2420 |
| 2220 | 0.2792 |
| 2240 | 0.2221 |
| 2260 | 0.2106 |
| 2280 | 0.1754 |
| 2300 | 0.0589 |
| 2320 | 0.1118 |
| 2340 | 0.0707 |
| 2360 | 0.0892 |
| 2380 | 0.0546 |
| 2400 | 0.0808 |
| 2420 | 0.0413 |
| 2440 | 0.0889 |
| 2460 | 0.0707 |
| 2480 | 0.0572 |
| 2500 | 0.2232 |

Transmittance average for each wavelength range

| | 1% Altiris, 14% Microvoid pigment |
|---|---|
| Average: 300-380 | 5% |
| Average 420-700 | 21% |
| Average 700-1000 | 23% |
| Average 1500-1600 | 28% |

Transmittance difference for each wavelength range

| | |
|---|---|
| (700-1000) vs (420-700) | 3% |
| (1500-1600) vs (700-1000) | 5% |

FIG. 78

FIG. 78: Diffuse transmittance table, diffuse transmittance versus radiation from 250 to 2500 nm monofilament, 2% Altiris, 14% Microvoid pigment Transmittance for each wavelength - ground cover

| wavelength (nm) | Mono 2% Altiris, 14% Microvoid pigment |
|---|---|
| 280 | 0.0127 |
| 300 | 0.0081 |
| 320 | 0.0009 |
| 340 | 0.0037 |
| 360 | 0.0053 |
| 380 | 0.0085 |
| 400 | 0.0320 |
| 420 | 0.1225 |
| 440 | 0.1308 |
| 460 | 0.1347 |
| 480 | 0.1375 |
| 500 | 0.1404 |
| 520 | 0.1429 |
| 540 | 0.1450 |
| 560 | 0.1472 |
| 580 | 0.1492 |
| 600 | 0.1508 |
| 620 | 0.1521 |
| 640 | 0.1540 |
| 660 | 0.1560 |
| 680 | 0.1579 |
| 700 | 0.1598 |
| 720 | 0.1616 |
| 740 | 0.1624 |
| 760 | 0.1662 |
| 780 | 0.1655 |
| 800 | 0.1669 |
| 820 | 0.1682 |
| 840 | 0.1695 |
| 860 | 0.1710 |
| 880 | 0.1722 |
| 900 | 0.1728 |
| 920 | 0.1716 |
| 940 | 0.1721 |
| 960 | 0.1761 |

FIG. 78

FIG. 78: Diffuse transmittance table, diffuse transmittance versus radiation from 250 to 2500 nm monofilament, 2% Altiris, 14% Microvoid pigment

| | |
|---|---|
| 980 | 0.1790 |
| 1000 | 0.1795 |
| 1020 | 0.1868 |
| 1040 | 0.1853 |
| 1060 | 0.1902 |
| 1080 | 0.1897 |
| 1100 | 0.1913 |
| 1120 | 0.1843 |
| 1140 | 0.2074 |
| 1160 | 0.1873 |
| 1180 | 0.1941 |
| 1200 | 0.1724 |
| 1220 | 0.1433 |
| 1240 | 0.1853 |
| 1260 | 0.2062 |
| 1280 | 0.1979 |
| 1300 | 0.2200 |
| 1320 | 0.2115 |
| 1340 | 0.2109 |
| 1360 | 0.2391 |
| 1380 | 0.2527 |
| 1400 | 0.2066 |
| 1420 | 0.1779 |
| 1440 | 0.1920 |
| 1460 | 0.2033 |
| 1480 | 0.1988 |
| 1500 | 0.2109 |
| 1520 | 0.2252 |
| 1540 | 0.2130 |
| 1560 | 0.2180 |
| 1580 | 0.2206 |
| 1600 | 0.2312 |
| 1620 | 0.2233 |
| 1640 | 0.2178 |
| 1660 | 0.2293 |
| 1680 | 0.2097 |
| 1700 | 0.1792 |
| 1720 | 0.0887 |
| 1740 | 0.1091 |
| 1760 | 0.1164 |
| 1780 | 0.1612 |
| 1800 | 0.1555 |
| 1820 | 0.0587 |
| 1840 | 0.1516 |
| 1860 | 0.1183 |
| 1880 | 0.1865 |
| 1900 | 0.1415 |
| 1920 | 0.1225 |
| 1940 | 0.2151 |
| 1960 | 0.1865 |
| 1980 | 0.1988 |
| 2000 | 0.2026 |
| 2020 | 0.1843 |
| 2040 | 0.2164 |
| 2060 | 0.2087 |
| 2080 | 0.2360 |
| 2100 | 0.2311 |
| 2120 | 0.2452 |
| 2140 | 0.2312 |
| 2160 | 0.2432 |
| 2180 | 0.2290 |
| 2200 | 0.2052 |
| 2220 | 0.2372 |
| 2240 | 0.1495 |
| 2260 | 0.1791 |
| 2280 | 0.1171 |
| 2300 | 0.0379 |
| 2320 | −0.0083 |
| 2340 | 0.0317 |
| 2360 | 0.0249 |
| 2380 | −0.0277 |
| 2400 | 0.0280 |
| 2420 | −0.0482 |
| 2440 | 0.0478 |
| 2460 | 0.0161 |
| 2480 | 0.0405 |
| 2500 | 0.0214 |

Transmittance average for each wavelength range

| | 2% Altiris, 14% Microvoid pigment |
|---|---|
| Average: 300-380 | 1% |
| Average 420-700 | 15% |
| Average 700-1000 | 17% |
| Average 1500-1600 | 22% |

Transmittance difference for each wavelength range

| | |
|---|---|
| (700-1000) vs (420-700) | 2% |
| (1500-1600) vs (700-1000) | 5% |

FIG. 79

FIG. 79: Diffuse transmittance table, diffuse transmittance versus radiation from 250 to 2500 nm monofilament, 1% TiO2, 14% Microvoid pigment Transmittance for each wavelength - ground cover

| wavelength (nm) | Mono 1% TiO2, 14% Microvoid pigment |
|---|---|
| 280 | 0.1586 |
| 300 | 0.0011 |
| 320 | 0.0558 |
| 340 | 0.0504 |
| 360 | 0.0565 |
| 380 | 0.0625 |
| 400 | 0.0983 |
| 420 | 0.1650 |
| 440 | 0.1700 |
| 460 | 0.1733 |
| 480 | 0.1759 |
| 500 | 0.1790 |
| 520 | 0.1811 |
| 540 | 0.1845 |
| 560 | 0.1871 |
| 580 | 0.1901 |
| 600 | 0.1919 |
| 620 | 0.1962 |
| 640 | 0.1968 |
| 660 | 0.1994 |
| 680 | 0.2016 |
| 700 | 0.2040 |
| 720 | 0.2061 |
| 740 | 0.2116 |
| 760 | 0.2070 |
| 780 | 0.2120 |
| 800 | 0.2147 |
| 820 | 0.2181 |
| 840 | 0.2222 |
| 860 | 0.2262 |
| 880 | 0.2289 |
| 900 | 0.2300 |
| 920 | 0.2295 |
| 940 | 0.2295 |
| 960 | 0.2357 |
| 980 | 0.2373 |
| 1000 | 0.2377 |
| 1020 | 0.2487 |
| 1040 | 0.2515 |
| 1060 | 0.2415 |
| 1080 | 0.2555 |

FIG. 79

FIG. 79: Diffuse transmittance table, diffuse transmittance versus radiation from 250 to 2500 nm monofilament, 1% TiO2, 14% Microvoid pigment

| | |
|---|---|
| 1100 | 0.2474 |
| 1120 | 0.2454 |
| 1140 | 0.2635 |
| 1160 | 0.2534 |
| 1180 | 0.2372 |
| 1200 | 0.2190 |
| 1220 | 0.2012 |
| 1240 | 0.2457 |
| 1260 | 0.2693 |
| 1280 | 0.2686 |
| 1300 | 0.2680 |
| 1320 | 0.2734 |
| 1340 | 0.2790 |
| 1360 | 0.2437 |
| 1380 | 0.4001 |
| 1400 | 0.3106 |
| 1420 | 0.2521 |
| 1440 | 0.2371 |
| 1460 | 0.2591 |
| 1480 | 0.2686 |
| 1500 | 0.2797 |
| 1520 | 0.2818 |
| 1540 | 0.2802 |
| 1560 | 0.2857 |
| 1580 | 0.2876 |
| 1600 | 0.2783 |
| 1620 | 0.2911 |
| 1640 | 0.2827 |
| 1660 | 0.2960 |
| 1680 | 0.2783 |
| 1700 | 0.2541 |
| 1720 | 0.1579 |
| 1740 | 0.1734 |
| 1760 | 0.1803 |
| 1780 | 0.2204 |
| 1800 | 0.2404 |
| 1820 | 0.1731 |
| 1840 | 0.0493 |
| 1860 | 0.2879 |
| 1880 | 0.2964 |
| 1900 | 0.2550 |
| 1920 | 0.3255 |
| 1940 | 0.2896 |
| 1960 | 0.2646 |
| 1980 | 0.2649 |
| 2000 | 0.2667 |
| 2020 | 0.2648 |
| 2040 | 0.2872 |
| 2060 | 0.2884 |
| 2080 | 0.3061 |
| 2100 | 0.3223 |
| 2120 | 0.3194 |
| 2140 | 0.3294 |
| 2160 | 0.3429 |
| 2180 | 0.3121 |
| 2200 | 0.2870 |
| 2220 | 0.3077 |
| 2240 | 0.2561 |
| 2260 | 0.2121 |
| 2280 | 0.1737 |
| 2300 | 0.0774 |
| 2320 | 0.0598 |
| 2340 | 0.1124 |
| 2360 | 0.0675 |
| 2380 | 0.0579 |
| 2400 | 0.0429 |
| 2420 | 0.0757 |
| 2440 | 0.0812 |
| 2460 | 0.1693 |
| 2480 | 0.0506 |
| 2500 | 0.1911 |

Transmittance average for each wavelength range

| | 1% TiO2, 14% Microvoid pigment |
|---|---|
| Average: 300-380 | 5% |
| Average 420-700 | 19% |
| Average 700-1000 | 22% |
| Average 1500-1600 | 28% |

Transmittance difference for each wavelength range

| | |
|---|---|
| (700-1000) vs (420-700) | 4% |
| (1500-1600) vs (700-1000) | 6% |

FIG. 80

FIG. 80: Diffuse transmittance table, diffuse transmittance versus radiation from 250 to 2500 nm tape, 1% Altiris, 10% Microvoid pigment Transmittance for each wavelength

| wavelength (nm) | Mono 1% Altiris, 10% Microvoid pigment |
|---|---|
| 280 | 0.1599 |
| 300 | 0.1747 |
| 320 | 0.1637 |
| 340 | 0.1700 |
| 360 | 0.1651 |
| 380 | 0.1721 |
| 400 | 0.2150 |
| 420 | 0.3299 |
| 440 | 0.3319 |
| 460 | 0.3406 |
| 480 | 0.3402 |
| 500 | 0.3473 |
| 520 | 0.3447 |
| 540 | 0.3505 |
| 560 | 0.3566 |
| 580 | 0.3509 |
| 600 | 0.3575 |
| 620 | 0.3564 |
| 640 | 0.3595 |
| 660 | 0.3565 |
| 680 | 0.3627 |
| 700 | 0.3584 |
| 720 | 0.3662 |
| 740 | 0.3722 |
| 760 | 0.3699 |
| 780 | 0.3747 |
| 800 | 0.3715 |
| 820 | 0.3765 |
| 840 | 0.3738 |
| 860 | 0.3789 |
| 880 | 0.3785 |
| 900 | 0.3833 |
| 920 | 0.3794 |
| 940 | 0.3844 |
| 960 | 0.3849 |
| 980 | 0.3893 |
| 1000 | 0.3967 |
| 1020 | 0.3904 |
| 1040 | 0.3928 |
| 1060 | 0.3930 |
| 1080 | 0.3983 |
| 1100 | 0.4039 |
| 1120 | 0.4011 |
| 1140 | 0.4052 |
| 1160 | 0.3944 |

FIG. 80: Diffuse transmittance table, diffuse transmittance versus radiation from 250 to 2500 nm tape, 1% Altiris, 10% Microvoid pigment

| | |
|---|---|
| 1180 | 0.3866 |
| 1200 | 0.3569 |
| 1220 | 0.3401 |
| 1240 | 0.3881 |
| 1260 | 0.4032 |
| 1280 | 0.4111 |
| 1300 | 0.4106 |
| 1320 | 0.4168 |
| 1340 | 0.4162 |
| 1360 | 0.4178 |
| 1380 | 0.4008 |
| 1400 | 0.3907 |
| 1420 | 0.3787 |
| 1440 | 0.3871 |
| 1460 | 0.4019 |
| 1480 | 0.4137 |
| 1500 | 0.4234 |
| 1520 | 0.4265 |
| 1540 | 0.4223 |
| 1560 | 0.4319 |
| 1580 | 0.4375 |
| 1600 | 0.4379 |
| 1620 | 0.4394 |
| 1640 | 0.4396 |
| 1660 | 0.4364 |
| 1680 | 0.4221 |
| 1700 | 0.3903 |
| 1720 | 0.2720 |
| 1740 | 0.2938 |
| 1760 | 0.2982 |
| 1780 | 0.3469 |
| 1800 | 0.3429 |
| 1820 | 0.3456 |
| 1840 | 0.3578 |
| 1860 | 0.3801 |
| 1880 | 0.3888 |
| 1900 | 0.3918 |
| 1920 | 0.3894 |
| 1940 | 0.3902 |
| 1960 | 0.3942 |
| 1980 | 0.3971 |
| 2000 | 0.3947 |
| 2020 | 0.3960 |
| 2040 | 0.4049 |
| 2060 | 0.4004 |
| 2080 | 0.4153 |
| 2100 | 0.4286 |
| 2120 | 0.4404 |
| 2140 | 0.4297 |
| 2160 | 0.4403 |
| 2180 | 0.4288 |
| 2200 | 0.4050 |
| 2220 | 0.3841 |
| 2240 | 0.3493 |
| 2260 | 0.3223 |
| 2280 | 0.2324 |
| 2300 | 0.1618 |
| 2320 | 0.1806 |
| 2340 | 0.1767 |
| 2360 | 0.1678 |
| 2380 | 0.1511 |
| 2400 | 0.1303 |
| 2420 | 0.1395 |
| 2440 | 0.1366 |
| 2460 | 0.1843 |
| 2480 | 0.1661 |
| 2500 | 0.2038 |

Transmittance average for each wavelength range

1% Altiris, 10% Microvoid pigment

| | |
|---|---|
| Average: 300-380 | 17% |
| Average 420-700 | 35% |
| Average 700-1000 | 38% |
| Average 1500-1600 | 43% |

Transmittance difference for each wavelength range

| | |
|---|---|
| (700-1000) vs (420-700) | 3% |
| (1500-1600) vs (700-1000) | 5% |

The foregoing describes the invention including preferred forms thereof, alterations and modifications as will be obvious to those skilled in the art are intended to be incorporated in the scope hereof, as defined in the accompanying claims.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date.

The invention claimed is:

1. A crop netting material which is knitted, woven, or non-woven, from a synthetic monofilament, multifilament yarn, or tape or combination thereof, formed from a resin comprising at least one pigment such that the monofilament, multifilament yarn, or tape:
across a UV wavelength range about 300 to about 380 nm:
absorbs at least about 55% solar radiation on average, and
transmits less than about 30% solar radiation on average;
across a visible wavelength range about 420 to about 700 nm:
transmits at least about 10% solar radiation on average, and
reflects at least about 10% of solar radiation on average;
across an infrared wavelength range about 700 to about 1000 nm: transmits between about 15% and about 80% of solar radiation on average;
across an infrared wavelength range of 1500 to 1600 nm: transmits at least about 15% to about 90% solar radiation on average; and
across an infrared wavelength range about 700 to about 1000 nm:
transmits not more than about 9 percentage points on average more than, and
transmits not less than about 9 percentage points on average less than,
the solar radiation transmission across said visible wavelength range about 420 to about 700 nm; and
across an infrared wavelength range about 1500 to about 1600 nm:
transmits not more than about 9 percentage points on average more than, and
transmits not less than about 9 percentage points on average less than,
the solar radiation transmission across said infrared wavelength range about 700 to about 1000 nm;
wherein the netting material has a cover factor of less than 80%;

wherein said pigment comprises titanium dioxide having an average particle size greater than 0.5 μm; and wherein said titanium dioxide comprises titanium dioxide coated with a coating comprising silica, alumina, or a combination thereof.

2. The crop netting material according to claim 1 which across a UV wavelength range about 300 to about 380 nm: absorbs at least about 60% solar radiation on average, and transmits less than about 30% solar radiation on average.

3. The crop netting material according to claim 1 which across a visible wavelength range about 420 to about 700 nm: transmits at least about 20% solar radiation on average.

4. The crop netting material according to claim 1 which across an infrared wavelength range about 700 to about 1000 nm: transmits between about 20% and about 80% of solar radiation on average.

5. The crop netting material according to claim 1 which across an infrared wavelength range about 700 to about 1000 nm: transmits between about 20% and about 70% of solar radiation on average.

6. The crop netting material according to claim 1 which across an infrared wavelength range of 1500 to 1600 nm: transmits at least about 15% to about 85% solar radiation on average.

7. The crop netting material according to claim 1 which across an infrared wavelength range of 1500 to 1600 nm: transmits at least about 20% to about 80% solar radiation on average.

8. The crop netting material according to claim 1 which across an infrared wavelength range about 1500 to about 1600 nm:
   transmits not more than about 8 percentage points on average more than, and
   transmits not less than about 8 percentage points on average less than,
   the solar radiation transmission across said infrared wavelength range about 700 to about 1000 nm.

9. The crop netting material according to claim 1 which across an infrared wavelength range about 700 to about 1000 nm:
   transmits not more than about 7 percentage points on average more than, and
   transmits not less than about 7 percentage points on average less than,
   the solar radiation transmission across said visible wavelength range about 420 to about 700 nm.

10. The crop netting material according to claim 1 wherein said pigment further comprises at least one white pigment.

11. The crop netting material according to claim 10 wherein said pigment further comprises at least one inorganic pigment.

12. The crop netting material according to claim 10 wherein said pigment further comprises a white zirconium, strontium, barium, magnesium, zinc, calcium, titanium, or potassium pigment or a combination thereof.

13. The crop netting material according to claim 1 wherein said titanium dioxide has an average particle size from about 0.7 μm to about 1.8 μm.

14. The crop netting material according to claim 1, wherein said titanium dioxide comprises titanium dioxide in a rutile crystal form.

15. The crop netting material according to claim 1, wherein said titanium dioxide comprises doped titanium dioxide.

16. The crop netting material according claim 1 formed from a resin comprising at least 1% by weight of said pigment.

17. The crop netting material according to claim 1, wherein the cover factor is less than 70%.

18. The crop netting material according to claim 1, wherein the cover factor of less than 50%.

19. A crop cover comprising:
   a crop netting having a cover factor of less than 80%, the crop netting including:
      a synthetic monofilament, multifilament yarn, or tape or combination thereof, formed from a resin comprising at least one pigment such that the monofilament, multifilament yarn, or tape in which the cover factor, as defined by overall area of the netting material which comprises knitted, woven, or non-woven monofilament, yarn, or tape or a combination, forming the netting itself as ratio to the air space in between the netting material:
      across a UV wavelength range about 300 to about 380 nm:
         absorbs at least about 55% solar radiation on average, and
         transmits less than about 30% solar radiation on average;
      across a visible wavelength range about 420 to about 700 nm:
         transmits at least about 10% solar radiation on average, and
         reflects at least about 10% of solar radiation on average;
      across an infrared wavelength range about 700 to about 1000 nm: transmits between about 15% and about 80% of solar radiation on average;
      across an infrared wavelength range of 1500 to 1600 nm: transmits at least about 15% to about 90% solar radiation on average; and
      across an infrared wavelength range about 700 to about 1000 nm:
         transmits not more than about 9 percentage points on average more than, and
         transmits not less than about 9 percentage points on average less than,
         the solar radiation transmission across said visible wavelength range about 420 to about 700 nm; and
      across an infrared wavelength range about 1500 to about 1600 nm:
         transmits not more than about 9 percentage points on average more than, and
         transmits not less than about 9 percentage points on average less than,
         the solar radiation transmission across said infrared wavelength range about 700 to about 1000 nm;
   wherein said pigment comprises titanium dioxide having an average particle size greater than 0.5 μm; and
   wherein said titanium dioxide comprises titanium dioxide coated with a coating comprising silica, alumina, or a combination thereof.

20. The crop cover in claim 1, wherein the crop netting is configured to cover and/or be placed adjacent to a plant as bird netting, insect netting, shadecloth netting, windbreak netting, or hail protection netting.

21. The crop netting material according to claim 1, wherein the at least one pigment further comprises a colored pigment.

22. The crop netting material according to claim 1, wherein said titanium dioxide is present in an amount of about 0.1% to about 4% weight of the crop netting material.

\* \* \* \* \*